US012786711B2

(12) United States Patent
Edge

(10) Patent No.: US 12,786,711 B2
(45) Date of Patent: Nov. 3, 2026

(54) STORE AND FORWARD SATELLITE ACCESS WITH DISCONTINUOUS FEEDER LINKS AND PACKAGING OF DATA

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 18/477,534

(22) Filed: Sep. 28, 2023

(65) Prior Publication Data

US 2025/0055560 A1 Feb. 13, 2025

Related U.S. Application Data

(60) Provisional application No. 63/518,551, filed on Aug. 9, 2023.

(51) Int. Cl.
*H04W 28/02* (2009.01)
*H04B 7/185* (2006.01)
(Continued)

(52) U.S. Cl.
CPC ........ *H04W 12/08* (2013.01); *H04B 7/18513* (2013.01); *H04B 7/18584* (2013.01);
(Continued)

(58) Field of Classification Search
CPC ............. H04W 12/08; H04W 12/0431; H04W 12/06; H04W 28/0215; H04B 7/18513; H04B 7/18584; H04B 7/18593
See application file for complete search history.

(56) References Cited

U.S. PATENT DOCUMENTS 11,736,997 B2 * 8/2023 Yang ..................... H04W 76/15 370/331
12,519,596 B2 * 1/2026 Lyu ....................... H04L 5/0051
(Continued)

FOREIGN PATENT DOCUMENTS

WO 2022076548 A9 10/2022
WO 2022218691 A1 10/2022
WO WO-2024022350 A1 * 2/2024 ............ H04W 76/34
WO WO-2024031072 A1 * 2/2024 ........ H04W 36/0072

OTHER PUBLICATIONS

3GPP TR 22.865 V19.0.0 : "3rd Generation Partnership Project; Technical Specification Group Services and System Aspects; Study on satellite access Phase 3; (Release 19)", 3GPP Standard, Technical Report, 3GPP TR 22.865 V19.0.0, 3GPP, Mobile Competence Centre, 650, Route Des Lucioles ; F-06921, Sophia-antipolis Cedex, France, No. V19.0.0, Jun. 23, 2023, pp. 1-45, XP052409110, Sections 5.2 and 5.3 and Annex a.
(Continued)

*Primary Examiner* — Jay P Patel
(74) *Attorney, Agent, or Firm* — Procopio, Cory, Hargreaves & Savitch LLP

(57) ABSTRACT

A user equipment (UE) communicates with remote endpoints by accessing a space vehicle (SV) in store and forward (S&F) mode when the SV has no feeder link to a network. The SV includes RAN and CN capability to enable the UE to communicate with an on board proxy. The UE sends mobile originated (MO) voice and data to the proxy in a packaged data set and receives mobile terminated voice and data from the remote endpoints also as a packaged data set. When the SV has a feeder link, the proxy forwards the packaged MO data set to a second proxy in an S&F center. The second proxy may unpackage the packaged MO data set and forward the MO data to the remote endpoints or forward the packaged MO data set for unpackaging by a remote
(Continued)

endpoint. The packaging can significantly reduce SV access time by the UE.

27 Claims, 34 Drawing Sheets

(51) Int. Cl.
*H04W 12/0431* (2021.01)
*H04W 12/06* (2021.01)
*H04W 12/08* (2021.01)

(52) U.S. Cl.
CPC .... *H04B 7/18593* (2013.01); *H04W 12/0431* (2021.01); *H04W 12/06* (2013.01); *H04W 28/0215* (2013.01)

(56) References Cited

U.S. PATENT DOCUMENTS

| | | | | |
|---|---|---|---|---|
| 2006/0189275 | A1 | 8/2006 | Karabinis | |
| 2022/0086713 | A1* | 3/2022 | Määttänen | H04W 36/00837 |
| 2023/0254851 | A1* | 8/2023 | Prasad | H04W 72/1268 370/316 |
| 2023/0309127 | A1* | 9/2023 | Prasad | H04W 72/51 |
| 2024/0276213 | A1* | 8/2024 | Mavureddi Dhanasekaran | H04W 12/06 |
| 2024/0298302 | A1* | 9/2024 | Zheng | H04W 56/0035 |
| 2024/0340980 | A1 | 10/2024 | Ji et al. | |
| 2024/0389071 | A1* | 11/2024 | Wang | H04W 68/005 |
| 2025/0008352 | A1* | 1/2025 | Prasad | H04B 7/18541 |
| 2025/0016721 | A1* | 1/2025 | Edge | H04W 64/00 |
| 2025/0038832 | A1* | 1/2025 | Shrestha | H04B 7/18513 |
| 2025/0038834 | A1* | 1/2025 | Ou | H04B 7/18513 |
| 2025/0055559 | A1 | 2/2025 | Edge | |
| 2025/0056229 | A1 | 2/2025 | Edge | |
| 2025/0324333 | A1* | 10/2025 | Lauridsen | H04W 36/083 |
| 2025/0324334 | A1* | 10/2025 | Khoshkholgh | H04W 56/001 |

OTHER PUBLICATIONS

Catt, et al., "Discussion and Proposal for Rel 19 Satellite", 3GPP TSG SA2 Meeting #157, S2-2307044, 3rd Generation Partnership Project (3GPP), Mobile Competence Centre, 650, Route Des Lucioles, F-06921 Sophia-Antipolis Cedex, France, vol. SA WG2, No. Berlin, Germany; May 22-May 26, 2023, May 12, 2023, 11 Pages, XP052488295, p. 7-p. 8.

China Telecom: "Discussion on 5GC Enhancement for Satellite Access Phase 3", 3GPP TSG SA WG2 Meeting #157, S2-2306359, Type Discussion, 3rd Generation Partnership Project (3GPP), Mobile Competence Centre, 650, Route Des Lucioles, F-06921 Sophia-Antipolis Cedex, France, vol. 3GPP SA 2, No. Berlin, DE, May 22-May 26, 2023, May 12, 2023, pp. 1-12, XP052318937, p. 9.

Ericsson: "A Solution for Authentication of EEC/UE and GPSI Verification by EES/ECS", 3GPP TSG-SA3 Meeting #108e-AdHoc, S3-223047 (revision of S3-222825), 3rd Generation Partnership Project, Mobile Competence Centre, 650, Route Des Lucioles, F-06921 Sophia-Antipolis Cedex, France, vol. SA WG3, No. e-meeting, Oct. 10-Oct. 14, 2022, 3 Pages, Oct. 16, 2022, XP052271960, The whole document.

Gong C., et al., "A Distributed Authentication Protocol for 5G Satellite Converged Network", 2023 3rd International Conference on Frontiers of Electronics, Information and Computation Technologies (ICFEICT), IEEE, May 26, 2023, pp. 248-252, XP034413317, Sections I-III.

Luglio M., et al., "Scenarios and Implementation Use-cases for Satellite-based NB-IoT", 2021 International Symposium on Networks, Computers and Communications (ISNCC), IEEE, Oct. 31, 2021, 6 Pages, XP034030439, abstract Sections I-V.

Novamint, et al., "Consolidation proposal for TR 22.865", 3GPP TSG-SA WG1 Meeting #102, S1-231382 (revision of S1-231086), Type Discussion, 3rd Generation Partnership Project (3GPP), Mobile Competence Centre, 650, Route Des Lucioles, F-06921 Sophia-Antipolis Cedex, France, vol. 3GPP SA 1, No. Berlin, DE, May 22-May 26, 2023, May 29, 2023, 13 Pages, XP052379926, Section 7.5.

Satellite Access: "SA Rel-19 Topics Priorities", TSG SA Rel-19 Workshop, SWS-230081, 3rd Generation Partnership Project (3GPP), Mobile Competence Centre, 650, Route Des Lucioles, F-06921 Sophia-Antipolis Cedex, France, vol. TSG SA, No. Taipei, Jun. 13-Jun. 14, 2023, Jun. 13, 2023, pp. 1-16, XP052510588, p. 7-p. 8.

Kellermann T., et al., "Novel Architecture for Cellular IoT in Future Non-Terrestrial Networks: Store and Forward Adaptations for Enabling Discontinuous Feeder Link Operation," IEEE Access, vol. 10, Jun. 29, 2022, pp. 68922-68936.

* cited by examiner

STORE AND FORWARD SATELLITE ACCESS WITH DISCONTINUOUS FEEDER LINKS AND PACKAGING OF DATA

CROSS REFERENCE TO RELATED APPLICATION(S)

This application claims the benefit of and priority to U.S. Provisional Application Ser. No. 63/518,551, entitled "Store and Forward 4G and 5G Satellite Access with Discontinuous Feeder Links" and filed on Aug. 9, 2023, which is expressly incorporated by reference herein in its entirety.

TECHNICAL FIELD

The present disclosure relates generally to communication systems, and more particularly, to wireless communication using satellites with discontinuous feeder links.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to use common protocols that enable different wireless devices to communicate on a municipal, national, regional, and global level. An example telecommunication standard is 5G New Radio (NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some wireless communication networks may include non-terrestrial components. Some aspects of 5G NR may be based on the 4G Long Term Evolution (LTE) standard.

Both 5G NR and LTE can support access to wireless networks using satellites. In such cases, a mobile device may access a satellite that does not have access to a ground based wireless network. In this case. the mobile device and the satellite may need to support store and forward operation to enable the mobile device to access remote endpoints via a ground based wireless network. Techniques to support store and forward operation may thus be useful.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a space vehicle (SV) of non-terrestrial network (NTN). The apparatus may include at least one memory and at least one processor coupled to the at least one memory. Based at least in part on information stored in the at least one memory, the at least one processor, individually or in any combination, may be configured to create an endpoint proxy corresponding to a user equipment (UE), the endpoint proxy simulating an end device in a terrestrial network; receive, as the endpoint proxy, communication from the UE to be delivered to the end device in the terrestrial network; store the communication at the SV during a time period when a feeder link between the SV and the terrestrial network is unavailable; and forward the communication to the terrestrial network when the feeder link becomes available.

In an aspect of the disclosure, a method, a computer-readable medium, and an apparatus are provided for wireless communication at a store-and-forward center (SFC). The apparatus may include at least one memory and at least one processor coupled to the at least one memory. Based at least in part on information stored in the at least one memory, the at least one processor, individually or in any combination, may be configured to receive communication for a UE from an end device in a terrestrial network when a feeder link to a SV in an NTN serving the UE is unavailable; create a UE proxy for the UE; store the communication at the SFC during a time period that the feeder link between is unavailable; and forward the communication to the SV when the feeder link becomes available.

In an aspect of the disclosure, a method, a computer-readable medium, and an apparatus are provided for wireless communication performed by a user equipment (UE). The apparatus is configured to access an SV using a service link at a time that the SV does not have a feeder link to a ground based network and the UE is not registered with the SV; register with the SV; send mobile originated (MO) data intended for at least one remote endpoint to the SV for storage at the SV until the SV has the feeder link to the ground based network to forward the MO data to the at least one remote endpoint via the ground based network; de-register from the SV; and cease to access the SV.

In an aspect of the disclosure, a method, a computer-readable medium, and an apparatus are provided for wireless communication performed by an SV. The apparatus is configured to provide wireless access to a UE via a service link, wherein the SV does not have a feeder link to a ground based network, wherein the UE is not registered with the SV; register the UE; receive MO data from the UE, the MO data intended for at least one remote endpoint; store the MO data; de-register the UE; cease to provide the wireless access to the UE; obtain the feeder link to the ground based network; and forward the MO data to the at least one remote endpoint via the ground based network.

In an aspect of the disclosure, a method, a computer-readable medium, and an apparatus are provided for wireless communication performed by a server. The apparatus is configured to receive MO data from an SV with a feeder link to the server, the MO data intended for at least one remote endpoint and originating from a user equipment (UE) at a time when the SV did not have the feeder link with the server, wherein the MO data is received independent of providing registration and de-registration assistance to register the UE with the SV and later de-register the UE from the SV, and forward the MO data to the at least one remote endpoint via a network.

In an aspect of the disclosure, a method, a computer-readable medium, and an apparatus are provided for wireless communication performed by a UE. The apparatus is configured to obtain MO data intended for at least one remote endpoint; package the mobile originated (MO) data into a single MO data set; access an SV using a service link, wherein the SV does not have a feeder link to a ground based network; send the MO data set to the SV for the SV to store and forward the MO data set to an other entity, for providing to the at least one remote endpoint, when the SV has the feeder link to the ground based network; and cease to access the SV prior to the SV having the feeder link to the ground based network.

In an aspect of the disclosure, a method, a computer-readable medium, and an apparatus are provided for wireless communication performed by a ground based server. The apparatus is configured to receive an MO data set from a space vehicle (SV) having a feeder link to the server, the MO data set comprising MO data intended for at least one remote endpoint; and provide the MO data set to an other entity for the other entity to unpackage the MO data set into the MO data; wherein the MO data set originated from a user equipment (UE) at a time when the ground based server did not have the feeder link with the SV, and the MO data set is received independent of providing registration and de-registration assistance to register the UE with the SV and later de-register the UE from the SV.

In an aspect of the disclosure, a method, a computer-readable medium, and an apparatus are provided for enabling security, performed by a first entity, for wireless access by a UE to an SV in a store and forward mode. The apparatus is configured to send a key identity (Kid) to a second entity for the second entity to determine a substitute primary key (K*) for the UE based on the Kid and a primary key (K) for the UE based on the K configured in the second entity; and perform authentication and ciphering key determination based on the K* to enable secure transfer of data between the UE and at least one remote endpoint via the SV, wherein the K* and the Kid are configured in the first entity, wherein the secure transfer of data is between the UE that accesses the SV using a service link when the SV does not have a feeder link, wherein UE registration with the SV is a part of access to the SV.

In an aspect of the disclosure, a method, a computer-readable medium, and an apparatus are provided for enabling security, performed by a second entity, for wireless access by a UE to an SV in a store and forward mode. The apparatus is configured to receive a key identity (Kid) from a first entity; determine a substitute primary key (K*) for the UE based on the Kid and a primary key (K) for the UE, the K configured in the second entity; and perform authentication and ciphering key determination based on the K* to enable secure data transfer between the UE and at least one remote endpoint via the SV, wherein the K* and the Kid are configured in the first entity, wherein the secure data transfer is between the UE that accesses the SV using a service link when the SV does not have a feeder link, wherein UE registration with the SV is a part of access to the SV.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

Figure 1:
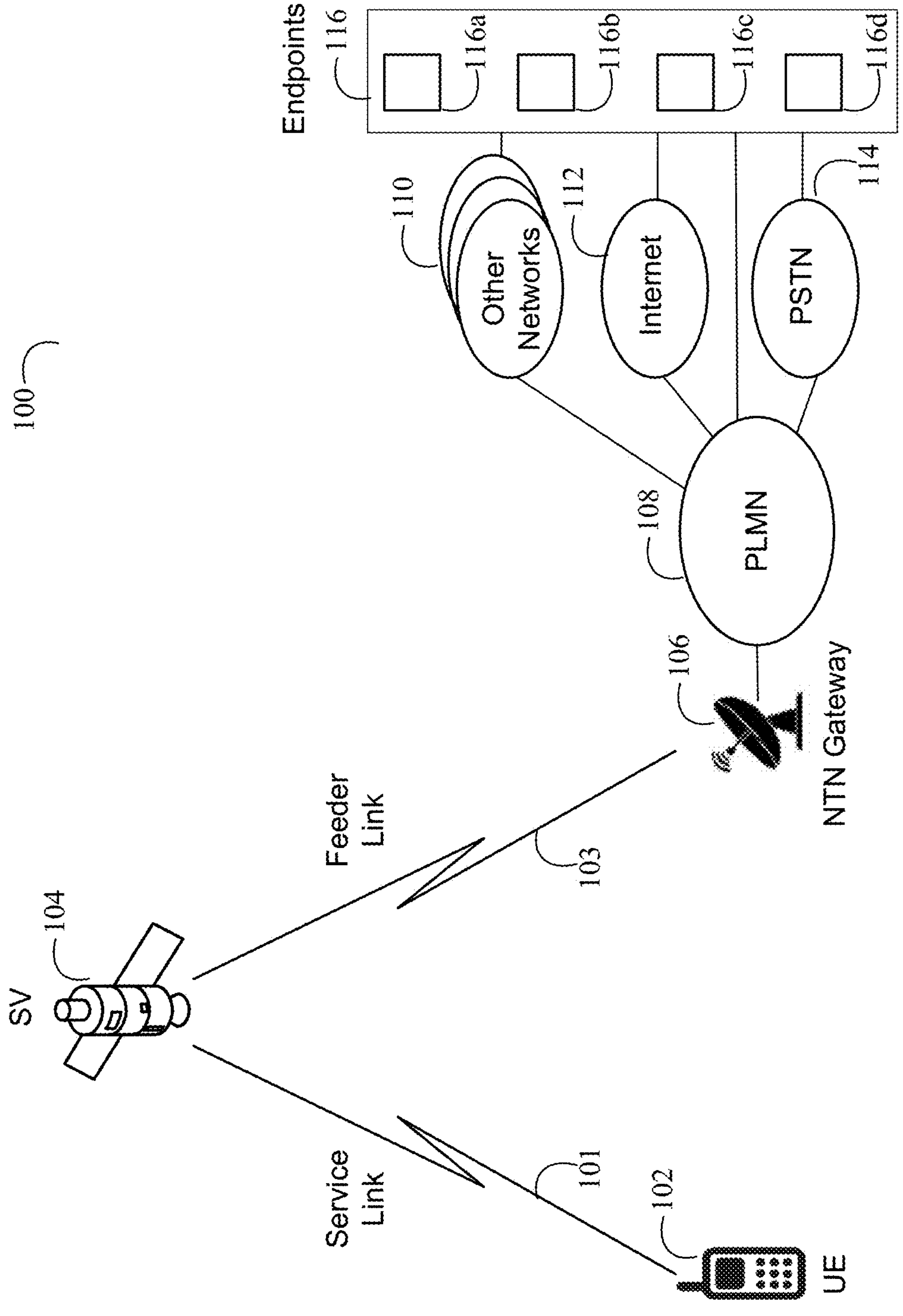
FIG. 1 illustrates access by a mobile device to a network via a satellite.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 106 may be indicated as 106-1, 106-2, 106-3 etc. Similarly, multiple instances of an element 102 may be indicated as 102*a*, 102*b*, 102*c* etc. When referring to such an element using only the first number, any instance of the element is to be understood (e.g. elements 106 in the previous example would refer to any of elements 106-1, 106-2 and 106-3, and element 102 in the previous example would refer to any of elements 102*a*, 102*b* and 102*c*).

DETAILED DESCRIPTION

Satellites, also referred to as space vehicles (SVs) or communication satellites, may be used in communication systems, for example, using gateways (also referred to as Earth stations or ground stations) and one or more satellites to relay communication signals between the gateways and one or more mobile devices, often referred to as user equipments (UEs). A UE, for example, may access a satellite (instead of a terrestrial base station) which may be connected to an Earth station (ES), which is also referred to as a ground station or Non-Terrestrial Network (NTN) Gateway. The Earth station in turn would connect to an element in a 5G (or 4G or future 6G) Network such as a modified base station (possibly without a terrestrial antenna) or a network node in a 5G Core (5GC) Network (5GCN) or 4G or future 6G core network. This element would in turn provide access to other elements in the 5G (or 4G or future 6G) Network and ultimately to entities external to the 5G (or 4G or future 6G) Network such as Internet web servers and user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g., a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas. Additional user cases can include providing wireless communication access to UEs located outdoors and associated with automated or Internet of Things (IoT) devices such as a UEs enabling communication with and possibly control of unmanned Aerial Vehicles (UAVs), driverless vehicles, automated machinery used in farming, forestry or mining, smart meters, and monitoring devices (e.g., for monitoring of weather, traffic, crowds, hazardous conditions).

The use of 5G satellite access may provide other benefits. For example, 5G satellite access may reduce Mobile Network Operator (MNO) infrastructure cost. For example, an MNO may use satellite access to reduce the number of terrestrial base stations that need to be deployed, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who might otherwise only provide fixed Internet access.

As a point of terminology, wireless cells supported by satellites (or SVs) are referred to herein as "satellite cells", as "radio cells", as "NTN cells" or simply as "cells" when there is prior context information that a "cell" is a "satellite cell". Satellite cells would be distinct from wireless cells supported by terrestrial base stations and access points which are referred to herein as terrestrial cells or terrestrial network (TN) cells.

It is noted that the terms space vehicle (SV), communication satellite and satellite can be synonymous and are accordingly used here interchangeably. In some cases, an SV (or satellite) can be a navigation SV (or satellite) such as an SV for GPS, Galileo, GLONASS or Beidou. An SV which functions as a navigation SV but possibly not as a communication SV is labelled and referred to explicitly herein to avoid confusion with a communication SV that may not support navigation.

Some wireless communication may be exchanged via a non-terrestrial network (NTN). Aspects presented herein help to enable efficient and consistent connectivity solutions that can adapt to varying network conditions, especially in areas with intermittent or unreliable network coverage. Data communication through an NTN can be limited by the availability of the service link and/or the feeder link. Aspects presented herein provide a solution that addresses the intermittent availability of a feeder link and/or service link by providing adaptive operational modes and efficient data handling methods, ultimately improving overall communication efficiency and user experience.

Various aspects relate generally to wireless communication. Some aspects more specifically relate to store-and-forward mode for satellite access with discontinuous feeder links.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or one or more components of a disaggregated base station. A disaggregated base station may be configured to utilize a protocol stack that is physically or logically distributed among two or more units (such as one or more central or centralized units (CUs), one or more distributed units (DUs), or one or more radio units (RUS)).

FIG. 1 illustrates an example communication system 100 in which a UE 102 accesses a ground public land mobile network (PLMN) 108 via an SV 104 and an NTN gateway 106. The ground PLMN 108 provides access for the UE 102 to remote endpoints 116 via the Internet 112, the PSTN 114 and other networks 110. FIG. 1 illustrates that there may be various endpoints, e.g., remote endpoints **116*a*, 116*b*, 116*c*, 166*c*, and 116*d*. The remote endpoints 116 can include application functions (AFs), external clients and other UEs 102 and may be physically supported by Internet servers, computers, Internet of Things (IoT) devices and other mobile devices. The radio communication link between the UE 102 and the SV 104 is referred to as service link (SL) 101 and may be based on 5G NR, 4G LTE, a future 6G standard or some other wireless standard. The radio communication link between the SV 104 and the NTN gateway 106 is referred to as feeder link (FL) 103. In normal operation, when the UE 102 has a service link 101 to the SV 104, the SV 104 will also have a feeder link 103 to an NTN gateway 106. With a discontinuous feeder link (DFL), the SV 104 may provide a service link 101 to the UE 102 without the availability of a feeder link 103 to an NTN gateway 106** at the same time.

DFL can apply to low earth orbit (LEO) and medium earth orbit (MEO) SVs 104 but not normally to geostationary earth orbit (GEO) SVs 104. With no FL availability, space vehicles (SVs) 104 in view of a UE 102 may not have a feeder link. With partial FL availability, SVs in view of a UE 102 may sometimes have a feeder link for a portion of their overall accessibility time to the UE 102. With continuous SL availability, SVs 104 with SLs may continuously be available to UE 102. With discontinuous SL availability, SVs 104 with SLs may, at times, not be available to a UE 102. When an SV 104 has a feeder link, the SV 104 may operate in real time mode when providing access to any UE 102. In real time mode, the SV 104 can transfer voice, data and control information between the UE 102 and the ground PLMN 108 in real time without a need to store and later forward the information. Real time mode can include transparent operation in which the SV 104 transfers voice, data and control information between the UE 102 to the ground PLMN 108 without interpretation or modification. Real time mode can also include regenerative operation in which the SV 104 performs some interpretation and possibly protocol and format conversion for the information being transferred between the UE 102 and the PLMN 108.

With no FL availability, e.g., at a time when a FL is not available, an SV 104 may operate in store and forward (S&F) mode, in which the SV 104 stores information received from the UE 102 when a service link is available and forwards the information to the ground PLMN 108 when a feeder link is available, and similarly stores information received from the ground PLMN 108 when the feeder link is available and forwards the information to the UE 102 when the service link is available. S&F mode may support continuous SL availability, discontinuous SL availability, no FL availability, and/or partial FL availability.

One type of solution for supporting S&F mode to UEs with SVs 104 could be to include PLMN functionality in an SV 104 including the functionality of a RAN and core network (CN) and where an SV 104 may include complete or partial CN functionality and may perform store and forwarding at an application level in an SV 104 using an endpoint proxy which mimics the behavior of a remote endpoint and using a UE proxy in a ground based PLMN 108 or separate ground based store and forward center which mimics the behavior of a UE 102. This type of solution is described herein at a high level and then in more detail. It may avoid store and forward at lower protocol levels (e.g. transport or NAS protocol level) which could complicate S&F and delay sending of MO data by a UE 102 and sending of MT data by a remote endpoint 116. Instead, with the type of solution described here, a UE 102 may access an SV 104 and starting sending MO data in S&F mode almost immediately without any extra delay.

Sending or receiving data at an application level, as referred to herein, may mean that the data is sent or received at a top application protocol layer. When an element E1 sends data to another element E2 in a communications system, it is common for a layered set of communication protocols (e.g. the ISO 7 layer set) to be used to transfer the data. Lower layers support transport, error detection and correction, session management and other functions well known in the industry. The top application protocol layer typically defines and supports data formatting and coding and may provide additional control information to identify various aspects of the data as well as source and destination addresses in some cases. Sending or receiving data at an application level could then mean supporting all protocol layers used for the transfer. This could exclude relaying or forwarding data at a lower protocol layer (e.g. transport layer) where higher protocol layers need not be supported.

An SVO may support S&F mode for UEs that have a subscription with the SVO. The subscription may be on behalf of the UE's Home PLMN (HPLMN) with the SVO acting as an Equivalent HPLMN (EHPLMN). Due to regulations, the SVO may only indicate support for serving PLMNs in a country where an SV 104 is currently providing coverage. This may lead to a UE obtaining S&F access via a VPLMN—e.g. an AT&T™ subscriber in northern Canada and subscribed to an SVO accesses an SV indicating support for Telus™ as the serving PLMN and not AT&T™. As an alternative, an SVO may supports all S&F capable UEs with or without a subscription to the SVO.

Figure 2:
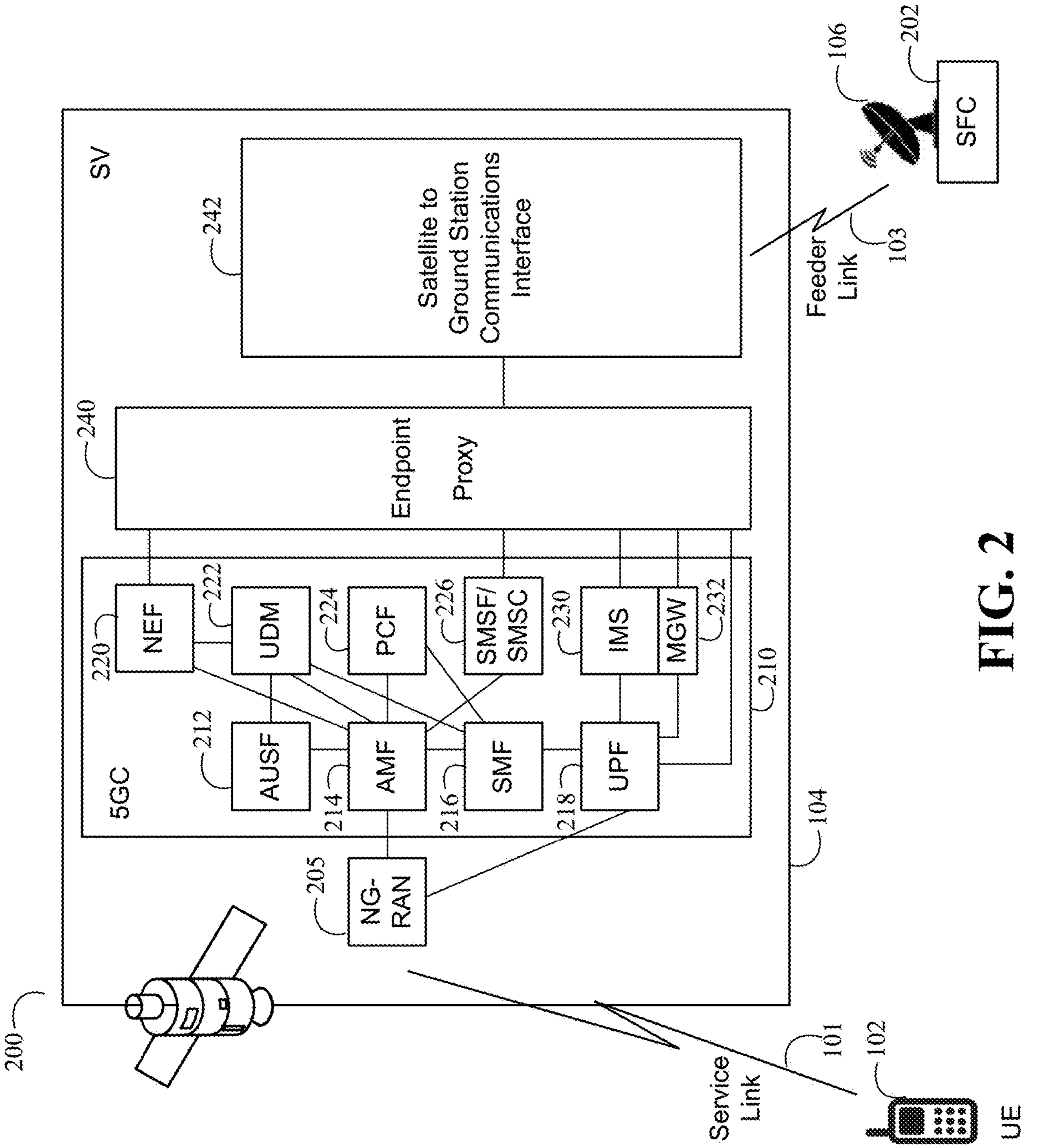
FIG. 2 illustrates an architecture of a satellite to support store and forward operation with discontinuous feeder links.

FIG. 2 shows an example communication system 200 in which an SV 104 provides store and forward support to enable a UE 102 to send and receive information to remote endpoints 116 while the SV 104 provides a service link 101 to the UE 102 but does not have a feeder link 103 to a ground PLMN. Communication system 200 may be part of communication system 100 with like entities indicated using the same labels. In communication system 200, the SV 104 supports 5G NR access by the UE 102 and includes an NR radio access network (NG-RAN) function (e.g., 205) and a 5G core (5GC) network function (e.g., 210), an endpoint proxy 240 and a satellite to ground station communication interface 242 for communicating with an NTN gateway 106. The NG-RAN function (e.g., 205) supports capabilities of a terrestrial NG-RAN in supporting access by UE 102 to the SV 104 using NR. The 5GC function 210 supports capabilities of a terrestrial 5GC in supporting all network capabilities to enable 5G access by the UE 102 to the SV 104. The NG-RAN function 205 may include functions of a base station, such as a gNB, as described later for a ground PLMN 108. The 5GC function 210 may include functions of a terrestrial 5GC as described later and may include a number of 5GC functional elements such as an AUSF 212, AMF 214, SMF 216, UPF 218, NEF 220, UDM 222, PCF 224, SMSF/SMSC 226, IMS 230 and MGW 232. The functional elements of the NG-RAN 205 and 5GC 210 may not be separate physical elements as in a terrestrial NG-RAN and terrestrial 5GC but may instead be different logical functions or different processes running on a single computing system in the SV 104. However, from the perspective of the UE 102, the functional elements of the SV 104 may perform the same functions as functions performed by elements of a terrestrial 5G-RAN and terrestrial 5GC, and the communications and signaling between the UE 102 and the SV 104 may exactly or almost exactly correspond to signaling between a UE 102 and a terrestrial NG-RAN and terrestrial 5GC. Thus, the functions performed by each of the AUSF 212, AMF 214, SMF 216, UPF 218, NEF 220, UDM 222, PCF 224, SMSF/SMSC 226, IMS 230, MGW 232 may correspond to functions described later with reference to FIG. 4 for AUSF 412, AMF 414, SMF 416, UPF 418, NEF 420, UDM 422, PCF 424, SMSF/SMSC 426, IMS 430, MGW 432, where like named elements (e.g. AUSF 212 and AUSF 412) perform the same or similar functions.

The endpoint proxy 240 may emulate or mimic the communications behavior of a remote endpoint 116 from a perspective of the UE 102. With this, UE 102 can communicate with the endpoint proxy 240 in exactly the same way as the UE 102 could communicate with a remote endpoint 116. The endpoint proxy 240 substitutes for the remote endpoint 116 and receives any mobile originated data and service information sent by the UE 102 and returns any responses to the UE 102 at a lower protocol level (e.g. a transport protocol level) to enable the mobile originated communication from the UE 102. This means that the UE 102 can originate communication to a remote endpoint 116 which is intercepted and stored by the endpoint proxy 240 in the same way as the UE 102 would originate communication to a remote endpoint 116 over a terrestrial PLMN or using an SV 104 in real time mode. The endpoint proxy 240 may be referred to as an endpoint proxy function because it may be a software of firmware function of the SV 104 and not a physical (e.g. hardware) component of the SV 104. It is to be understood that because the endpoint proxy 240 is a part of the SV 104, the actions of the endpoint proxy 240 are also actions of the SV 104. The UE 102 interaction with the endpoint proxy 240 is described later in more detail with reference to FIG. 3 and FIGS. 7-9.

The satellite to ground station communication interface 242 supports communication between the SV 104 and an NTN gateway 106 and an associated ground based store and forward center (SFC) 202. The satellite to ground station communication interface 242 is used to support a feeder link 103 and the signaling and procedures used between the satellite to ground station communication interface 242 and the store and forward center (SFC) 202 may not be standardized and may be proprietary to a satellite vehicle operator.

Figure 3:
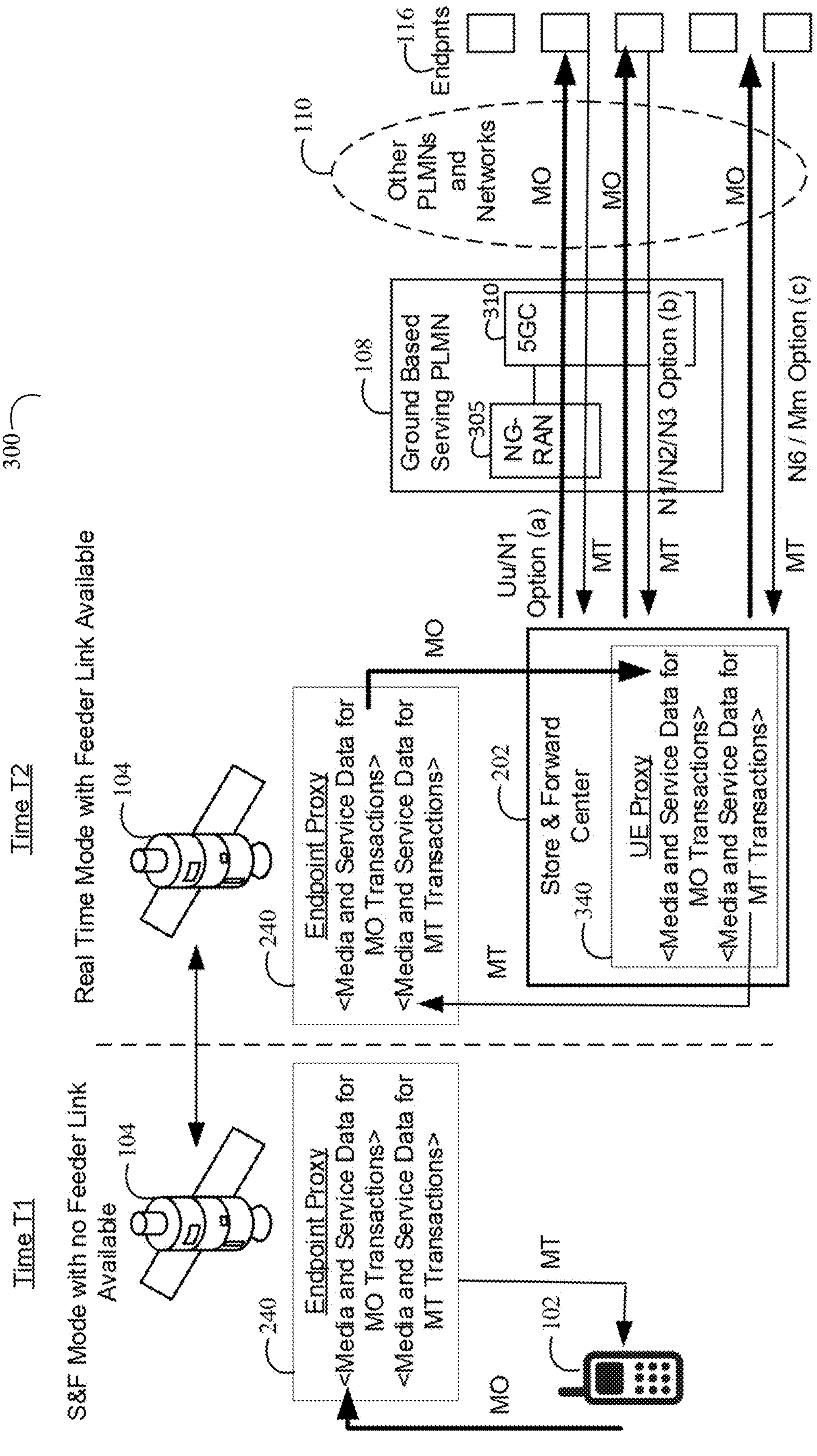
FIG. 3 illustrates store and forward operation via a satellite to a ground based network and remote endpoints.

FIG. 3 shows an example communication system 300 for supporting end to end communication in S&F mode between the UE 102 and one or more remote endpoints 116 using an SV 104, an SFC 202 and a ground PLMN 108. Communication system 300 may include all of communication system 200 and may correspond to communication system 100 with common elements in these communication systems indicated by the same labels. Communication system 300 includes the SFC 202 shown in FIG. 2. The SFC 202 includes an NTN gateway 106 or is connected to an NTN gateway 106 in order to communicate with the satellite to ground station communication interface 242 in the SV 104. The SFC 202 includes a UE proxy 340. The UE proxy 340 can be similar to the endpoint proxy 240 in communication system 200 but instead of emulating the behavior of a remote endpoint 116, emulates the behavior of the UE 102 from the perspective of the remote endpoints 116. The UE proxy 340 stores mobile originated data and service information sent by the UE 102 which was originally stored by the endpoint proxy 240 in the SV 104 but which is subsequently transferred to the SFC 202 by the SV 104 when a feeder link 103 becomes available between the SV 104 and the SFC 202. The UE proxy 340 transfers the mobile originated data and service information to the remote endpoints 116 through the ground PLMN 108. The UE proxy 340 emulates the behavior of the UE 102 in accessing the ground PLMN 108 and subsequently transferring the mobile originated data and service information to the remote endpoints 116. If subsequent mobile terminated data and service information is transferred by the remote endpoints 116 towards the UE 102, this mobile terminated data and service information is stored initially in the UE proxy 340 and is later transferred to an endpoint proxy 240 in an SV 104 when a feeder link 103 becomes available to an SV 104 that will later provide a service link 101 to UE 102. The UE proxy 340 may be referred to as a UE proxy function because it may be a software of firmware function of the SFC 202 and not a physical (e.g. hardware) component of the SFC 202. It is to be understood that because the UE proxy 340 is a part of the SFC 202, the actions of the UE proxy 340 are also actions of the SFC 202. It is noted that SFC 202 can be any enhanced ground based server that provides such functions and may therefore be referred to by other names or as just “a server.” The name “store and forward center” is a term used here to illustrate the concept.

Although FIG. 2 shows SV 104 support of 5G NR access by a UE 102, alternative internal architectures for the SV 104 could support 4G LTE access, a future 6G access or other access types. For example, when the SV supports 4G LTE access, the NG-RAN 205 may be replaced by an Evolved Universal Terrestrial Radio Access Network (E-UTRAN), the 5GC 210 may be replaced by an enhanced packet core (EPC) and the AMF 214, UPF 218 and UDM 222 plus AUSF 212 may be replaced by a Mobility Management Entity (MME), a serving gateway (SGW) plus packet data network gateway (PGW) and a Home Subscriber Server (HSS), respectively, which may support similar or the same functions as the AMF 214, UPF 218 and UDM 222 plus AUSF 212, respectively.

FIG. 3 shows two times T1 and T2. At time T1, the SV 104 does not have a feeder link, and is providing a service link 101 to the UE 102 to enable the UE 102 to send mobile originated data and service information to the SV 104 and to enable the SV 104 to send mobile terminated data and service information to the UE 102. At time T2, the SV 104 does not have a service link to the UE 102, and has a feeder link 103 to the SFC 202 to enable the SV 104 to send mobile originated data and service information stored in the endpoint proxy 240 to the UE proxy 340 in the SFC 202 and to enable the UE proxy 340 in the SFC 202 to send mobile terminated data and service information back to the endpoint proxy 240 in the SV 104. The times T1 and T2 can be different with discontinuous feeder link support. In one example, time T1 occurs initially when the UE 102 first starts to access an SV 104 in S&F mode; the time T2 then occurs later when the SV 104 has moved away from the location of the UE 102 and is able to access an SFC 202 associated with a ground PLMN 108. However, in another example, time T2 may occur first when the SV 104 sends mobile originated data and service information to the UE proxy 340 and SFC 202 returns mobile terminated data and service information to the endpoint proxy 240 in the SV 104. In that case, the SV 104 may move away from the location of the SFC 202 and may later provide a service link 101 to the UE 102 and send the mobile terminated data and service information received at time T1 from the SFC 202 to the UE 102 at time T2. Detailed procedures for these operations are described next.

As shown in FIG. 3, mobile originated (MO) and mobile terminated (MT) service and media data can be transferred between the UE 102 and endpoints 116 via an endpoint proxy 240 in the SV 104 and a UE proxy 340 in an SVO operated Store & Forward Center (SFC) 202 which either connects to a ground based PLMN 108 as an NTN Gateway 106 at a Uu level (referred to here as Option (a)), or as a gNB or Trusted Non-3GPP Gateway Function (TNGF) at an N2 level (referred to as Option (b)) or supports ground PLMN capability itself (referred to as Option (c)).

Each SV 104 internally supports all functions of a terrestrial NG-RAN and 5GC with respect to interaction with UEs 102. Each SV 104 thus supports functions of a gNB, AMF, SMF, UPF, UDM etc. and supports the Uu and N1 interfaces to a UE 102. These SV functions may interact internally according to 5GS interfaces and SBIs but may also bypass 3GPP protocols and procedures with proprietary equivalents. The UDM 222 function may be pre-configured with the identities, subscription information and security credentials for all UEs 102 subscribed to S&F mode with the SVO and its SVs 104. When no FL is available, an SV 104 may broadcast an indication of support for PLMNs allowed to provide S&F coverage at the locations covered by the SV 104 and with which the SVO has a business relationship and may indicate S&F mode in a System Information Block (SIB) 1 (SIB1). The PLMN Mobile Country Codes (MCCs) and Mobile Network Codes (MNCs) that are broadcast in the SIB1 can be the same as those broadcast for real time mode. UEs with an S&F subscription to the SVO and allowed to access a PLMN that is broadcast may then access the SV according to the 3GPP solution in Release 17 or 18. UEs without S&F subscription or support or not allowed to access any PLMN that is broadcast may not attempt to access the SV 104 if S&F mode is recognized or may get rejected when attempting access otherwise.

For initial access of a UE 102 to an SV 104 operating in S&F mode where SVs 104 do not use or support Inter-satellite links (ISL), a UE 102 can perform standard RRC Connection establishment with the SV 104 (e.g. with the NG-RAN 205 element in the SV 104) and initial NAS Registration with the SV 104 (e.g. with the AMF 214 element in the SV 104). The UE 102 may then establish PDU sessions to the SV 104 (e.g. to the UPF 218 element in the SV 104) and perform IMS Registration (e.g. with the IMS 230 element in the SV 104). The SV 104 can support the initial access by UE 102 and these operations by behaving as a home PLMN (HPLMN) or equivalent HPLMN (EHPLMN) for the UE 102 from the UE 102 perspective. This would mean that an identity or identities for the UE 102 might need to be pre-configured in advance in the SV 104, for example in the UDM 222 element in the SV 104, along with security credentials for the UE 102. The UE 102 would also select and register with one PLMN advertised as supported by the SV 104.

The user of the UE 102 may then instigate "MO transactions" to send MO data and MO SMS, instigate outgoing IMS voice or other media calls, request Internet access or perform Email access. The SV 104 can simulate the remote endpoint 116 for each case via the endpoint proxy 240 in the SV 104 which may be created specifically for the UE 102 following the initial NAS Registration of the UE 102 with the SV 104. The endpoint proxy 240 can replace remote endpoints 116 and can accept and store whatever media and service data the UE 102 sends and any associated metadata (e.g. data network (DN) and IP addresses for PDU sessions, remote endpoint 116 addresses, transport protocol details) and can provide any replies at lower protocol levels (e.g. for TCP, NAS, SIP and HTTP) to avoid UE 102 timeouts. The endpoint proxy 240 may receive data from, or related to, UE 102 via integration with certain network functions (NFs) in the SV 104 5GC 210 or by receiving data from NFs in the SV 104 5GC 210 over a standard service based interface (SBI) or over other interfaces from certain NFs (e.g. AMF 214, IMS 230, UPF 218). The endpoint proxy 240 may also store location and time of access information for the UE—e.g. geodetic latitude and longitude of UE 102 and time of NAS Registration. For example, the NG-RAN element (e.g., 205) of SV 104 may determine or obtain the location of UE 102 and transfer this to the AMF 214 element which in turn transfers this to the Endpoint Proxy 240.

The endpoint proxy 240 may provide replies to the UE 102 and the user of UE 102 indicating that S&F mode is in operation and indicating when MO communication from the UE 102 may reach the remote endpoints 116 and/or when replies from the remote endpoints 116 may be received back later by the UE 102. For example, for MO voice media sent by the UE 102, a pre-configured voice recording could be returned by the endpoint Proxy 240 to the UE 102 and the user of UE 102 (e.g. at an application level) after a MO voice call is established by the UE 102 to the endpoint proxy 240 saying: "Communication is now in store and forward mode. Please record a message and hang up or press "0" for more options when done. Your message will be delivered in approximately X minutes and you may receive a reply in approximately X+Y minutes". For Email access, the endpoint proxy 240 may prompt for a login/password and dates or senders of interest. For MO data, simplex operation may be supported (e.g. using a non-internet protocol (non-IP), internet protocol (IP), user datagram protocol (UDP) plus IP (UDP/IP)) or duplex operation (e.g. using transmission control protocol (TCP) plus IP (TCP/IP)) in which the endpoint proxy returns responses at a transport level (e.g. returns an acceptance response to a request from the UE 102 for a new TCP connection) in order to allow the UE 102 to send MO data without transport protocol failure. Emergency voice calls may also be supported—but with some delay in reaching a Public Safety Answering Point (PSAP) remote endpoint 116.

For Internet access by the UE 102, the endpoint proxy 240 may return a preconfigured SV webpage in response to every Internet access and only return the correct webpage later as part of MT data. For example, if the UE 102 (or user of UE 102) enters "www.msn.com", the endpoint proxy 240 could return an internal webpage stating "Your query to www.msn.com will be answered in approximately X minutes. Please retry your query then". At a later time after the website has been accessed by the UE proxy 340 through the ground PLMN 108 and the website response has been received and uploaded to another SV 104 (see later) and the other SV 104 becomes accessible the UE 102, the UE 102 or user of UE 102 can retrieve the website response by reentering the query "www.msn.com".

The UE 102 or the user of the UE 102 can continue a session with the SV 104 in S&F mode to initiate further MO transactions after which the UE 102 is de-registered by the SV 104 (e.g. by the UDM 222 element) before UE 102 access to the SV 104 will be lost (due to orbital motion of the SV 104). This can avoid maintaining a 5GC UE 102 registration state across different SVs 104 which could be complex, error prone and unnecessary. The SV 104 may not handoff the UE 102 to another SV 104 and the UE 102 may not attempt handover or cell change to another SV 104 which would not know about the registration state of the UE 102 in the previous SV 104 (without ISL). Cell change and handover of UE 102 can be avoided, for example, if each SV 104 broadcasts support of a single tracking area (TA) that is different to the TAs supported (and broadcast) by other SVs 104 and if all TAs except for the current TA of the currently accessed SV 104 are treated as forbidden TAs for the UE 102 by both the UE 102 and currently accessed SV 104. The SV 104 may also, or instead, inform the UE 102 that cell change is forbidden during the NAS Registration of UE 102 with SV 104.

After de-registering the UE 102 and due to orbital motion, the SV 104 would typically move away to where feeder link access is available to a suitable ground based PLMN 108. This may not happen immediately and, in some cases, the SV 104 may need to orbit the Earth several times before it has feeder link access available to an allowed serving ground based PLMN 108 for the UE 102. For example, the serving ground based PLMN 108 may be required by national regulations to be in the same country as the UE 102. All the MO media and service data and metadata previously sent by the UE 102 and stored by the SV 104 endpoint proxy 240 can then be copied (downloaded) (e.g. via a satellite to ground station communication interface 242 in SV 104 and an NTN Gateway 106 connected to or part of SFC 202) to the SFC 202, and a UE proxy 340 can be created to manage and transfer this data to the remote endpoints 116 on behalf of the real UE 102. If the UE 102 registered in the SV 104 but did not instigate any MO transactions, just the presence of the UE 102 may be conveyed to the SFC 202 which can still result in creation of the UE proxy 340. The SFC 202 and UE proxy 340 then forward all of the MO media and service data to the remote endpoints 116 via the serving ground based PLMN 108 and may receive back MT media and service data then or later which is returned later to the UE 102.

In case SVs 104 support and use ISL, initial access by a UE 102 to an SV 104 with S&F mode can be more flexible than that just described without ISL. For the ISL case, the UE 102 can access multiple SVs 104 (e.g. with continuous SL availability), and the SVs 104 can use ISL to support UE 102 mobility to new SVs 104 via handoff or cell change. To manage this, each SV 104 can broadcast support for a different TA to force a NAS Registration Update from the UE 102 when performing cell change to a new SV 104. The current SV 104 then does not de-register the UE 102 if the UE 102 can be handed off to another SV 104 or performs a cell change to another SV 104 before access to the current SV 104 is lost. An SV 104 may then only de-register the UE 102 if access to the UE 102 will be lost and if handover or cell change to another SV 104 by the UE 102 did not occur. For handover or cell change of the UE 102 to another SV 104, the complete UE 102 connection state to the current SV 104 (e.g. for NAS, PDU sessions, IMS) and the endpoint proxy 240 state for all ongoing MO transactions of UE 102 are transferred by the current SV 104 to the new SV 104 using ISL (e.g. using ISL proprietary procedures). The endpoint proxy 240 state for completed MO transactions for UE 102 may only be transferred by the current SV 104 to the new SV 104 if the new SV 104 will reach a feeder link with access to the ground PLMN 108 before the current SV 104 will have feeder link access. This may result in a series of SVs 104 receiving MO media and service data from the UE 102 (at different times) and later accessing the SFC 202 with different (e.g. successive) endpoint proxy 240 states for the UE 102. Each of these SVs 104 then transfers its own endpoint proxy 240 state (including stored MO data from UE 102) to the SFC 202. Labels or tags can be assigned to different portions of MO data to avoid transferring information for MO transactions more than once—e.g. the SFC 202 may record transferred MO transactions and may only accept new ones.

As described previously, a Store & Forward Center (SFC) 202 may connect to a ground based PLMN 108 in three different ways: as an NTN Gateway 106 at the Uu level (Option (a)), as a gNB or TNGF at the N2 level (Option (b)), or by supporting ground PLMN capability itself (Option (c)).

With Option (a), interaction between the SFC 202 and the ground based PLMN 108 may mimic real time UE 102 access to the ground based PLMN 108 (e.g. where UE 102 accesses the ground based PLMN 108 using an SV 104 in real time mode). The SFC 202 and UE proxy 340 then simulate the presence of the UE 102 by interacting with the ground based serving PLMN 108 as if the UE 102 was accessing a LEO or MEO SV 104 in real time. This may be done by simulating in the SFC 202 the presence of a virtual "stationary" SV 104 that provides coverage to all UEs 102 subscribed to S&F mode in an area where the ground based serving PLMN 108 provides S&F mode coverage via SVs 104. The SFC 202 could be part of an SVO owned NTN Gateway 106 that is either used for both real time mode and S&F mode or may be dedicated just to S&F mode. The SFC 202 could interface to the ground based serving PLMN 108 as an NTN Gateway 106 and could support all protocols (from the physical layer upwards) for existing NG-RAN and 5GC Uu and N1 interfaces towards a gNB for the ground based serving PLMN 108, and could reproduce the UE 102 signaling and interaction needed to transfer the MO media and service data to the remote endpoints 116 via the ground based serving PLMN 108. The SFC 202 and UE proxy 340 could start by registering the UE 102 with the ground based serving PLMN 108 and could then set up any PDU sessions and perform any IMS Registration as performed earlier by the real UE 102 with the SV 104.

With Option (b), the SFC 202 connects to a 5GC in the ground based serving PLMN 108 as a base station, in this example a gNB, and could thus support the 5GC N2 and N3 interfaces which would avoid support of the physical layer Uu interface. The UE proxy 340 can also stay permanently in a CM CONNECTED state to avoid unnecessary paging and service requests from the ground based serving PLMN 108 5GC. As an alternative, an SFC 202 could connect as a Trusted Non-3GPP Gateway Function (TNGF) for 5G non-3GPP access to the ground based serving PLMN 108 5GC, although this might not allow the provision of NR cell and NR TA information to the ground based serving PLMN 108 5GC.

With Option (c), the SFC 202 may comprise or may be part of the ground based serving PLMN 108. For example, the SFC 202 could be a server that supports serving PLMN interactions with other networks (e.g. Internet 112, PSTN 114, other PLMNs and networks 110) for S&F mode but may not support real time access by UEs 102. Alternatively, the ground based serving PLMN 108 could support real time access for UEs 102 via SVs 104 and/or terrestrial access by UEs 102. The SFC 202 then forwards the MO media and service data for the UE 102 to the remote endpoints 116 and may receive back MT media and service data replies using the N6, Mm and other external PLMN interfaces.

An SFC 202 and UE proxy 340 can interact with a Serving ground based PLMN 108 in similar ways with options (a) and (b). For example, the SFC 202 and UE proxy 340 can indicate a current serving TA identity (TAI) and a serving cell global identifier (CGI) for a UE 102 to a gNB 406 (Option (a)) or AMF 414 (Option (b)) that is based on (e.g. mapped from) a latest known geodetic location for the UE 102. For example, the UE 102 geodetic location can be mapped to a corresponding ground PLMN 108 serving TAI and serving CGI. The serving TAI and serving CGI for the UE 102 may be identifiers defined for the ground based PLMN 108 and may thus indicate to the ground based PLMN 108 (e.g. an AMF 414 or gNB 406) the actual last known location of the UE 102. Similarly, any IP addresses assigned to a UE 102 by an SV 104 (e.g. by an SMF 216 in the SV 104) can be mapped to other IP addresses for the UE 102 that are assigned by the ground based PLMN 108 (e.g. by an SMF 416 in the 5GC 310-1).

When a UE 102 is subscribed to S&F mode service from SVs 104 belonging to an SVO, the SFCs 202 for this SVO as well as the SVs 104 can be pre-configured with the UE 102 identifications(s) and security credentials. The SFC 202 (or UE proxy 340) can then treat the ground based PLMN 108 as a serving PLMN (unless the ground based PLMN 108 also belongs to the SVO when it can act as an HPLMN or EHPLMN for the UE 102) and may perform NAS Registration and IMS Registration of the UE 102 with the ground based PLMN 108. The UE proxy 340 can then transfer MO data and service information received earlier from the endpoint proxy 240 in an SV 104 to the remote endpoints 116.

In the case of MO voice media, the UE proxy 340 may play a preconfigured voice message to a remote endpoint 116 before transferring the UE 102's voice media data to the remote endpoint 116. For example, the preconfigured voice message might be: "This is a message from user ABC sent at time XYZ. After you have heard the message, you will be prompted to repeat the message, reply to the message or end the call". The remote endpoint 116 (e.g. a user) may then provide a reply which is treated by the UE proxy 340 as a new MT voice message to be returned to the UE 102.

In the case of Internet access, the UE proxy 340 may provide a login if needed (and if provided by the UE 102 earlier), send out the Internet (e.g. HTTP) queries received earlier from the UE 102 and store any returned Internet (e.g. HTTP) webpages for later transfer to the UE 102.

For Email access, the UE proxy 340 may provide a login if needed (and if provided by the UE 102 earlier), query for Email, store any returned webpages and retrieve specific Emails according to earlier UE 102 preferences. Support of particular Email systems (e.g. Gmail) by SFC 202 may be needed for this.

When MO media and service data transfer is complete, the UE proxy 340 may remain in a CM CONNECTED state permanently (or at least until S&F support for UE 102 is no longer needed) to avoid later paging (e.g. by AMF 414 or gNB 406), though transition to IDLE state could also be allowed.

Figure 4:
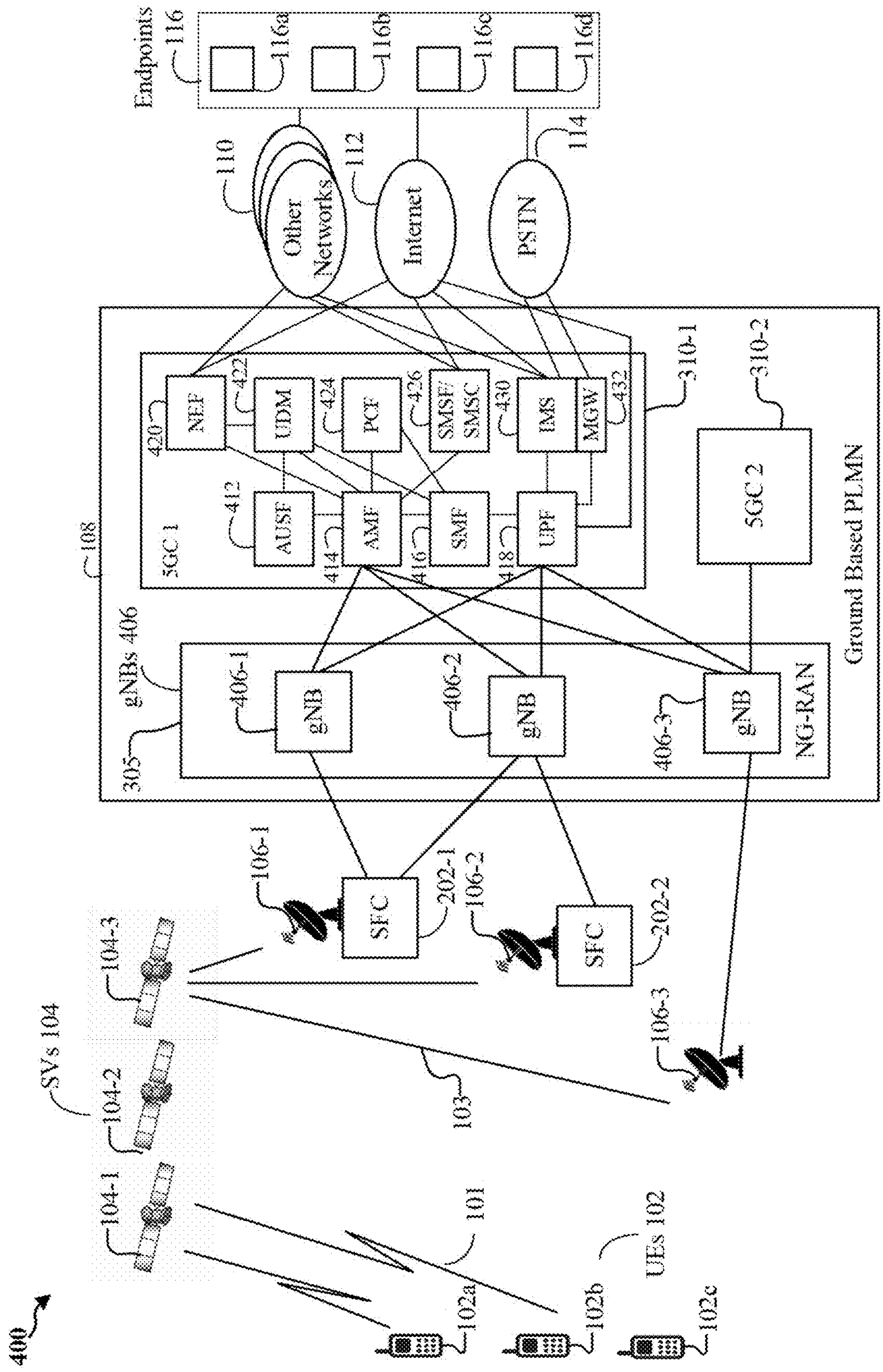
FIG. 4 illustrates a first option for accessing a ground based network using store and forward operation.
Figure 5:
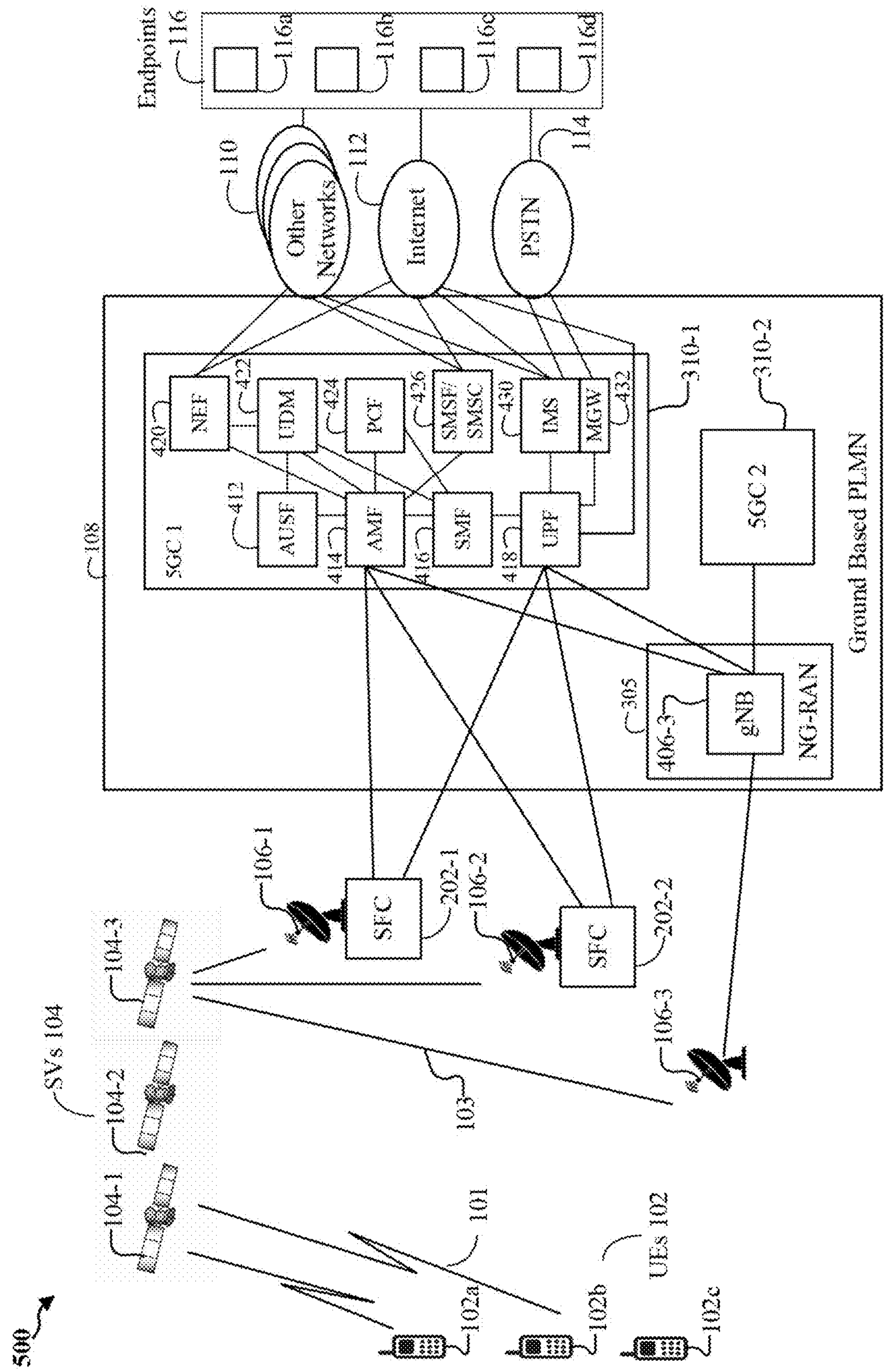
FIG. 5 illustrates a second option for accessing a ground based network using store and forward operation.
Figure 6:
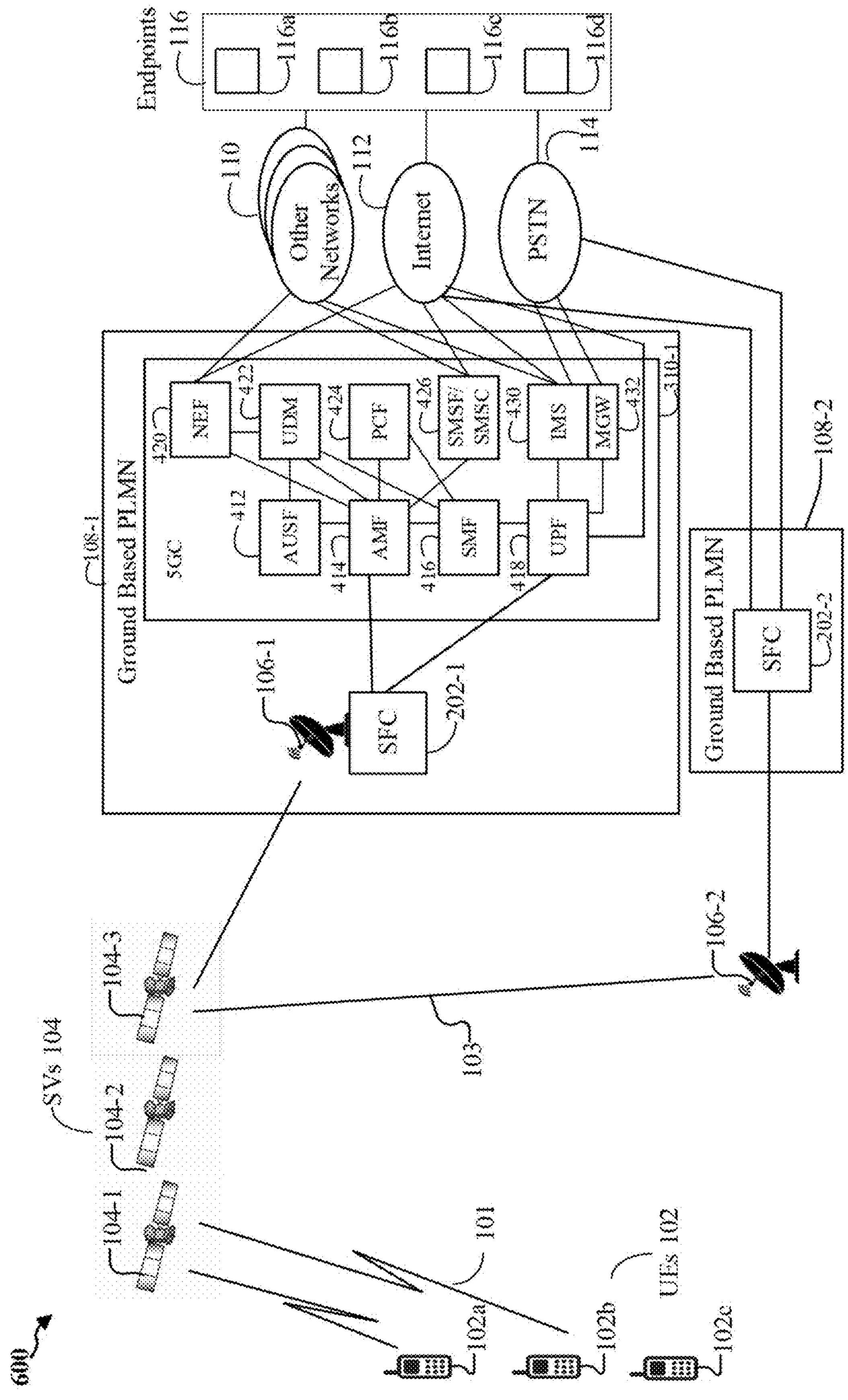
FIG. 6 illustrates a third option for accessing a ground based network using store and forward operation.

A more detailed illustration of Options (a), (b) and (c) is provided in FIGS. 4, 5 and 6, respectively, next.

FIG. 4 illustrates an example network architecture 400 capable of supporting satellite access for wireless communication for both real time and S&F modes, e.g., using 5G NR. Network architecture 400 may be an example of communication system 100 and may include communication systems 200 and 300. Although aspects of network architecture 400 are described using the example of 5G NR, the concepts presented herein may also be applied for other types of core networks. FIG. 4 illustrates a network architecture 400 with transparent SVs 104 in real time mode. A transparent SV 104 may implement frequency conversion and a radio frequency (RF) amplifier in both uplink (UL) and downlink (DL) directions and may correspond to an analog RF repeater. A transparent SV 104, for example, may receive uplink (UL) signals from served UEs 102 and may redirect the combined signals DL to an earth station (e.g., 106) without demodulating or decoding the signals. Similarly, a transparent SV 104 may receive a UL signal from an earth station (e.g., 106) and redirect the signal downlink to served UEs 102 without demodulating or decoding the signal. However, the SV 104 may frequency convert received signals and may amplify and/or filter received signals before transmitting the signals.

The network architecture 400 may include a number of UEs 102, a number of SVs 104-1, 104-2, 104-3 (collectively referred to herein as SVs 104), a number of NTN gateways 106-1 to 106-3 (collectively referred to herein as NTN gateways 106), a number of NR NodeBs (gNBs) 406-1 to 406-3 (collectively referred to herein as gNBs 406) capable of communication with UEs 102 via SVs 104 and with SFCs 202 in S&F mode and that are part of an NG-RAN 305. The network architecture 400 is illustrated as further including components of a number of 5G networks including 5G Core Networks (5GCNs or 5GCs) 310-1 and 310-2 (collectively referred to herein as 5GCNs or 5GCs 310). FIG. 4 illustrates various components within 5GC1 310-1 that may operate with the NG-RAN 305. The 5GC2 310-2 and other 5GCs may include identical, similar or different components and associated NG-RANs, which are not illustrated in FIG. 4 in order to avoid unnecessary obfuscation.

The UE 102 may include and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, tracking device, navigation device, Internet of Things (IoT) device, or some other portable or moveable device.

The UEs 102 are configured to communicate with 5GCs 310 in real time mode via the SVs 104, earth station (e.g., NTN gateway 106-3), and gNB 406-3. Access in real time mode to the 5G network is provided to UEs 102 via wireless communication between each UE 102 and a serving gNB 406-3, via an SV 104 and earth station (e.g., NTN gateway 106-3). The gNB 406-3 may provide wireless communications access to the 5GCs 310 on behalf of each UE 102 using 5G NR.

The gNBs 406 in the NG-RAN 305 may communicate with an AMF 414 in 5GC 310-1. For example, the gNBs 406 may provide an N2 interface to the AMF 414. An N2 interface between a gNB 406 and a 5GC 310 may be the same as or similar to an N2 interface supported between a terrestrial gNB and a 5GC 310 for terrestrial NR access by a UE 102 and may use a Next Generation Application Protocol (NGAP) between a gNB 406 and the AMF 414. The AMF 414 may support mobility of a UE 102 in real time mode, including radio cell change and handover and may participate in supporting a signaling connection to a UE 102 and possibly data and voice bearers for a UE 102.

A Network Exposure Function (NEF) 420 may be included in 5GC 310-1, e.g., connected to the AMF 414. In some implementations, the NEF 420 may be connected to communicate directly with a remote endpoint 116. The NEF 420 may support secure exposure of capabilities and events concerning 5GC 310-1 and a UE 102 to a remote endpoint 116 and may enable secure provision of information from a remote endpoint 116 to 5GC 310-1.

A User Plane Function (UPF) 418 may support voice and data bearers for a UE 102 and may enable UE 102 voice and data access to other networks such as the Internet 112. The UPF 418 may be connected to gNBs 406. UPF 419 functions may include: external Protocol Data Unit (PDU) session point of interconnect to a Data Network, packet (e.g., Internet Protocol (IP)) routing and forwarding, packet inspection and user plane part of policy rule enforcement, Quality of Service (QOS) handling for user plane, downlink packet buffering and downlink data notification triggering.

As illustrated, a Session Management Function (SMF) 416 connects to the AMF 414 and the UPF 418. The SMF 416 may have the capability to control both a local and a central UPF within a PDU session. SMF 416 may manage the establishment, modification, and release of PDU sessions for a UE 102, perform IP address allocation and management for the UE 102, act as a Dynamic Host Configuration Protocol (DHCP) server for the UE 102, and select and control a UPF 418 on behalf of a UE 102.

The AMF 414 may normally support network access and registration by UEs 102 in real time mode, mobility of UEs 102, including radio cell change and handover and may participate in supporting a signaling connection to a UE 102 and possibly data and voice bearers for a UE 102. The role of an AMF 414 may be to register the UE during a registration process, as discussed herein. The AMF 414 may page a UE 102, e.g., by sending a paging message via one or more radio cells in a tracking area in which the UE 102 is located.

The Policy Control Function (PCF) 424 may support a unified policy framework to govern network behavior, provide policy rules to other NFs to enforce them, access subscription information relevant for policy decisions in a Unified Data Repository (UDR) and support PDU Set Handling.

The Unified Data Management (UDM) 422 may support generation of 3GPP AKA Authentication credentials, user identification handling (e.g. storage and management of a Subscription Permanent Identifier (SUPI) for each subscriber in the 5G system), de-concealment of privacy-protected subscription concealed identifier (SUCI), access authorization based on subscription data, MT-SMS delivery, and subscription management.

The Authentication Server Function (AUSF) 412 may support authentication of a UE 102 for 3GPP access and untrusted non-3GPP access and authentication of a UE for 102 a Disaster Roaming service.

A short message service function (SMSF) may support SMS transfer over Non-Access Stratum (NAS), SMS management subscription data checking and SMS delivery. An SMSF may interact with an SMS center (SMSC) via an SMS interworking Mobile Switching Center server (MSC) or gateway MSC to transfer MT SMS messages from a remote endpoint 116 to a UE 102 or transfer MO SMS messages from a UE 102 to a remote endpoint 116. In such cases (and others), the SMSC may act as the main relay point for SMS transfer and is typically located in the HPLMN for any UE originating an SMS message. FIG. 4 shows an SMSF/SMSC 426 which represents an SMSF, an SMSC or an SMSF combined with an SMSC.

The IP multimedia subsystem (IMS) 430 supports sessions between UEs 102 and remote endpoints 116 using a session initiation protocol (SIP). The IMS 430 typically includes multiple SIP capable servers referred to as Call Session Control Functions (CSCFs), including a Proxy CSCF (P-CSCF), an Interrogating CSCF (I-CSCF), a serving CSCF (S-CSCF), and a Media Gateway Control Function (MGCF). The P-CSCF is typically the entry point to the IMS 430 for SIP messages exchanged between a UE 102 and the IMS 430. The functions performed by a P-CSCF can include forwarding a SIP Register request received from a UE 102 to an entry point (e.g. I-CSCF) in an IMS for the HPLMN of the UE 102, forwarding SIP messages received from a UE 102 to another SIP server (e.g. an S-CSCF), forwarding SIP requests and responses to a UE 102, and maintaining a security association between itself and each UE 102, e.g., as defined in 3GPP Technical Specification (TS) 33.203.

An I-CSCF can be the contact point within the IMS 430 for all SIP connections destined to a UE 102 accessing ground PLMN 108. After a UE 102 sends a SIP Register message to a P-CSCF, the P-CSCF may typically forward the SIP Register message to an I-CSCF in the IMS for the HPLMN of the UE 102. The I-CSCF may then determine an S-CSCF for the UE 102 in the HPLMN IMS and forward the SIP Register message to this S-CSCF.

The S-CSCF performs session control services for UEs 102 and other UEs for which ground PLMN 108 is the HPLMN. It maintains a session state for support of the services. For SIP Registration, an S-CSCF may behave as a SIP Registrar as defined in IETF RFC 3261. An S-CSCF may also act as a Proxy Server as defined in IETF RFC 3261 or as a User Agent as defined in IETF RFC 3261. An S-CSCR may be used to route a mobile terminated SIP call to a destination UE 102. In that case, the mobile terminated SIP call would have been initially routed to an S-CSCF in the HPLMN for the destination UE 102 and the SCCF would then use a previous SIP registration of the destination UE 102 to route the mobile terminated SIP call to a P-CSCF in the network serving the destination UE 102.

An MGCF may control the functions of a media gateway MGW 432. The MGW 432 can support translation of packet based media, for example voice over IP, to corresponding circuit switched based media, for example to circuit switched voice if, for example, a UE 102 originates a voice call over NR which needs to go through the PSTN 114 or when an incoming circuit switched voice call from the PSTN 114 arrives at PLMN 108 for delivery over NR to a UE 102.

As noted, while the network architecture 400 is described in relation to 5G technology, the network architecture 400 may be implemented to support other communication technologies, such as GSM, WCDMA, LTE, 6G, etc., that are used for supporting and interacting with mobile devices such as a UE 102 (e.g., to implement voice, data, positioning, and other functionalities).

The communication system shown by the network architecture 400 has been described so far in terms of its support of real time access to the ground based PLMN 108 by UEs 102 accessing an SV 104 which then accesses the NTN gateway 106-3 which accesses the ground based PLMN 108 via the gNB 406-3. The communication system illustrated by the network architecture 400 can also support access by UEs 102 in store and forward mode via SVs 104. In this case, a UE 102 communicates with an SV 104 in store and forward mode as previously described, at a time when the SV 104 does not have feeder link access so the ground based PLMN 108. At a later time, SV 104 obtain feeder link access to the ground based PLMN 108 via access to an SFC 202 via an NTN gateway 106. The two SFCs 202 shown in FIG. 4 which support this are SFC 202-1 and SFC 202-2 which access gNB 406-1 and gNB 402-2. With the option (a), the SFCs 202-1 and 202-2 access gNBs 406-1 and 406-2 by emulating the communication signaling of an NTN gateway 106. The gNBs 406-1 and 406-2 may not need to be aware that they are communicating with SFCs 202 rather than communicating for real time mode with an SV 104 via an NTN gateway 106-1 or 106-2. From the perspective of the ground based PLMN 108 including the gNBs 406 and 5GC 310-1, it can appear that a UE proxy 340 and SFC-202-1 or 202-2 are a UE 102 accessing an SV 104 in real time mode via an NTN gateway 106. The access by an SFC 202 to a gNB 406 is what distinguishes the option (a) from the two other options. Both the gNBs 406 and elements in the 5GC 310-1 can treat the signaling from the UE proxies 340 as if it originates from the UE 102, which means that there may be no new impacts to the gNBs 406 or to elements of the 5GC 310-1.

FIG. 5 shows a diagram of an example network architecture 500 supporting NTN access, e.g., using 5G NR, as presented herein. While the network architecture 500 is described in relation to 5G technology to illustrate the concept, the network architecture 500 may also be implemented to support other communication technologies. The network architecture 500 shown in FIG. 5 is similar to that shown in FIG. 4, like designated elements being similar or the same. FIG. 5, however, illustrates a network architecture that supports the option (b) where SFCs 202-1 and 202-2 connect to the 5GC 310-1 in the ground base PLMN 108 and not to the NG-RAN 305. That means that the SFCs 202-1 and 202-2 can emulate the behavior of a gNB 406 and connect to the AMF 414 and UPF 418 in the 5GC 310-1 in the same way as a gNB 406. For example, the SFCs 202-1 and 202-2 could support the NGAP protocol when accessing the AMF 414. The SFCs 202 and UE proxy 340 may emulate the signaling and procedures that would be performed by a gNB 406 for a UE 102 that is accessing the ground based PLMN 108 in real time mode via an SV 104 and the gNB 406.

FIG. 6 shows a diagram of an example network architecture 600 supporting NTN access, e.g., using 5G NR, as presented herein. While the network architecture 600 is described in relation to 5G technology to illustrate the concept, the network architecture 600 may also be implemented to support other communication technologies. The network architecture 600 shown in FIG. 6 is similar to those shown in FIGS. 4 and 5, like designated elements being similar or the same. FIG. 6, however, illustrates a network architecture that supports the option (c) where the SFCs 202-1 and 202-2 are part of the ground base PLMN 108. There can be two alternative types of support here. In the case of SFC 202-1, the SFC 202-1 can be part of the ground based PLMN 108 which also includes the 5GC 310-1 and possibly an NG-RAN 305 that is not shown in FIG. 6. The SFC 202-1 may then connect to elements in the 5GC 310-1 such as the AMF 414 and UPF 418 and possibly other elements also. The signaling and procedures used on the links between the SFC 202-1 and other elements in the ground based PLMN 108 such as AMF 414 and UPF 418 may not be standardized but may be proprietary to the ground based PLMN 108. However, the SFC 202-1, the UE proxy 340 contained within it and other elements in the ground based PLMN 108 can enable the UE proxy 340 to communicate with remote endpoints 116 via other networks 110, the Internet 112 and the PSTN 114 in the same way as a UE 102 would communicate with the remote endpoints 116 when accessing the ground based PLMN 108 using an SV 104 in real time mode. The SFC 202-2 corresponds to and supports a complete ground based PLMN 108 and may not contain a 5GC 310 or NG-RAN 305. The SFC 202-2 may use proprietary signaling and procedures internally and to communicate with any other elements in the ground PLMN 108 and may not necessarily support UE 102 access in real time. The SFC 202-2 may connect to other networks 110, the Internet 112 and the PSTN 114 as if it was a ground based PLMN 108 supporting real time access by UEs 102.

Although FIGS. 4, 5 and 6 show ground based PLMN 108 support of 5G NR, alternative architectures for the ground PLMN 108 could support 4G LTE access, a future 6G access or other access types. For example, when the ground PLMN 108 supports 4G LTE access, the NG-RAN 305 may be replaced by an E-UTRAN, the 5GC 310 may be replaced by an EPC and the AMF 414, UPF 418 and UDM 422 plus AUSF 412 may be replaced by an MME, an SGW plus PGW and HSS, respectively, which may support similar or the same functions as the AMF 414, UPF 418 and UDM 422 plus AUSF 412, respectively.

Return of MT Data from remote endpoints 116 to a UE 102 in S&F mode is described next. For the options (a), (b) and (c), MT data can be provided to the SFC 202 and stored in the UE proxy 340 for the UE 102 which simulates continuous availability of the UE 102. With the options (a) and (b), the SFC 202 could need to recognize and respond to Paging messages from the serving ground based PLMN 108 unless the UE proxy 340 remains in CM CONNECTED state. Periodically, the SFC 202 uploads (e.g. by proprietary means) MT media and service data for the UE 102 to one or more SVs 104 which will later provide coverage at the UE 102 location. The SFC 202 may upload itself or many upload via a different SFC 202 if permitted by regulation and if a different SFC 202 can access suitable SVs 104 before the SFC 202 can.

An SV 104 endpoint proxy 240 previously used for a UE 102 for transfer of MO data from the UE 102 might be reused by an SFC 202 to transfer MT data to the UE 102. Alternatively, an endpoint proxy 240 in an SV 104 might be created specifically to transfer MO data from the UE 102 or transfer MT data to the UE 102 and might be erased from the SV 104 when transfer of MO data or MT data for the UE 102 is no longer needed.

The UE 102 may access available SVs 104 at any time to send MO data and/or to receive any available MT data, but the user may be advised (e.g. by an endpoint proxy 240) when to expect MT data replies to any MO data that was sent.

When the UE 102 accesses another SV 104 in S&F mode, the UE 102 can register with the SV 104 as described previously. The SV 104 can then look to see if there is any new MT data to send to the UE 102. If so, there may already be an endpoint proxy 240 for the UE 102 in the SV 104 or, if not, the SV 104 can create an endpoint proxy 240 for the UE 102. ISL may be used (if supported) by the SV 104 if there is no MT data for the UE 102 to handoff the UE 102 to another accessible SV 104 if there is MT data for the UE 102 in this SV 104, or ISL may be used to retrieve the MT data for the UE 102 from the other SV 104 if the other SV 104 would provide no or poorer access to the UE 102. To transfer the MT data to the UE 102 from the SV 104, and in the case of MT voice, the SV 104 or endpoint proxy 240 can establish an MT SIP call to the UE 102 from the endpoint proxy 240 which may playback voice messages to the user of UE 102 one at a time and with possibly some type of menu control—e.g. to allow the user of UE 102 to repeat and/or answer the MT voice messages For MT SMS, all MT SMS messages can be delivered to the UE 102 (e.g. using SMS over NAS or SMS over IMS) using existing standards.

For Internet and Email access, the user of UE 102 may reenter the original Internet address (e.g. a uniform resource identifier (URI)) and/or Internet (e.g. HTTP) query, after which a webpage received earlier from the remote endpoint 116 and forwarded by the SFC 202 to the SV 104 can be provided to the UE 102.

For Email access, the user of UE 102 can also retrieve specific Emails by repeating previous MO Email queries if the UE proxy 340 in the SFC 202 was able to access and retrieve Email from the remote endpoint 116 (e.g. an Email server) based on the UE 102 original Email query.

For simplex MT data (e.g. UDP/IP), any MT data replies from remote endpoints 116 can be provided to the UE 102 using any PDU session setup by the UE 102 that matches a PDU session setup by the UE 102 earlier to originally transfer any MO data—and using any new IP address now assigned to the UE 102.

The session between the SV 104 and UE 102 may end when all MT data to the UE 102 and any new MO data from the UE 102 have been transferred. De-registration of the UE 102 or transfer of the UE 102 to a new SV 104 can also occur as described previously.

The SV 104 may later update the SFC 202 with the delivery status of the MT data to the UE 102 and may provide any new MO data received from the UE 102. The SFC 202 may then remove the delivered MT data from all SVs 104 to which this data was earlier provided for delivery to the UE 102. ISL may also be used (if supported) to delete delivered MT data from SVs 104.

In some aspects, the procedures just described for return of MT data to a UE 102 may be performed without special user action except for MT data related to Internet and Email access. However, the user of UE 102 may then have no control over when MT data may be returned and risks receiving the same MT data multiple times from different SVs 104. In an improved method of delivery, the SV 104 (e.g. endpoint proxy 240) first sends an indication to the UE 102 that MT data is available for delivery to the UE 102. This indication could be included in an SMS message or UDP/IP message that indicates the different types of MT media and service data available in the SV 104 for the UE 102 and with a label and time of original receipt by the serving ground based PLMN 108. The user can then inspect the SMS message (or UDP/IP message) using an application (sometimes referred to as an "App") and then, if the MT data is new (and not yet delivered to the UE 102), the user may access an application on the SV 104 (e.g. that may be part of the endpoint proxy 240) to instigate and control delivery of the MT data—e.g. by playing voice messages one at a time, triggering delivery of all SMS and UDP/IP messages that were not yet delivered and looking at any returned Internet web pages and Email. Alternatively, an application on the UE 102 (that can be accessed by the user of UE 102) could autonomously inspect the MT SMS or UDP/IP message and verify if (at least some of) the MT data is new and then alert the user only if (at least some of) the MT data is new.

To support transfer of further MO data from a UE 102 and further MT data to a UE 102, a UE 102 can be allowed to send further MO data at any time to an available SV 104 as described previously, where the MO data is subsequently transferred to the SFC 202 and then forwarded to the remote endpoints 116 as also described previously. Similarly, further MT data for the UE 102 may arrive at the UE proxy 340 in the SFC 202 at any time from one or more remote endpoints 116. The new MT data can then be uploaded by the SFC 202 to suitable SVs 104 that will later provide coverage to a last known location of the UE 102 or an expected new location of the UE 102. The new MT data may be added to any previous still undelivered MT data for the UE 102 that is already in the SV 104. The UE 102 then retrieves the new MT data, as described previously, but may selectively retrieve only MT data not previously received by the UE 102.

To support in order delivery of MO data to remote endpoints 116 and in order delivery of MT data to a UE 102, extra procedures may be used. For example, a UE 102 may access SVs 104 in a certain order—e.g. SV1, SV2, SV3, SV4 etc. Due to orbital differences, SVs 104 accessed earlier by the UE 102 may arrive at and obtain a feeder link to SFC 202 later than other SVs 104 that were accessed later by the UE 102. For example, the order of SV 104 arrival at and feeder link access to SFC 202 might be (in this example) SV3, SV1, SV4, SV2, where SV3 and SV4 have arrived earlier. This could lead to MO related data being sent to the remote endpoints 116 and to MT related data being received by the UE 102 in a different order than sent by the UE 102 and by the remote endpoints 116, respectively. A UE proxy 340 or an SFC 202 could correctly order MO data received from an SVx (e.g. where x=1, 2, 3 or 4 in this example) by only forwarding the MO data to the remote endpoints 116 after accessing all SVs 104 that were accessible earlier at the UE 102 than SVx and forwarding any MO data from these SVs 104 first. In the previous example, this can mean that when SV3 arrives at SFC 202, UE proxy 340 or SFC 202 delays forwarding any MO data from UE 102 provided by SV3 until both SV1 and SV2 have arrived at SFC 202. Similarly, when SV4 arrives at SFC 202, UE proxy 340 or SFC 202 can delay forwarding any MO data from UE 102 provided by SV4 until SV2 has arrived at SFC 202. An SFC 202 may know the order in which SVs 104 will arrive at SFC 202 and be visible at a known last location or expected new location of UE 102 from orbital related data for SVs 104 which may be pre-configured by an SVO in SFC 202. Alternatively, in some aspects, a UE 102 may indicate to an SV 104 the identities of previous SVs 104 to which the UE 102 has previously sent MO data, and when this SV 104 is accessed by the SFC 202, the SFC 202 can verify whether these previous SVs 104 have already been accessed by SFC 202 or will only be accessed later by the SFC 202. This variation may also avoid an SFC 202 waiting for the arrival of an SV 104 to which the UE 102 did not send any MO data.

Similarly, a UE proxy 340 or an SFC 202 could correctly order MT data for UE 102 received from remote endpoints 116 by uploading the MT data to any SVx such that (i) the MT data includes all MT data uploaded earlier to all SVs 104 that will only become accessible to the UE 102 after SVx unless (ii) this MT data was uploaded to another SV 104 that will become available to UE 102 before SVx. As an example, assume that an SFC 202 has access to SVs 104 in the order SV1, SV2, SV3, SV4. Assume further that the SVs will later become accessible to the UE 102 in the order SV3, SV1, SC4, SV2. The SFC 202 may then upload currently available MT data to SV3 such that the MT data includes all data previously uploaded to SV1 and SV2. Similarly, SFC 202 may upload currently available MT data to SV4 but need not include data previously uploaded to SV2 as this data was also uploaded to SV3 which becomes available to UE 102 before SV4. If the UE 102 later receives MT data from SV3 first, it can treat the MT data received later from SV1 and SV2 as a duplicate and not provide this MT data to the user. And if the UE 102 does not access SV3 first, the data from SV1 and SV2 will be then delivered in the right order (though SV3 data would be missed).

As a UE 102 may miss accessing some SVs 104 (e.g. if the UE 102 is not powered on or does not have visibility of these SVs 104), an SFC 202 may support some redundancy in MT data delivery by including MT data already uploaded to some SVs 104 accessible earlier to the UE 102 to other SVs 104 that will be accessible later to UE 102, in order to avoid UE 102 not receiving this MT data. For the previous example, where SVs will become accessible to the UE in the order SV3, SV1, SV4, SV2, the MT data uploaded to SV1 can also be uploaded to SV2 in case the UE misses access to SV1 (and SV3) and the MT data uploaded to SV1, SV2 and SV3 can also be uploaded to SV4 in case the UE misses access to SV1 and SV3.

Supporting in order delivery of MO data and MT data as just described may add some extra delay in delivering the MO and MT data which may not be preferred, in some circumstances. A UE 102 may thus be given the choice of either minimizing delay by not performing in order MO and MT data delivery or performing in order MO and MT data delivery with some extra delay. The choice could be part of the UE 102 subscription to the SVO and preconfigured in an SFC 202 or could be indicated by the UE 102 when registering with an SV 104 and then transferred to the SFC 202. The choice could apply to both MO and MT data or could be different for MO versus MT data delivery.

Some SVs 104 may support access by UEs 102 in both real time mode and S&F mode. Transition between real time mode and S&F mode may then occur as follows. When an SV 104 loses all feeder links, it may transition from providing real time access to providing S&F access to UEs 102. All previously registered UEs 102 for real time access may then stay registered with their current serving PLMNs and may either be handed off to another SV 104 that has a feeder link or may enter a coverage gap in which real time access is not possible. The SV 104 could then cease indicating support for PLMNs in real time mode and start indicating support for the same or other PLMNs that are allowed and able to provide coverage for S&F mode at the current SV location. The SV 104 could also include an indication of S&F mode in a SIB1. A UE 102 that is not subscribed to S&F mode may then remain in real time mode and may not access the SV 104. However, another UE 102 which is subscribed to S&F mode could chose to either remain in real time mode (and not access the SV 104) or switch to S&F mode and access the SV 104 in S&F mode. When switching to S&F mode, the UE 102 could locally de-register for real time mode and then perform an new initial Registration with the SV for S&F mode.

On the ground based PLMN 108 side, UEs 102 may have been previously registered in the ground based PLMN 108 for real time mode access from an SV 104. If the SV 104 accessed by one of these UEs 102 switches to S&F mode and the UE 102 remains in real time mode (and thus in a coverage gap), the ground based PLMN 108 can regard this UE 102 as out of coverage and in an IDLE state. However, if the UE 102 registers with an SV 104 for S&F mode, then the new registration may impact the previous registration in the ground based PLMN 108 for real time mode. With SFC 202 to ground based PLMN 108 interaction according to the option (c) described previously, an SV 104 can indicate to the SFC 202 and ground based PLMN 108 (if this PLMN is the same for both real time and S&F modes) that the previous registration for real time mode is no longer valid and may provide new registration information for UE 102 for S&F mode.

Figure 8:
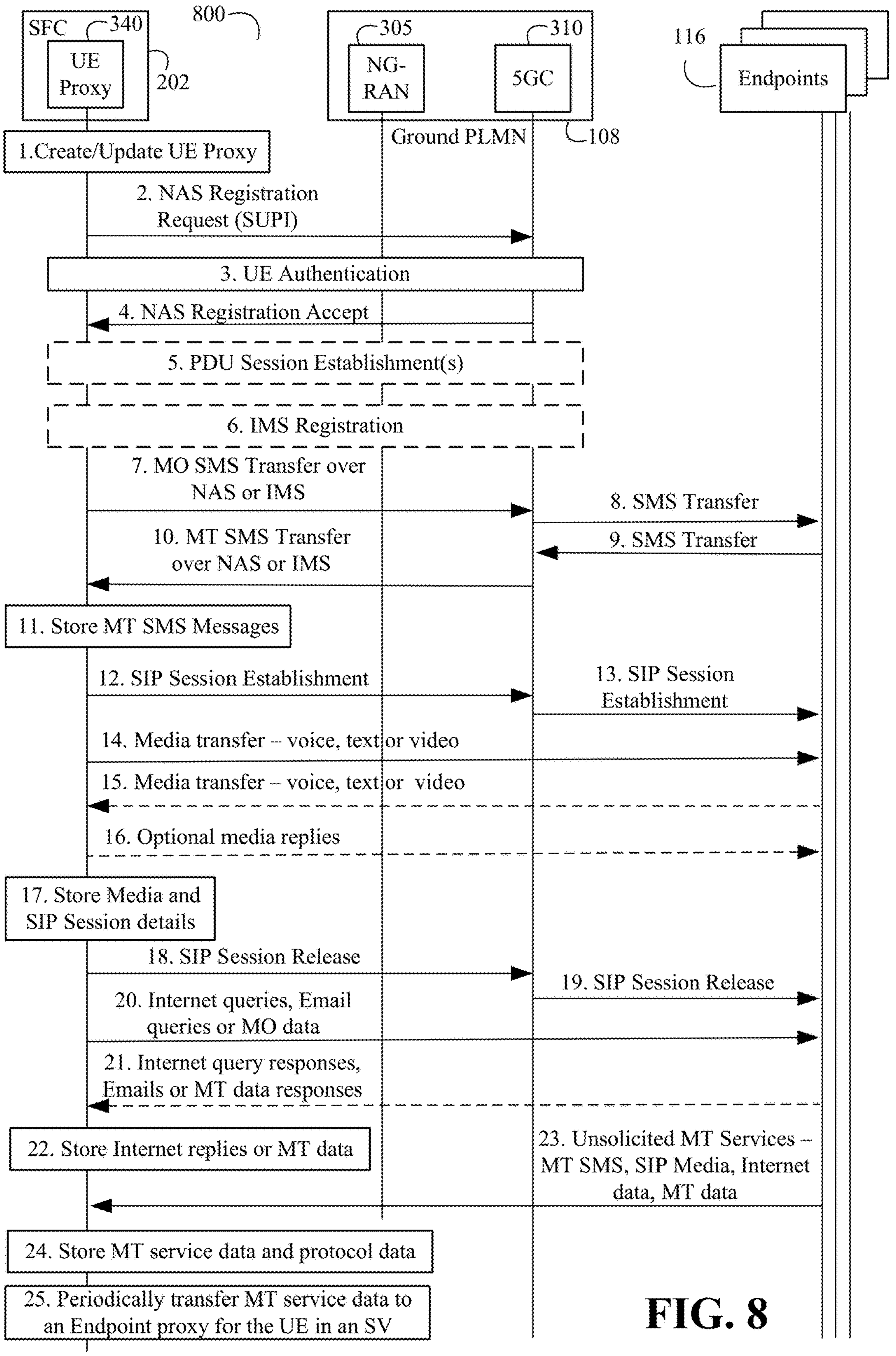
FIG. 8 illustrates access to a ground based network with store and forward operation.

With SFC 202 to ground based PLMN 108 interaction according to the option (a) or the option (b) described previously, when a UE proxy 340 is first created in an SFC 202 for a UE 102, the UE proxy 340 would normally perform Initial Registration of the UE 102 with the serving ground based PLMN 108 (e.g. as described previously and shown later with reference to FIG. 8). The Initial Registration then proceeds and when notified to a UDM in the HPLMN for the UE 102 can cause the UDM to implicitly de-register the UE 102 for the previous real time access. To avoid possible errors, a new indication could be included in the UE 102 Initial Registration for S&F mode (e.g. as shown in FIG. 8) indicating that the Initial Registration is for S&F mode with the indication forwarded to the UDM. When the UDM receives this indication, the UDM can perform an implicit de-registration of UE 102 for real time mode.

Transition from S&F mode to real time mode for an SV 104 and UE 102 may also need to be supported. The transition from S&F mode back to real time mode can be the reverse of transition to S&F mode. Thus, when an SV 104 re-acquires a feeder link, it can transition from providing S&F access to providing real time access to UEs 102. Before making this transition, the SV 104 can indicate to UEs 102 accessing the SV 104 in S&F mode that the current SV 104 radio cell(s) will become unavailable—e.g. some time in advance to allow UEs 102 to complete any MO and MT transactions for S&F mode. The SV 104 may then de-register all registered UEs 102 for S&F mode before exiting S&F mode. When the SV transitions to real time mode, any S&F indication in a SIB1 can be removed. UEs 102 which were using S&F mode may then remain in S&F mode and access other SVs providing S&F mode or switch to real time mode. When switching to real time mode, the UE 102 can perform a new Initial NAS Registration with the SV 104 (e.g. with a real time indication) which may allow the UDM in the UE 102's HPLMN to implicitly de-register the UE for S&F mode.

It is noted that some UEs 102 may be at a geographic location where visible SVs 104 do not have access to a feeder link. These UEs 102 would thus not see a transition between real time and S&F modes as visible SVs 104 would continuously be in S&F mode. The same can apply to UEs 102 at a geographic location where visible SVs 104 have continuous access to a feeder link. These UEs 102 would similarly not see a transition between real time and S&F modes as visible SVs 104 would continuously be in real time mode. Only UEs 102 at a location where SVs 104 only sometimes have access to a feeder link would see transitions between real time and S&F modes.

It is also noted that although an SV 104 might support both real time and S&F modes simultaneously (when a feeder link is available), this might complicate SV 104 implementation and degrade real time mode if the SV 104 first inspects all UL transmission, removes any signaling and messages associated with S&F mode, and then transparently forwards the rest of the signaling using the feeder link.

Dual registration of a UE 102 for S&F mode and real time mode may be supported in some cases. A UE 102 in an area where SVs 104 have feeder links for only a portion of total accessibility time might benefit from being able to use both S&F mode and real time mode without having to either de-register from real time mode while using S&F mode or de-register from S&F mode while using real time mode. This could lead to dual registration of a UE 102 in the same serving ground based PLMN 108 and possible in the same AMF 414 in some cases and to two sets of PDU sessions and IMS registrations. This may involve some new impact but could include some aspects similar to simultaneous dual NAS Registration on different radio access technologies (RATs), such as 3GPP NR and non-3GPP or 3GPP NR and 3GPP LTE.

Local communication between UEs 102 may also be supported in S&F Mode by an SV 104. With this, UEs 102 able to access the same SV 104 at the same time in S&F Mode could be allowed to communicate directly through the SV 104 without communication via a serving ground based PLMN 108 and SFC 202. Real time mode communication can be supported by first verifying if a destination address for an MO transaction initiated by a UE 102 in S&F mode corresponds to another UE 102 also currently registered in the SV 104. If so, real time communication can be supported by the SV 104 (e.g. NG-RAN 305 and 5GC 310) acting as a serving PLMN, serving HPLMN or serving EHPLMN for both UEs 102.

It is noted that the terms "MO data" and "MO service data", may be used here generically to refer to any type of mobile originated data sent by a UE 102 to an SV 104 in S&F mode for later transfer to remote endpoints 116. Likewise, the terms "MT data" and "MT service data" may be used generically to refer to any type of mobile terminated data sent to a UE 102 by an SV 104 in S&F mode, where the MT data was originally sent by remote endpoints 116. The types of MO and MT data can include SMS, SIP media (e.g. voice, text or video), Emails, Internet (e.g. HTTP) queries and responses and plain MO and MT data such as UDP/IP, TCP/IP or IP packets or non IP data.

Figure 7:
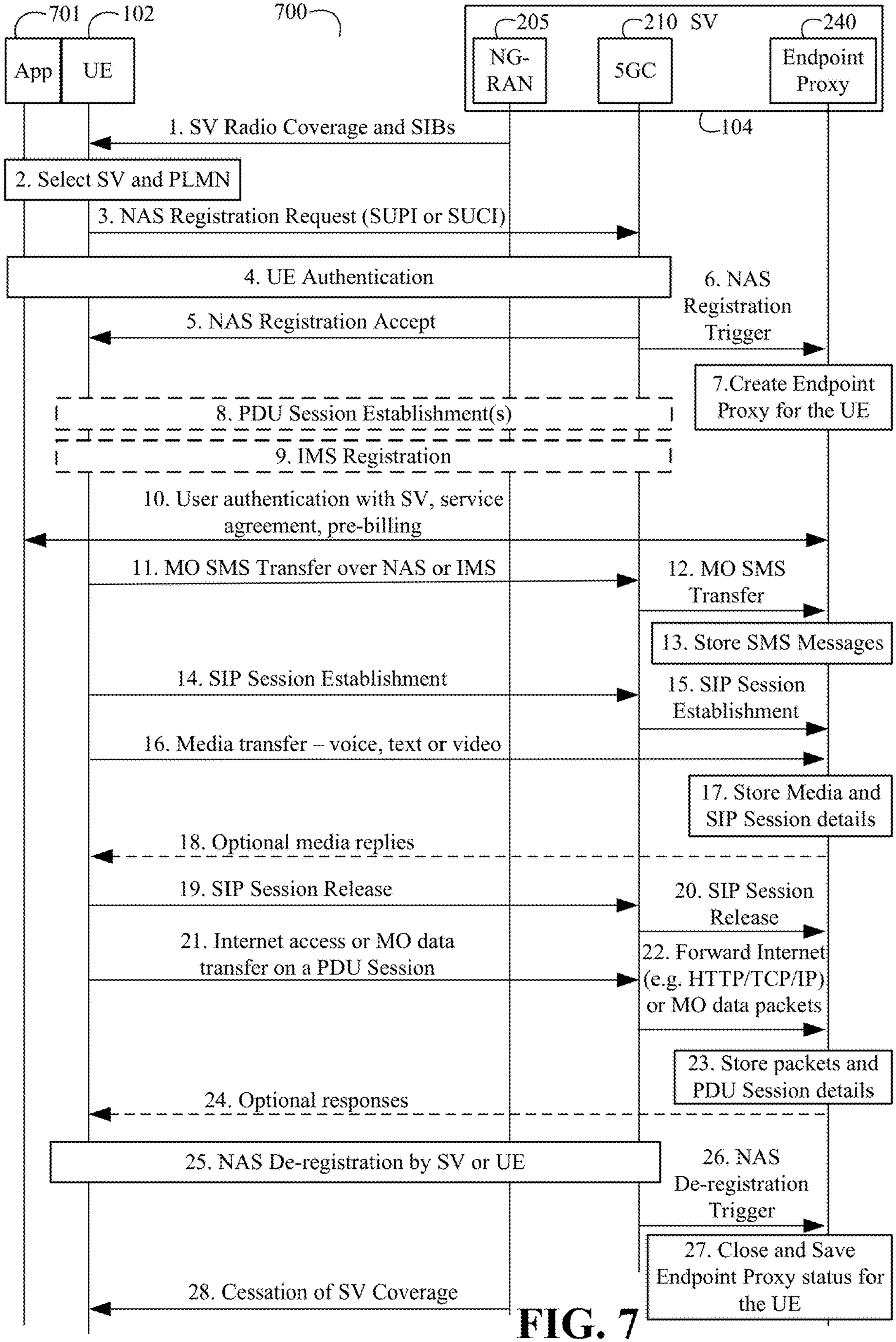
FIG. 7 illustrates initial access to a satellite by a mobile device with store and forward operation.
Figure 9:
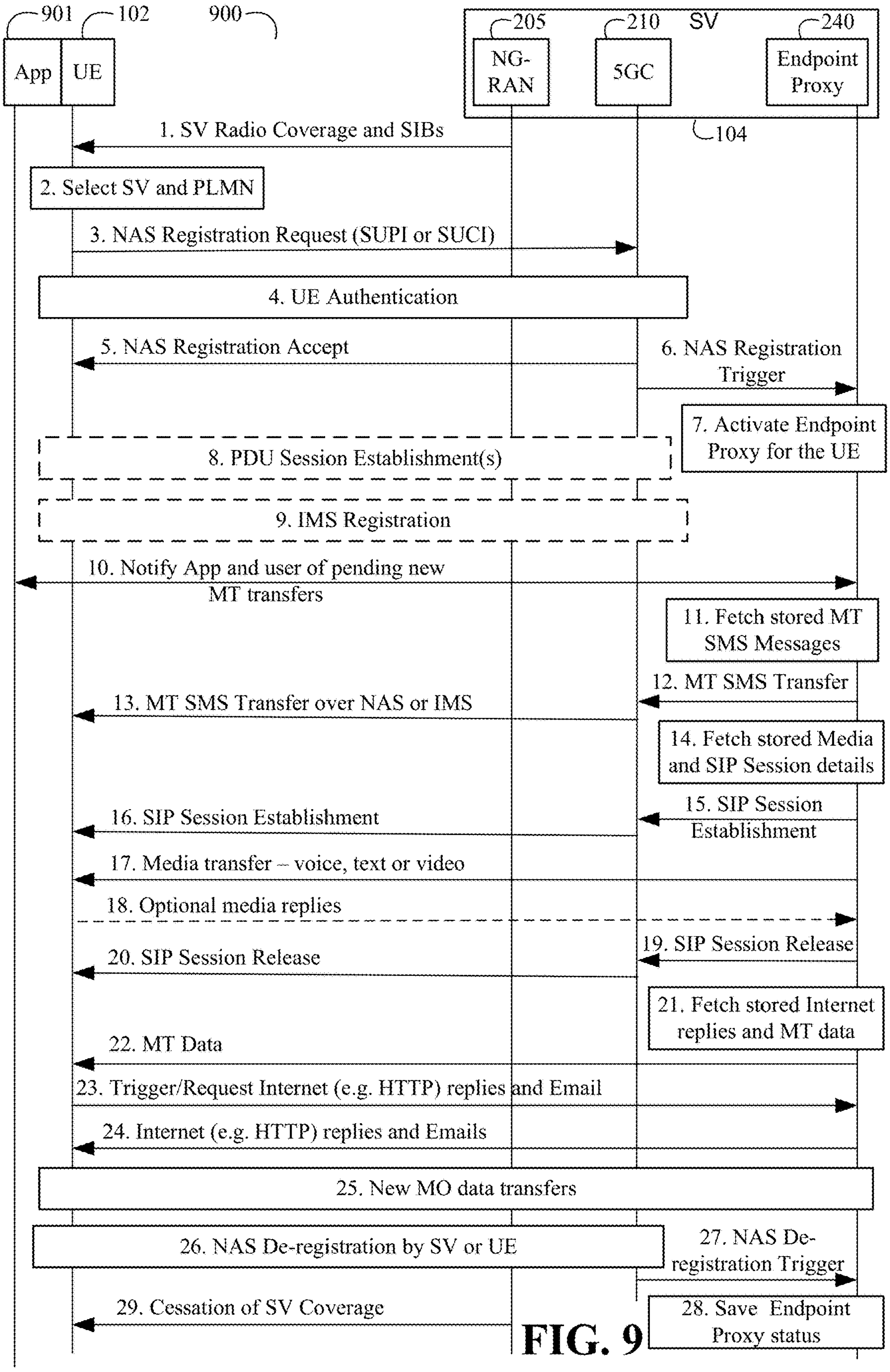
FIG. 9 illustrates subsequent access to a satellite by a mobile device with store and forward operation.

The techniques for support of store and forward mode by a UE 102, SV 104, endpoint proxy 240, SFC 202 and UE proxy 340 as described previously are described and elaborated next with respect to FIGS. 7, 8 and 9. Note that FIGS. 7-9 show various aspects and examples of the techniques for support of store and forward mode. There may, however, be many other examples of these techniques in which certain details and aspects are different.

FIG. 7 shows an example signal flow 700 that in more detail shows how a UE 102 can register for initial access with an SV 104 in store and forward mode and enable creation of an endpoint proxy 240. The signal flow 700 is performed by a UE 102 and SV 104, where the SV 104 contains an NG-RAN 205, 5GC 210 and endpoint proxy 240 as described for FIGS. 2 and 3. It is assumed in FIG. 7 that the UE 102 may have a subscription with an SVO to access the SV 104 in store and forward mode and therefore SV 104 may be preconfigured with the identities and security credentials for UE 102 in the 5GC 210, for example in UDM 222.

At stage 1 in FIG. 7, the SV 104 becomes visible at the UE 102 location and starts to provide radio coverage at that location and may broadcast SIBs over the coverage area of SV 104, where a SIB1 may indicate that the SV 104 is operating in a store and forward mode and may indicate PLMNs supported by SV 104 such as ground based PLMN 108.

At stage 2, the UE 102 detects the radio coverage from SV 104 and decides to select SV 104 and access SV 104 using one of the PLMNs indicated by SV 104 in a SIB1 at stage 1. For example, the UE 102 may decide to access SV 104 based on the indication that the SV 104 is operating in the store and forward mode, e.g. if UE 102 supports store and forward mode.

In FIG. 7, it is assumed that SV 104 may indicate a ground based PLMN 108 at stage 1 and that UE 102 selects the ground based PLMN 108. Alternatively, SV 104 could indicate a PLMN at stage 1 corresponding to the SVO, in which case the UE 102 can select this PLMN based on its knowledge of UE 102 subscription to the SVO.

At stage 3, the UE 102 registers in the SV 104 by sending a NAS Registration request to the SV 104 and includes in the NAS Registration request the SUPI or a SUCI for the UE 102. The SUCI may be the SUPI for the UE 102 ciphered using a public key provided by the SV 104 in one of the SIBs broadcast at stage 1 or already preconfigured in UE 102 as a result of the UE 102 subscription to the SVO for the SV 104.

At stage 4, the SV 104, for example the AMF 214 and/or UDM 222, authenticate the UE 102 based on the SUPI or SUCI provided at stage 3. The authentication may exactly duplicate authentication of a UE 102 registering in a ground based HPLMN and may use existing standard NAS procedures for this. In that case, the identities of the UE 102 and the security credentials of the UE 102 already preconfigured in the SV 104 may be used to perform the authentication. The authentication may be performed by the SV 104 as if the SV 104, and in particular the 5GC 310, is a home PLMN for the UE 102. From the UE 102 perspective, the authentication can be performed exactly the same as if the UE 102 was accessing a ground based HPLMN for the UE 102.

Assuming the authentication at stage 4 succeeds, the 5GC 210, for example the AMF 214, returns a NAS Registration accept to the UE 102 at stage 5 to complete the registration of the UE 102 in the SV 104.

At stage 6, the 5GC 210, for example the AMF 214 or UDM 222, sends a trigger event to the endpoint proxy 240 for the UE, if already created, or to some other element in the SV 104, if not yet created, to indicate that the UE 102 has successfully registered in the SV 104. If the endpoint proxy 240 was not yet created for the UE 102, the endpoint proxy 240 is then created by the SV 104 at stage 7 with an indication that the UE 102 is currently registered in the SV 104.

At stage 8 the UE 102 may establish one or more PDU sessions so the SV 104, for example to the UPF 218, which may be used subsequently to send mobile originated data. At stage 9, UE 102 may perform IMS registration with the SV 104 for example with the IMS 230 which may enable the UE 102 to originate mobile originated SIP calls to the endpoint proxy 240 acting on behalf of remote endpoints 116.

At stage 10, the user of the UE 102 may interact with the endpoint proxy 240, e.g. via an application 701 (which may be referred to as an "App") on the UE 102, to support out of band authentication of the user and agree provision of certain services by the SV 104 to the UE 102. For example, in some scenarios, the SV 104 may not be able to authenticate the UE 102 at stage 4 if the SV 104 is not preconfigured with the identities and security credentials for the UE 102. In this case, the SV 104 may decide to forgo authentication of the UE 102 and allow the registration of the UE 102 at stages 3 and 5 to succeed without authentication. This would be similar to a UE being allowed to access a Wi-Fi access point (AP) without initial logon to or authentication by the WiFi AP, where the WiFi AP authenticates the UE or user of the UE out of band and may obtain some prepayment via a credit card. In the case of UE 102 and SV 104, the endpoint proxy 240 may prompt for some identification of the user of the UE 102 (e.g. via the application 701) and accept some type of prepayment by the user, for example a credit card prepayment which may also enable some agreement on the services to be provided by the SV 104 to the UE 102. If this occurs, the user or UE 102 (e.g. the application 701) may still need to provide the UE identifications, for example a SUPI or SUCI to the SV 104 and security credentials to be used later by the UE proxy 340 in the SFC 202 for authenticating the UE 102 with the HPLMN of the UE 102. In FIG. 7, it is assumed that stage 10 may not occur, but this stage is included in FIG. 7 as a possible extension of the access procedure by UE 102 to the SV 104.

Stages 11 to 24 in FIG. 7 show how the UE 102 can initiate different types of mobile originated data transfer towards remote endpoints 116 where the MO data that is being transferred is intercepted and stored by the endpoint proxy 240 in the SV 104. Here, the endpoint proxy 240 mimics the behavior of the remote endpoints 116 from a perspective of the UE 102 by returning pre-configured responses to the UE at an application level (e.g. as part of SIP media data or using HTTP) and/or by returning responses to the UE at a transport level (e.g. a TCP or NAS level).

At stage 11, the UE 102 may transfer MO SMS either over NAS or over IMS. For example, MO SMS transfer over NAS may reach the SMSF/SMSC 226 from where it is transferred to the endpoint proxy 240 at stage 12 with the SMS messages then being stored by the endpoint proxy 240 at stage 13.

At stage 14, the UE 102 may establish one or more SIP sessions towards remote endpoints 116 where the SIP session establishment messages sent at stage 14 are received by the 5GC 210, for example by the IMS 230, and are subsequently forwarded to the endpoint proxy 240 which simulates the behavior of remote endpoints 116 by accepting the SIP session establishment requests and enabling the SIP sessions to be established at stages 14 and 15. Following the establishment of the SIP sessions to the endpoint proxy 240 at stages 14 and 15, user plane connections can be established between the UE 102 and the endpoint proxy 240 to enable transfer of different types of media data supported by SIP, such as voice text or video, for the SIP sessions at stage 16. These media (or media data) would be sent by UE 102 at stage 16 and received and stored by the endpoint proxy 240 at stage 17. The endpoint proxy 240 may return some pre-configured media replies to the UE 102 at stage 18, for example to confirm receipt and storage of the media at stage 17 and advise the user of the UE 102 when this will be delivered to the remote endpoints 116 and when replies from the remote endpoints 116 may be received back at the UE 102. In some cases, the endpoint proxy 240 may send some pre-configured media messages to the user of the UE 102 before media transfer occurs at stage 16 to indicate to the user of UE 102 that any media transferred at stage 16 will be stored by the endpoint proxy 240 and sent on later to the remote endpoints 116. After all the media has been transferred at stage 16, the UE 102 may initiate release of the SIP sessions at stage 19 by sending SIP release messages to the SV 104, for example to the IMS 230, which may in turn indicate release of the SIP sessions at stage 20 to the endpoint proxy 240.

In the case of Internet access (e.g. which can include Email access) or mobile originated data transfer (e.g. transported using non-IP, IP, UDP/IP or TCP/IP), at stage 21, UE 102 may send an Internet query (or Email query), for example an HTTP query, to the SV 104 and/or may send mobile originated data, for example IP, UDP/IP or TCP/IP packets, to the SV 104. This data may be transferred using a PDU session established at stage 8 to UPF 218 with UPF 218 forwarding the data to the endpoint proxy 240 at stage 22. The endpoint proxy 240 may then store the data packets, for example HTTP, non-IP, IP, UDP/IP and/or TCP/IP packets, at stage 23 and also store details of the PDU session and the protocols and parameters being used to transfer the data. At stage 24, the endpoint proxy 240 may optionally return responses to UE 102 (e.g. HTTP responses) in the case of Internet queries (or Email queries) to indicate to a user of UE 102 that the Internet queries (or Email queries) sent at stage 21 have been stored by the endpoint proxy 240 and will be forwarded later to the remote Internet endpoints 116. The endpoint proxy 240 may also return responses at a transport level (e.g. TCP level) to UE 102 if needed to allow the MO data to be sent by UE 102 without transport protocol failure.

After the UE 102 has initiated and completed all the MO data transfer at stages 11 to 24 and when UE 102 is about to lose access to the SV 104, the SV 104 may de-register the UE 102 or the UE 102 may de-register from the SV 104. For example, the AMF 214 and/or UDM 222, may perform a NAS de-registration of the UE 102 at stage 25 or possibly the UE 102 may initiate the NAS de-registration itself.

At stage 26, an indication that the NAS de-registration has occurred is sent, for example by the AMF 214 or UDM 222, to the endpoint proxy 240. The endpoint proxy can then be deactivated (e.g. closed) at stage 27 with all the MO data transferred from the UE 102 and stored by the endpoint proxy 240 being saved by the SV 104. Finally, at stage 28, the SV 104 is assumed to move away from the location of the UE 102 and to cease providing coverage to the UE 102.

FIG. 8 shows an example signal flow 800 that in more detail shows how a UE proxy 340 in an SFC 202 can register for initial access on a behalf of a UE 102 with a ground based serving PLMN 108, transfer MO data previously sent by the UE 102 in S&F mode to remote endpoints 116 and receive back and store any MT data from the remote endpoints 116 intended for the UE 102. The signal flow 800 is performed by an SFC 202, UE proxy 340, ground based PLMN 108 containing an NG-RAN 305 and 5GC 310 and remote endpoints 116 as described for FIGS. 3-6. It is assumed in FIG. 8 that, as described for FIGS. 3-7: (i) a procedure that is the same as or similar to that in FIG. 7 has already occurred, in which a UE 102 sends MO data to an endpoint proxy 240 in an SV 104; (ii) the SV 104 has obtained feeder link access to the SFC 202 as shown in FIG. 8; and (iii) all the MO data sent by UE 102 and associated protocol and addressing information have been transferred from the SV 104 to the SFC 202. As in FIG. 7, the UE 102 may have a subscription with an SVO to access the SV 104 in store and forward mode and therefore the SFC 202 may already be preconfigured with subscription information for the UE 102 including the identities and security credentials for the UE 102 which may be made available to the UE proxy 340.

At stage 1 in FIG. 8, the SFC 202 creates the UE proxy 340 and provides the UE proxy 340 with all the MO data and associated protocol and addressing information received from the SV 104. If the UE proxy 340 was already created in the SFC 202, the SFC 202 would instead just update the UE proxy 340 with the new MO data and associated protocol and addressing information received from the SV 104.

At stage 2, if the UE proxy 340 did not yet register the UE 102 in the ground based PLMN 108, the UE proxy 340 registers the UE 102 in the ground based PLMN 108 by sending a NAS registration request to the ground based PLMN 108 as described previously for the options (a), (b) and (c). For option (a), the NAS registration request would be sent to the NG-RAN 305 and forwarded to the 5GC 310. For option (b), the NAS registration request would be sent directly to the 5GC 310. For option (c), the SFC 202 may already include the 5GC 310 capability or may have some proprietary link to the 5GC 310 for sending of the NAS registration request. The NAS registration request may include the SUPI or an SUCI for the UE 102 The NAS registration which is instigated at stage 2 may just be with the ground based PLMN 108 if this is an HPLMN or EHPLMN for the UE 102. Otherwise, the NAS registration at stage 2 may also involve the HPLMN for the UE 102 which is not shown in FIG. 8.

At stage 3, authentication of the UE proxy 340 by the ground based PLMN 108, or the HPLMN of the UE 102 if different, occurs. If the ground based PLMN 108 is acting as an HPLMN or EHPLMN for the UE 102, the authentication may use identifications and security credentials for the UE 102 preconfigured in the ground based PLMN 108, for example in the UDM 422.

If authentication succeeds, the 5GC 310, for example the AMF 414, returns a NAS registration accept to the UE proxy 340 at stage 4 which completes the registration of the UE 102 in the ground based PLMN 108.

At stage 5, the UE proxy 340 establishes any PDU sessions to the 5GC 310 corresponding to PDU sessions established earlier by the UE 102 to the SV 104 as described in FIG. 7. Similarly, at stage 6, the UE proxy 340 performs an IMS registration with the 5GC 310, for example with the IMS 430, and with the HPLMN of the UE 102 if different from the ground based PLMN 108, if the UE 102 had performed an IMS registration with the SV 104 as in FIG. 7.

It is noted that for option (a) and option (b), the ground based PLMN 108 including the 5GC 310 may view the UE proxy 340 as the UE 102 itself accessing the ground based PLMN 108 via an SV 104 in real time mode as described previously for FIGS. 3-7. In this case, the UE proxy 340 can mimic the behavior of the UE 102 from the perspective of the ground PLMN 108 by performing the NAS Registration of the UE 102 with the ground PLMN 108 and optionally the IMS registration of the UE 102 which can apply to option (a) and option (b).

Stages 7 to 22 in FIG. 8 show how the UE proxy 340 can send on the MO data received previously from the SV 104 to the remote endpoints 116. If UE 102 had sent MO SMS to the SV 104 as in FIG. 7, then at stage 7 in FIG. 8, the UE proxy 340 initiates transfer of mobile originated SMS either over NAS or over IMS corresponding to whatever the UE 102 previously sent to the SV 104. This MO SMS may be received by the SMSF/SMSC 426 any may be subsequently forwarded to the remote endpoints 116 at stage 8. The transfer could be via an SMSC in the HPLMN of the UE 102 (not shown in FIG. 8) if the HPLMN is not the ground based PLMN 108. If the remote endpoints 116 have any SMS replies, these may be sent at stage 9 by the remote endpoints 116 and could be received by the SMSF/SMSC 426 and forwarded to the UE proxy 340 at stage 10. The UE proxy 340 would then store these mobile terminated (MT) SMS messages at stage 11.

If UE 102 had initiated SIP sessions to the SV 104 as in FIG. 7, the UE proxy 340 can initiate corresponding SIP sessions to remote endpoints 116 at stages 12 and 13 via the 5GC 310, for example the IMS 430. The remote endpoints 116 may then accept the SIP sessions which would be established following stage 13. After the SIP sessions have been established, user plane connections would be established between the UE proxy 340 and the remote endpoints 116, for example via the UPF 418. SIP media (or SIP media data) previously sent by the UE 102 as in FIG. 7 can then be transferred on these user plane connections from the UE proxy 340 to the remote endpoints 116 and may include voice, text or video media. At stage 15, the remote endpoints 116 may send media replies back to the UE 102 which would be transferred on the user plane connections to the UE proxy 340. The UE proxy 340 may also optionally send pre-configured media replies or messages to the remote endpoints 116 at stage 16 and/or prior to stage 14 at an application level indicating for example that the media data sent at stage 14 is being forwarded on behalf of UE 102 and/or that the media replies at stage 15 are being stored and will be later transferred to the UE 102. The UE proxy 340 also stores all the media replies and SIP session details for the transfers received at stage 15. When all the media sent by the UE 102 has been transferred to the remote endpoints 116 and when all the media replies from the remote endpoints 116 have been received and stored, UE proxy 340 can request release of the SIP sessions at stage 18 to the 5GC 310, for example the IMS 430, with the release request being forwarded by the 5GC 310 to the remote endpoints 116 at stage 19. The UE proxy 340 and the remote endpoints 116 can then release the SIP sessions.

In the case of Internet queries, Email queries or MO data sent by UE 102 on PDU sessions as in FIG. 7, the UE proxy 340 can forward the Internet queries and Email queries, for example HTTP queries, and/or the MO data, for example non-IP, IP, UDP/IP and/or TCP/IP packets, at stage 20 over the PDU sessions established at stage 5 to the 5GC 310, for example the UPF 418, for transfer to the remote endpoints 116. The remote endpoints 116 may then return Internet query responses, for example HTTP responses, Emails, and/or MT data responses at stage 21 to the UE proxy 340. The Internet query responses, Emails and/or MT data responses are stored by the UE proxy 340 at stage 22.

There may be additional unsolicited MT service data sent by the remote endpoints 116 to the UE proxy 340 at stage 23. For example, this may include, mobile terminated SMS, SIP media, Internet data or MT data (e.g. non-IP, IP, UDP/IP or TCP/IP packets). In this case, the UE proxy 340 can send lower protocol level (e.g. transport protocol level) replies (e.g. acknowledgments) that may be needed for these. The UE proxy 340 also stores the MT service data and associated protocol and addressing data at stage 24. It is noted that the UE proxy 340 can mimic the behavior of the UE 102 from the perspective of the remote endpoints 116 by: (i) sending MO data at stages 7, 14 and 20, receiving MT data at stages 10, 15 and 21, and/or sending pre-configured messages to the remote endpoints 116 at an application level at stage 16 and/or prior to stage 14; and/or by (ii) sending responses to the remote endpoints 116 at a transport level at stage 23.

At stage 25, the UE proxy 340 or SFC 202 periodically transfers all the MT service data and related protocol and addressing data stored by the UE proxy 340 to an available SV 104 which is expected later to be able to provide coverage to the UE 102. The transfer at stage 25 may be performed to more than one SV 104 since any particular SV 104 may, at times, not be accessible to or accessed by the UE 102. Furthermore, the SFC 202 and the UE proxy 340 can continue to store all of the MT date and related protocol and addressing data that was stored earlier at stage 22 until a confirmation is later received from an SV 104 that this MT data was delivered to the UE 102 as described previously. The SFC 202 can employ extra techniques to ensure that the MT data returned to the UE 102 is returned in the correct order to the UE 102 and that the MO data sent to the remote endpoints 116 is sent in the correct order as previously described.

FIG. 9 shows an example signal flow 900 that in more detail shows how an SV 104 can return MT data from remote endpoints 116 to a UE 102 in S&F mode and how the UE 102 can send more MO data to the SV 104 in S&F mode. The signal flow 900 may be performed by the UE 102, an application (App) 901 in the UE 102 and an SV 104, where the SV 104 contains an NG-RAN 205, 5GC 210 and endpoint proxy 240. It is assumed in FIG. 9 that: (i) the UE 102 has previously registered with an SV 104 and sent MO data to the SV 104 as described in FIG. 7; (ii) the SV 104 has transferred the MO data to an SFC 202 and UE proxy 340 which have transferred the MO data to remote endpoints 116 as described in FIG. 8; and (iii) the remote endpoints 116 have returned MT data to the SFC 202 and UE proxy 340 as described in FIG. 8 which have transferred the MT data to the SV 104 shown in FIG. 9 for later delivery to the UE 102. It is also assumed that the UE 102 may have a subscription with an SVO to access SVs 104 in store and forward mode and therefore the SV 104 shown in FIG. 9 may be preconfigured with the identities and security credentials for UE 102 in the 5GC 210, for example in UDM 222.

At stage 1 in FIG. 9, the SV 104 becomes visible at the UE 102 location and starts to provide radio coverage at that location and may broadcast SIBs over the coverage area of SV 104, where a SIB1 may indicate PLMNs supported by SV 104 such as ground based PLMN 108 and use of S&F mode.

At stage 2, the UE 102 detects the radio coverage from SV 104 and decides to select SV 104 and access SV 104 using one of the PLMN's indicated by SV 104 in a SIB1 at stage 1. In FIG. 9, it is assumed that SV 104 may indicate ground based PLMN 108 at stage 1 and that UE 102 selects ground based PLMN 108. Alternatively, SV 104 could indicate a PLMN at stage 1 corresponding to the SVO, in which case the UE 102 can select this PLMN based on its knowledge of its subscription to the SVO.

At stage 3, the UE 102 registers in the SV 104 by sending a NAS Registration request to the SV 104 and includes in the NAS Registration request the SUPI or a SUCI for the UE 102. The SUCI may be the SUPI for the UE 102 ciphered using a public key provided by the SV 104 in one of the SIBs broadcast at stage 1 or already preconfigured in UE 102 as a result of the UE 102 subscription to the SVO for the SV 104.

At stage 4, the SV 104, for example the AMF 214 and/or UDM 222, authenticate the UE 102 based on the SUPI or SUCI provided at stage 3. The authentication may be as described for stage 4 in FIG. 7.

Assuming the authentication at stage 4 succeeds, the 5GC 210, for example the AMF 214, returns a NAS Registration accept to the UE 102 at stage 5 to complete the registration of the UE 102 in the SV 104.

At stage 6, the 5GC 210, for example the AMF 214 or UDM 222, sends a trigger event to the endpoint proxy 240 for the UE if already created or to some other element in the SV 104 if not yet created to indicate that the UE 102 has successfully registered in the SV 104. If the endpoint proxy 240 was not yet created for the UE 102, the endpoint proxy 240 is created by the SV 104 at stage 7 with an indication that the UE 102 is currently registered in the SV 104. If the endpoint proxy 240 was already created for the UE 102, the endpoint proxy 240 is activated by the SV 104 at stage 7 with an indication that the UE 102 is currently registered in the SV 104. In either case, the endpoint proxy 240 is provided with access to all the MT data for the UE 102 that was previously transferred to SV 104 by the SFC 202 and UE proxy 340.

At stage 8 the UE 102 may establish one or more PDU sessions to the SV 104, for example to the UPF 218, which may be used subsequently to send MO and MT data. At stage 9, UE 102 may perform IMS registration with the SV 104, for example with the IMS 230, which may enable the UE 102 to originate mobile originated SIP calls to the endpoint proxy 240 acting on behalf of remote endpoints 116, and may enable the endpoint proxy 240 to originate mobile terminated SIP calls to the UE 102 for the transfer of MT SIP media.

At stage 10, the endpoint proxy 240 may notify the UE 102, for example the application 901, that there is MT data stored for the UE 102 in the SV 104 which should be transferred to the UE 102. The user of the UE 102 may interact with the application 901 and decide which types of MT data needs to be received by the UE 102 and which types do not need to be received. For example, if the UE 102 previously received MT data from another SV 104 where the MT data was labeled or described in some way, the user can opt out of receiving the same MT data if the endpoint proxy 240 indicates some of all of this same MT data is stored in the SV 104. Alternatively, if all the MT data stored in the SV 104 appears to be new, the user can indicate to the endpoint proxy 240 that all of the MT data can be transferred to the UE 102. Stage 10 may not be performed, in some aspects, but may help avoid duplicate delivery of the same MT data to the UE 102.

At stages 11-24, the endpoint proxy 240 fetches the stored MT data (e.g. as agreed with the user at stage 10) and transfers it to the UE 102.

At stage 11, and in the case of SMS messages, the endpoint proxy 240 fetches stored MT SMS messages and transfers these messages to UE 102 at stages 12 and 13 using SMS over NAS or SMS over IMS, where the MT SMS messages may be transferred to the UE 102 via the 5GC 310, for example, via the SMSF/SMSC 226.

At stage 14, the endpoint proxy 240 fetches any stored SIP media (or SIP media data) and establishes one or more mobile terminated IMS sessions with the UE 102 via the 5GC 210, for example via the IMS 230, at stages 15 and 16. The UE 102 would then normally accept these IMS sessions which would be established as part of stages 15 and 16. Also as part of stages 15 and 16, user plane connections are established between the endpoint proxy 240 and UE 102 to transfer the SIP media. These user plane connections may go over PDU sessions established at stage 5. At stage 17, the endpoint proxy 240 transfers the stored SIP media, for example voice text or video, to the UE 102 over the user plane connections. At stage 18, UE 102 (e.g. the user of UE 102) may return optional media replies to the endpoint proxy 240 on the user plane connections for later return to the remote endpoints 116. In that case, the endpoint proxy 240 stores the returned media replies for later transfer to the remote endpoints 116 by the SFC 202 and point proxy 340 as described in FIG. 8. After all the MT SIP media data has been transferred to the UE 102 at stage 17 and after the UE 102 has provided any media replies at stage 18, the endpoint proxy 240 can initiate release of the SIP sessions via the 5GC 210, for example the IMS 230, at stages 19 and 20.

At stage 21, the endpoint proxy 240 may fetch any stored Internet query replies, Emails and/or MT data stored in the SV 104 and transfers any MT data, for example non-IP, IP, UDP/IP or TCP/IP packets, to the UE 102 at stage 22. In the case of Internet query replies and/or Emails, the UE 102 or the user of the UE 102 may first need to trigger receipt of the Internet query replies and/or Emails or even send the original Internet queries and/or Email queries, for example HTTP requests, to the endpoint proxy 240 at stage 23. The endpoint proxy 240 can then return any corresponding Internet query replies and/or Emails, for example HTTP replies, which are stored in the SV 104 to the UE 102 at stage 24.

The UE 102 may also initiate new mobile originated data transfers to the SV 104 at stage 25 as described in FIG. 7. The endpoint proxy 240 would then store all of the transferred new MO data.

After the SV 104 has transferred all the stored MT data to the UE 102 and the UE 102 has sent any new MO data to the SV 104 and when UE 102 is about to lose access to the SV 104, the SV 104 may de-register the UE 102 or the UE 102 may de-register from the SV 104. For example, the SV 104, e.g. the AMF 214 and/or UDM 222, may perform a NAS de-registration of the UE 102 at stage 26 or possibly the UE 102 may initiate the NAS de-registration itself.

At stage 27, an indication that the NAS de-registration has occurred is sent, for example by the AMF 214 or UDM 222, to the endpoint proxy 240. The endpoint proxy 240 can then be deactivated (e.g. closed) at stage 28 with all the new MO data transferred from the UE 102 and stored by the endpoint proxy 240 being saved by the SV 104. Finally, at stage 29, the SV 104 is assumed to move away from the location of the UE 102 and to cease providing coverage to the UE 102. The SV 104 may then later have a feeder link to the SFC 202 and ground based PLMN 108, and may forward any new MO data to the remote endpoints 116 via the SFC 202 and ground based PLMN 108, e.g. as described for FIG. 8.

To improve the efficiency of and reduce delays in SV 104 access by a UE 102 in S&F mode, an S&F application may be used in a UE 102. An S&F application can be an application level program or process in a UE 102 similar to other applications in terms of its interaction with the user of UE 102 and interaction with other elements in the UE 102. The S&F application can enable a user of UE 102 to instigate and send MO data (e.g. MO SMS, voice calls, MO data, Email and Internet queries) internally and locally within the UE 102. Here, the user can interact with the S&F application and not with an endpoint proxy 240 in an SV 104 and can still originate and send MO data as if interacting with an endpoint proxy 240. However, the MO data (e.g. MO media and service data) is instead intercepted by and stored in the UE 102 by the S&F application. Later, when an SV 104 with S&F mode access becomes available to the UE 102, the S&F application can autonomously instigate NAS Registration of the UE 102 with the SV 104, set up PDU sessions, perform IMS Registration and then transfer all the MO media and service data to the endpoint proxy 240 in the SV 104. This transfer may mimic transfer from the user as described previously and in FIG. 7.

The S&F application may also support a faster and more efficient mode of transfer where all of the MO media and service data is first packaged (also referred to as "packed") into a single data set by the S&F application and then sent to the endpoint proxy 240 in the SV 104, e.g. is sent to a pre-configured address (e.g. IP, UDP or TCP address) assigned to an SV application that is part of or associated with the endpoint proxy 240 in the SV 104. The SV application then stores this data set without alteration or interpretation. When the SV 104 later has feeder link access to an SFC 202, the data set is transferred (unchanged) to an SFC application associated with the UE proxy 340 in the SFC 202. The SFC application in the SFC 202 can then unpackage (also referred to as "unpack") the data set to separate out the different MO transactions and send the MO media and service data to the remote endpoints 116.

The same type of procedure could be used to return MT media and service data back to the UE 102, where the SFC application in the SFC 202 can package the different types of MT service and media data received from remote endpoints 116 into a single data set, which can be transferred to an endpoint proxy 240 in an SV 104 and then sent to the S&F application in the UE 102 where the data set would be unpackaged into the individual MT transactions and provided to the user.

Because high bandwidth may be used to transfer data between the UE 102 and SV 104, transfers could be very fast, allowing a UE 102 to access only one SV 104 for a short period (e.g. less than 1 minute) and avoid using ISL support. The user can then make use of S&F mode at any time (by interacting with the UE 102 S&F application regardless of whether an SV 104 can be accessed by the UE 102) and is no longer restricted to access only when an SV 104 is accessible.

In a variant which could simplify SV 104 and SFC 202 support, the S&F application in the UE 102 is also supported at a remote endpoint 116 and with no SV application or SFC application support. The dataset created by the S&F application in the UE 102 is then sent transparently (as MO data) to the SV 104 endpoint proxy 240 and then to the SFC 202 UE proxy 340 and is finally sent to the remote endpoint 116 without any interpretation or alteration along the way-being treated as just data by the SV 104 and SFC 202. The data set is then unpackaged by the S&F application at the remote endpoint 116 to separate out the different MO transactions and with the original MO media and service data provided to the remote endpoint 116 (e.g. a user of the remote endpoint 116). While the dataset can contain various media (e.g. voice, video, text), the SV 104 and SFC 202 only need to support transfer of unstructured data (e.g. an octet string) using such transport protocols as IP, UDP/IP or TCP/IP. The S&F application in the remote endpoint 116 would similarly package any MT data to be returned to the UE 102 into a single MT dataset containing different types of MT data (e.g. MT SMS, voice media, MT data, Email and Internet replies) which would be transferred back to the S&F application in the UE 102 transparently through the SFC 202 and SV 104.

Such transfer could also be used in real time mode when SV 104 availability is very short (e.g. with discontinuous SL coverage) and even when SV 104 and ground based PLMN 108 coverage is continuous to reduce SV 104 access time and access charges.

The dataset could be sent ciphered end to end and the media (e.g. voice, text, video) could be compressed. The S&F application in the UE could also manage the sending and receiving of different datasets to and from different remote endpoints 116.

Local communication between two UEs 102 accessing the same SV 104 at the same time could also be supported using the S&F application if both of the UEs support the S&F application. In this case, the S&F application in a first UE 102 can send a dataset to the SV 104 which recognizes the destination remote endpoint 116 for this as being a second UE 102 that is also registered in the SV 104 and forwards the dataset to a similar S&F application in the second UE 102 which then unpackages the dataset into the original MO media and service data sent by the first UE 102 and alerts the user of the second UE. A response from the second UE using the S&F application could be also returned in the same manner to the first UE. The use of an S&F application to support local communication between two UEs 102 could allow communication to be exchanged between the two UEs 102 that, when transferred at a normal speed (e.g. a normal voice speed, normal video speed or normal typing speed for text), could greatly exceed the accessibility time of the SV 104 to the two UEs 102.

Figure 10:
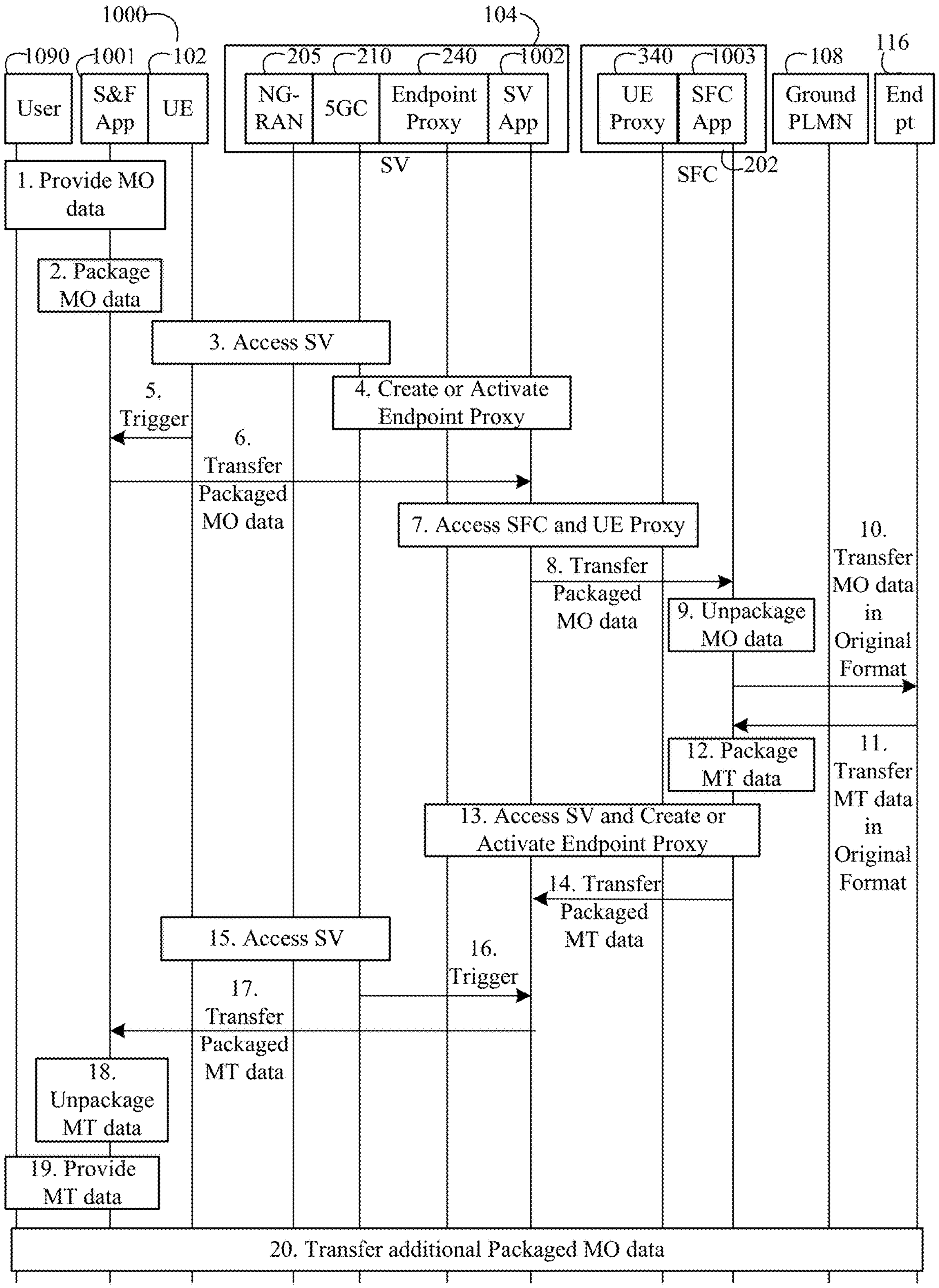
FIG. 10 illustrates use of an application to improve store and forward operation.
Figure 11:
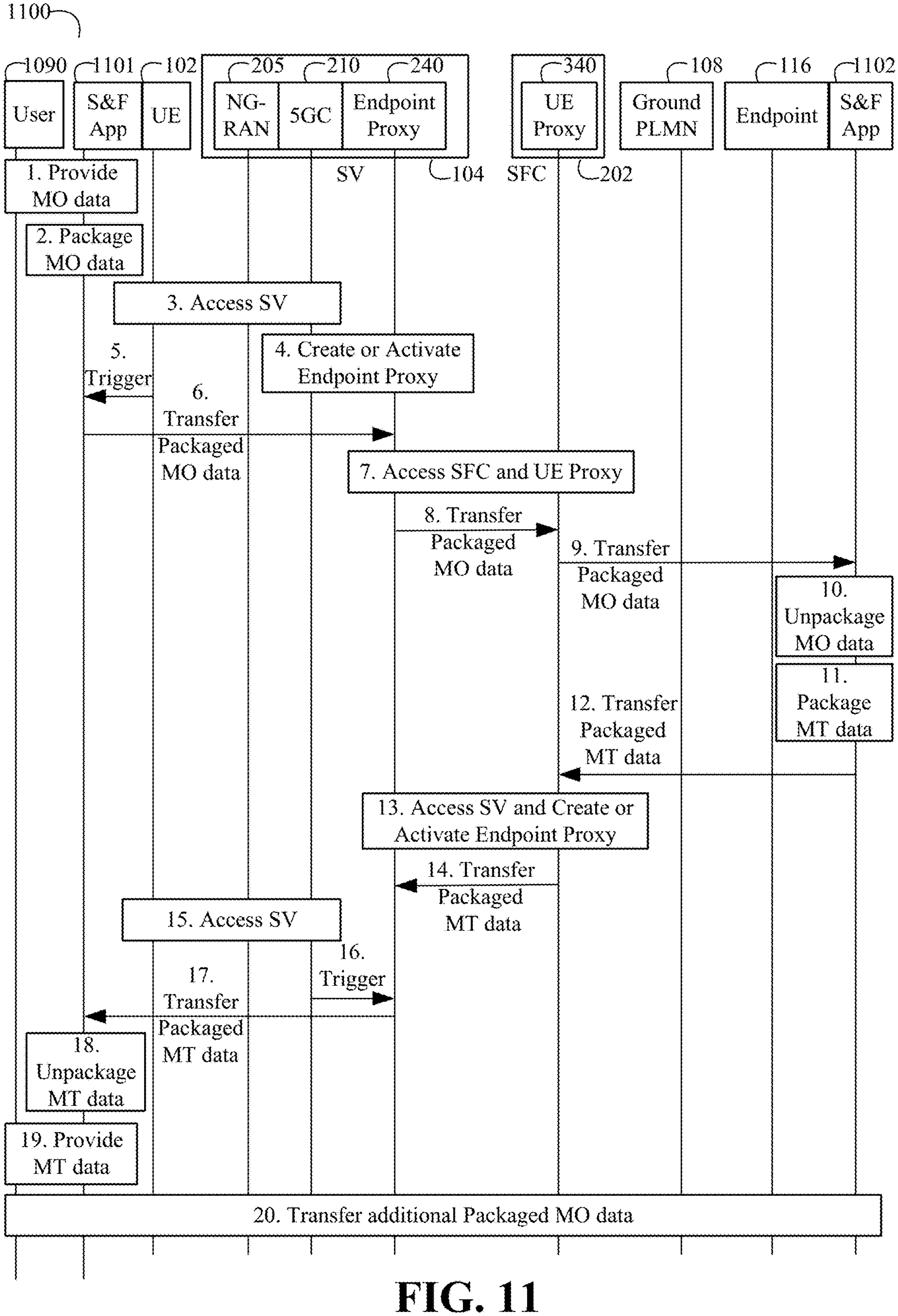
FIG. 11 illustrates an alternative use of an application to improve store and forward operation.

The use of an S&F application to improve store and forward mode communication between a UE 102 and remote endpoint 116 as described previously is described and elaborated next with respect to FIGS. 10 and 11.

FIG. 10 shows an example signal flow 1000 that in more detail shows how a UE 102 can send MO data to a remote endpoint 116 using an S&F application. The signal flow 1000 is performed by the UE 102 and an S&F application 1001 in the UE 102, a user 1090 of the UE 102, an SV 104 containing an NG-RAN 205, 5GC 210, endpoint proxy 240 and SV application 1002, an SFC 202 containing a UE proxy 340 and an SFC application 1003, a ground based PLMN 108 and a remote endpoint 116. It is noted that the SV application 1002 may be part of the endpoint proxy 240 or SV 104 and/or the SFC application 1003 may be part of the UE proxy 340 or SFC 202.

At stage 1 in FIG. 10, the user 1090 of the UE 102 provides mobile originated data to the S&F application 1001 in the UE 102. For example, the MO data may comprise MO SMS messages, media data for SIP (e.g. voice, video or text), Internet queries, Email queries and/or plain MO data (e.g. data transported using non-IP, IP, UDP/IP or TCP/IP). Stage 1 may be performed at any time convenient to the user 1090 and in particular may occur when an SV 104 is not accessible to the UE 102. The provision of the MO data at step 1 may appear to the user 1090 as similar to providing MO data to remote endpoints 116 or similar to providing MO data to an SV 104 in S&F mode as in FIG. 7.

At stage 2, the S&F application 1001 packages the MO data received at stage 1 into a single MO data set. The single MO data set may comprise a bit string or octet string and may appear to other entities as a bit string or octet string. However, it could contain internal structuring (e.g. as defined by some data structure standard such as ASN.1 or XML) which preserves the separate types of MO data and their formatting as provided by the user 1090 at stage 1. For example, the S&F application 1001 may package the MO data into the single MO data set by combining different types of the MO data (e.g. MO SMS, MO SIP media data, Internet queries, Email queries, MO IP, non-IP, UDP/IP or TCP/IP data) into the single MO data set and including control information in the MO data set that identifies the different types of the MO data and their position(s) within the MO data set. Where the MO data is intended for more than one remote endpoint 116, the S&F application 1001 could create a single MO data set containing the MO data for all the intended remote endpoints 116, where packaging the MO data may further include including an address or identity for each intended remote endpoint 116 for each type or each piece of MO data. Alternatively, the S&F application 1001 could create a separate MO data set for each intended remote endpoint 116 containing the MO data for just this remote endpoint 116. In this case, the separate MO data sets would be transferred in the stages described below rather than just a single MO data set.

At stage 3 which may occur later, the UE 102 becomes able to access an SV 104 and accesses the SV 104, e.g. as described in FIG. 7 including registering with the SV 104 (by performing a NAS registration), establishing PDU sessions and performing an IMS registration.

At stage 4 the SV 104 creates or activates an endpoint proxy 240 for the UE 102, for example as described in FIG. 7.

At stage 5, the UE 102 sends a trigger or notification to the S&F application 1001 indicating that an SV 104 has been accessed by the UE 102 with the UE 102 able to send MO data in S&F mode to the SV 104. The trigger may also indicate that the SV 104 or SFC 202 has SV application capability that is able to receive the MO data set packaged by the S&F application 1001 at stage 2, or the S&F application 1001 may query the SV 104 (e.g. the endpoint proxy 240) to determine whether the SV 104 supports an SV application, or the S&F application 1001 may be configured with information (e.g. SVO MCC-MNCs) about SVOs that support packaged MO data sets.

Based on the trigger at stage 5 and determination of packaged MO data set support at stage 5, the S&F application 1001 sends the packaged MO data set to the SV 104 at stage 6 where it is received by the endpoint proxy 240 and may be passed to the SV application 1002 where it would be stored. The MO data set may not be completely transparent to the SV 104 which may need to be aware that the MO data set contains packaged MO data. However, the SV 104 and SV application 1002 may not look at the MO data or necessarily support packaging and/or unpackaging of the MO data. Optionally, however, the SV application 1002 could re-package the MO data in the MO data set—e.g. to reduce data set size or if the SFC application 1003 in the SFC 202 supports a different method of MO data packaging than the S&F application 1001 in the UE 102. For example, the SV application 1002 could re-package the MO data by unpackaging the MO data set into the MO data and then packaging the MO data into a new MO data set using different (e.g. more efficient) packaging techniques. In another aspect, the packaged MO data set can be completely transparent to the SV 104 and no SV application 1002 is supported in the SV 104. Instead, the packaged MO data set may be received and stored by the endpoint proxy at stage 6 and treated as unstructured MO data (e.g. a bit string or octet string).

At some later time at stage 7, after the SV 104 has moved away from the location of the UE 102, the SV 104 obtains a feeder link and is able to access the SFC 202 and UE proxy 340 for the UE 102 as described in FIG. 8. At stage 8, the SV 104, the endpoint proxy 240 or the SV application 1002 transfers the packaged MO data set to the UE proxy 340 which then transfers the MO data set to the SFC application 1003. The SV 104 or the SV application 1002 can also provide an indication that the MO data set contains packaged MO data if this is known.

At stage 9, the SFC application 1003 unpackages (also referred to as "depackages" or "unpacks") the MO data set received at stage 8 into the original MO data types provided by the user 1090 at stage 1. For example, the SFC application 1003 may unpackage the MO data set into the MO data by identifying the different types of the MO data in the MO data set (e.g. MO SMS, MO SIP media data, Internet queries, Email queries, MO IP, non-IP, UDP/IP or TCP/IP data) and their positions in the MO data set, and separating the different types of the MO data. If the indication that the MO data set contains packaged MO data was not received at stage 8 (e.g. if the SV 104 or endpoint proxy 240 is not aware that the MO data is a packaged MO data set), the SFC application 1003 can first determine that the MO data received at stage 8 is a packaged MO data set, e.g. by examining the content of the MO data and verifying it has the structure of a packaged MO data set or using configuration data for the UE 102 stored in the SFC 202 that indicates that the UE 102 is able to send a packaged MO data set. After such a determination, the SFC application 1003 can unpackage the packaged MO data set.

The SFC application 1003 or the UE proxy 340 then transfers each of the original MO data types to the intended remote endpoints 116 at stage 10 and possibly as described in FIG. 8.

At stage 11, the remote endpoints 116 may transfer various MT data types (e.g. MT SMS messages, SIP media data, Internet query responses, Emails or plain MT data in the form of non-IP, IP, UDP/IP or TCP/IP data) in an original format to the UE proxy 340 which may transfer these to the SFC application 1003. At stage 12, the SFC application 1003 then packages the received MT data types into a single MT data set similar to the MO data set created by the S&F application in the UE 102 at stage 2 and stores the MT data set.

At stage 13, which may occur at some later time, the UE proxy 340 is able to access an SV 104 (which may be different to the SV 104 for stages 3 to 8) which will later provide coverage to the last known location of the UE 102, and an endpoint proxy 240 for UE 102 is then created or activated in the SV 104. At stage 14, the SFC application 1003 or the UE proxy 340 then transfers the packaged MT data set to the endpoint proxy 240 in the SV 104.

At a later time, the SV 104 moves away from the location of the SFC 202 and provides coverage to the UE 102 where the UE 102 accesses the SV 104 (e.g. registers in the SV 104) at stage 15, for example as described in FIG. 7. After this occurs and at stage 16, the SV 104, for example the 5GC 310, sends a trigger to the endpoint proxy 240 which can forward this to the SV application 1002, indicating that the SV 104 is now able to access the UE 102. Based on the trigger at stage 16, the SV application 1002 transfers the packaged MT data set to the UE 102 at stage 17 which provides the MT data set to the S&F application 1001. At stage 18 the S&F application 1001 unpackages the MT data set received at stage 17 into the original MT data types sent by the remote endpoints 116 at stage 11. The S&F application 1001 then provides the original MT data types to the user 1090 at that time or at a later time convenient to the user 1090, for example when an SV 104 is not accessible to the UE 102.

At stage 20, stages 1, 2 and 6 to 10 may be repeated to transfer more packaged MO data from the UE 102 to the remote endpoints 116 using the SV 104 used at stages 13 to 17. Alternatively, at stage 20, stages 1 to 10 may be repeated to transfer more packaged MO data from the UE 102 to the remote endpoints 116 using a different SV 104 to the SV 104 used at stages 13 to 17.

FIG. 11 shows an example signal flow 1100 that in more detail shows how a UE 102 can send MO data to a remote endpoint 116 using an S&F application, where the MO data is packaged into a single MO data set by the S&F application in the UE 102 and sent transparently through an SV 104 and SFC 202 to a similar S&F application in the remote endpoint 116. The signal flow 1100 is performed by the UE 102 and an S&F application 1101 in the UE 102, a user 1090 of the UE 102, an SV 104 containing an NG-RAN 205, 5GC 210 and endpoint proxy 240, an SFC 202 containing a UE proxy 340, a ground based PLMN 108 and a remote endpoint 116 containing an S&F application 1102.

At stage 1 in FIG. 11, the user 1090 of the UE 102 provides mobile originated data for a single remote endpoint 116 to the S&F application 1101 in the UE 102. For example, the MO data may comprise MO SMS messages, media data for SIP (e.g. voice, video or text), Internet queries, Email queries and/or plain MO data (e.g. data transported using non-IP, IP, UDP/IP or TCP/IP). Stage 1 may be performed at any time convenient to the user 1090 and in particular may occur when an SV 104 is not accessible to the UE 102. The provision of the MO data at step 1 may appear to the user 1090 as similar to providing MO data to remote endpoints 116 or similar to providing MO data to an SV 104 in S&F mode as in FIG. 7. The user 1090 may also indicate to the S&F application 1101 at stage 1 that the remote endpoint 116 for the MO data sent at stage 1 has S&F application capability. Alternatively, the S&F application 1101 may be configured with an indication of this capability.

At stage 2, based on the knowledge that the remote endpoint 116 for the MO data sent at stage 1 has S&F application capability, the S&F application 1101 packages the MO data received at stage 1 into a single MO data set. The single MO data set may comprise a bit string or octet string and may appear to other entities as a bit string or octet string. However, it can contain internal structuring (e.g. as defined by some data structure standard such as ASN. 1 or XML) which preserves the separate types of MO data and their formatting as provided by the user 1090 at stage 1. For example, the S&F application 1101 may package the MO data into the single MO data set by combining different types of the MO data (e.g. MO SMS, MO SIP media data, Internet queries, Email queries, MO IP, non-IP, UDP/IP or TCP/IP data) into the single MO data set and including control information in the MO data set that identifies the different types of the MO data and their position(s) in the MO data set.

At stage 3 which may occur later, the UE 102 becomes able to access an SV 104 and accesses the SV 104, e.g. as described in FIG. 7 including registering with the SV 104 (by performing a NAS registration), establishing PDU sessions and performing an IMS registration.

At stage 4 the SV 104 creates or activates an endpoint proxy 240 for the UE 102, for example as described in FIG. 7.

At stage 5, the UE 102 sends a trigger or notification to the S&F application 1101 indicating that an SV 104 has been accessed by the UE 102 with the UE 102 able to send MO data in S&F mode to the SV 104.

Based on the trigger at stage 5, the S&F application 1101 sends the packaged MO data set to the SV 104 at stage 6 as a single unstructured piece of data (e.g. octet string or bit string) where it is received by the endpoint proxy 240 and stored. The MO data set can be transparent to the SV 104 and endpoint proxy 240 which may not be aware that the MO data set contains packaged MO data and may instead treat the MO data set as a single unstructured piece of data (e.g. octet string or bit string).

At some later time at stage 7, after the SV 104 has moved away from the location of the UE 102, the SV 104 obtains a feeder link and is able to access the SFC 202 and UE proxy 340 for the UE 102 as described in FIG. 8. At stage 8, the SV 104 or the SV application 1002 transfers the packaged MO data set to the UE proxy 340.

At stage 9, the UE proxy 340 transfers the packaged MO data set without change or interpretation to the remote endpoint 116 and possibly as described in FIG. 8. The remote endpoint 116 then transfers the packaged MO data set to the S&F application 1102 in the remote endpoint 116.

At stage 10, the S&F application 1102 in the remote endpoint 116 unpackages the MO data set received at stage 9 into the original MO data types provided by the user 1090 at stage 1 and may make these available to a user of the remote endpoint 116. For example, the S&F application 1102 may unpackage the MO data set into the MO data by identifying the different types (and positions) of the MO data in the MO data set (e.g. MO SMS, MO SIP media data, Internet queries, Email queries, MO IP, non-IP, UDP/IP or TCP/IP data) and separating the different types of the MO data.

The remote endpoint 116 or a user of the remote endpoint 116 may determine to transfer various MT data types back to the UE 102. For example, the MT data may comprise MO SMS messages (which become MT SMS messages while being transferred to UE 102), media data for SIP (e.g. voice, video or text), Internet query responses, Emails and/or plain MO data (e.g. data transported using non-IP, IP, UDP/IP or TCP/IP and which becomes MT data while being transferred to UE 102). In that case, at stage 11, the MT data is first provided to the S&F application 1102 which packages the MT data types into a single MT data set similar to the MO data set created by the S&F application in the UE 102 at stage 2. At stage 12, the S&F application 1102 transfers the single MT data set to the UE proxy 340 which stores the MT data set.

At stage 13, which may occur at some later time, the UE proxy 340 is able to access an SV 104 (which may be different to the SV 104 for stages 3 to 8) which will later provide coverage to the last known location of the UE 102, and an endpoint proxy 240 for UE 102 is then created or activated in the SV 104. At stage 14, the UE proxy 340 transfers the packaged MT data set to the endpoint proxy 240 in the SV 104.

At a later time, the SV 104 moves away from the location of the SFC 202 and provides coverage to the UE 102 where the UE 102 accesses the SV 104 (e.g. registers in the SV 104) at stage 15, for example as described in FIG. 7. After this occurs and at stage 16, the SV 104, for example the 5GC 310, sends a trigger to the endpoint proxy 240 indicating that the SV 104 is now able to access the UE 102. Based on the trigger at stage 16, the endpoint proxy 240 transfers the packaged MT data set without change or interpretation to the UE 102 at stage 17 which provides the MT data set to the S&F application 1101. At stage 18, the S&F application 1101 unpackages the MT data set received at stage 17 into the original MT data types provided at the remote endpoint 116. The S&F application 1101 then provides the original MT data types to the user 1090 at that time or at a later time convenient to the user 1090, for example when an SV 104 is not accessible to the UE 102.

At stage 20, stages 1, 2 and 6 to 10 may be repeated to transfer more packaged MO data from the UE 102 to the remote endpoint 116 using the SV 104 used at stages 13 to 17. Alternatively, at stage 20, stages 1 to 10 may be repeated to transfer more packaged MO data from the UE 102 to the remote endpoint 116 using a different SV 104 to the SV 104 used at stages 13 to 17.

It has been assumed so far that a UE 102 may have a subscription to an SVO and that UE 102 identities and security credentials may be stored as a result in SVs 104 and SFCs 202. In some cases, this could mean that a UE 102 primary security key K (which is normally only stored in a UE 102 Universal Subscriber Identity Module (USIM) and HPLMN UDM) needs to be provided to an SVO and stored in multiple SVs 104 and SFCs 202, which may create a later security risk for the UE 102. To support SVO subscription by a UE 102 with a reduced security risk, a technique to enhance existing security procedures may be used, referred to here as “SVO subscription with increased security”, where the primary key K of the UE 102 is not exposed. With this technique, an HPLMN operator may perform a non-reversible transformation of the primary key K into a substitute primary key K* whose value is indicated by a key ID Kid. For example, the K* may be determined based on the Kid and the K for the UE by ciphering the Kid using the K. As an example, the Kid could include a random component (e.g. pseudo-random or random bits or octets), a timestamp (e.g. a date and/or a time) and/or an SVO identity, where for example:

$$K^{*}=\text{Hash}(\text{ciphering of } Kid \text{ using } K) \qquad \text{(Equation 1)}$$

The ciphering in equation 1 may for example be Advanced Encryption Standard (AES) ciphering.

The HPLMN operator may (securely) provide the values of Kid and K* to the SVO which stores both in SVs 104 and SFCs 202. Authentication and ciphering operations between a UE 102 and SV 104 for S&F mode can then follow normal procedures with the following differences.

(A) The SV 104 provides the value of Kid to the UE 102 at the start of any security procedure in which the UE 102 needs to use the key K.

(B) The UE uses the value of Kid to determine the key K*.

The security procedure is then performed by both sides as normal but using K* in place of K.

For security procedures between the UE proxy 340 in the SFC 202 and the HPLMN of a UE 102, the UE proxy 340 similarly provides the stored value of Kid to the HPLMN (e.g. UDM/AUSF) which determines the value of K* to be used in place of K-which avoids the need to store the Kid and K* values in the HPLMN.

It has also been assumed so far (e.g. for FIGS. 7-11) that UE 102 may at least have a subscription to an SVO to access SVs 104 in S&F mode, using either existing security procedures or the SVO subscription with increased security technique just described above. However, this assumption is restrictive as it means a UE 102 user could need to know ahead of time that SV 104 access in S&F mode will be needed and to arrange such a subscription prior to accessing an SV 104 in S&F mode.

To avoid these restrictions, UE 102 access to SVs 104 may be supported without subscription of UEs 102 to an SVO using a technique referred to here as “SVO non-subscription”. With this technique, security and subscription information for a UE 102 is not pre-stored in SVs 104 and SFCs 202. Instead, authentication and ciphering between a UE 102 and SV 104 can make use of a public-private key pair where the SV 104, the UE 102 or both provide a public key and a certificate (e.g. in an Authentication Request in the case of an SV 104) after finding that a UE 102 is not subscribed with the SVO. A public key provided to a UE 102 by an SV 104 can allow the UE 102 to authenticate the SV 104. Similarly, a public key provided to an SV 104 by a UE 102 can allow the SV 104 to authenticate an identity for UE 102. The SV 104 then provides all or some limited S&F services to the UE 102 the same as for a subscribed UE 102. The SV 104 could limit initial UE 102 service until UE 102 has been verified (as described later) by the UE 102 HPLMN.

The UE 102 also provides to the SV 104, on request, a substitute primary key K* and associated Kid (after ciphering has started) as described above for the SVO subscription with increased security technique. The SV 104 later provides the values of K* and Kid to the SFC 202 which uses them to enable the UE proxy 340 to be authenticated by the HPLMN of UE 102 similar to UE proxy 340 authentication by the HPLMN of UE 102 for the SVO subscription with increased security technique described above. If the UE proxy 340 is successfully authenticated by the HPLMN of the UE 102, the values of K* and Kid can be uploaded along with any MT data to other SVs 104 which can use them to authenticate the UE 102 for any further access by the UE 102 to the other SVs 104. In the meantime, the UE 102 could wait for a satellite SV 104 with the uploaded values of K* and Kid to become available to perform further access to SVs 104 in S&F mode.

Figure 12:
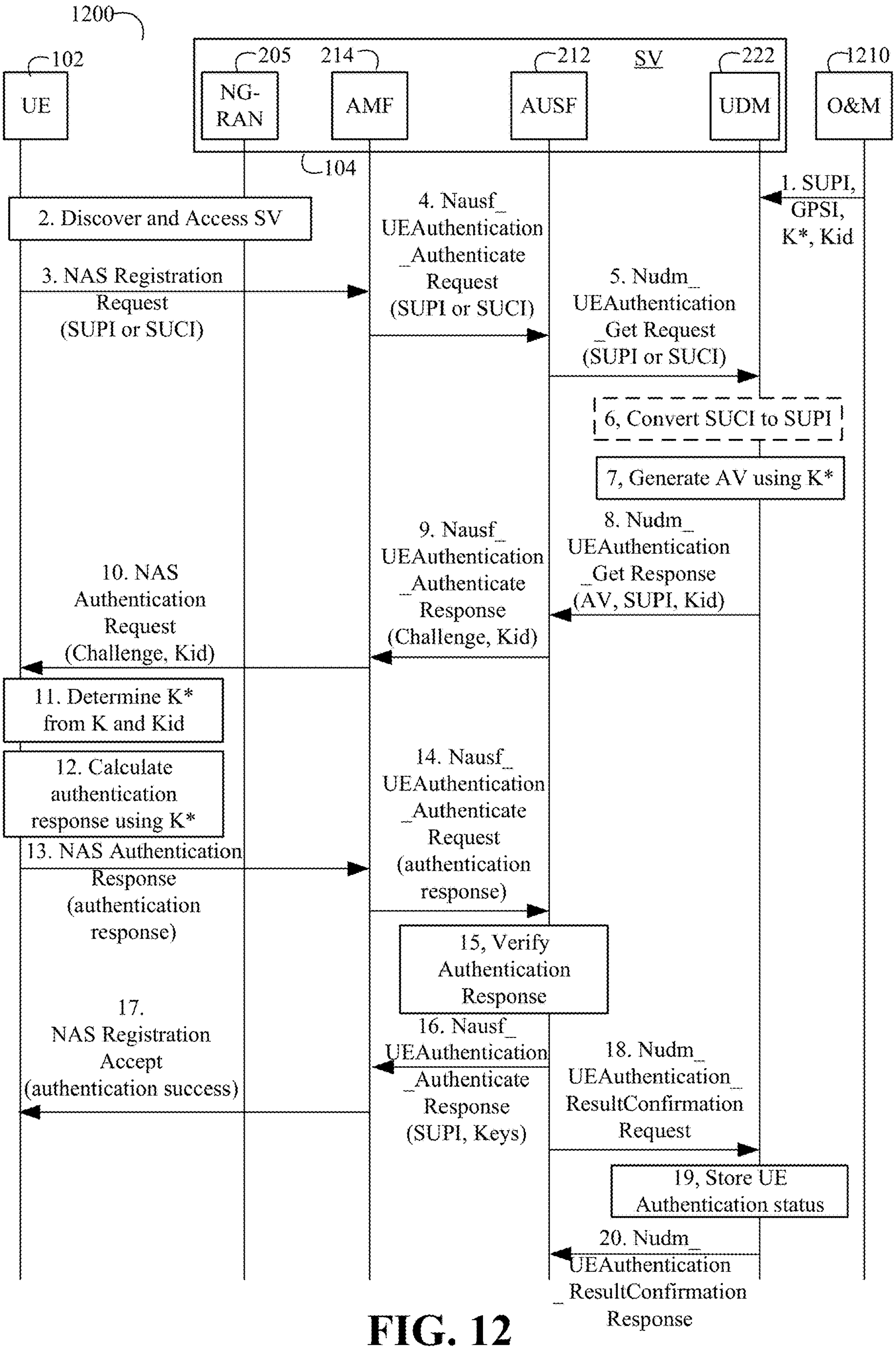
FIG. 12 illustrates secure access to a satellite by a mobile device with store and forward operation.
Figure 13:
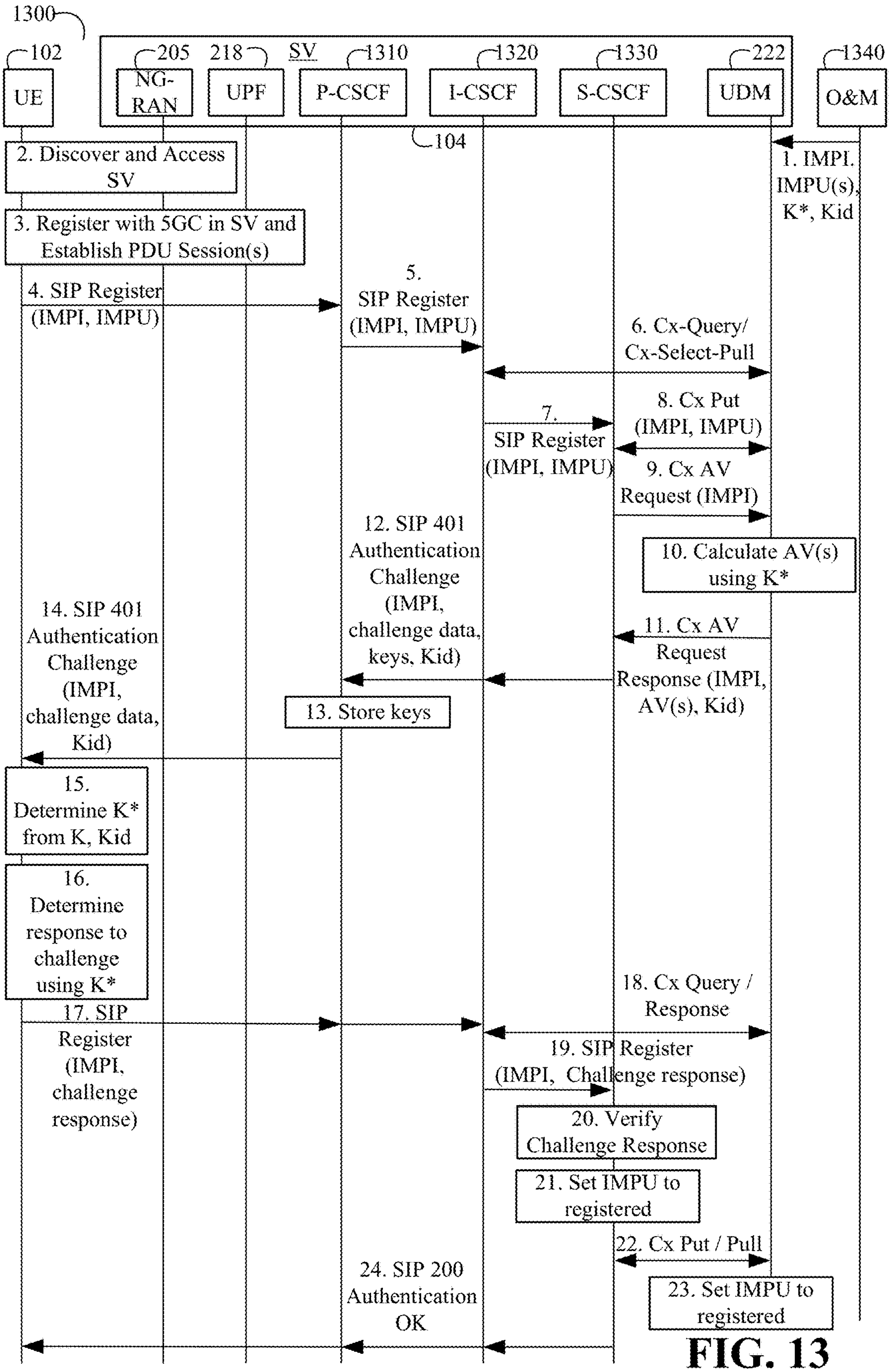
FIG. 13 illustrates secure IMS access to a satellite by a mobile device with store and forward operation.

FIGS. 12 and 13 illustrate, and provide further example aspects for, the SVO subscription with increased security technique. FIG. 12 shows an example signal flow 1200 that in more detail shows how a UE 102 can register with and be authenticated by an SV 104 for the SVO subscription with increased security technique. The signal flow 1200 is performed by the UE 102, the SV 104 containing an NG-RAN 205, 5GC 210 containing an AMF 214, AUSF 212 and UDM 222 and an operations and maintenance (O&M) server 1210 which may, for example, belong to the SVO for SV 104 or the HPLMN for the UE 102. Stages 3 to 20 of signal flow 1200 could be used at stages 3 to 5 of signal flow 700 in FIG. 7 and stages 3 to 5 of signal flow 900 in FIG. 9 to perform authentication and ciphering key determination for NAS Registration and help enable secure transfer of MO data and MT data between the UE 102 and at least one remote endpoint 116.

It is assumed that a user of the UE 102 contacts the HPLMN operator for UE 102 and possibly the SVO for SVs 104 and indicates that UE 102 will need to receive store and forward mode service from SVs 104 belonging to the SVO. As a consequence of this, the HPLMN operator and/or the SVO arrange for the O&M server 1210 at stage 1 in FIG. 12 to configure SVs 104, for example the UDM 222 in each SV 104, with subscription, identity and security information for the UE 102. Identity information may include the SUPI and possibly Generic Public Subscription Identifier (GPSI) of the UE 102. The security information can include a substitute primary key K* and a key identity Kid that would have been determined by the HPLMN operator of the UE 102 as described previously for the SVO subscription with increased security technique.

At stage 2, UE 102 discovers and accesses an SV 104 in S&F mode. At stage 3, the UE 102 registers with the SV 104 by sending a NAS Registration Request to the AMF 214 in SV 104 which can include the SUPI or a SUCI for the UE 102. Stages 2 and 3 may occur as described for corresponding stages in FIG. 7.

At stage 4, the AMF 214 sends a UE authentication authenticate request to the AUSF 212 in the SV 104 and includes the SUPI or SUCI received at stage 3.

At stage 5, the AUSF 212 sends a UE authentication get request to the UDM 222 in SV 104 requesting authentication information for the UE 102. Stages 4 and 5 can follow existing procedures for authenticating a UE in an HPLMN. Although the AMF 214 may not know whether the UE 102 subscribes to the SVO and SV 104, the AMF 214 can in all cases send the authentication request to the AUSF and UDM at stages 4 and 5.

At stage 6, the UDM 222 may convert any SUCI that was received at stage 5 into the SUPI for the UE 102, for example based on known ciphering of the SUCI using a public key known to the SV 104.

At stage 7, the UDM 222 generates an authentication vector (AV) using the substitute primary key K* configured at stage 1.

At stage 8, the UDM 222 returns a UE authentication get response to the AUSF 212 which can include the authentication vector, the SUPI, if determined at stage 6, and the key identity Kid configured at stage 1.

At stage 9, the AUSF 212 returns a UE authentication authenticate response to the AMF 214 including the key identity Kid and data for an authentication challenge derived by the AUSF 212 from the AV.

At stage 10, the AMF 214 sends a NAS authentication request to the UE 102 and includes the data for the authentication challenge and the key identity Kid.

At stage 11 and based on the inclusion of the key identity Kid at stage 10, UE 102 determines the substitute primary key K* from the known primary key K stored (i.e. configured) on the USIM of UE 102 and the key identity Kid (e.g. using equation 1) and as described previously for the SVO subscription with increased security technique.

At stage 12, the UE 102 calculates authentication response data to the data for the authentication challenge received at stage 10 using the substitute primary key K* calculated at stage 11. The UE 102 also uses the substitute primary key K* and authentication related data to determine cipher keys to be used later for signaling with SV 104.

At stage 13, the UE 102 returns a NAS authentication response to the AMF 214 and includes the authentication response data calculated at stage 12. The AMF 214 then returns to the AUSF 212 at stage 14 a UE authentication authenticate request including the authentication response data received from the UE 102.

At stage 15, the AUSF 212 verifies that the authentication response data received at stage 14 is correct based on the authentication vector received from the UDM at stage 8. Assuming that the authentication response data is successfully verified, the AUSF 212 sends a UE authentication authenticate response to the AMF 214 at stage 16 and includes the SUPI if that was received from UDM 222 at stage 8 and ciphering keys to be used by the AMF 214.

The AMF 214 then returns a NAS registration accept to the UE 102 at stage 17 indicating that authentication was successful, which completes the registration of the UE 102 in the SV 104. The AUSF 212 also sends a UE authentication result confirmation request to the UDM 222 at stage 18 indicating that authentication of UE 102 was successful and the UDM 222 then stores the successful UE authentication status at stage 19. The UDM 222 also returns a UE authentication result confirmation response to the AUSF 212 at stage 20.

Except for some small differences added by the SVO subscription with increased security technique, stages 3 to 20 of the example signal flow 1200 as shown in FIG. 12 and described above can be similar or identical to stages performed by a UE and HPLMN when the UE registers in and is authenticated by the HPLMN. The differences to normal NAS registration and authentication in signal flow 1200 can comprise: (i) the addition and inclusion of the key identity Kid at stages 8 to 10; (ii) the determination of the substitute primary key K* from the primary key K and the key Identity Kid by UE 102 at stage 11; (iii) the usage of K* and not K by UE 102 at stage 12 to calculate the authentication response; and (iv) use of the substitute primary key K* and authentication related data to determine cipher keys by the UE 102 at stage 12.

Following authentication of the UE 102 as described for FIG. 12 and to support later authentication of the UE proxy 340, e.g. as at stage 3 in FIG. 8, the SFC 202 or UE proxy 340 could be configured with the substitute primary key K* (e.g. by an O&M server such as O&M server 1210 in FIG. 12) and be authenticated by an HPLMN of UE 102 which also uses the substitute primary key K* for UE 102 authentication when a VPLMN for the UE 102 corresponds to the ground based PLMN 108.

Alternatively, the SFC 202 or UE proxy 340 could be configured with both the substitute primary key K* and the key ID Kid (e.g. by an O&M server such as O&M server 1210 in FIG. 12), with stages 2 to 19 of FIG. 14B (as described later) being performed to authenticate the UE 102 by the HPLMN of the UE 102 based on the substitute primary key K* and the key ID Kid.

FIG. 13 shows an example signal flow 1300 that in more detail shows how a UE 102 can perform an IMS registration with an SV 104 and can be authenticated at an IMS level by the SV 104 for the SVO subscription with increased security technique. Authentication aspects and in particular the differences added by the SVO subscription with increased security technique in signal flow 1300 are similar to those in signal flow 1200, and an SV 104 might support both signal flows 1200 and 1300 as part of the SVO subscription with increased security technique. Signal flow 1300 is performed by the UE 102, the SV 104 containing an NG-RAN 205, 5GC 210 containing a P-CSCF 1310, I-CSCF 1320, S-CSCF 1330 and UDM 222, and an operations and maintenance (O&M) server 1340 which may, for example, belong to the SVO for SV 104 or the HPLMN for the UE 102. The P-CSCF 1310, I-CSCF 1320 and S-CSCF 1330 may be part of the IMS 230 for the SV 104 and may perform the same or similar functions to a P-CSCF, I-CSCF 1320 and S-CSCF described earlier in association with FIG. 4 for IMS 430. The (O&M) server 1340 may be the same as O&M server 1210 in FIG. 12. Stages 4 to 24 of signal flow 1300 could be used at stage 9 of signal flow 700 in FIG. 7 and stage 9 of signal flow 900 in FIG. 9 to perform authentication and ciphering key determination for IMS Registration and help enable secure transfer of MO data and MT data (e.g. SIP media data) between the UE 102 and at least one remote endpoint 116.

As for FIG. 12, it is assumed that a user of the UE 102 may contact the HPLMN operator for UE 102 and possibly the SVO for SVs 104 and indicates that UE 102 will need to receive store and forward mode service from SVs 104 belonging to the SVO. As a consequence of this, the HPLMN operator and/or the SVO arrange for the O&M server 1340 at stage 1 in FIG. 13 to configure SVs 104, for example the UDM 222 in each SV 104, with subscription, identity and security information for the UE 102. Identity information relevant to IMS may include an IMS private identity (IMPI) and one or more IMS public identities (IMPUs) of the UE 102. The security information can include a substitute primary key K* and a key identity Kid that would have been determined by the HPLMN operator of the UE 102 as described previously for the SVO subscription with increased security technique.

At stage 2, UE 102 discovers and accesses an SV 104 in S&F mode. At stage 3, the UE 102 registers with the SV 104 at a NAS level and establishes one or more PDU sessions. Stages 2 and 3 may occur as described for corresponding stages in FIG. 7. In addition, registration at the NAS level at stage 3 may use the SVO subscription with increased security technique for authentication of the UE 102, e.g. as described for FIG. 12.

At stage 4, the UE 102 starts an IMS Registration with the SV 104 by sending a SIP Register message through the NG-RAN 205 and the UPF 218 in the SV 104 to the P-CSCF 1310 in the SV 104. The SIP Register message includes the IMPI of the UE 102 and an IMPU to be registered.

At stage 5, the P-CSCF 1310 forwards to SIP Register message with the IMPI and IMPU to the I-CSCF 1320.

At stage 6, the I-CSCF 1320 sends a query to the UDM 222 to discover the identity of the S-CSCF 1330, which is then returned by the UDM 222.

At stage 7, the I-CSCF 1320 forwards the SIP Register message with the IMPI and IMPU to the S-CSCF 1330 indicated at stage 6.

At stage 8, the S-CSCF 1330 send a Cx put message to the UDM 222 with the IMPI and IMPU, indicating a registration attempt for the IMPU.

At stage 9, the S-CSCF 1330 sends a request for an authentication vector (AV) to the UDM 222 and includes the IMPI.

At stage 10, UDM 222 calculates one or more AVs for the UE 102 using the substitute primary key K* configured at stage 1.

At stage 11, the UDM 222 returns a response to the S-CSCF 1330 and includes the IMPI, the one more AVs calculated at stage 10 and the key identity Kid configured at stage 1.

At stage 12, the S-CSCF 1330 sends a SIP 401 authentication challenge so the P-CSCF 1310 via the I-CSCF 1320 and includes in the SIP 401 message the IMPI, challenge data for the UE 102, IMS security keys and the key identity Kid.

At stage 13, the P-CSCF 1310 stores the IMS security keys received from the S-CSCF 1330.

At stage 14 the P-CSCF 1310 sends a SIP 401 authentication challenge message to the UE 102 and includes the IMPI, the challenge data and the key identity Kid.

Based on the inclusion of the key identity Kid at stage 14, at stage 15, the UE 102 determines the substitute primary key K* from the primary key K stored (i.e. configured) in the USIM of the UE 102 and the key identity Kid received at stage 14, as described earlier—e.g. using equation (1).

At stage 16, UE 102 determines a response (referred to as a challenge response) to the challenge data received at stage 14 using the substitute primary key K*. The UE 102 also uses the substitute primary key K* to determine IMS security keys to be used later for signaling at an IMS level with SV 104.

At stage 17, the UE 102 sends a second SIP Register message to the P-CSCF 1310, which forwards the message to the I-CSCF 1320. The second SIP Register message includes the IMPI and the challenge response determined at stage 16.

At stage 18, the I-CSCF 1320 queries for and receives the S-CSCF 1330 identity from the UDM 222.

At stage 19, the I-CSCF 1320 forwards the second SIP Register message with the IMPI and the challenge response to the S-CSCF 1330.

At stage 20, the S-CSCF 1330 verifies the challenge response received at stage 19.

Assuming that verification is successful at stage 20, at stage 21, the S-CSCF 1330 stores information indicating that the IMPU of UE 102 has been registered.

At stage 22, the S-CSCF 1330 sends a Cx put message to the UDM 222 indicating the IMPU of UE 102 is now registered.

At stage 23, the UDM 222 stores information that the IMPU is registered.

At stage 24, the S-CSCF 1330 returns a SIP 200 authentication OK message to the UE 102 via the I-CSCF 1320 and the P-CSCF 1310. The IMS Registration of the UE 102 with the SV 104 is then complete.

Except for some small differences added by the SVO subscription with increased security technique, stages 4 to 24 of signal flow 1300 as shown in FIG. 13 and described above can be similar or identical to stages performed by a UE and HPLMN when the UE performs an IMS Registration with the HPLMN using existing procedures—e.g. for SV 104 access by UE 102 in real time mode or for terrestrial access by UE 102 to the HPLMN. The differences to normal IMS registration in signal flow 1300 may comprise: (i) the addition and inclusion of the key identity Kid at stages 11, 12 and 14; (ii) the determination of the substitute primary key K* from the primary key K and the key Identity Kid by UE 102 at stage 15; (iii) the usage of K* and not K by UE 102 at stage 16 to calculate the challenge response; and (iv) use of the substitute primary key K* to determine IMS security keys by the UE 102 at stage 16.

Following authentication of the UE 102 for IMS registration as described for FIG. 13 and to support later authentication of the UE proxy 340 for IMS registration, e.g. as part of stage 6 in FIG. 8, the SFC 202 or UE proxy 340 could be configured with the substitute primary key K* (e.g. by an O&M server such as O&M server 1340 in FIG. 13) and be authenticated for IMS registration by an HPLMN of UE 102 which also uses the substitute primary key K* for UE 102 authentication when a VPLMN for the UE 102 corresponds to the ground based PLMN 108. Alternatively, the SFC 202 or UE proxy 340 could be configured with both the substitute primary key K* and the key ID Kid (e.g. by an O&M server such as O&M server 1340 in FIG. 13), with authentication of the UE proxy 340 by the HPLMN for UE 102 for IMS registration including changes to normal operation whereby: (i) the UE proxy 340 includes the key ID Kid in an initial SIP Register message sent to the HPLMN of UE 102 via the ground based PLMN 108; and (ii) based on the inclusion of the key ID Kid in the initial SIP Register message, the HPLMN of the UE 102 determines the substitute primary key K* from the key ID Kid and known primary key K of the UE 102 (e.g. using equation (1)) and uses K* instead of K to authenticate the UE proxy 340 for the IMS registration.

Figure 14A:
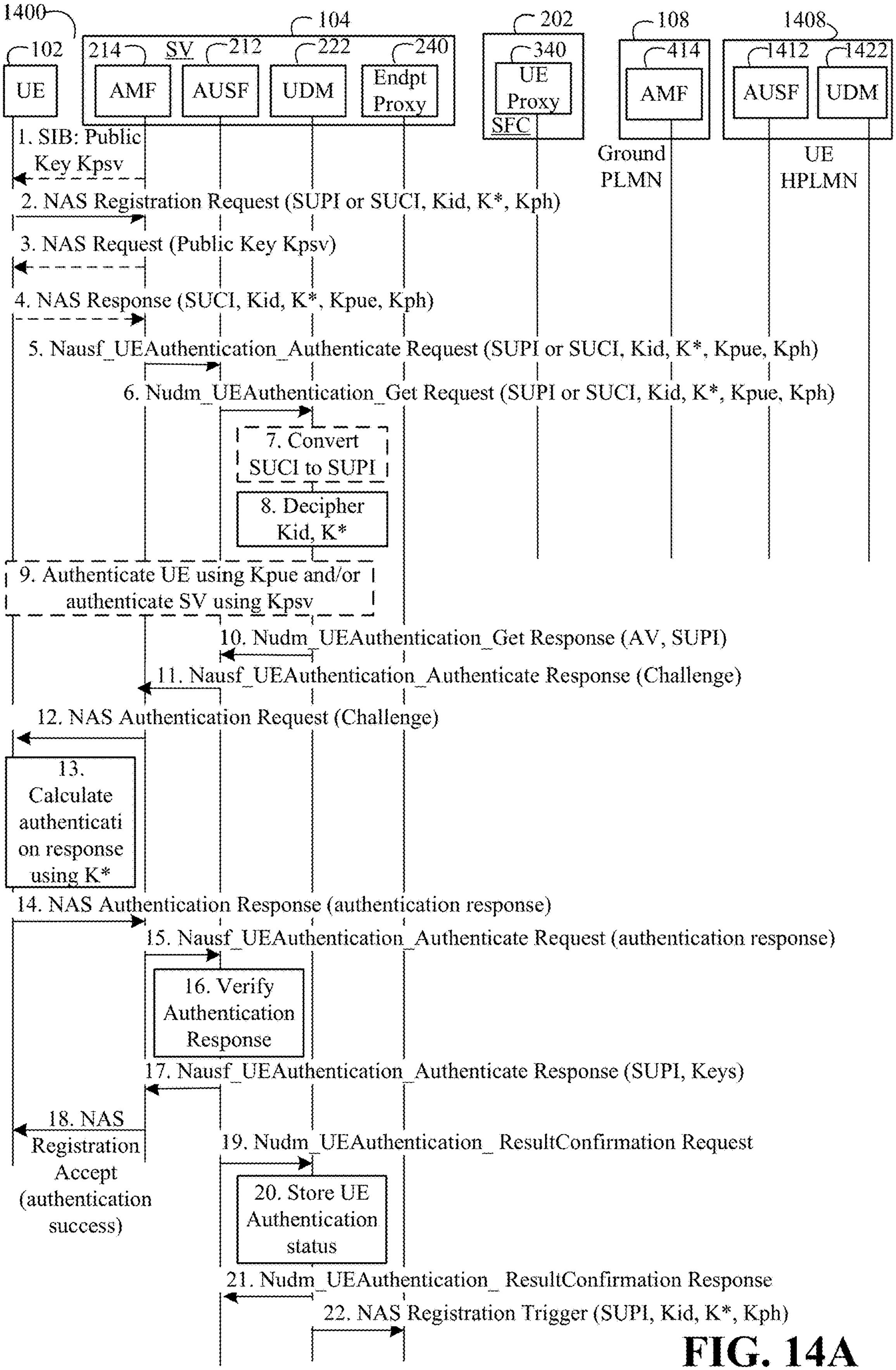
FIGS. 14A and 14B illustrate more flexible secure access to a satellite by a mobile device with store and forward operation.
Figure 14B:
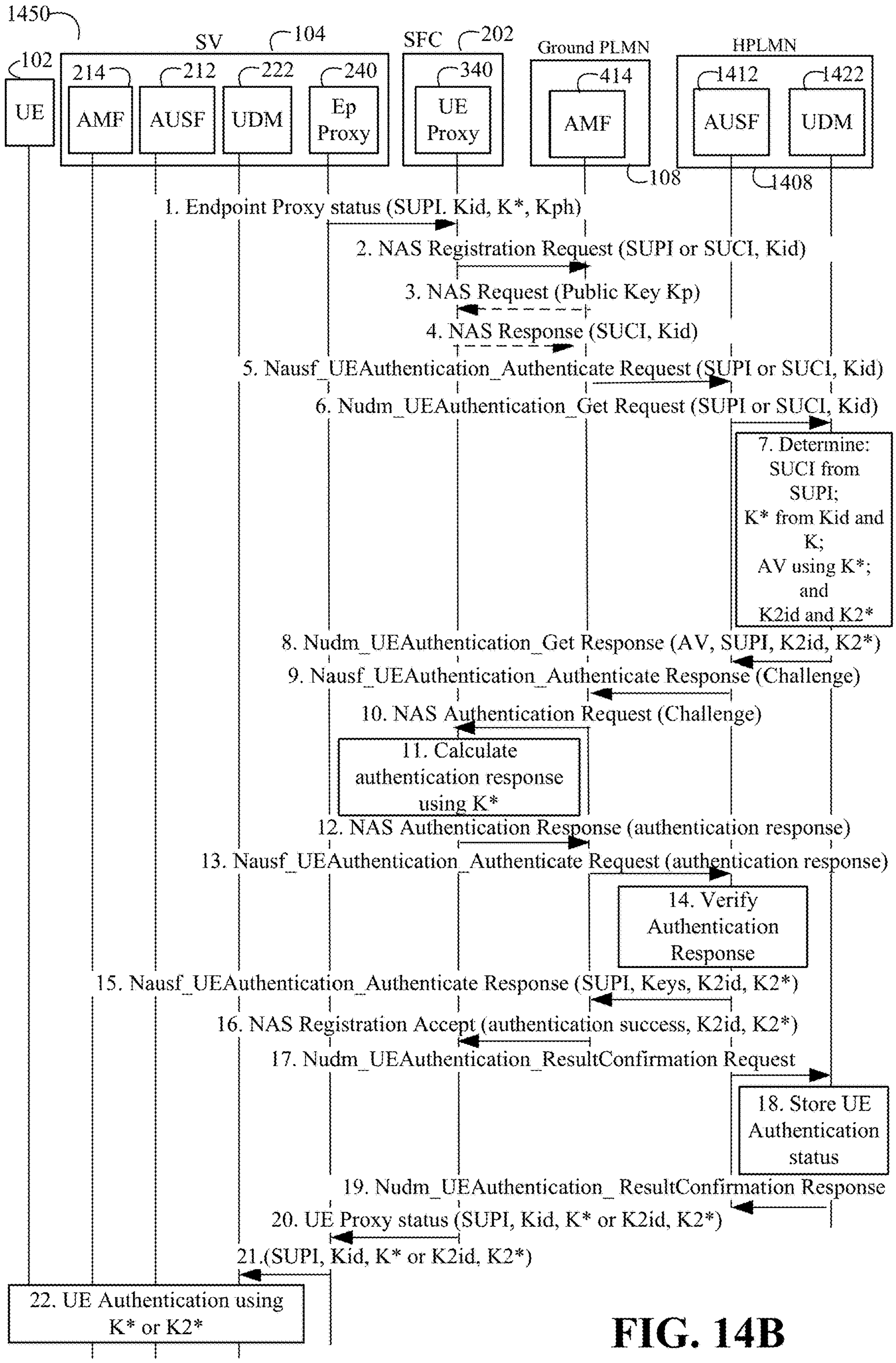

FIGS. 14A and 14B, illustrate and provide further example aspects for the SVO non-subscription technique described previously. FIG. 14A shows an example signal flow 1400 that in more detail shows how a UE 102 can register with and be authenticated by an SV 104 for the SVO non-subscription technique. FIG. 14B continues FIG. 14A and shows in an example signal flow 1450 how, after the UE 102 has registered with and been authenticated by the SV 104 using signal flow 1400, the UE proxy 340 in the SFC 202 can register with the HPLMN of the UE 102. The signal flows 1400 and 1450 are performed by: the UE 102; the SV 104 containing a 5GC 210 containing an AMF 214, AUSF 212 and UDM 222 and an endpoint proxy 240; an SFC 202 containing a UE proxy 340; a ground based PLMN 108 containing an AMF 414; and an HPLMN 1408 for the UE 102 containing an AUSF 1412 and a UDM 1422. The AUSF 1412 and UDM 1422 may perform functions similar to or the same as those described for the AUSF 412 and UDM 422 described earlier for FIG. 4.

Stages 2 to 21 of signal flow 1400 could be used at stages 3 to 5 of signal flow 700 in FIG. 7 and stages 3 to 5 of signal flow 900 in FIG. 9 to perform authentication and ciphering key determination for NAS Registration and help enable secure transfer of MO data and MT data between the UE 102 and at least one remote endpoint 116. Stages 2 to 19 of signal flow 1450 could be used at stages 2 to 4 of signal flow 800 in FIG. 8 to perform authentication and ciphering key determination for NAS Registration of the UE proxy 340 and help enable secure transfer of MO data and MT data between the UE 102 and at least one remote endpoint 116.

Starting off with FIG. 14A, the UE 102 is assumed to have already discovered an SV 104 that provides access in store and forward mode and has determined to access the SV 104. At stage 1 in FIG. 14A, the SV 104, for example the NG-RAN 205 (not shown in FIG. 14A), may broadcast in a system information block a public cipher key Kpsv. Stage 1 is optional, and in some aspects, may not occur.

At stage 2, UE 102 registers in the SV 104 by sending a NAS Registration Request to the SV 104 and specifically to the AMF 214. The NAS Registration Request includes a SUPI or SUCI for the UE 102, a substitute primary key K* and associated key ID Kid. The values of K* and Kid may be determined by UE 102 using the technique described previously for the SVO subscription model with increased security, for example using equation 1 to determine K*. The determination by UE 102 of K* and Kid may be based on UE 102 awareness that it has no subscription to the SVO for SV 104. The UE 102 may use the public key Kpsv to cipher the values of K* and Kid sent at stage 2 and to create the SUCI from the SUPI. The UE 102 may also include a public key Kph belonging to the HPLMN of the UE 102 (e.g. and configured on the USIM of the UE 102).

At stage 3, which is an optional stage, the AMF 214 in the SV 104 may send a NAS request message to the UE 102 and include a request for more information from the UE 102 and may further include the public cipher key Kpsv for the SV 104. If the key Kpsv is included at stage 3 then stage 1 need not occur and vice versa.

At stage 4, and in response to the request at stage 3 if stage 3 occurs, the UE 102 returns a NAS response to the AMF 214 in the SV 104 and includes the SUCI if requested at stage 3 and not sent at stage 2 and further includes the substitute primary key K* and associated key ID Kid if not included at stage 2. UE 102 may also include at stage 4 a public cipher key Kpue for the UE 102 if requested at stage 3 and/or the Kph. For example, the public cipher key Kpue may have been obtained by the UE 102 for support of V2X.

At stage 5, the AMF 214 sends a UE authentication authenticate request service operation to the AUSF 212 and includes in this operation the SUPI or SUCI received at stage 2 or stage 4 and the substitute primary key K* and associated key ID Kid if received at stage 2 or stage 4 and the public key Kpue and/or Kph if received at stage 2 or stage 4.

At stage 6, the AUSF 212 sends a UE authentication get request service operation to the UDM 222 and includes the SUPI or SUCI, the K* and Kid values and the Kpue and/or Kph cipher keys if any of these were received at stage 5.

At stage 7, the UDM 222 converts the SUCI if received at stage 6 into the SUPI for UE 102 using a private key corresponding to the public cipher key Kpsv in the case that the SUCI was ciphered using the Kpsv key.

At stage 8, if the UE 102 sent the substitute primary key K* and associated key ID Kid at stage 2 or stage 4 and ciphered these using the public cipher key Kpsv, the UDM 222 deciphers the values of K* and Kid, using the private key corresponding to the public cipher key Kpsv, to obtain the unciphered values of K* and Kid.

At stage 9, messages may be exchanged between the UE 102, the AUSF 212 and UDM 222 (e.g. via the AMF 214) to authenticate the UE 102 using the public cipher key Kpue if this was sent by the UE 102 at stage 4 or was sent as part of stage 9. Also, as part of stage 9, the UE 102 may authenticate the SV 104 using the public key Kpsv received at stage1, stage 4 or as part of stage 9. The public keys Kpue and Kpsv may be provided along with certificates which demonstrate that these public keys belong to the UE 102 (e.g. identified by the SUPI) and SV 104 (e.g. identified by a mobile country code (MCC) and mobile network code (MNC)), respectively. In some aspects, the UDM 222 or AUSF 212 may provide the SV public key Kpsv to the UE 102 and/or receive the public key Kpue of the UE 102 from the UE 102 as part of stage 9 and not as part of stage stages 1, 2 and 4. Similarly, the UE 102 might provide the substitute primary key K* and associated key ID Kid to the AUSF 212 and UDM 222 at stage 9 rather than at stage 2 or stage 4.

At stage 10, the UDM 222 may send a UE authentication get response service operation to the AUSF 212 and may include an authentication vector (AV) and the SUPI of the UE 102 if determined at stage 7. The AV is calculated by the UDM 222 based on the substitute primary key K* received at stage 7 and deciphered at stage 8.

At stage 11, the AUSF 212 sends a UE authentication authenticate response service operation to the AMF 214 and includes data for an authentication challenge determined by the AUSF 212 from the AV received at stage 10.

At stage 12, the AMF 214 sends a NAS authentication request to the UE 102 and includes the authentication challenge data received at stage 11.

At stage 13, the UE 102 calculates authentication response data to the authentication challenge data received at stage 12 using the substitute primary key K* previously sent to the AMF 214.

At stage 14, the UE 102 returns a NAS authentication response message to the AMF 214 and includes the authentication response data calculated at stage 13.

At stage 15 the AMF 214 sends a UE authentication authenticate request service operation to the AUSF 212 and includes the authentication response data from stage 13.

At stage 16 the AUSF 212 verifies the authentication response data based on the AV received from the UDM 222 at stage 10.

In some aspects, part or all of stages 11 to 16 may not be performed. This is because the authentication vector, authentication challenge data and authentication response data for stages 11-16 are calculated by the UDM 222, AUSF 212 and UE 102, respectively, based on the substitute primary key K* which is explicitly transferred from the UE 102 to the UDM 222 in previous stages. This means the authentication will succeed and therefore provides no new information. However, stages 11 to 16 may also be used to reduce implementation changes to the UE 102, AMF 214 and/or AUSF 212 by retaining a procedure that is already supported and expected to be used.

At stage 17, the AUSF 212 sends a UE authentication authenticate response reply to the AMF 214 that includes the SUPI if received at stage 10 and cipher keys determined by the AUSF 212 from the AV received at stage 10.

At stage 18, the AMF 214 sends a NAS registration accept message to the UE 102 and indicates successful authentication, which completes the registration of the UE 102 in the SV 104.

At stage 19, the AUSF 212 sends a UE authentication result confirmation request to the UDM 222 indicating successful authentication of the UE 102.

At stage 20, the UDM 222 stores an indication of successful UE 102 authentication.

At stage 21, the UDM 222 sends a UE authentication result confirmation response to the AUSF 212.

At stage 22, the UDM 222 sends a NAS registration trigger indication to the endpoint proxy 240 indicating that the UE 102 has successfully registered with the SV 104. The endpoint proxy 240 may also be created as part of this stage if not already created. The UDM 222 includes in the NAS registration trigger indication the SUPI of the UE 102, the substitute primary key K* and associated key ID Kid received previously from the UE 102 and the Kph if received. which are then stored by the endpoint proxy 240.

Following stage 22, the UE 102 nay send mobile originated data, for example SMS messages, MO data, IMS media data, Internet queries and/or Email queries, to the SV 104 and specifically to the endpoint proxy 240, which may be stored by the endpoint proxy 240, e.g. as described in FIG. 7. Because the SV 104 does not yet know whether the UE 102 provided a legitimate identity (SUPI) and security information (K* and Kid) at stages 2-9, an SV 104 may limit the services provided to the UE 102 and therefore limit the types and amount of MO data that the UE 102 is permitted to send. For example, in some cases, the SV 104 may not permit the UE 102 to send any MO data until after the completion of signal flow 1450 in FIG. 14B.

FIG. 14B continues the procedure started in FIG. 14A. Specifically, it is assumed that stages 1 to 22 in FIG. 14A have already occurred when signal flow 1450 is started.

At stage 1 in FIG. 14B, the SV 104 obtains feeder link access to an SFC 202 and a UE proxy 340 is created in the SFC 202, e.g. as described in FIG. 8. As part of stage 1 in FIG. 14B, the endpoint proxy 240 sends endpoint proxy status information to the UE proxy 340 and includes the SUPI of the UE 102, the substitute primary key K* and associated key identity Kid and any Kph obtained by the endpoint proxy 240 as described for FIG. 14A.

At stage 2, the UE proxy 340 registers the UE 102 in the ground based PLMN 108 by sending a NAS registration request message to the AMF 414 in the ground based PLMN 108 and includes the SUPI for the UE 102, or a SUCI containing a ciphered value of the SUPI, and the key identity Kid. The SUCI may be the SUPI ciphered using the public key Kph if received at stage 1.

At stage 3, which is optional, the AMF 414 may send a NAS request to the UE proxy 340 and may include a public cipher key Kp for the ground based PLMN 108. If stage 3 occurs, then in response at stage 4, the UE proxy 340 sends a NAS response containing the SUCI if no SUPI or SUCI was sent at stage 2 and/or the key identity Kid if not included at stage 2. The SUCI and Kid may then be ciphered using the public cipher key Kp. In that case, the AMF 214 deciphers the SUCI and/or Kid.

At stage 5, the AMF 414 sends a UE authentication authenticate request service operation to the AUSF 1412 in the HPLMN for the UE 102. The AMF 214 includes the SUPI or SUCI received from the UE proxy 340 and the key identity Kid. The AMF 414 may determine the HPLMN for the UE 102 from the SUPI if received at stage 2 or from an MCC-MNC for the HPLMN included by the UE 102 at stage 2 or stage 4. In some aspects, the HPLMN 1408 for the UE 102 may be the same as the ground based PLMN 108, which may not affect the signaling described here.

At stage 6, the AUSF 1412 sends a UE authentication get request service operation to the UDM 1422 in the HPLMN 1408 for the UE 102 and includes the SUPI or SUCI and key identity Kid received at stage 6.

At stage 7, the UDM 1422 determines the SUPI for the UE 102 from the SUCI, if received at stage 6, using a private key for the HPLMN 1408 corresponding to the public key Kph for the HPLMN 1408, and assuming the UE proxy 340 ciphered the SUPI into the SUCI using the public key Kph for the HPLMN 1408. Also, as part of stage 7 and based on the receipt of the key identity Kid at stage 6, the UDM 222 determines the substitute primary key K* from the key identity Kid and the primary key K for the UE 102 known to (i.e. configured in) the UDM 1422 (e.g. using equation 1). The UDM 1422 also determines an authentication vector (AV) for the UE 102 using the substitute primary key K* and optionally determines a new key identity K2*id* and a new substitute primary key K2* based on the new key ID K2*id* and using the technique for the SVO subscription model with increased security, for example equation 1.

At stage 8, the UDM 1422 sends a UE authentication get response service operation to the AUSF 1412 and includes the SUPI if determined at stage 7, the AV, and the new substitute primary key K2* and associated key ID K2*id* if determined at stage 7.

At stage 9, the AUSF 1412 sends a UE authentication authenticate response to the AMF 414 in the ground based PLMN 108 and includes authentication challenge data determined by the AUSF 1412 based on the AV received at stage 8.

At stage 10, the AMF 414 sends a NAS authentication request to the UE proxy 340 and includes the authentication challenge data received at stage 9.

At stage 11, the UE proxy 340 calculates authentication response data to the authentication challenge data using the substitute primary key K*.

At stage 12, the UE proxy 340 sends a NAS authentication response message to the AMF 414 and includes the authentication response data determined at stage 11.

At stage 13, the AMF 414 sends a UE authentication authenticate request service operation to the AUSF 1412 and includes the authentication response data received at stage 12.

At stage 14, The AUSF 1412 verifies the authentication response data using the AV received from the UDM 1422.

At stage 15, the AUSF 1412 sends a UE authentication authenticate response to the AMF 414 and includes the SUPI if received at stage 8, cipher keys. and, if received from the UDM 1422 at stage 8, the new substitute primary key K2* and associated new key ID K2*id.*

At stage 16, the AMF 414 stores the cipher keys from stage 15 and sends a NAS registration accept to the UE proxy 340 and includes an indication of authentication success and, if received at stage 15, the new substitute primary key K2* and associated new key ID K2*id*. This stage completes the registration of the UE 102 by the UE proxy 340 in the ground based PLMN 108.

At stage 17, the AUSF 1412 sends a UE authentication result confirmation request to the UDM 1422 indicating successful authentication of the UE proxy 340.

At stage 18, the UDM 1422 stores an indication that the UE proxy 340 was successfully authenticated. Note that the UDM 1422 may not be aware that it was the UE proxy 340 that was authenticated and may instead treat this as being authentication of the UE 102.

At stage 19, the UDM 1422 sends a UE authentication result confirmation response to the AUSF 1412.

At stage 20 which may occur at some later time after an SV 104 becomes accessible via feeder link to the SFC 202 and when the SV 104 is expected to later provide coverage to the UE 102, the UE proxy 340 sends UE proxy status data to an endpoint proxy 240 in the SV 104 and includes the SUPI for UE 102 and either the substitute primary key K* and associated key ID Kid received at stage 1 or, if received stage 16, includes the new substitute primary key K2* and associated new key ID K2*id*. The endpoint proxy 240 may then send the SUPI and either the K* and Kid or the K2* and K2*id* to the UDM 222 at stage 21. In some aspects, stages 20 and 21 may be combined with the UE proxy 340 sending the SUPI and either the K* and Kid or the K2* and K2*id* to the UDM 222 (or to the SV 104 which transfers this to the UDM 222).

At some later time, UE 102 may start to access the SV 104 (which may be different than the SV 104 for signal flow 1400) in store and forward mode, for example as described for FIG. 7 and FIG. 9. In that case, the UE 102 may perform a NAS registration with the SV 104 and the SV 104 may authenticate the UE 102 using the substitute primary key K* or the new substitute primary key K2*. The NAS registration and authentication may proceed as described for the SVO subscription model with increased security in stages 3 to 20 of FIG. 12. In particular, the SV 104 may now provide the UE 102 with the key ID Kid or the new key ID K2*id* (at stages 8-10 in FIG. 12) and the UE 102 may use the key ID Kid or the new key ID K2*id* to determine the substitute primary key K* or the new substitute primary key K2*, respectively, from the primary key K configured in the UE 102, at stage 11 in FIG. 12. The substitute primary key K* or the new substitute primary key K2* is then used by UE 102 to determine the authentication response data at stage 12 of FIG. 12. For any later authentication of the UE 102 by an SV 104, the UE 102 and the SV 104 (e.g. the UDM 222) can both use the substitute primary key K* or the new substitute primary key K2* without needing to indicate this using the key ID Kid or the new key ID K2*id*, respectively.

Other SVs 104 may also be configured with either the K* and Kid values or the K2* and K2*id* values by the UE proxy 340 and authentication of the UE 102 by these other SVs 104 may be as described for stage 22. At this point, the SVO subscription model with increased security can be used by the SVs 104 and UE 102 to support UE 102 access to the SVs 104.

It is noted that stages 2 to 21 of signal flow 1400 described for FIG. 14A and stages 2 to 19 of signal flow 1450 described for FIG. 14B can each be similar to stages performed by a UE and HPLMN (in the case of FIG. 14A) or by a UE, visited PLMN (VPLMN) and HPLMN (in the case of FIG. 14B) when a UE registers in and is authenticated by an HPLMN (FIG. 14A) or VPLMN (FIG. 14B) for normal terrestrial network access. The differences to normal NAS registration and authentication in signal flow 1400 may comprise: (i) a determination by the UE 102 of the key identity Kid and substitute primary key K* for stage 2; (ii) sending of the key identity Kid and substitute primary key K* by the UE 102 to the UDM 222 at stages 2 or 4 and stages 5-6 along with optionally the cipher keys Kpue and/or Kph; (iii) an optional extra authentication stage based on public keys Kpue and/or Kpsv at stage 9; and (iv) usage of K* and not the primary UE 102 key K by the UDM 222 at stage 10 and by the UE 102 at stage 13 to calculate or enable calculation of the authentication challenge and response data, respectively.

The differences to normal NAS registration and authentication in signal flow 1450 may comprise: (i) provision to the UE proxy 340 by the endpoint proxy 240 of the key identity Kid and substitute primary key K* at stage 1; (ii) sending of the key identity Kid by the UE proxy 340 to the UDM 1422 in the HPLMN 1408 at stages 2 or 4 and stages 5-6; (iii) determination of the substitute primary key K* by the UDM 1422 at stage 7; (iv) usage of K* and not the primary UE 102 key K by UDM 222 at stage 7 and the UE proxy 340 at stage 11 to calculate or enable calculation of the authentication challenge and response data, respectively; and (v) optional determination of a new key identity K2*id* and new substitute primary key K2* by the UDM 1422 at stage 7 and provision of this by the UDM 1422 to the UE proxy 340 at stages 8, 15, and 16.

The SVO non-subscription technique described previously may also be used for IMS registration—e.g. at stage 9 in FIG. 7, stage 6 in FIG. 8 and stage 9 in FIG. 9. The usage can be similar to that described for UE authentication for NAS Registration for FIGS. 14A and 14B, but with messages used for UE authentication for IMS Registration (e.g. as shown in FIG. 13) replacing messages used for UE authentication for NAS Registration (e.g. as shown in FIGS. 14A and 14B) and with some change to involved network entities.

It is noted that FIGS. 7 to 14B assume that an SV 104 provides 5G NR access to a UE 102 for S&F mode, that ground based PLMN 108 provides 5G NR access to the UE proxy 340 in the SFC 202 for the options (a) and (b) for interconnection of the SFC 202 and that an HPLMN for UE 102 supports 5G access. However, as noted previously, either or both of SV 104 and ground based PLMN 108 (as well as the UE 102 HPLMN) could support a different type of wireless access such as 4G LTE or a future 6G standard. In such cases, 5G entities that perform FIGS. 7 to 14B (e.g. an NG-RAN, 5GC, AMF, UPF, UDM, AUSF) may be replaced by corresponding entities for the different type of wireless access. For example, when the different type of wireless access is 4G LTE, the NG-RAN, 5GC, AMF, UPF and UDM plus AUSF may be replaced, respectively, by an E-UTRAN, EPC, MME, SGW plus PGW and HSS. Similarly, stages in FIGS. 7 to 14B in which a message (or messages) for 5G NR is (are) transferred between a pair of elements supporting 5G NR may be replaced by equivalent stages in which the message (or messages) for 5G NR are replaced by a corresponding message (or corresponding messages) for 4G LTE that is (are) transferred between a pair of corresponding elements supporting 4G LTE.

As an example, at stages 3 and 5 in FIG. 7 where the UE 102 sends a NAS Registration Request to the 5GC 210 (e.g. AMF 214) at stage 3 and receives a NAS Registration Accept from the 5GC 210 (e.g. AMF 214) at stage 5 in order to register the UE 102 with the 5GC 210, the UE 102 may instead, in the case of 4G LTE access to the SV 104, send a NAS Attach Request to an EPC (e.g. MME) at stage 3 and receive a NAS Attach Accept from the EPC (e.g. MME) at stage 5 in order to register (or attach) the UE 102 with the EPC. The same changes can also occur for stages 3 and 5 in FIG. 9, for stages 3 and 17 in FIG. 12, for stages 2 and 18 in FIG. 14A, and for stages 2 and 4 in FIG. 8 and stages 2 and 16 in FIG. 14B when the ground based PLMN 108 supports 4G LTE access by the UE proxy 340 and not 5G NR access. As another example, at stage 25 in FIG. 7 and stage 26 in FIG. 9 where the UE 102 performs a NAS De-registration with the SV 104, the UE 102 may instead perform a NAS Detach with the SV 104 when the SV 204 supports 4G LTE access by the UE 102. As another example, the PDU session establishment(s) at stage 8 in FIG. 7, stage 5 in FIG. 8, stage 8 in FIG. 9 and stage 3 in FIG. 13 may be replaced by establishment of Packet Data Network (PDN) connection(s) when 4G LTE access is provided. However, it is pointed out that SIP signaling actions involving IMS entities (e.g. a P-CSCF, I-CSCF or S-CSCF in IMS 230 or IMS 430 or an HPLMN for UE 102) can be the same for both 5G NR and 4G LTE access and possibly for a future 6G access.

Some additional enhancements are next briefly described that may be supported for UEs 102 accessing SVs 104 in S&F mode as described previously for FIGS. 1-14B. To support wireless emergency alerts (WEA) to UEs 102 in S&F mode, a ground PLMN 108 may receive emergency alerts from a ground source (e.g. a government or local government agency) and may send them to an SFC 202 together with a time or duration and a location area of applicability. The SFC 202 may then transfer emergency alerts to SVs 104 with feeder links to the SFC 202, such that an SV 104 receives emergency alerts for locations of applicability for the emergency alerts that will be in future coverage of the SV 104. The SV 104 can later broadcast the emergency alerts (e.g. in SIB messages) to UEs 102 at locations with coverage from the SV 104 and where emergency alerts are broadcast that are applicable to a current location area of coverage for the SV 104.

To support lawful interception (LI) of some UEs 102, an SFC 202 and/or a ground based PLMN 108 may be configured with the identities (e.g. SUPIs) of UEs 102 to which LI applies. When MO and/or MT data for a UE 102 with LI configured is transferred between an SV 104 and the SFC 202 and/or between the SFC 202 and the ground based PLMN 108, LI related information for the UE 102 and the MO and/or MT data may be provided by the SFC 202 or by the ground based PLMN 108 to an LI authority. LI related impacts may be small or zero if existing LI capabilities in the ground based PLMN 108 are reused.

To support provision of service, and only to UEs 102 that are in the same country as a ground based PLMN 108, an SV 104 may obtain location related information for a UE 102 that is accessing the SV 104 in S&F mode. The location related information may be based on a coverage area for an SV 104 serving radio cell for the UE 102 and/or may be based on location measurements (e.g. of angle of arrival, time of arrival or round trip signal propagation time) obtained by the SV 104 and possibly by the UE 102. The SV 104 may then determine a location and a country for the UE 102 based on the location related information and may withhold service to the UE 102 if (i) the UE 102 is not in the same country as a ground based PLMN 108 with which the SV 104 will later have a feeder link to support UE 102 at its current location, or (ii) if the UE has selected the ground PLMN 108 as a serving PLMN when first accessing the SV 104.

To support an emergency (e.g. E911) call from a UE 102 accessing an SV 104 in S&F mode, the SV 104 may allow the UE 102 to establish an emergency IMS call to the endpoint proxy 240 with the endpoint proxy 240 then providing a preconfigured voice announcement to the UE 102 or a user of UE 102 saying that the emergency call is being transferred in S&F mode. The user of UE 102 may then leave an emergency related voice message using SIP voice media which may be transferred with priority to the SFC 202 when the SV 104 later has a feeder link to the SFC 202. The UE proxy 340 in the SFC 202 may then establish an emergency call with priority to a PSAP remote endpoint 116 and may forward the emergency voice message from the UE 102 and other information for the UE 102 such as a time of the emergency call from the UE 102 and the last know location of the UE 102. The emergency call may be supported by the SV 104 and SFC 202 even when the UE 102 has no subscription to access the SV 104 for other services.

Figure 15:
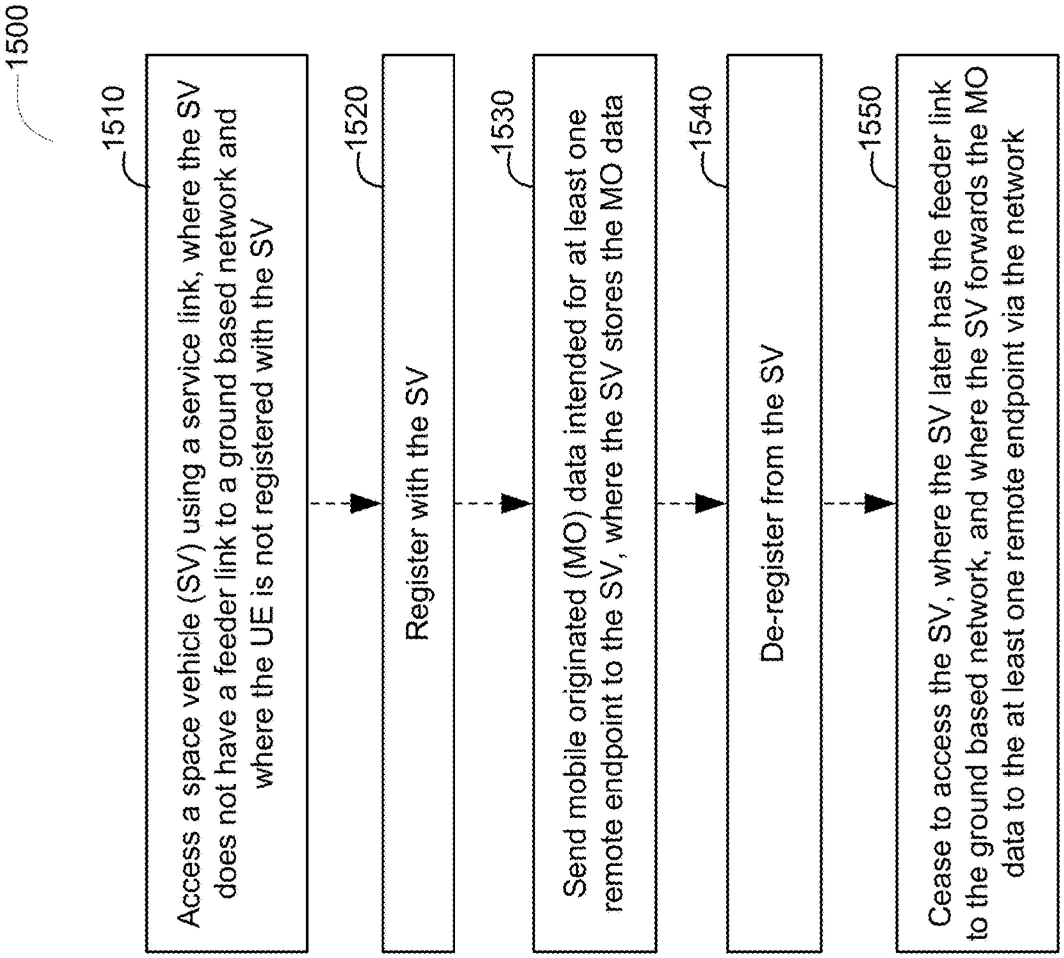
FIG. 15 is a flow diagram of a method of supporting wireless communication performed by a user equipment.

FIG. 15 is a flow diagram of an example method 1500 of supporting wireless communication performed by a user equipment (e.g. UE 102, apparatus 2204). Example components of a UE are provided hereafter with respect to FIG. 22. The method may improve coverage for the UE by enabling the UE to send and/or receive communication via an SV when the SV may have intermittent feeder link connection to a ground based network.

At block 1510, the UE accesses a space vehicle (e.g. an SV 104) using a service link, where the SV does not have a feeder link to a ground based network (e.g. PLMN 108) and where the UE is not registered with the SV. For example, the aspects described for stages 2 to 9 in FIG. 7 and stages 2 to 9 in FIG. 9 illustrate example aspects of a UE accessing an SV. As an example, the access may be performed, e.g., by the communication component 2298, the transceiver 2222 and/or the antennas 2280 of the apparatus 2204.

At block 1520, the UE registers with the SV. For example, stages 3 to 5 in FIG. 7 and stages 3 to 5 in FIG. 9 illustrate example aspects of a UE registering with an SV. As an example, the registration may be performed, e.g., by the communication component 2298, the transceiver 2222 and/or the antennas 2280 of the apparatus 2204.

At block 1530, the UE sends mobile originated (MO) data intended for at least one remote endpoint (e.g. a remote endpoint 116) to the SV, where the SV stores the MO data. FIG. 7 illustrates an example of a UE transmitting MO data to an SV at stages 11 to 23. As an example, the data may be sent or transmitted, e.g., by the communication component 2298, the transceiver 2222 and/or the antennas 2280 of the apparatus 2204.

At block 1540, the UE de-registers from the SV. FIG. 7 illustrates an example of de-registration at stage 25, and FIG. 9 illustrates an example of de-registration at stage 26. As an example, the de-registration may be performed, e.g., by the communication component 2298, the transceiver 2222 and/or the antennas 2280 of the apparatus 2204.

At block 1550, the UE ceases to access the SV, where the SV later has the feeder link to the ground based network, and where the SV forwards the MO data to the at least one remote endpoint via the network. FIG. 7 illustrates an example of cessation at stage 28, and FIGS. 8 and 9 illustrate an example of cessation at stage 29. For example, the cessation may be performed by the communication component 2298 of the apparatus 2204.

In some aspects, the service link supports wireless access to the SV using 4G LTE, 5G NR or a future 6G standard, where the SV comprises a RAN and a CN. e.g. as described for FIG. 2. The service link may support 5G NR, in which case registering with the SV may comprise performing a NAS registration with the SV and de-registering from the SV may comprise performing a NAS de-registration with the SV. The service link may alternatively, or additionally, support 4G LTE, in which case registering with the SV may comprise performing a NAS attach with the SV and de-registering from the SV may comprise performing a NAS detach with the SV. In some aspects, the registration/de-registration and/or attach/detach may be performed by the communication component 2298 of the apparatus 2204.

In some aspects, the SV includes an endpoint proxy function for the at least one remote endpoint (e.g. endpoint proxy function (e.g., 240)), where the endpoint proxy function may mimic a behavior of the at least one remote endpoint from a perspective of the UE, and where the endpoint proxy function may receive and store the MO data, e.g. as described for FIG. 7. Mimicking the behavior of the at least one remote endpoint from the perspective of the UE may include returning by the remote endpoint proxy function at least one of: a pre-configured response to the UE at an application level; a response to the UE at a transport level; or both of these, e.g. as described for FIG. 7.

In some aspects, the MO data comprises at least one of: an MO short message service (SMS) message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7.

In some aspects, the SV forwards the MO data to the at least one remote endpoint via the network by forwarding the MO data to a ground based server (e.g. SFC 202), where the server forwards the MO data to the at least one remote endpoint via the network, e.g. as described for FIG. 8. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 3 to 5 and FIG. 8. The server may include a UE proxy function for the UE (e.g. UE proxy 340), where the UE proxy function mimics a behavior of the UE from a perspective of the at least one remote endpoint and a perspective of the network, where the UE proxy function receives the MO data from the SV, and where the UE proxy function forwards the MO data to the at least one remote endpoint, e.g. as described for FIG. 8. Mimicking the behavior of the UE from the perspective of the at least one remote endpoint may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network may comprise performing by the UE proxy function: a NAS registration of the UE with the network for option (a) or option (b) when the wireless access type is 5G NR; or a NAS attach of the UE with the network for option (a) or option (b) when the wireless access type is 4G LTE. Mimicking the behavior of the UE from the perspective of the network may further comprise keeping by the UE proxy function the UE in a permanent Connected state from the perspective of the network.

In some aspects, the SV may be a first SV, the feeder link for the first SV may be a first feeder link, and the service link to the first SV may be a first service link. The UE may access a second SV at a later time (e.g. another SV 104) using a second service link, where the second SV does not have a second feeder link to the ground based network, and where the UE is not registered with the second SV, e.g. as described for FIG. 9. The UE may then: register with the second SV; receive mobile terminated (MT) data from the second SV, where the MT data originated from the at least one remote endpoint, and where the MT data was stored by the second SV; de-register from the second SV; and cease to access the second SV, e.g. as described for FIG. 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 9. The second SV may receive the MT data from a ground based server (e.g. SFC 202), where the server receives the MT data from the at least one remote endpoint via the network, e.g. as described for FIG. 9. The UE may send second MO data intended for the at least one remote endpoint (e.g. a remote endpoint 116) to the second SV, where the second SV stores the second MO data, where the second SV later has a feeder link to the ground based network, and where the second SV forwards the second MO data to the at least one remote endpoint via the network, e.g. as described for FIG. 9.

In some aspects, the UE may receive an indication broadcast by the SV that the SV is operating in a store and forward mode. The UE may then access the SV using the service link at block 1510, based on the indication broadcast by the SV that the SV is operating in the store and forward mode. The UE may have a subscription to access the SV when the SV is operating in the store and forward mode, e.g. as described for FIG. 7.

The method may further include any of the aspects performed by a UE, as described in connection with any of FIGS. 1-14B.

Figure 16:
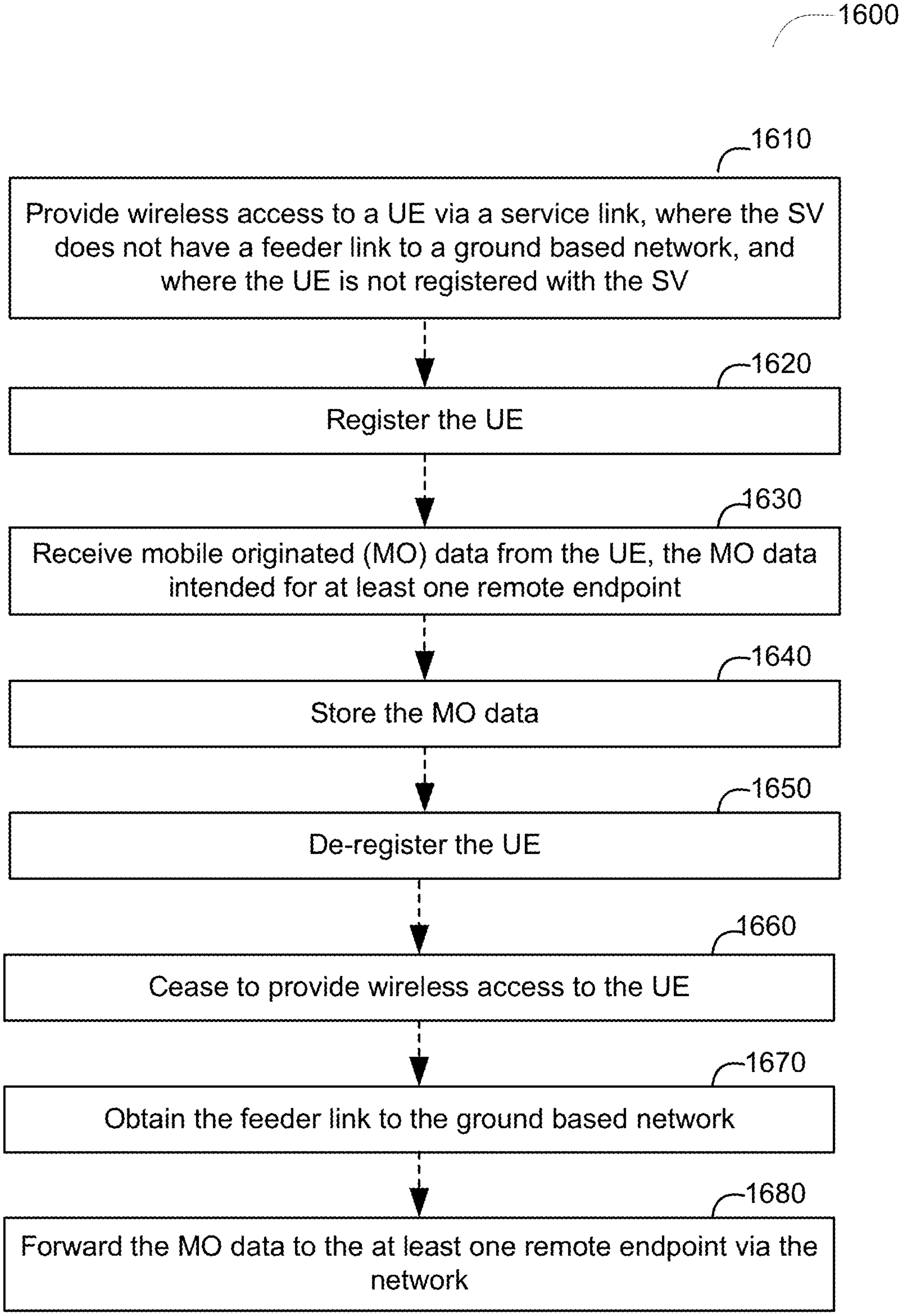
FIG. 16 is a flow diagram of a method of supporting wireless communication performed by a space vehicle.

FIG. 16 is a flow diagram of a method 1600 of supporting wireless communication performed by a space vehicle (e.g. an SV 104; network entity 2302). Example components of an SV are provided hereafter with respect to FIG. 23. The method may improve coverage provided to a UE by enabling the SV to receive and store communication when the SV does not have a feeder link connection to a ground based network in order to provide the communication to the ground based network at a later point at which the SV has a feeder link with the network.

At block 1610, the SV provides wireless access to a UE (e.g. a UE 102) via a service link, where the SV does not have a feeder link to a ground based network (e.g. a PLMN 108) and where the UE is not registered with the SV. FIGS. 7 and 9 illustrate examples of providing such access e.g. as described for stages 1 to 9 in FIG. 7 and stages 1 to 9 in FIG. 9. The provision of the access may be performed, e.g., by the store and forward component 2399, the communications interface 2348, the transceiver(s) 2346, and/or the antenna(s) 2380 of the network entity 2302 in FIG. 23.

At block 1620, the SV registers the UE. FIGS. 7 and 9 illustrate example aspects of registration, e.g. as described for stages 3 to 5 in FIG. 7 and stages 3 to 5 in FIG. 9. The registration may be performed, e.g., by the store and forward component 2399, the communications interface 2348, the transceiver(s) 2346, and/or the antenna(s) 2380 of the network entity 2302 in FIG. 23.

At block 1630, the SV receives mobile originated (MO) data from the UE, where the MO data is intended for at least one remote endpoint (e.g. a remote endpoint 116). FIG. 7 illustrates an example of reception of MO data from a UE, e.g. as described for stages 11 to 22 in FIG. 7. The reception may be performed, e.g., by the store and forward component 2399, the communications interface 2348, the transceiver(s) 2346, and/or the antenna(s) 2380 of the network entity 2302 in FIG. 23.

At block 1640, the SV stores the MO data. FIG. 7 illustrates an example of storage of MO data at the SV, e.g. as described for stages 13, 17 and 23 in FIG. 7. The storage may be performed, e.g., by the store and forward component 2399 of the network entity 2302 in FIG. 23.

At block 1650, the SV de-registers the UE. FIG. 7 and FIG. 9 illustrate example aspects of de-registration, e.g. as described for stage 25 in FIG. 7 and stage 26 in FIG. 9. The de-registration may be performed, e.g., by the store and forward component 2399, the communications interface 2348, the transceiver(s) 2346, and/or the antenna(s) 2380 of the network entity 2302 in FIG. 23.

At block 1660, the SV ceases to provide wireless access to the UE. FIG. 7 and FIG. 9 illustrate example aspects of an SV ceasing wireless access for a UE, e.g. as described for stage 28 in FIG. 7 and stage 29 in FIG. 9. The cessation of the access may be performed, e.g., by the store and forward component 2399 and/or the communications interface 2348 of the network entity 2302 in FIG. 23.

At block 1670, the SV obtains the feeder link to the ground based network. FIG. 8 illustrates example aspects of an SV obtaining a feeder link. The obtaining of the feeder link may be performed, e.g., by the store and forward component 2399, the communications interface 2348, the transceiver(s) 2346, and/or the antenna(s) 2380 of the network entity 2302 in FIG. 23.

At block 1680, the SV forwards the MO data to the at least one remote endpoint via the ground based network, e.g. as described in connection with the example in FIG. 8. The forwarding may be performed, e.g., by the store and forward component 2399, the communications interface 2348, the transceiver(s) 2346, and/or the antenna(s) 2380 of the network entity 2302 in FIG. 23.

In some aspects, the service link supports wireless access using 4G LTE, 5G NR or a future 6G standard, where the SV comprises a RAN and a CN, e.g. as described for FIGS. 2 and 7 to 9. When the service link supports 5G NR, registering the UE may comprise performing a NAS registration of the UE and de-registering the UE may comprise performing a NAS de-registration of the UE, e.g. as described for FIGS. 7 and 9. When the service link supports 4G LTE, registering the UE may comprise performing a NAS attach of the UE and de-registering the UE may comprise performing a NAS detach of the UE, e.g. as described above following the description of FIG. 14B.

In some aspects, the SV includes an endpoint proxy function (e.g. endpoint proxy 240) for the at least one remote endpoint, where the endpoint proxy function mimics a behavior of the at least one remote endpoint from a perspective of the UE, and where the endpoint proxy function receives and stores the MO data. Mimicking the behavior of the at least one remote endpoint from the perspective of the UE may include returning at least one of: a pre-configured response to the UE at an application level; a response to the UE at a transport level; or both of these, e.g. as described for FIG. 7.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7.

In some aspects, forwarding the MO data to the at least one remote endpoint via the ground based network may comprise forwarding the MO data to a ground based server (e.g. an SFC 202), where the server forwards the MO data to the at least one remote endpoint via the ground based network, e.g. as described for FIG. 8. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6. The server may include a UE proxy function for the UE (e.g. UE proxy 340), where the UE proxy function mimics a behavior of the UE from a perspective of the at least one remote endpoint and from a perspective of the network, and the SV may send the MO data to the UE proxy function, where the UE proxy function may forward the MO data to the at least one remote endpoint, e.g. as described for FIG. 8. Mimicking the behavior of the UE from the perspective of the at least one remote endpoint may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network may comprise performing by the UE proxy function: a NAS Registration of the UE with the network for option (a) or option (b) when the wireless access type is 5G NR, e.g. as described for FIG. 8; or a NAS Attach of the UE with the network for option (a) or option (b) when the wireless access type is 4G LTE, e.g. as described above following the description of FIG. 14B. Mimicking the behavior of the UE from the perspective of the network may further comprise keeping by the UE proxy function the UE in a permanent Connected state from the perspective of the network, e.g. as described for FIG. 8.

In some aspects, the SV may: receive mobile terminated (MT) data via the network, where the MT data originates from the at least one remote endpoint; store the MT data; and send the MT data to the UE using the service link at a later time, e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these. The SV may receive the MT data from a ground based server (e.g. an SFC 202), where the server receives the MT data from the at least one remote endpoint via the ground based network, e.g. as described for FIG. 8.

In some aspects, the SV broadcasts an indication to the UE that the SV is operating in a store and forward mode, where the accessing the SV using the service link by the UE is then based on the indication broadcast by the SV that the SV is operating in the store and forward mode, e.g. as described for FIG. 7. The SV may have subscription information for the UE, where the subscription information for the UE permits the UE to access the SV when the SV is operating in the store and forward mode, e.g. as described for FIG. 7.

Figure 17:
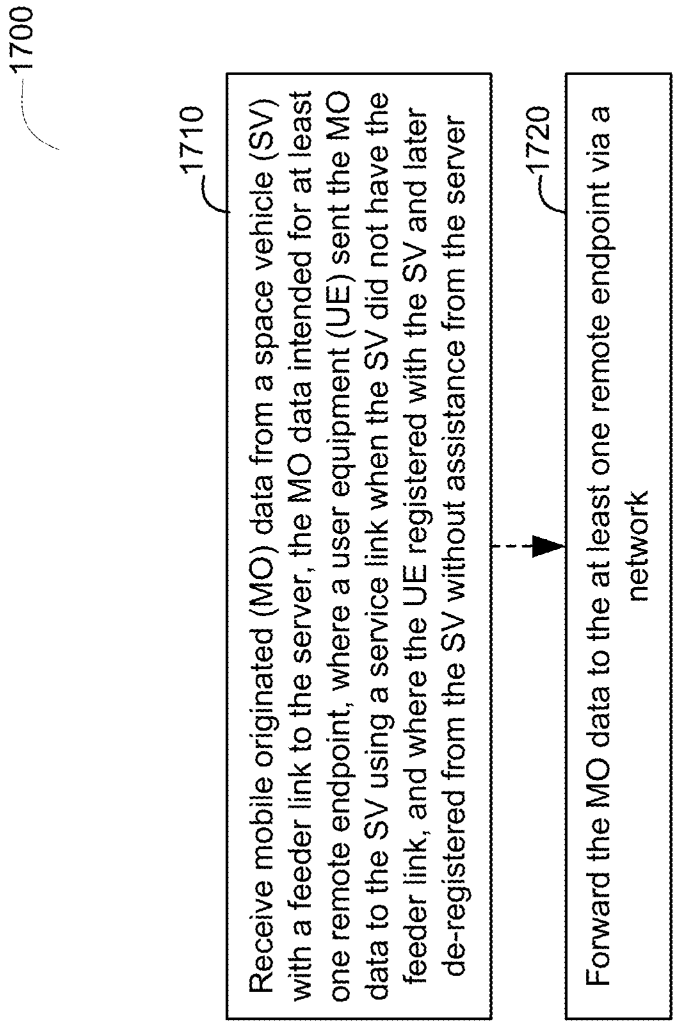
FIG. 17 is a flow diagram of a method of supporting wireless communication performed by a server.

FIG. 17 is a flow diagram of a method 1700 of supporting wireless communication performed by a server (e.g. an SFC 202; the network entity 2402). Example components of a server are provided hereafter with respect to FIG. 24. The method may improve communication with a UE via an SV that has an intermittent feeder link connection to a ground based network.

At block 1710, the server receives mobile originated (MO) data from a space vehicle (e.g. SV 104) with a feeder link to the server, where the MO data is intended for at least one remote endpoint (e.g. a remote endpoint 116), where a user equipment (e.g. UE 102) sent the MO data to the SV using a service link when the SV did not have the feeder link, and where the UE registered with the SV and later de-registered from the SV without assistance from the server FIGS. 7 and 8 illustrate example aspects of a server receiving MO data from an SV. The reception may be performed, e.g., by the store and forward component 2499, the communications interface 2448, the transceiver(s) 2446, and/or the antenna(s) 2480 of the network entity 2402 in FIG. 24.

At block 1720, the server forwards the MO data to the at least one remote endpoint via a network (e.g. a PLMN 108), e.g. as described for FIG. 8. The forwarding may be performed, e.g., by the store and forward component 2499, the communications interface 2448, the transceiver(s) 2446, and/or the antenna(s) 2480 of the network entity 2402 in FIG. 24.

In some aspects, the service link supports wireless access using 4G LTE, 5G NR or a future 6G standard, and the SV comprises a RAN and a CN, e.g. as described for FIGS. 2 and 7-9. When the service link supports 5G NR, registering with the SV by the UE may comprise performing a NAS Registration by the UE with the SV prior to sending the MO data to the SV and de-registering from the SV may comprise performing a NAS De-registration by the UE with the SV after sending the MO data to the SV, e.g. as described for FIG. 7. When the service link supports 4G LTE, registering with the SV by the UE may comprise performing a NAS Attach by the UE with the SV prior to sending the MO data to the SV and de-registering from the SV by the UE may comprise performing a NAS Detach by the UE with the SV, e.g. as described above following the description of FIG. 14B.

In some aspects, the SV includes an endpoint proxy function (e.g. endpoint proxy 240) for the at least one remote endpoint, where the endpoint proxy function mimics a behavior of the at least one remote endpoint from a perspective of the UE, and where the MO data is received by the server from the endpoint proxy function, e.g. as described for FIGS. 7 and 8. Mimicking the behavior of the at least one remote endpoint from the perspective of the UE may include returning by the endpoint proxy function at least one of: a pre-configured response to the UE at an application level; a response to the UE at a transport level; or both of these, e.g. as described for FIG. 7.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7.

In some aspects the server accesses the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6. The server may include a UE proxy function for the UE (e.g. a UE proxy 340), where the UE proxy function mimics a behavior of the UE from a first perspective of the at least one remote endpoint and a second perspective of the network, where the MO data is received from the SV by the UE proxy function, and where forwarding the MO data to the at least one remote endpoint comprises forwarding the MO data from the UE proxy function, e.g. as described for FIG. 8. Mimicking the behavior of the UE from the perspective of the at least one remote endpoint may include sending at least one of: a pre-configured message to the at least one remote endpoint at an application level; a response to the at least one remote endpoint at a transport level; or both of these, e.g. as described for FIG. 8. Mimicking the behavior of the UE from the perspective of the network may comprise performing: a NAS Registration of the UE with the network for option (a) or option (b) when the wireless access type is 5G NR, e.g. as described for FIG. 8; or a NAS Attach of the UE with the network for option (a) or option (b) when the wireless access type is 4G LTE, e.g. as described above following the description of FIG. 14B. Mimicking the behavior of the UE from the perspective of the network may further comprise keeping the UE in a permanent Connected state from the perspective of the network, e.g. as described for FIG. 8.

In some aspects, the server: receives mobile terminated (MT) data via the network, where the MT data originates from the at least one remote endpoint; stores the MT data; and sends the MT data to a second SV (e.g. another SV 104) using a second feeder link, where the SV forwards the MT data to the UE using a second service link at a later time, e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 8.

In some aspects, the SV and the server have subscription information for the UE, where the subscription information for the UE permits the UE to send the MO data to the at least one remote endpoint via the SV and the server, e.g. as described for FIGS. 7 and 8.

Figure 18:
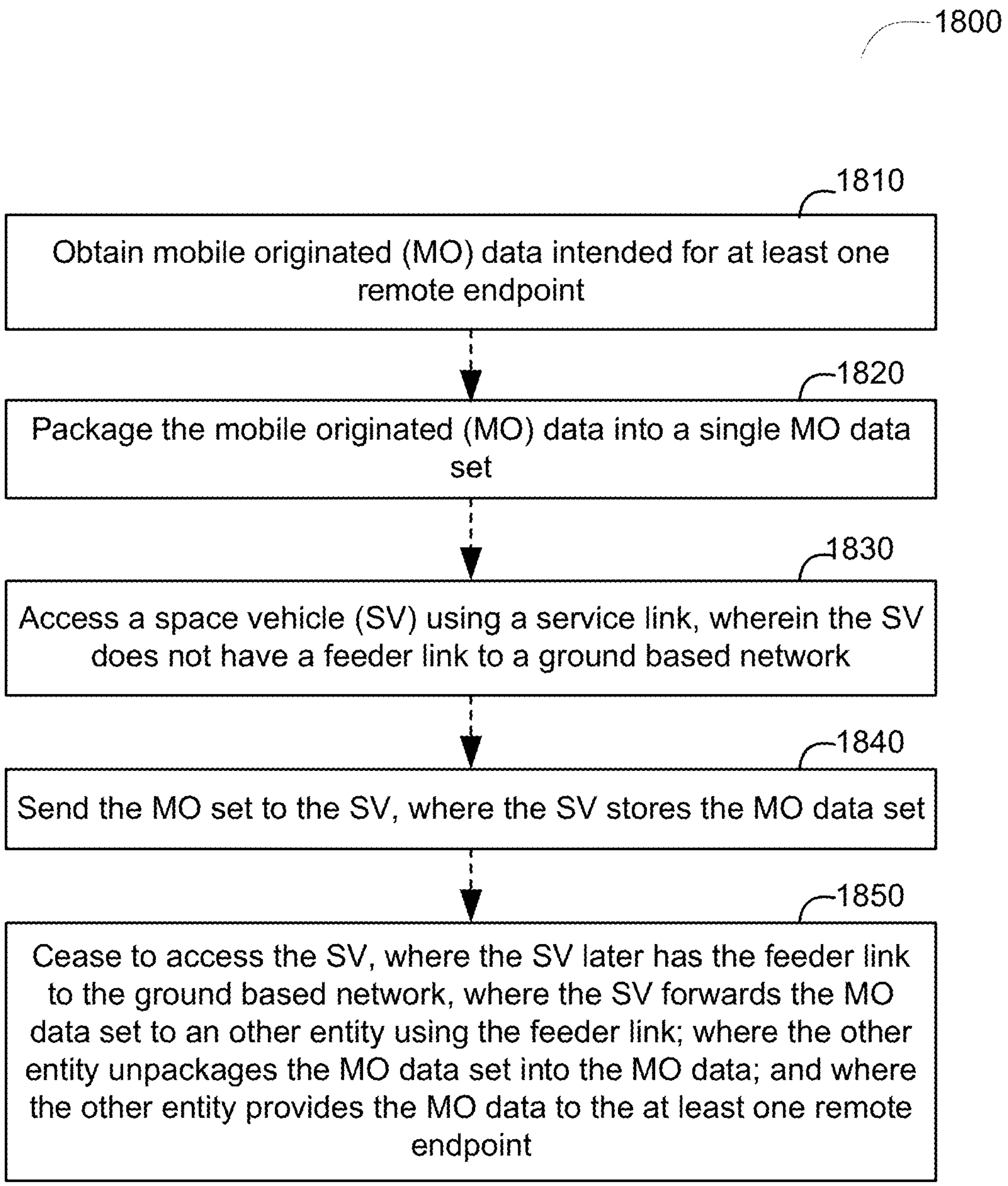
FIG. 18 is a flow diagram of a method of supporting wireless communication performed by a user equipment.

FIG. 18 is a flow diagram of a method 1800 of supporting wireless communication performed by a user equipment (e.g. a UE 102; the apparatus 2204). Example components of a UE are provided hereafter with respect to FIG. 22. The method may improve coverage for the UE by enabling the UE to send and/or receive communication via an SV when the SV may have intermittent feeder link connection to a ground based network.

At block 1810, the UE obtains mobile originated (MO) data intended for at least one remote endpoint (e.g. a remote endpoint 116). As an example, FIGS. 10 and 11 illustrate aspects of a UE obtaining MO data intended for a remote endpoint. As an example, the obtaining may be performed, e.g., by the communication component 2298, the transceiver 2222 and/or the antennas 2280 of the apparatus 2204.

At block 1820, the UE packages the mobile originated (MO) data into a single MO data set, e.g. as described for FIGS. 10 and 11. As an example, the packaging may be performed, e.g., by the communication component 2298 of the apparatus 2204.

At block 1830, the UE accesses a space vehicle (e.g. an SV 104) using a service link, where the SV does not have a feeder link to a ground based network (e.g. a PLMN 108), e.g. as described for FIGS. 10 and 11. As an example, the access may be performed, e.g., by the communication component 2298, the transceiver 2222 and/or the antennas 2280 of the apparatus 2204.

At block 1840, the UE sends the MO data set to the SV, where the SV stores the MO data set. FIGS. 10 and 11 illustrate example aspects of a UE sending the MO set to the SV. As an example, the sending may be performed, e.g., by the communication component 2298, the transceiver 2222 and/or the antennas 2280 of the apparatus 2204.

At block 1850, the UE ceases to access the SV, where the SV later has the feeder link to the ground based network, where the SV forwards the MO data set to an other entity using the feeder link, where the other entity unpackages the MO data set into the MO data, and where the other entity provides the MO data to the at least one remote endpoint, e.g. as described for FIGS. 10 and 11. As an example, the cessation may be performed, e.g., by the communication component 2298 of the apparatus 2204.

In some aspects, the service link supports wireless access to the SV using 4G LTE, 5G NR or a future 6G standard, and the SV comprises a RAN and a CN, e.g. as described for FIGS. 2, 10 and 11. When the service link supports 5G NR, accessing the SV may include performing a NAS Registration with the SV and ceasing to access the SV may include performing a NAS De-registration with the SV, e.g. as described for FIGS. 10 and 11. When the service link supports 4G LTE, accessing the SV may include performing a NAS Attach with the SV and ceasing to access the SV may include performing a NAS Detach with the SV, e.g. as described above following the description of FIG. 14B.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIGS. 10 and 11.

In some aspects, the single MO data set comprises a bit sequence or an octet sequence, e.g. as described for FIGS. 10 and 11.

In some aspects, packaging the MO data into the single MO data set comprises: combining different types of the MO data into the single MO data set; and including control information in the MO data set identifying the different types of the MO data, e.g. as described for FIGS. 10 and 11. Unpackaging the single MO data set into the MO data by the other entity may then comprise: identifying the different types of the MO data in the single MO data set by the other entity based on the control information; and separating the different types of the MO data by the other entity, e.g. as described for FIGS. 10 and 11.

In some aspects, the other entity is a ground based server (e.g. an SFC 202), where the ground based server provides the MO data to the at least one remote endpoint by sending the MO data to the at least one remote endpoint via the network, e.g. as described for FIG. 10. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6.

In some aspects, the single MO data set is transparent to the SV, and the other entity comprises the at least one remote endpoint. In some aspects, the at least one remote endpoint comprises a single remote endpoint, where the SV forwards the MO data set to a ground based server (e.g. an SFC 202) using the feeder link, and where the ground based server forwards the MO data set to the single endpoint via the network, e.g. as described for FIG. 11.

In some aspects, the SV may be a first SV, the feeder link may be a first feeder link, and the service link may be a first service link. In such aspects, the UE may access a second SV (e.g. another SV 104) at a later time using a second service link, where the second SV does not have a second feeder link to the ground based network. The UE may then receive a mobile terminated (MT) data set from the second SV, where the MT data set contains MT data originated from the at least one remote endpoint (e.g., where the MT data was stored by the second SV), e.g. as described for FIGS. 10 and 11. The UE may then obtain the MT data by unpackaging the MT data set. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIGS. 10 and 11. The second SV may receive the MT data set from a ground based server (e.g. an SFC 202), where the server receives the MT data from the at least one remote endpoint via the network, and where the server packages the MT data into the MT data set, e.g. as described for FIG. 10. Alternatively, the second SV may receive the MT data set from a ground based server (e.g. an SFC 202), where the server receives the MT data set from the at least one remote endpoint via the network, where the at least one remote endpoint comprises a single remote endpoint, and where the single remote endpoint packages the MT data into the MT data set, e.g. as described for FIG. 11. The UE may further: obtain second MO data intended for the at least one remote endpoint; package the second MO data into a second single MO data set; and send the second single MO data set to the second SV, where the second SV stores the second single MO data set, where the second SV later has the second feeder link to the ground based network, where the SV forwards the second single MO data set to the other entity using the feeder link, where the other entity unpackages the second single MO data set into the second MO data, and where the other entity provides the second MO data to the at least one remote endpoint, e.g. as described for FIGS. 10 and 11.

In some aspects, packaging the MO data into the single MO data set at block 1820 and/or unpackaging the MT data set into the MT data may be performed by an application on the UE, e.g. as described for FIGS. 10 and 11. A user of the UE may provide the MO data to the application and may obtain the MT data from the App when the UE does not have access to an SV.

Figure 19:
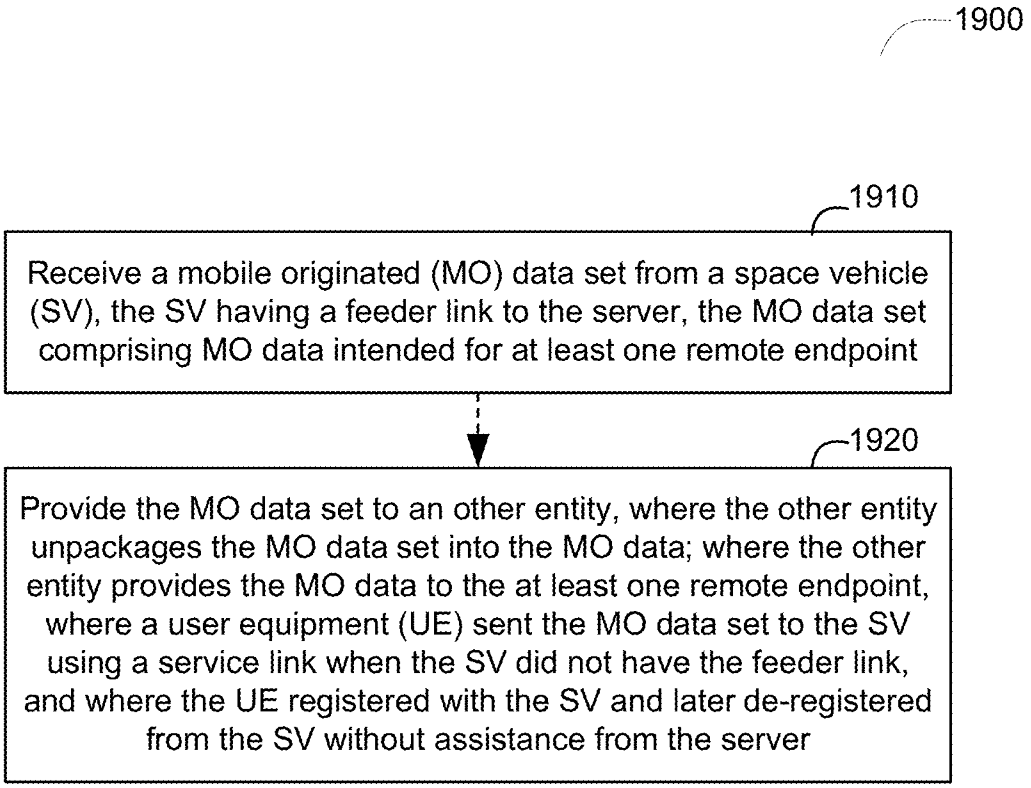
FIG. 19 is a flow diagram of a method of supporting wireless communication performed by a server.

FIG. 19 is a flow diagram of a method 1900 of supporting wireless communication performed by a server (e.g. an SFC 202; the network entity 2402). Example components of a server are provided hereafter with respect to FIG. 24. The method may improve communication with a UE via an SV to that has an intermittent feeder link connection to a ground based network.

At block 1910, the server receives an MO data set from a space vehicle (e.g. an SV 104), where the SV has a feeder link to the server, and where the MO data set comprises MO data intended for at least one remote endpoint (e.g. a remote endpoint 116). FIGS. 10 and 11 illustrate various example aspects of a server receiving an MO data set from an SV. The reception may be performed, e.g., by the store and forward component 2499, the communications interface 2448, the transceiver(s) 2446, and/or the antenna(s) 2480 of the network entity 2402 in FIG. 24.

At block 1920, the server provides the MO data set to an other entity, where the other entity unpackages the MO data set into the MO data, where the other entity provides the MO data to the at least one remote endpoint, where a user equipment (e.g. a UE 102) sent the MO data set to the SV using a service link when the SV did not have the feeder link, and where the UE registered with the SV and later de-registered from the SV without assistance from the server, e.g. as described for FIGS. 10 and 11. The providing may be performed, e.g., by the store and forward component 2499, the communications interface 2448, the transceiver(s) 2446, and/or the antenna(s) 2480 of the network entity 2402 in FIG. 24.

In some aspects, the service link supports wireless access by the UE to the SV using 4G LTE, 5G NR or a future 6G standard, and the SV comprises a RAN and a CN, e.g. as described for FIGS. 2, 10 and 11. When the service link supports 5G NR, registering with the SV by the UE may comprise performing a NAS Registration by the UE with the SV prior to sending the MO data set to the SV and de-registering from the SV may comprise performing a NAS De-registration by the UE with the SV after sending the MO data set to the SV, e.g. as described for FIGS. 10 and 11. When the service link supports 4G LTE, registering with the SV by the UE may comprise performing a NAS Attach by the UE with the SV prior to sending the MO data set to the SV and de-registering from the SV by the UE may comprise performing a NAS Detach by the UE with the SV, e.g. as described above following the description of FIG. 14B.

In some aspects, the UE obtains the MO data and packages the MO data into the MO data set, e.g. as described for FIGS. 10 and 11. Packaging the MO data into the single MO data set by the UE may comprise: combining different types of the MO data into the MO data set; and including control information in the MO data set identifying the different types of the MO data, e.g. as described for FIGS. 10 and 11. Unpackaging the single MO data set into the MO data by the other entity may comprise: identifying the different types of the MO data in the single MO data set by the other entity based on the control information; and separating the different types of the MO data by the other entity, e.g. as described for FIGS. 10 and 11.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIGS. 10 and 11.

In some aspects, the MO data set may comprise a bit sequence or an octet sequence, e.g. as described for FIGS. 10 and 11.

In some aspects, the other entity is the ground based server, and the server may then provide the MO data to the at least one remote endpoint by sending the MO data to the at least one remote endpoint via the network, e.g. as described for FIG. 10. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6.

In some aspects, the other entity comprises the at least one remote endpoint, where the at least one remote endpoint comprises a single remote endpoint, e.g. as described for FIG. 11. In such aspects, the server may forward the MO data set to the single endpoint via the network, e.g. as described for FIG. 11.

In some aspects, the server obtains a mobile terminated (MT) data set, where the MT data set comprises MT data, and where the MT data originates from the at least one remote endpoint, e.g. as described for FIGS. 10 and 11. The server may then store the MT data set, and send the MT data set to a second SV (e.g. another SV 104) using a second feeder link, where the second SV forwards the MT data set to the UE using a second service link at a later time, and where the UE obtains the MT data by unpackaging the MT data set, e.g. as described for FIGS. 10 and 11. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIGS. 10 and 11. The server may receive the MT data from the at least one remote endpoint via the ground based network, and the server may then package the MT data into the MT data set, e.g. as described for FIG. 10. Alternatively, the server may receive the MT data set from the at least one remote endpoint via the network, where the at least one remote endpoint comprises a single remote endpoint, and where the single remote endpoint packages the MT data into the MT data set, e.g. as described for FIG. 11. The server may further receive a second MO data set from a second SV (e.g. another SV 104), where the second SV has a second feeder link to the server, and where the second MO data set comprises second MO data intended for the at least one remote endpoint, e.g. as described for FIGS. 10 and 11. The server may then provide the second MO data set to the other entity, where the other entity unpackages the second MO data set into the second MO data, where the other entity provides the second MO data to the at least one remote endpoint, where the UE sent the second MO data set to the second SV using a second service link when the SV did not have the feeder link, and where the UE registered with the second SV and later de-registered from the second SV without assistance from the server, e.g. as described for FIGS. 10 and 11.

In some aspects, packaging the MO data into the MO data set and unpackaging the MT data set into the MT data may be performed by an application on the UE, e.g. as described for FIGS. 10 and 11. A user of the UE may then provide the MO data to the application and may obtain the MT data from the application when the UE does not have access to an SV.

Figure 20:
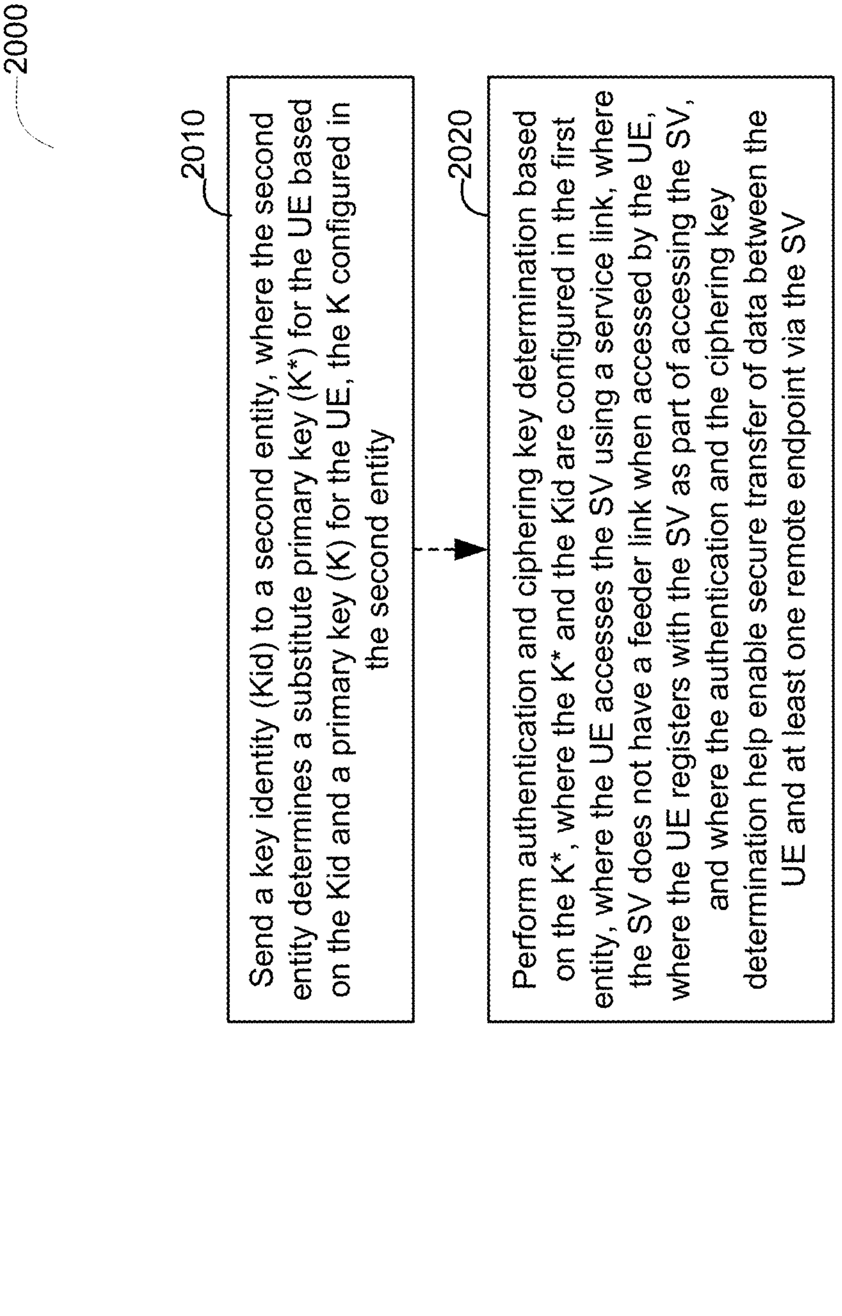
FIG. 20 is a flow diagram of a method of enabling security for wireless access by a UE to a space vehicle in a store and forward mode.

FIG. 20 is a flow diagram of a method 2000 of enabling security for wireless access by a UE (e.g. a UE 102) to a space vehicle (e.g. an SV 104) in a store and forward mode performed by a first entity. The first entity may be the SV, a UE proxy function in a server or a server. Example components of an SV are provided hereafter with respect to FIG. 23. Example components of a server are provided hereafter with respect to FIG. 24.

At block 2010, the first entity sends a key identity (Kid) to a second entity, where the second entity determines a substitute primary key (K*) for the UE based on the Kid and a primary key (K) for the UE, where the K is configured in the second entity, e.g. as described for FIGS. 12, 13, 14A and/or 14B.

At block 2020, the first entity performs authentication and ciphering key determination based on the K*, where the K* and the Kid are configured in the first entity, where the UE accesses the SV using a service link, where the SV does not have a feeder link when accessed by the UE, where the UE registers with the SV as part of accessing the SV, and where the authentication and the ciphering key determination help enable secure transfer of data between the UE and at least one remote endpoint (e.g. a remote endpoint 116) via the SV, e.g. as described for FIGS. 12, 13, 14A and/or 14B.

In some aspects, the second entity determines the K* based on the Kid and the K for the UE by ciphering the Kid using the K (e.g. using equation 1), e.g. as described for FIGS. 12, 13, 14A and/or 14B. The Kid may include one or more of: pseudo-random or random bits or octets; a date; and a time.

In some aspects, the service link supports wireless access to the SV using 4G LTE, 5G NR or a future 6G standard, where the SV comprises a RAN and a CN, e.g. as described for FIGS. 2, 12, 13, 14A and/or 14B. When the service link supports 5G NR, registering by the UE with the SV may comprise performing a NAS Registration by the UE with the SV, e.g. as described for FIGS. 12, 13, 14A and/or 14B. When the service link supports 4G LTE, registering by the UE with the SV may comprise performing a NAS Attach by the UE with the SV, e.g. as described above following the description of FIG. 14B. The SV may further comprise an IMS, where registering with the SV by the UE comprises performing an IMS Registration by the UE with the SV, e.g. as described for FIG. 13.

In some aspects, the first entity is the SV and the second entity is the UE, and the SV (i.e. first entity) may then send the Kid to the UE and perform the authentication and the ciphering key determination as part of the UE registering with the SV, e.g. as described for FIGS. 12 and 13. The SV (i.e. first entity) may also obtain the Kid and K* from one of the following: an O&M server, where the O&M server configures the Kid and K* in the SV; or the UE, where the UE sends the Kid and K* to the SV as part of the registering by the UE with the SV, e.g. as described for FIGS. 12, 13, 14A and/or 14B.

In some aspects, the UE sends mobile originated (MO) data intended for the at least one remote endpoint to the SV, where the SV stores the MO data, where the SV later has the feeder link to a ground based network (e.g. a PLMN 108), where the SV forwards the MO data to a server (e.g. an SFC 202) using the feeder link, where the server registers the UE with the network, and where the server forwards the MO data to the at least one remote endpoint via the network, e.g. as described for FIGS. 7 and 8. The MO data may comprise at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises, or is part of, the network, e.g. as described for FIGS. 4-6. The server may include a UE proxy function for the UE (e.g. a UE proxy 340), where the UE proxy function mimics a behavior of the UE from a perspective of the at least one remote endpoint and a perspective of the network, where the UE proxy function receives the MO data from the SV, and where the UE proxy function forwards the MO data to the at least one remote endpoint via the network, e.g. as described for FIGS. 7 and 8. Mimicking the behavior of the UE from the perspective of the at least one remote endpoint by the UE proxy function may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network by the UE proxy function may comprise the registering the UE with the network, where the registering the UE with the network comprises performing by the UE proxy function one of: a NAS Registration of the UE with the network when the wireless access type is 5G NR; a NAS Attach of the UE with the network when the wireless access type is 4G LTE; or an IMS Registration of the UE with the network, e.g. as described for FIG. 8. The first entity may be the UE proxy function and the second entity may be a UDM or HSS in an HPLMN for the UE, and the first entity (i.e. UE proxy function) may then perform the authentication and the ciphering key determination as part of the registering the UE with the network, e.g. as described for FIGS. 12, 13, 14A and/or 14B. The first entity (i.e. UE proxy function) may also obtain the Kid and K* from one of the following: an O&M server, where the O&M server configures the Kid and K* in the UE proxy function or in the server; the SV, wherein the SV transfers the Kid and K* to the UE proxy function when the SV has the feeder link to the ground based network; or the UDM or the HSS in the HPLMN for the UE, where the UDM or HSS sends the Kid and K* to the UE proxy function via the ground based network as part of the registering the UE with the ground based network, e.g. as described for FIGS. 12, 13, and 14B.

In some aspects, the UE receives mobile terminated (MT) data from the SV, where the MT data was stored by the SV, where the SV received the MT data from a server (e.g. an SFC 202), where the server registers the UE with the network, and where the server received the MT data from the at least one remote endpoint via a ground based network (e.g. a PLMN 108), e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 8. The first entity may be the SV and the second entity may be the UE, and the SV (i.e. first entity) may then perform the authentication and the ciphering key determination as part of the UE registering with the SV, e.g. as described for FIGS. 12, 13, 14A and 14B. The SV (i.e. first entity) may also obtain the Kid and K* from the server, where the server receives the Kid and K* from an HPLMN of the UE as part of the server registering the UE with the network, e.g. as described for FIG. 14B.

Figure 21:
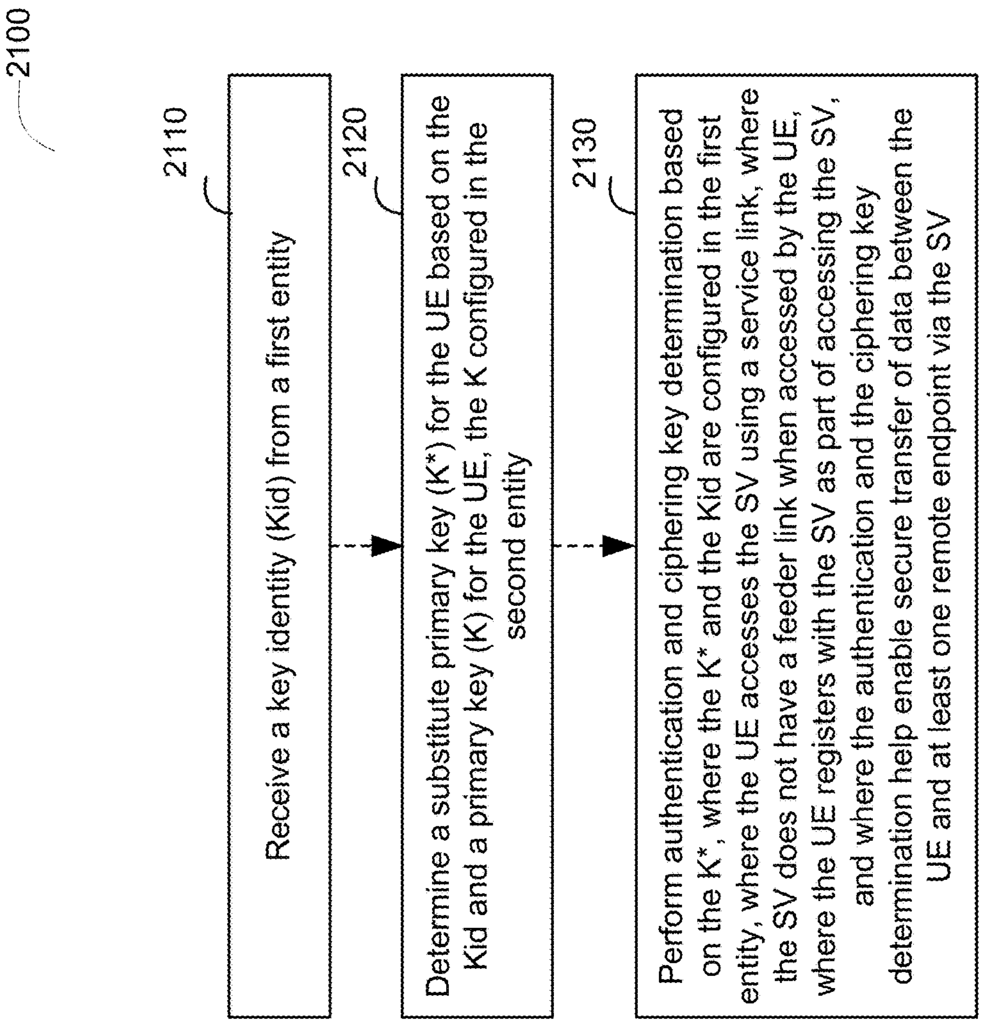
FIG. 21 is a flow diagram of a method of enabling security for wireless access by a UE to a space vehicle in a store and forward mode.

FIG. 21 is a flow diagram of a method 2100 of enabling security for wireless access by a UE (e.g. a UE 102) to a space vehicle (e.g. an SV 104) in a store and forward mode performed by a second entity. The second entity may be the UE or an entity (e.g. UDM or HSS) in an HPLMN for the UE. Example components of a UE are provided hereafter with respect to FIG. 22. Example components of a UDM and HSS are provided hereafter with respect to FIG. 25.

At block 2110, the second entity receives a key identity (Kid) from a first entity, e.g. as described for FIGS. 12, 13, 14A and/or 14B.

At block 2120, the second entity determines a substitute primary key (K*) for the UE based on the Kid and a primary key (K) for the UE, where the K is configured in the second entity, e.g. as described for FIGS. 12, 13, 14A and/or 14B.

At block 2130, the second entity performs authentication and ciphering key determination based on the K*, where the K* and the Kid are configured in the first entity, where the UE accesses the SV using a service link, where the SV does not have a feeder link when accessed by the UE, where the UE registers with the SV as part of accessing the SV, and where the authentication and the ciphering key determination help enable secure transfer of data between the UE and at least one remote endpoint (e.g. a remote endpoint 116) via the SV, e.g. as described for FIGS. 12, 13, 14A and/or 14B.

In some aspects, the second entity determines the K* based on the Kid and the K for the UE by ciphering the Kid using the K (e.g. using equation 1), e.g. as described for FIGS. 12, 13, 14A and/or 14B. The Kid may include one or more of: pseudo-random or random bits or octets; a date; and a time.

In some aspects, the service link supports wireless access to the SV using 4G LTE, 5G NR or a future 6G standard, and the SV comprises a RAN and a CN, e.g. as described for FIGS. 2, 12, 13, 14A and/or 14B. When the service link supports 5G NR, registering by the UE with the SV may comprise performing a NAS Registration by the UE with the SV, e.g. as described for FIGS. 12, 13, 14A and/or 14B. When the service link supports 4G LTE, registering by the UE with the SV may comprise performing a NAS Attach by the UE with the SV, e.g. as described above following the description of FIG. 14B. The SV may further comprise an IMS, where registering with the SV by the UE comprises performing an IMS Registration by the UE with the SV, e.g. as described for FIG. 13.

In some aspects, the first entity is the SV and the second entity is the UE, and the UE (i.e. second entity) may then receive the Kid from the SV and perform the authentication and the ciphering key determination as part of the registering with the SV, e.g. as described for FIGS. 12 and 13. The SV (i.e. first entity) may also obtain the Kid and K* from one of the following: an O&M server, where the O&M server configures the Kid and K* in the SV; or the UE, wherein the UE sends the Kid and K* to the SV as part of the registering by the UE with the SV, e.g. as described for FIGS. 12, 13, 14A and/or 14B.

In some aspects, the UE sends mobile originated (MO) data intended for the at least one remote endpoint to the SV, where the SV stores the MO data, where the SV later has the feeder link to a ground based network (e.g. a PLMN 108), where the SV forwards the MO data to a server (e.g. an SFC 202) using the feeder link, where the server registers the UE with the network, and where the server forwards the MO data to the at least one remote endpoint via the network, e.g. as described for FIGS. 7 and 8. The MO data may comprise at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises, or is part of, the network, e.g. as described for FIGS. 4-6. The server may include a UE proxy function for the UE (e.g. a UE proxy 340), where the UE proxy function mimics a behavior of the UE from a perspective of the at least one remote endpoint and a perspective of the network, where the UE proxy function receives the MO data from the SV, and where the UE proxy function forwards the MO data to the at least one remote endpoint via the network, e.g. as described for FIG. 8. Mimicking the behavior of the UE from the perspective of the at least one remote endpoint by the UE proxy function may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network by the UE proxy function may comprise the registering the UE with the network, where the registering the UE with the network comprises performing by the UE proxy function one of: a NAS Registration of the UE with the network when the wireless access type is 5G NR; a NAS Attach of the UE with the network when the wireless access type is 4G LTE; or an IMS Registration of the UE with the network, e.g. as described for FIG. 8. The first entity may be the UE proxy function and the second entity may be a UDM or HSS in an HPLMN for the UE, and the second entity (i.e. the UDM or HSS) may then perform the authentication and the ciphering key determination as part of the registering the UE with the network by the server, e.g. as described for FIG. 14B. The first entity (i.e. the UE proxy function) may obtain the Kid and K* from one of the following: an O&M server, where the O&M server configures the Kid and K* in the UE proxy function or in the server; the SV, where the SV transfers the Kid and K* to the UE proxy function when the SV has the feeder link to the ground based network; or the UDM or the HSS in the HPLMN for the UE, and where the UDM or HSS sends the Kid and K* to the UE proxy function via the ground based network as part of the registering the UE with the ground based network by the server, e.g. as described for FIGS. 12, 13, 14A, and/or 14B.

In some aspects, the UE receives mobile terminated (MT) data from the SV, where the MT data was stored by the SV, where the SV received the MT data from a server (e.g. an SFC 202), where the server registers the UE with the network, and where the server received the MT data from the at least one remote endpoint via a ground based network, e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 8. The first entity may be the SV and the second entity may be the UE, and the UE (i.e. second entity) may then perform the authentication and the ciphering key determination as part of the registering with the SV, e.g. as described for FIGS. 12, 13, 14A and/or 14B. The SV (i.e. first entity) may also obtain the Kid and K* from the server, where the server receives the Kid and K* from an HPLMN of the UE as part of the server registering the UE with the network, e.g. as described for FIG. 14B.

Figure 22:
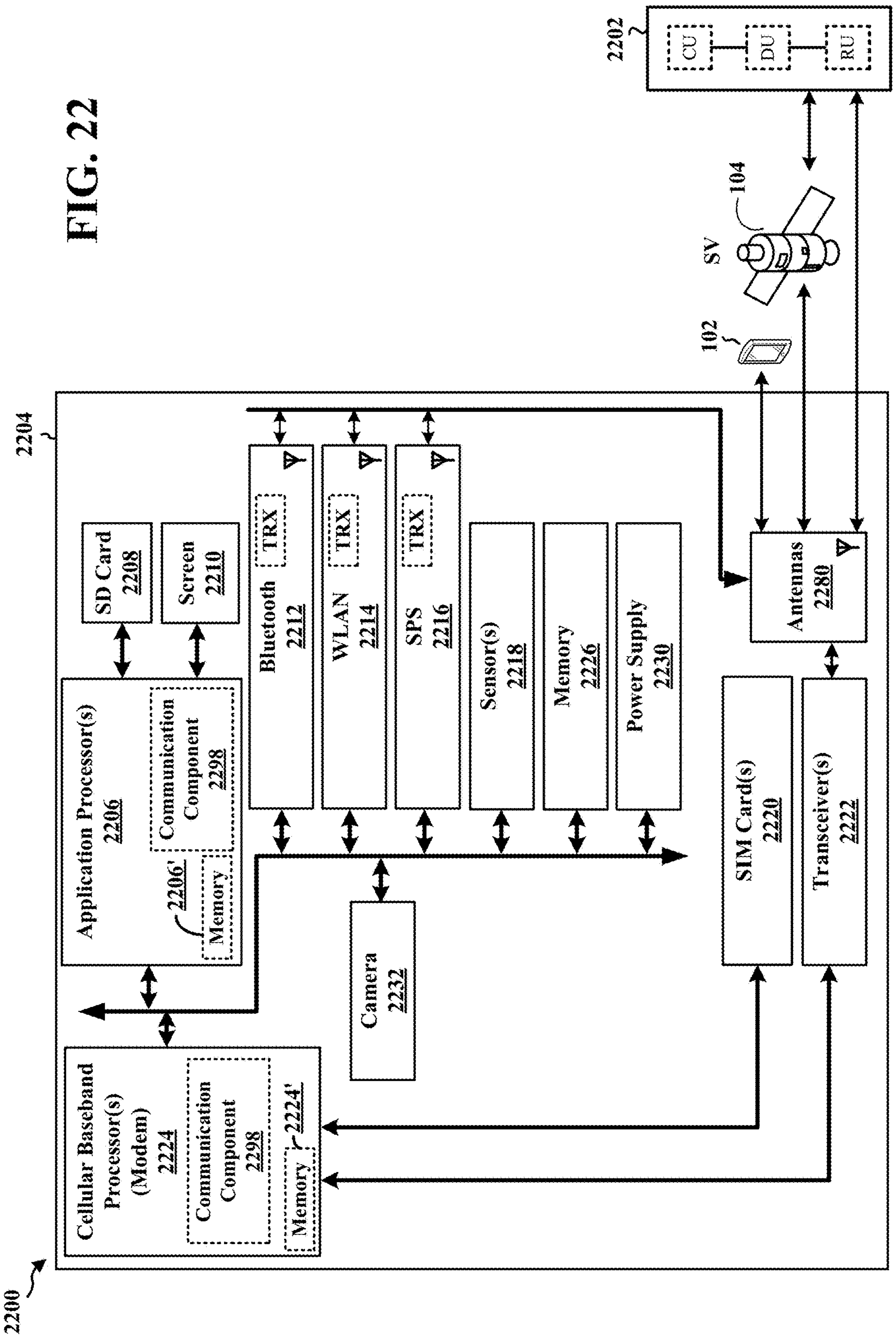
FIG. 22 is a diagram illustrating an example of a hardware implementation of a UE configured to access a space vehicle.

FIG. 22 is a diagram 2200 illustrating an example of a hardware implementation for an apparatus 2204. The apparatus 2204 may be a UE, a component of a UE, or may implement UE functionality. For example, the apparatus may correspond to UE 102, a component of the UE 102, or may implement the functionality or UE 102, such as any of the aspects performed by the UE 102 in any of FIGS. 1-14B or in the flowcharts in any of FIG. 15, 18, 21, 27, 30, or 33. In some aspects, the apparatus 2204 may include at least one cellular baseband processor 2224 (also referred to as a modem) coupled to one or more transceivers 2222 (e.g., cellular RF transceiver). The cellular baseband processor(s) 2224 may include at least one on-chip memory 2224'. In some aspects, the apparatus 2204 may further include one or more subscriber identity modules (SIM) cards 2220 and at least one application processor 2206 coupled to a secure digital (SD) card 2208 and a screen 2210. The application processor(s) 2206 may include on-chip memory 2206'. In some aspects, the apparatus 2204 may further include a Bluetooth module 2212, a WLAN module 2214, an SPS module 2216 (e.g., GNSS module), one or more sensor modules 2218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the SPS module 2216 may include an on-chip transceiver (TRX) (or in some cases, just a receiver (RX)). The Bluetooth module 2212, the WLAN module 2214, and the SPS module 2216 may include their own dedicated antennas and/or utilize the antennas 2280 for communication. The cellular baseband processor(s) 2224 communicates through the transceiver(s) 2222 via one or more antennas 2280 with the UE 102, with an SV 104, and/or with an RU associated with a network entity 2202. The network entity 2202 may correspond to a ground based wireless communication network. As described herein, the apparatus 2204 may communicate with the ground based network via the SV 104. The cellular baseband processor(s) 2224 and the application processor(s) 2206 may each include a computer-readable medium/memory 2224', 2206', respectively. The additional memory modules 2226 may also be considered a computer-readable medium/memory. Each computer-readable medium/memory (e.g., 2224', 2206', 2226) may be non-transitory. The cellular baseband processor(s) 2224 and the application processor(s) 2206 are each responsible for general processing, including the execution of software stored on the computer-readable medium/memory. The software, when executed by the cellular baseband processor(s) 2224/application processor(s) 2206, causes the cellular baseband processor(s) 2224/application processor(s) 2206 to perform the various functions described supra. The cellular baseband processor(s) 2224 and the application processor(s) 2206 are configured to perform the various functions described supra based at least in part of the information stored in the memory. That is, the cellular baseband processor(s) 2224 and the application processor(s) 2206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2224/application processor(s) 2206 when executing software. The cellular baseband processor(s) 2224/application processor(s) 2206 may be a component of the UE 2650 and may include the at least one memory 2660 and/or at least one of the TX processor 2668, the RX processor 2656, and the controller/processor 2659. In one configuration, the apparatus 2204 may be at least one processor chip (modem and/or application) and include just the cellular baseband processor(s) 2224 and/or the application processor(s) 2206, and in another configuration, the apparatus 2204 may be the entire UE (e.g., see UE 102 or 2650 of FIG. 26) and include the additional modules of the apparatus 2204.

As discussed supra, in some aspects, the component 2298 may be configured to access an SV using a service link at a time that the SV does not have a feeder link to a ground based network and the UE is not registered with the SV; register with the SV; send MO data intended for at least one remote endpoint to the SV for storage at the SV until the SV has the feeder link to the ground based network to forward the MO data to the at least one remote endpoint via the ground based network; de-register from the SV; and cease to access the SV. In some aspects, the service link supports wireless access to the SV using 4G LTE, 5G NR or a future 6G standard, wherein the SV comprises a RAN and a CN. In some aspects, when the service link supports 5G NR, to register with the SV, the apparatus may be configured to perform a NAS registration with the SV and to de-register from the SV, the apparatus may be configured to a NAS de-registration with the SV. When the service link supports 4G LTE, to register with the SV, the apparatus may be configured to a NAS attach with the SV and to de-register from the SV, the apparatus may be configured to a NAS detach with the SV. The apparatus 2204 may be further configured to receive a response from an endpoint proxy function, at the SV, for the at least one remote endpoint, the response mimicking a behavior of the at least one remote endpoint from a perspective of the UE, the response indicating that the endpoint proxy function will receive and store the MO data. The response may mimic the behavior of the at least one remote endpoint from the perspective of the UE and include at least one of: a pre-configured response to the UE at an application level; a transport level response to the UE; or both of these. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the SV may be a first SV, the feeder link for the first SV may be a first feeder link, and the service link to the first SV may be a first service link, and the apparatus may be further configured to access a second SV at a later time using a second service link, wherein the second SV does not have a second feeder link to the ground based network, wherein the UE is not registered with the second SV; register with the second SV; receive MT data from the second SV, wherein the MT data comprises SV stored data that originated from the at least one remote endpoint; de-register from the second SV; and cease to access the second SV. In some aspects, the apparatus may be further configured to send second MO data intended for at least one second remote endpoint to the second SV to be stored at the SV and forwarded to the at least one second remote endpoint when the second SV later has the second feeder link to the ground based network. In some aspects, the apparatus may be further configured to receive an indication in a broadcast received from the SV, wherein the indication indicates that the SV is operating in a store and forward mode; and access the SV using the service link, based on the indication, received from the SV, that the SV is operating in the store and forward mode. In some aspects, the UE may have a subscription to access the SV when the SV is operating in the store and forward mode.

In some aspects, the apparatus, 2204, and in particular, the cellular baseband processor(s) 2224, and/or the application processor(s), e.g., including the communication component 2298, may be configured to obtain MO data intended for at least one remote endpoint; means for packaging the MO data into a single MO data set; access an SV using a service link, wherein the SV does not have a feeder link to a ground based network; send the MO set to the SV for storage of the MO data set and forwarding to an other entity, for providing to the at least one remote endpoint, when the SV has the feeder link to the ground based network; and cease to access the SV prior to the SV having the feeder link to the ground based network. In some aspects, the service link supports wireless access to the SV using 4G LTE, 5G NR or a future 6G standard, wherein the SV comprises a RAN and a CN. In some aspects, the service link supports wireless access to the SV using 4G LTE, 5G NR or a future 6G standard, where the SV comprises a RAN and a CN. In some aspects, to access the SV, the apparatus 2204 is configured to perform a NAS registration with the SV, and to cease to access the SV, the apparatus is configured to perform a NAS de-registration with the SV, and when the service link supports 5G NR, to access the SV, the apparatus may be configured to perform a NAS attach with the SV and to cease to access the SV, the apparatus may be configured to perform a NAS detach with the SV when the service link supports 4G LTE. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the single MO data set may comprise a bit sequence or an octet sequence. In some aspects, to package the MO data into the single MO data set, the apparatus 2204 may be configured to combine different types of the MO data into the single MO data set and include control information in the MO data set identifying the different types of the MO data. In some aspects, the other entity is a ground based server. In some aspects, the single MO data set is transparent to the SV, where the other entity comprises the at least one remote endpoint, wherein the at least one remote endpoint comprises a single remote endpoint. In some aspects, the SV is a first SV, the feeder link for the first SV is a first feeder link, and the service link to the first SV is a first service link, and the apparatus may be further configured to access a second SV at a later time using a second service link, wherein the second SV does not have a second feeder link to the ground based network; receive a MT data set from the second SV, wherein the MT data set contains MT data originated from the at least one remote endpoint; and obtain the MT data by unpackaging the MT data set. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the apparatus 2204 may be further configured to obtain second MO data intended for the at least one remote endpoint; package the second MO data into a second single MO data set; and send the second single MO data set to the second SV for storing and forwarding when the second SV later has the second feeder link to the ground based network. In some aspects, one or more of packaging the MO data into the single MO data set or unpackaging the MT data set into the MT data is performed by an application on the UE. In some aspects, a user of the UE may provide the MO data to the application and obtain the MT data from the application when the UE does not have access to the SV.

In some aspects, the communication component 2298, or another component of the apparatus 2204, may be configured to determine the K* based on the Kid and the K for the UE by ciphering the Kid using the K. In some aspects, the Kid includes one or more of: pseudo-random or random bits or octets; a date and/or a time (e.g. a date and/or time when the Kid is determined); and either a duration or a second date and/or time (e.g. indicating when the Kid is no longer to be valid). In some aspects, the service link supports the wireless access to the SV using 4G LTE, 5G NR or a future 6G standard, wherein the SV comprises a RAN and CN. When the service link supports the 5G NR, the UE registration with the SV may include a NAS registration of the UE with the SV, and when the service link supports the 4G LTE, the UE registration with the SV may include a NAS attach of the UE with the SV. In some aspects, the SV further includes an IMS, where the UE registration comprises an IMS registration of the UE with the SV. For example, the secure transfer of data that is enabled may be for a UE that sends MO data intended for the at least one remote endpoint to the SV for storage and forwarding to a ground based network via a server when the SV later has the feeder link to the ground based network, where the UE registers with the ground based network via the server. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the second entity may be the UE, and the first entity may be the SV, where the communication component 2298, or another component of the apparatus 2204, are configured to perform the authentication and the ciphering key determination as part of registering the UE with the SV. In some aspects, the Kid and the K* may be from one of: an O&M server; or the UE, wherein the UE sends the Kid and the K* to the SV as part of registering by the UE with the SV.

The communication component 2298, or another component of the apparatus, may be further configured to perform, or to cause the apparatus to perform, any of the aspects performed by the UE 102 in any of FIGS. 1-14B and/or described in connection with the flowcharts in any of FIG. 15, 18, 21, 27, 30, or 33. The component 2298 may be within the cellular baseband processor(s) 2224, the application processor(s) 2206, or both the cellular baseband processor(s) 2224 and the application processor(s) 2206. The component 2298 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

As shown, the apparatus 2204 may include a variety of components configured for various functions. In some configurations, the apparatus 2204, and in particular the cellular baseband processor(s) 2224 and/or the application processor(s) 2206, may include means for accessing a SV using a service link at a time that the SV does not have a feeder link to a ground based network and the UE is not registered with the SV; means for registering with the SV; means for sending MO data intended for at least one remote endpoint to the SV for storage at the SV until the SV has the feeder link to the ground based network to forward the MO data to the at least one remote endpoint via the ground based network; means for de-registering from the SV; and means for ceasing to access the SV. In some aspects, the service link supports wireless access to the SV using 4G LTE, 5G NR or a future 6G standard, wherein the SV comprises a RAN and a CN. In some aspects, when the service link supports 5G NR, the means for registering with the SV are configured to perform a NAS registration with the SV and the means for de-registering from the SV are configured to perform a NAS de-registration with the SV, wherein when the service link supports 4G LTE, the means for registering with the SV are configured to perform a NAS attach with the SV and the means for de-registering from the SV are configured to perform a NAS detach with the SV. In some aspects, the apparatus may further include means for receiving a response from an endpoint proxy function, at the SV, for the at least one remote endpoint, the response mimicking a behavior of the at least one remote endpoint from a perspective of the UE, the response indicating that the endpoint proxy function will receive and store the MO data. In some aspects, the SV is a first SV, the feeder link for the first SV is a first feeder link, and the service link to the first SV is a first service link, and the apparatus may further include means for accessing a second SV at a later time using a second service link, wherein the second SV does not have a second feeder link to the ground based network, wherein the UE is not registered with the second SV; means for registering with the second SV; means for receiving MT data from the second SV, wherein the MT data comprises SV stored data that originated from the at least one remote endpoint; means for de-registering from the second SV; and means for ceasing to access the second SV. In some aspects, the apparatus may further include means for sending second MO data intended for at least one second remote endpoint to the second SV to be stored at the SV and forwarded to the at least one second remote endpoint when the second SV later has the second feeder link to the ground based network. In some aspects, the apparatus may further include means for receiving an indication in a broadcast received from the SV, wherein the indication indicates that the SV is operating in a store and forward mode; and means for accessing the SV using the service link, based on the indication, received from the SV, that the SV is operating in the store and forward mode.

In some configurations, the apparatus 2204, and in particular the cellular baseband processor(s) 2224 and/or the application processor(s) 2206, may include means for obtaining MO data intended for at least one remote endpoint; means for packaging the MO data into a single MO data set; means for accessing an SV using a service link, wherein the SV does not have a feeder link to a ground based network; means for sending the MO set to the SV for storage of the MO data set and forwarding to an other entity, for providing to the at least one remote endpoint, when the SV has the feeder link to the ground based network; and means for ceasing to access the SV prior to the SV having the feeder link to the ground based network. In some aspects, the service link supports wireless access to the SV using 4G LTE, 5G NR or a future 6G standard, wherein the SV comprises a RAN and a CN. In some aspects, the service link supports wireless access to the SV using 4G LTE, 5G NR or a future 6G standard, wherein the SV comprises a RAN and a CN. In some aspects, the means for accessing the SV are configured to perform a NAS registration with the SV and the means for ceasing to access the SV are configured to perform a NAS de-registration with the SV when the service link supports 5G NR, the means for accessing the SV are configured to perform a NAS attach with the SV and the means for ceasing to access the SV are configured to perform a NAS detach with the SV when the service link supports 4G LTE. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the single MO data set may comprise a bit sequence or an octet sequence. In some aspects, the means for packaging the MO data into the single MO data set may be configured to combine different types of the MO data into the single MO data set and include control information in the MO data set identifying the different types of the MO data. In some aspects, the other entity is a ground based server. In some aspects, the single MO data set is transparent to the SV, where the other entity comprises the at least one remote endpoint, wherein the at least one remote endpoint comprises a single remote endpoint. In some aspects, the SV is a first SV, the feeder link for the first SV is a first feeder link, and the service link to the first SV is a first service link, and the apparatus further includes means for accessing a second SV at a later time using a second service link, wherein the second SV does not have a second feeder link to the ground based network; means for receiving a MT data set from the second SV, wherein the MT data set contains MT data originated from the at least one remote endpoint; and means for obtaining the MT data by unpackaging the MT data set. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the apparatus 2204 may further include means for obtaining second MO data intended for the at least one remote endpoint; means for packaging the second MO data into a second single MO data set; and means for sending the second single MO data set to the second SV for storing and forwarding when the second SV later has the second feeder link to the ground based network. In some aspects, one or more of packaging the MO data into the single MO data set or unpackaging the MT data set into the MT data is performed by an application on the UE. In some aspects, a user of the UE may provide the MO data to the application and obtain the MT data from the application when the UE does not have access to the SV.

In some aspects some aspects, the apparatus 2204 may correspond to the second entity described in connection with FIG. 21. The apparatus 2204 may include means for enabling security, performed by a second entity, for wireless access by a UE to an SV in a store and forward mode. The apparatus 2204 may include means for receiving a key identity (Kid) from a first entity; means for determining a substitute primary key (K*) for the UE based on the Kid and a primary key (K) for the UE, the K configured in the second entity; and means for performing authentication and ciphering key determination based on the K* to enable secure data transfer between the UE and at least one remote endpoint via the SV, wherein the K* and the Kid are configured in the first entity, wherein the secure data transfer is between the UE that accesses the SV using a service link when the SV does not have a feeder link, wherein UE registration with the SV is a part of access to the SV. In some aspects, the means for determining are configured to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the service link supports the wireless access to the SV using 4G LTE, 5G NR or a future 6G standard, wherein the SV comprises a RAN and CN. When the service link supports the 5G NR, the UE registration with the SV may include a NAS registration of the UE with the SV, and when the service link supports the 4G LTE, the UE registration with the SV may include a NAS attach of the UE with the SV. In some aspects, the SV further includes an IMS, where the UE registration comprises an IMS registration of the UE with the SV. For example, the secure transfer of data that is enabled may be for a UE that sends MO data intended for the at least one remote endpoint to the SV for storage and forwarding to a ground based network via a server when the SV later has the feeder link to the ground based network, wherein the UE registers with the ground based network via the server. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the second entity may be the UE, and the first entity may be the SV, where the UE includes the means for performing the authentication and the ciphering key determination as part of registering the UE with the SV. In some aspects, the Kid and the K* may be from one of: an O&M server; or the UE, wherein the UE sends the Kid and the K* to the SV as part of registering by the UE with the SV.

The apparatus may further include means for performing any of the aspects performed by a UE in any of FIGS. 1-14B and/or described in connection with the flowcharts in any of FIG. 15, 18, 21, 27, 30, or 33. The means may be the component 2298 of the apparatus 2204 configured to perform the functions recited by the means. As described supra, the apparatus 2204 may include the TX processor 2668, the RX processor 2656, and the controller/processor 2659. As such, in one configuration, the means may be the TX processor 2668, the RX processor 2656, and/or the controller/processor 2659 configured to perform the functions recited by the means.

Figure 23:
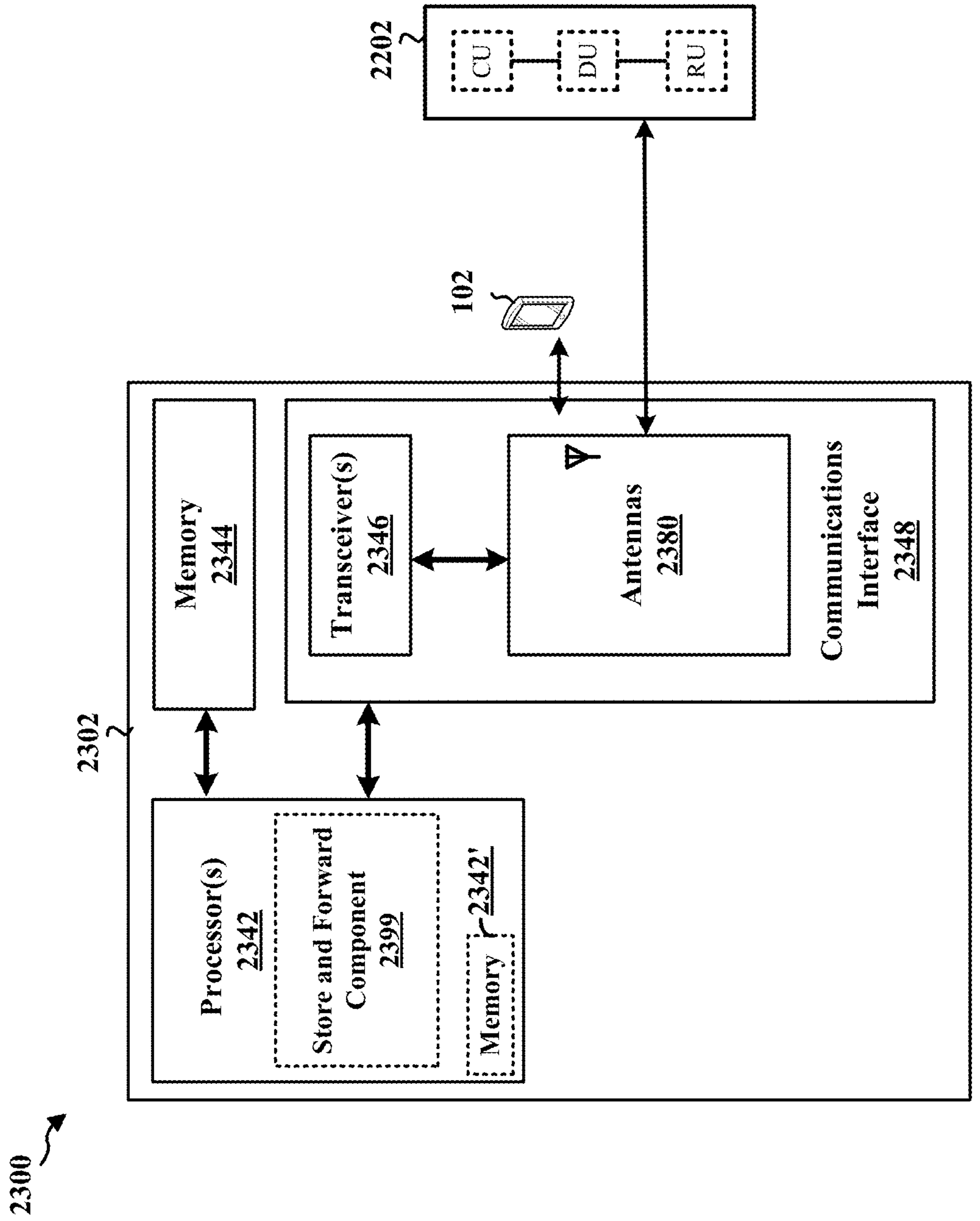
FIG. 23 is a diagram illustrating an example of a hardware implementation of a space vehicle configured to support access by a UE.

FIG. 23 is a diagram 2300 illustrating an example of a hardware implementation for a network entity 2302. The network entity may correspond to an SV, a component of an SV, or may implement SV functionality, e.g., as described for the SV 104 in any of FIGS. 1-14B and/or the methods described in connection with the flowcharts in any of FIGS. 16, 20, 21, 28, 32, and/or 33. The network entity 2302 may include at least one processor 2342, which may include on-chip memory 2342'. In some aspects, the network entity 2302 may further include additional memory modules 2344 and a communications interface 2348, one or more transceivers 2346, antennas 2380, and a communications interface 2348. The network entity 2302 may be configured to communicate with the UE 102, e.g., via a service link, and a ground based network entity 2202, e.g., via a feeder link, as described in connection with any of FIGS. 1-14B and/or the methods described in connection with the flowcharts in any of FIGS. 16, 20, 21, 28, 32, and/or 33. The on-chip memory 2342' and the additional memory modules 2344 may each be considered a computer-readable medium/memory. Each computer-readable medium/memory may be non-transitory. The processor(s) 2342 are responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the store and forward component 2399 may be configured to provide wireless access to a UE via a service link, wherein the SV does not have a feeder link to a ground based network, where the UE is not registered with the SV; register the UE; receive MO data from the UE, the MO data intended for at least one remote endpoint; store the MO data; de-register the UE; cease to provide the wireless access to the UE; obtain the feeder link to the ground based network; and forward the MO data to the at least one remote endpoint via the ground based network. In some aspects, the service link supports wireless access to the SV using 4G LTE, 5G NR or a future 6G standard, where the SV comprises a RAN and a CN. When the service link supports 5G NR, to register the UE, the network entity may be configured to perform a NAS registration of the UE, and to de-register, the network entity may be configured to perform a NAS de-registration of the UE. When the service link supports 4G LTE, to register the UE, the network entity may be configured to perform a NAS attach of the UE, and to de-register the UE, the network entity may be configured to perform a NAS detach of the UE. In some aspects, the SV may include an endpoint proxy function, e.g., which may be an aspects of the store and forward component 2399, for the at least one remote endpoint, the endpoint proxy function may be configured to mimic a behavior of the at least one remote endpoint from a perspective of the UE, receive and store the MO data. In some aspects, to mimic the behavior of the at least one remote endpoint from the perspective of the UE, the network entity 2302 may be further configured to return at least one of: a pre-configured response to the UE at an application level; a response to the UE at a transport level; or both of these. In some aspects, the MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. To forward the MO data to the at least one remote endpoint via the ground based network, the network entity 2302 may be configured to forward the MO data to a ground based server for forwarding to the at least one remote endpoint via the ground based network. In some aspects, the network entity 2302 may be further configured to receive MT data via the ground based network, the MT data originating from the at least one remote endpoint; store the MT data; and send the MT data to the UE using the service link at a later time. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, to receive the MT data, the network entity 2302 may be configured to receive the MT data from a ground based server, where the MT data is originated from the at least one remote endpoint via the ground based network. In some aspects, the network entity 2302 may be further configured to broadcast an indication to the UE that the SV is operating in a store and forward mode, where access is provided to the SV using the service link with the UE based on the indication broadcast by the SV that the SV is operating in the store and forward mode. In some aspects, the SV may have subscription information for the UE, the subscription information for the UE permitting the UE to access the SV when the SV is operating in the store and forward mode.

In some aspects, the store and forward component 2399, and/or another component of the network entity 2302, may be configured to enable security, performed by a first entity, for wireless access by a UE to an SV in a store and forward mode. For example, the network entity may be configured to send a key identity (Kid) to a second entity for the second entity to determine a substitute primary key (K*) for the UE based on the Kid and a primary key (K) for the UE based on the K configured in the second entity; and perform authentication and ciphering key determination based on the K* to enable secure transfer of data between the UE and at least one remote endpoint via the SV, where the K* and the Kid are configured in the first entity, where the secure transfer of data is between the UE that accesses the SV using a service link when the SV does not have a feeder link, wherein UE registration with the SV is a part of access to the SV. In some aspects, the network entity, e.g., the component 2399, may be configured to send the Kid to enable the second entity to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the secure transfer of data may be via the service link that supports the wireless access to the SV using 4G LTE, 5G NR or a future 6G standard, wherein the SV comprises RAN and CN. In some aspects, when the service link supports the 5G NR, the UE registration with the SV comprises a NAS registration of the UE with the SV, wherein when the service link supports the 4G LTE, the UE registration with the SV comprises a NAS attach of the UE with the SV. In some aspects, the SV may further comprise an IMS, wherein the UE registration with the SV comprises an IMS Registration of the UE with the SV. In some aspects, the first entity may be the SV, the second entity may be the UE, and the network entity, e.g., the component 2399, may be configured to send, from the SV, the Kid to the UE, and perform the authentication and the ciphering key determination as part of the UE registration with the SV. In some aspects, the network entity, e.g., the component 2399, may be configured to obtain the Kid and the K* from one of: an O&M server, as a configuration from the O&M server indicating the Kid and the K* to the SV; or the UE, where the SV receives the Kid and the K* from the UE as part of the UE registration with the SV. In some aspects, the network entity, e.g., the component 2399, may be configured to obtain the Kid and the K* from a server, based on the Kid and the K* from an HPLMN of the UE as part of the UE registration with the ground based network. In some aspects, the secure transfer of data may include MO data from the UE that is intended for the at least one remote endpoint via the SV to be forwarded, at a later time when the SV later has the feeder link to a ground based network, wherein the secure transfer of data is further via a server, that registers the UE with the ground based network. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these.

The store and forward component 2399, or another component of network entity 2302, may be further configured to perform, or cause the network entity to perform, any of the aspects performed by the SV 104 described in connection with any of FIGS. 1-14B and/or the methods described in connection with the flowcharts any of FIGS. 16, 20, 21, 28, 32, and/or 33. The store and forward component 2399 may be within one or more processors of the network entity 2302. The store and forward component 2399 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

The network entity 2302 may include a variety of components configured for various functions. In some configurations, the network entity 2302 may include means for providing wireless access to a UE via a service link, wherein the SV does not have a feeder link to a ground based network, wherein the UE is not registered with the SV; means for registering the UE; means for receiving MO data from the UE, the MO data intended for at least one remote endpoint; means for storing the MO data; means for de-registering the UE; means for ceasing to provide the wireless access to the UE; means for obtaining the feeder link to the ground based network; and means for forwarding the MO data to the at least one remote endpoint via the ground based network. In some aspects, the service link supports wireless access to the SV using 4G LTE, 5G NR or a future 6G standard, wherein the SV comprises a RAN and a CN. When the service link supports 5G NR, the means for registering the UE may be configured to perform a NAS registration of the UE and the means for de-registering may be configured to perform a NAS de-registration of the UE. When the service link supports 4G LTE, the means for registering the UE may be configured to perform a NAS attach of the UE and the means for de-registering the UE may be configured to perform a NAS detach of the UE. In some aspects, the SV may include an endpoint proxy function for the at least one remote endpoint, the endpoint proxy function may be configured to mimic a behavior of the at least one remote endpoint from a perspective of the UE, receive and store the MO data. In some aspects, to mimic the behavior of the at least one remote endpoint from the perspective of the UE, the network entity 2302 may include means for returning at least one of: a pre-configured response to the UE at an application level; a response to the UE at a transport level; or both of these. In some aspects, the MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. The means for forwarding the MO data to the at least one remote endpoint via the ground based network may be configured to forward the MO data to a ground based server for forwarding to the at least one remote endpoint via the ground based network. In some aspects, the network entity 2302 may further include means for receiving MT data via the ground based network, the MT data originating from the at least one remote endpoint; means for storing the MT data; and means for sending the MT data to the UE using the service link at a later time. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the means for receiving the MT data may be configured to receive the MT data from a ground based server, where the MT data is originated from the at least one remote endpoint via the ground based network. In some aspects, the network entity 2302 may further include means for broadcasting an indication to the UE that the SV is operating in a store and forward mode, where access is provided to the SV using the service link with the UE based on the indication broadcast by the SV that the SV is operating in the store and forward mode. In some aspects, the SV may have subscription information for the UE, the subscription information for the UE permitting the UE to access the SV when the SV is operating in the store and forward mode.

In some configurations, the network entity may include means to enable security, performed by a first entity, for wireless access by a UE to an SV in a store and forward mode. For example, the network entity may include means for sending a key identity (Kid) to a second entity for the second entity to determine a substitute primary key (K*) for the UE based on the Kid and a primary key (K) for the UE based on the K configured in the second entity; and means for performing authentication and ciphering key determination based on the K* to enable secure transfer of data between the UE and at least one remote endpoint via the SV, wherein the K* and the Kid are configured in the first entity, wherein the secure transfer of data is between the UE that accesses the SV using a service link when the SV does not have a feeder link, wherein UE registration with the SV is a part of access to the SV. In some aspects, the means for sending may be configured to send the Kid to enable the second entity to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the secure transfer of data may be via the service link that supports the wireless access to the SV using 4G LTE, 5G NR or a future 6G standard, wherein the SV comprises RAN and CN. In some aspects, when the service link supports the 5G NR, the UE registration with the SV comprises a NAS registration of the UE with the SV, wherein when the service link supports the 4G LTE, the UE registration with the SV comprises a NAS attach of the UE with the SV. In some aspects, the SV may further comprise an IMS, wherein the UE registration with the SV comprises an IMS Registration of the UE with the SV. In some aspects, the first entity may be the SV, the second entity may be the UE, and the means for sending may be configured to send, from the SV, the Kid to the UE, and the means for performing may be configured to perform the authentication and the ciphering key determination as part of the UE registration with the SV. The network entity may further include means for obtaining the Kid and the K* from one of: an O&M server, as a configuration from the O&M server indicating the Kid and the K* to the SV; or the UE, where the SV receives the Kid and the K* from the UE as part of the UE registration with the SV. The network entity may further include means for obtaining the Kid and the K* from a server, based on the Kid and the K* from an HPLMN of the UE as part of the UE registration with the ground based network. In some aspects, the secure transfer of data may include MO data from the UE that is intended for the at least one remote endpoint via the SV to be forwarded, at a later time when the SV later has the feeder link to a ground based network, wherein the secure transfer of data is further via a server, that registers the UE with the ground based network. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these.

The network entity 2302 may further include means for performing any of the aspects performed by the SV 104 described in connection with any of FIGS. 1-14B and/or the methods described in connection with the flowcharts in any of FIGS. 16, 20, 21, 28, 32, and/or 33. The means may be the store and forward component 2399 of the network entity 2302 configured to perform the functions recited by the means. As described supra, the network entity 2302 may include the TX processor 2616, the RX processor 2670, and the controller/processor 2675. As such, in one configuration, the means may be the TX processor 2616, the RX processor 2670, and/or the controller/processor 2675 configured to perform the functions recited by the means.

Figure 24:
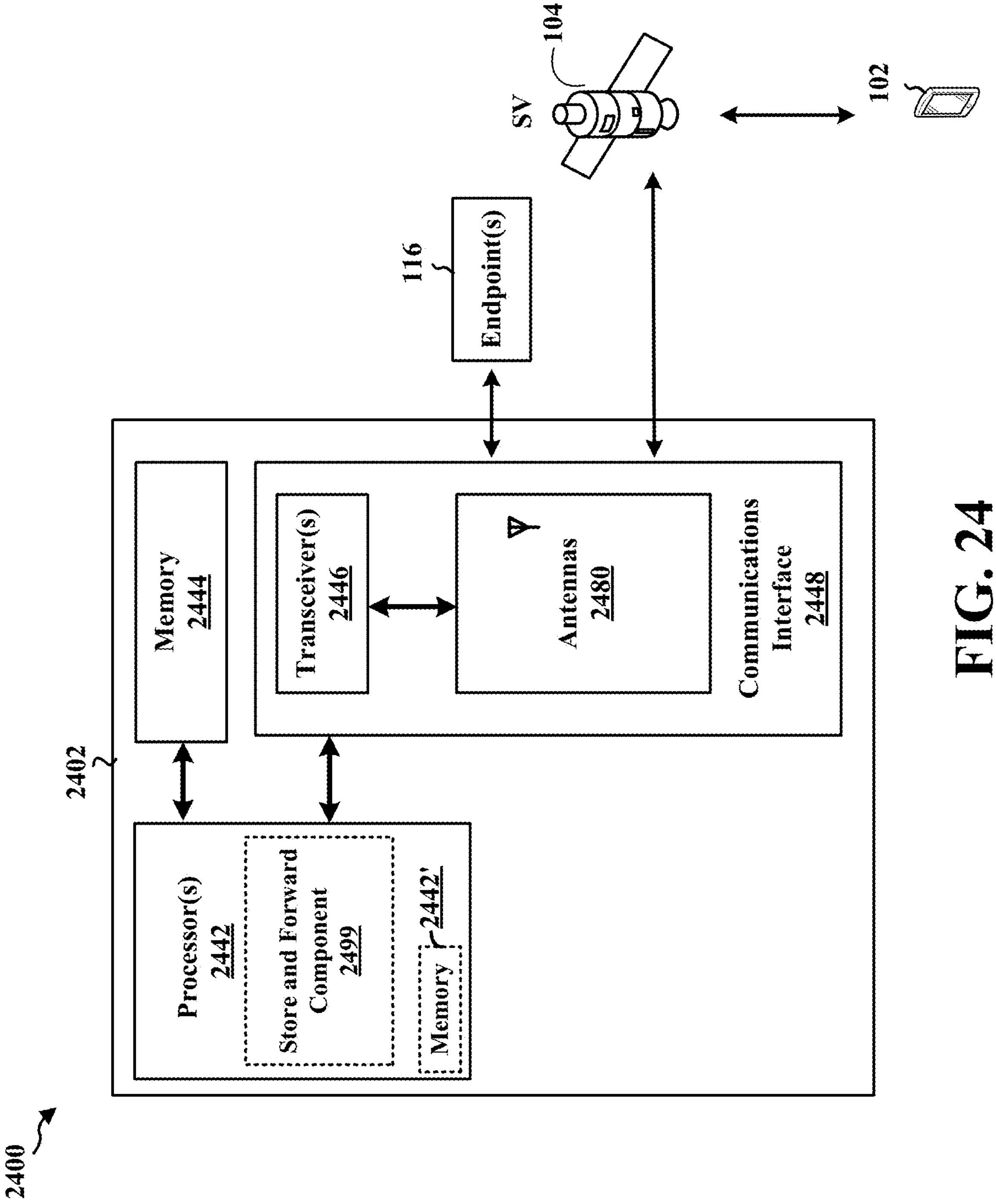
FIG. 24 is a diagram illustrating an example of a hardware implementation of a server configured to support UE access to a space vehicle.

FIG. 24 is a diagram 2400 illustrating an example of a hardware implementation for a network entity 2402. The network entity 2402 may be a server, a component of a server, or may implement server functionality. For example, the network entity 2402 may be configured to implement any of the aspects described for the ground based SFC 202 described in connection with any of FIGS. 2-14B, and/or performed by the server in connection with the flowcharts in any of FIGS. 17, 19, 20, 21, 29, 31, 32, and/or 33. The network entity 2402 may include at least one processor 2442, which may include on-chip memory 2442'. In some aspects, the network entity 2402 may further include additional memory modules 2444 and a communications interface 2448 for exchanging communication with one or more SVs 104 and with one or more endpoints 116. In some aspects, the communications interface 2448 may include one or more transceivers 2446, antennas 2480. The network entity 2402 may be configured to communicate with an SV 104, e.g., via a feeder link, and with one or more endpoints 116, as described in connection with any of FIGS. 2-14B and/or any of FIGS. 17, 19, 20, 21, 29, 31, 32, and/or 33. The on-chip memory 2442' and the additional memory modules 2444 may each be considered a computer-readable medium/memory. Each computer-readable medium/memory may be non-transitory. The processor(s) 2442 are responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, in some aspects, the store and forward component 2499 may be configured to receive MO data from an SV with a feeder link to the server, the MO data intended for at least one remote endpoint and originating from a UE at a time when the SV did not have the feeder link with the server, wherein the network entity 2402 is configured to receive the MO data independent of registration and de-registration assistance to register the UE with the SV and later de-register the UE from the SV, and forward the MO data to the at least one remote endpoint via a network. In some aspects, the MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the network entity 2402 may be configured to access the network using an option (a), an option (b), or an option (c), where: for the option (a), the server is configured to attach as an NTN gateway to the network and the network comprises a RAN and a CN for a wireless access type; for the option (b), the server is configured to attach as a base station to the network and the network comprises the CN for the wireless access type; and for the option (c), the server comprises or is part of the network. In some aspects, the network entity 2402 may include a UE proxy function for the UE, wherein the UE proxy function is configured to mimic a behavior of the UE from a first perspective of the at least one remote endpoint and a second perspective of the network, where the MO data is received from the SV by the UE proxy function, wherein the network entity is configured to forward the MO data to the at least one remote endpoint are configured to forward the MO data from the UE proxy function. In some aspects, to mimic the behavior of the UE from the perspective of the at least one remote endpoint, the network entity 2402 may be configured to send at least one of: a pre-configured message to the at least one remote endpoint at an application level; a response to the at least one remote endpoint at a transport level; or both of these. In some aspects, to mimic the behavior of the UE from the perspective of the network, the network entity 2402 may be configured to perform a NAS Registration of the UE with the network for the option (a) or the option (b) when the wireless access type is 5G NR; or a NAS Attach of the UE with the network for the option (a) or the option (b) when the wireless access type is 4G LTE. In some aspects, to mimic the behavior of the UE from the perspective of the network, the network entity 2402 may be further configured to keep the UE in a permanent Connected state from the perspective of the network. In some aspects, the network entity 2402 may be further configured to receive MT data via the network, the MT data originating from the at least one remote endpoint; store the MT data; and send the MT data to a second SV using a second feeder link, for forwarding to the UE using a second service link at a later time. The MT data may include at least one of: an MT SMS message, media data for an SIP, where the media data includes at least one of voice, text or video; MT data transported using non-IP, IP, UDP/IP TCP/IP; an Internet query response; an Email; or some combination of these.

In some aspects, the network entity 2402, e.g., the store and forward component 2499, may be configured to receive an MO data set from an SV having a feeder link to the server, the MO data set comprising MO data intended for at least one remote endpoint; and provide the MO data set to an other entity for unpackaging of the MO data set into the MO data; wherein the MO data set originated from a UE at a time when the ground based server did not have the feeder link with the SV, and the MO data set is received independent of providing registration and de-registration assistance to register the UE with the SV and later de-register the UE from the SV. In some aspects, the MO data set may be based on 4G LTE, 5G NR or a future 6G standard. In some aspects, the MO data set may include a single MO data set includes different types of the MO data and control information identifying the different types of the MO data, wherein to unpackage the single MO data set into the MO data by the other entity, the network entity 2402 is configured to identify the different types of the MO data in the single MO data set by the other entity based on the control information; and separate the different types of the MO data by the other entity. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the MO data set comprises a bit sequence or an octet sequence. In some aspects, the other entity is the ground based server, and the network entity 2402 may be further configured to provide the MO data to the at least one remote endpoint by sending the MO data to the at least one remote endpoint via a ground based network. In some aspects, the network entity 2402 may be configured to access the ground based network using an option (a), an option (b), or an option (c), wherein: for the option (a), the ground based server attaches as an NTN gateway to the ground based network and the ground based network comprises a RAN and a CN for a wireless access type; for the option (b), the ground based server attaches as a base station to the ground based network and the ground based network comprises the CN for the wireless access type; and for the option (c), the ground based server comprises or is part of the ground based network. In some aspects, the other entity comprises the at least one remote endpoint, wherein the at least one remote endpoint comprises a single remote endpoint, and the network entity 2402 may be further configured to forward the MO data set to the single endpoint via the network. The network entity 2402 may be further configured to obtain an MT data set, the MT data set comprising MT data, the MT data originating from the at least one remote endpoint; store the MT data set; and send the MT data set to a second SV using a second feeder link for forwarding the MT data set to the UE using a second service link at a later time. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the network entity 2402 may be configured to receive the MT data from the at least one remote endpoint via a ground based network, and package the MT data into the MT data set. In some aspects, the network entity 2402 may be configured to receive the MT data set in a packaged form from the at least one remote endpoint via a ground based network, wherein the at least one remote endpoint comprises a single remote endpoint. The network entity 2402 may be further configured to receive a second MO data set from a second SV, the second SV having a second feeder link to the server, the second MO data set comprising second MO data intended for the at least one remote endpoint; and provide the second MO data set to the other entity for unpackaging the second MO data set into the second MO data, for providing the second MO data to the at least one remote endpoint.

In some aspects, the network entity, e.g., the store and forward component 2499, may be configured to enable security for wireless access by a UE to an SV in a store and forward mode. For example, the network entity 2402, e.g., the store and forward component 2499, may be configured to send a key identity (Kid) to a second entity for the second entity to determine a substitute primary key (K*) for the UE based on the Kid and a primary key (K) for the UE based on the K configured in the second entity; and perform authentication and ciphering key determination based on the K* to enable secure transfer of data between the UE and at least one remote endpoint via the SV, wherein the K* and the Kid are configured in the first entity, wherein the secure transfer of data is between the UE that accesses the SV using a service link when the SV does not have a feeder link, wherein UE registration with the SV is a part of access to the SV. In some aspects, the network entity 2402, e.g., the store and forward component 2499, may be configured to send the Kid to enable the second entity to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the secure transfer of data may be via the service link that supports the wireless access to the SV using 4G LTE, 5G NR or a future 6G standard, wherein the SV comprises RAN and CN. In some aspects, when the service link supports the 5G NR, the UE registration with the SV comprises a NAS registration of the UE with the SV, wherein when the service link supports the 4G LTE, the UE registration with the SV comprises a NAS attach of the UE with the SV. In some aspects, the SV may further comprise an IMS, wherein the UE registration with the SV comprises an IMS Registration of the UE with the SV. In some aspects, the secure transfer of data may include MO data from the UE that is intended for the at least one remote endpoint via the SV to be forwarded, at a later time when the SV later has the feeder link to a ground based network, wherein the secure transfer of data is further via a server, that registers the UE with the ground based network. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the first entity may comprise a UE proxy function of the server, where the second entity is a UDM or HSS in an HPLMN for the UE, and the network entity 2402, e.g., the store and forward component 2499, may be configured to perform the authentication and the ciphering key determination as part of registering the UE with the ground based network. In some aspects, the network entity 2402, e.g., the store and forward component 2499, may be configured to access the ground based network using an option (a), an option (b) or an option (c), wherein: for the option (a), the server is configured to attach as an NTN gateway to the ground based network and the ground based network comprises a RAN and a CN for a wireless access type; for the option (b), the server is configured to attach as a base station to the ground based network and the ground based network comprises the CN for the wireless access type; and for the option (c), the server comprises, or is part of, the ground based network. In some aspects, the server includes the UE proxy function for the UE, wherein the UE proxy function is configured to mimic a behavior of the UE from a first perspective of the at least one remote endpoint and a second perspective of the ground based network, wherein the UE proxy function receives the MO data from the SV, wherein the UE proxy function forwards the MO data to the at least one remote endpoint via the ground based network. In some aspects, the network entity 2402, e.g., the store and forward component 2499, may be configured to mimic the behavior of the UE from the first perspective of the at least one remote endpoint by the UE proxy function and send by the UE proxy function at least one of: a pre-configured message to the at least one remote endpoint at an application level; a response to the at least one remote endpoint at a transport level; or both of these. In some aspects, the network entity 2402, e.g., the store and forward component 2499, may be configured to mimic the behavior of the UE from the second perspective of the ground based network by the UE proxy function including to register the UE with the ground based network, wherein the UE registration with the ground based network comprises performance, by the UE proxy function, one of: an NAS registration of the UE with the ground based network when the wireless access type is 5G NR; a NAS attach of the UE with the ground based network when the wireless access type is 4G LTE; or an IMS registration of the UE with the ground based network. The network entity may further include means for obtaining the Kid and the K* from one of: an O&M server, as a configuration from the O&M server indicating the Kid and the K* to the UE proxy function or the server; the SV, as a transfer of the Kid and the K* to the UE proxy function when the SV has the feeder link to the ground based network; or the UDM or the HSS in the HPLMN for the UE, wherein the UE proxy function receives the Kid and the K* from the UDM or the HSS via the ground based network as part of the UE registration with the ground based network.

The store and forward component 2499, and/or another component of the network entity 2402, may be configured to perform, or cause the network entity to perform, any of the aspects performed by the SFC 202, as described in connection with any of FIGS. 2-14B, or performed by the server in the flowchart described in connection with the flowcharts in any of FIGS. 17, 19, 20, 21, 29, 31, 32, and/or 33. The store and forward component 2499 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

The network entity 2402 may include a variety of components configured for various functions. In some configurations, the network entity 2402 may include means for receiving MO data from an SV with a feeder link to the server, the MO data intended for at least one remote endpoint and originating from a UE at a time when the SV did not have the feeder link with the server, wherein the MO data is received independent of providing registration and de-registration assistance to register the UE with the SV and later de-register the UE from the SV, and means for forwarding the MO data to the at least one remote endpoint via a network. In some aspects, the MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the network entity 2402 may include means for accessing the network using an option (a), an option (b), or an option (c), where: for the option (a), the server is configured to attach as an NTN gateway to the network and the network comprises a RAN and a CN for a wireless access type; for the option (b), the server is configured to attach as a base station to the network and the network comprises the CN for the wireless access type; and for the option (c), the server comprises or is part of the network. In some aspects, the network entity 2402 may include a UE proxy function for the UE, wherein the UE proxy function is configured to mimic a behavior of the UE from a first perspective of the at least one remote endpoint and a second perspective of the network, where the MO data is received from the SV by the UE proxy function, wherein the means for forwarding the MO data to the at least one remote endpoint are configured to forward the MO data from the UE proxy function. In some aspects, to mimic the behavior of the UE from the perspective of the at least one remote endpoint, the means for providing the UE proxy function may be configured to send at least one of: a pre-configured message to the at least one remote endpoint at an application level; a response to the at least one remote endpoint at a transport level; or both of these. In some aspects, to mimic the behavior of the UE from the perspective of the network, the means for providing the UE proxy function may be configured to perform a NAS Registration of the UE with the network for the option (a) or the option (b) when the wireless access type is 5G NR; or a NAS Attach of the UE with the network for the option (a) or the option (b) when the wireless access type is 4G LTE. In some aspects, to mimic the behavior of the UE from the perspective of the network, the means for providing the UE proxy function may be further configured to keep the UE in a permanent Connected state from the perspective of the network. In some aspects, the network entity 2402 may further include means for receiving MT data via the network, the MT data originating from the at least one remote endpoint; means for storing the MT data; and means for sending the MT data to a second SV using a second feeder link, for forwarding to the UE using a second service link at a later time. The MT data may include at least one of: an MT SMS message, media data for an SIP, where the media data includes at least one of voice, text or video; MT data transported using non-IP, IP, UDP/IP TCP/IP; an Internet query response; an Email; or some combination of these.

In some configurations, the network entity 2402 may include means for receiving a MO data set from an SV having a feeder link to the server, the MO data set comprising MO data intended for at least one remote endpoint; and means for providing the MO data set to an other entity for unpackaging of the MO data set into the MO data; wherein the MO data set originated from a UE at a time when the ground based server did not have the feeder link with the SV, and the MO data set is received independent of providing registration and de-registration assistance to register the UE with the SV and later de-register the UE from the SV. In some aspects, the MO data set is based on 4G LTE, 5G NR or a future 6G standard. In some aspects, the MO data set includes a single MO data set includes different types of the MO data and control information identifying the different types of the MO data, wherein unpackaging the single MO data set into the MO data by the other entity comprises: means for identifying the different types of the MO data in the single MO data set by the other entity based on the control information; and means for separating the different types of the MO data by the other entity. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the MO data set comprises a bit sequence or an octet sequence. In some aspects, the other entity is the ground based server, and the network entity 2402 further includes means for providing the MO data to the at least one remote endpoint by sending the MO data to the at least one remote endpoint via a ground based network. In some aspects, the means for accessing the ground based network using an option (a), an option (b), or an option (c), wherein: for the option (a), the ground based server attaches as an NTN gateway to the ground based network and the ground based network comprises a RAN and a CN for a wireless access type; for the option (b), the ground based server attaches as a base station to the ground based network and the ground based network comprises the CN for the wireless access type; and for the option (c), the ground based server comprises or is part of the ground based network. In some aspects, the other entity comprises the at least one remote endpoint, wherein the at least one remote endpoint comprises a single remote endpoint, and the network entity 2402 further includes means for forwarding the MO data set to the single endpoint via the network. The network entity 2402 may further include means for obtaining an MT data set, the MT data set comprising MT data, the MT data originating from the at least one remote endpoint; means for storing the MT data set; and means for sending the MT data set to a second SV using a second feeder link for forwarding the MT data set to the UE using a second service link at a later time. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the means for receiving may receive the MT data from the at least one remote endpoint via a ground based network, and the network entity may include means for packaging the MT data into the MT data set. In some aspects, the means for receiving may receive the MT data set in a packaged form from the at least one remote endpoint via a ground based network, wherein the at least one remote endpoint comprises a single remote endpoint. The network entity 2402 may further include means for receiving a second MO data set from a second SV, the second SV having a second feeder link to the server, the second MO data set comprising second MO data intended for the at least one remote endpoint; and means for providing the second MO data set to the other entity for unpackaging the second MO data set into the second MO data, for providing the second MO data to the at least one remote endpoint.

In some aspects, the network entity 2402 may include means to enable security, performed by a first entity, for wireless access by a UE to an SV in a store and forward mode. For example, the network entity may include means for sending a key identity (Kid) to a second entity for the second entity to determine a substitute primary key (K*) for the UE based on the Kid and a primary key (K) for the UE based on the K configured in the second entity; and means for performing authentication and ciphering key determination based on the K* to enable secure transfer of data between the UE and at least one remote endpoint via the SV, wherein the K* and the Kid are configured in the first entity, wherein the secure transfer of data is between the UE that accesses the SV using a service link when the SV does not have a feeder link, wherein UE registration with the SV is a part of access to the SV. In some aspects, the means for sending may be configured to send the Kid to enable the second entity to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the secure transfer of data may be via the service link that supports the wireless access to the SV using 4G LTE, 5G NR or a future 6G standard, wherein the SV comprises RAN and CN. In some aspects, when the service link supports the 5G NR, the UE registration with the SV comprises a NAS registration of the UE with the SV, wherein when the service link supports the 4G LTE, the UE registration with the SV comprises a NAS attach of the UE with the SV. In some aspects, the SV may further comprise an IMS, wherein the UE registration with the SV comprises an IMS Registration of the UE with the SV. In some aspects, the secure transfer of data may include MO data from the UE that is intended for the at least one remote endpoint via the SV to be forwarded, at a later time when the SV later has the feeder link to a ground based network, wherein the secure transfer of data is further via a server, that registers the UE with the ground based network. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the first entity may comprise a UE proxy function of the server, where the second entity is a UDM or HSS in an HPLMN for the UE, and further comprising performing the authentication and the ciphering key determination as part of registering the UE with the ground based network. In some aspects, the server includes means for accesses the ground based network using an option (a), an option (b) or an option (c), wherein: for the option (a), the server includes means for attaches as an NTN gateway to the ground based network and the ground based network comprises a RAN and a CN for a wireless access type; for the option (b), the server includes means for attaching as a base station to the ground based network and the ground based network comprises the CN for the wireless access type; and for the option (c), the server comprises, or is part of, the ground based network. In some aspects, the server includes the UE proxy function for the UE, wherein the UE proxy function mimics a behavior of the UE from a first perspective of the at least one remote endpoint and a second perspective of the ground based network, wherein the UE proxy function receives the MO data from the SV, wherein the UE proxy function forwards the MO data to the at least one remote endpoint via the ground based network. In some aspects, the means for mimicking the behavior of the UE from the first perspective of the at least one remote endpoint by the UE proxy function are configured to send by the UE proxy function at least one of: a pre-configured message to the at least one remote endpoint at an application level; a response to the at least one remote endpoint at a transport level; or both of these. In some aspects, the means for mimicking the behavior of the UE from the second perspective of the ground based network by the UE proxy function comprises registering the UE with the ground based network, wherein the UE registration with the ground based network comprises performing, by the UE proxy function, one of: an NAS registration of the UE with the ground based network when the wireless access type is 5G NR; a NAS attach of the UE with the ground based network when the wireless access type is 4G LTE; or an IMS registration of the UE with the ground based network. The network entity may further include means for obtaining the Kid and the K* from one of: an O&M server, as a configuration from the O&M server indicating the Kid and the K* to the UE proxy function or the server; the SV, as a transfer of the Kid and the K* to the UE proxy function when the SV has the feeder link to the ground based network; or the UDM or the HSS in the HPLMN for the UE, wherein the UE proxy function receives the Kid and the K* from the UDM or the HSS via the ground based network as part of the UE registration with the ground based network.

The network entity 2402 may further include means for performing any of the aspects performed by the SFC 202, as described in connection with any of FIGS. 2-14B, or performed by the server in the flowchart described in connection with the flowcharts in any of FIGS. 17, 19, 20, 21, 29, 31, 32, and/or 33. The means may be the store and forward component 2499 of the network entity 2402 configured to perform the functions recited by the means. As described supra, the network entity 2402 may include a TX processor, RX processor and/or controller/processer, similar to those described in connection with TX processor 2616, the RX processor 2670, and the controller/processor 2675. As such, in one configuration, the means may include one or more such processors configured to perform the functions recited by the means.

Figure 25:
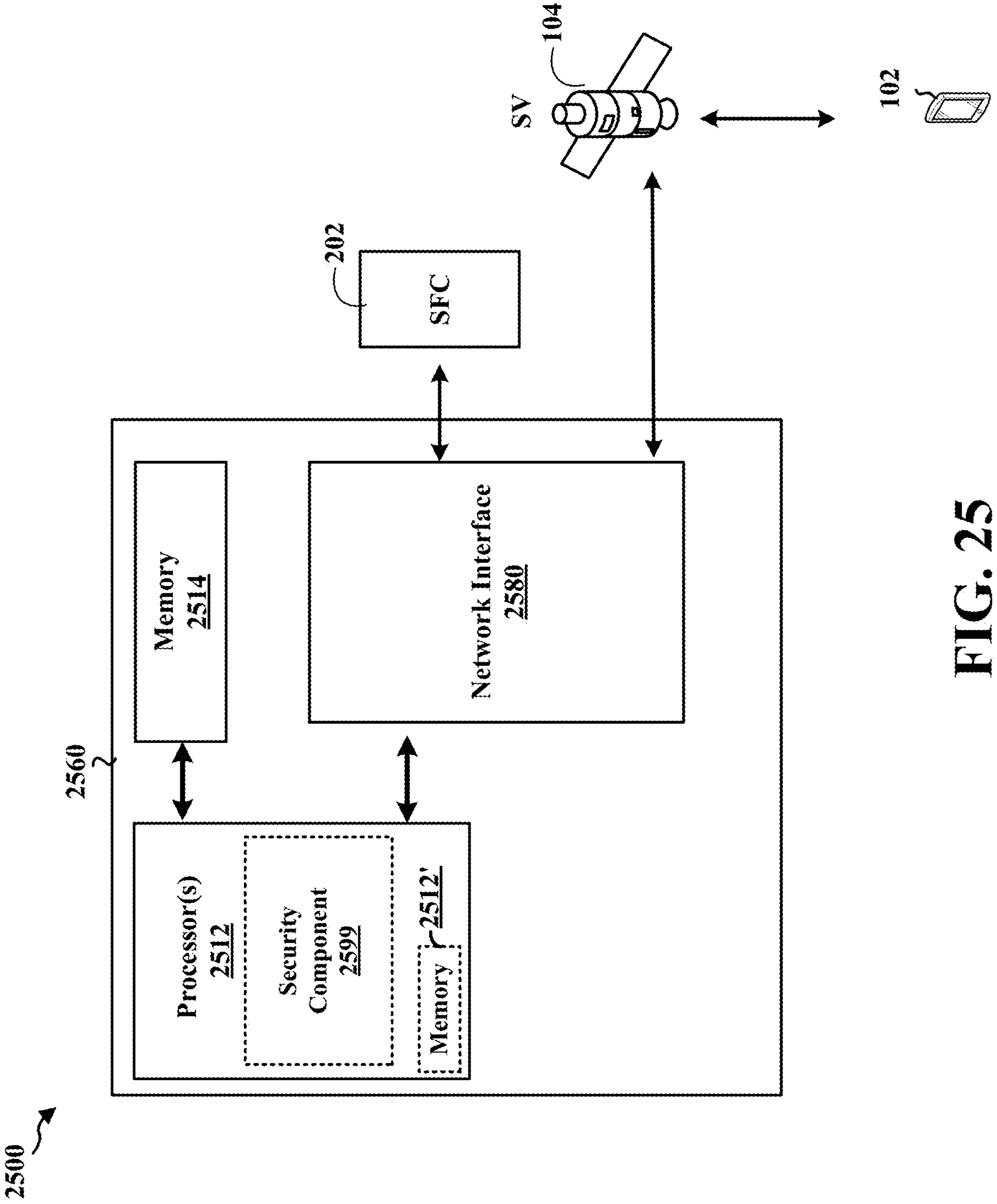
FIG. 25 is a diagram illustrating an example of a hardware implementation of an entity in a PLMN such as a UDM or HSS.

FIG. 25 is a diagram 2500 illustrating an example of a hardware implementation for a network entity 2560. In one example, the network entity 2560 may be within a core network. In some aspects, the network entity 2560 may be a UDM in an HPLMN. In some aspects, the network entity 2560 may be an HSS in an HPLMN. The network entity 2560 may include at least one network processor 2512. The network processor(s) 2512 may include at least one on-chip memory 2512'. In some aspects, the network entity 2560 may further include additional memory modules 2514. The network entity 2560 communicates via the network interface 2580 directly (e.g., backhaul link) or indirectly (e.g., through a RIC) with the SV 104 and the SFC 202 to enable secure data transfer between the UE 102 and an end point via the SV 104 in a store and forward mode, e.g., as described in connection with any of FIGS. 1-14B and/or the flowchart in FIG. 21 and/or FIG. 32. The on-chip memory 2512' and the additional memory modules 2514 may each be considered a computer-readable medium/memory. Each computer-readable medium/memory may be non-transitory. The network processor(s) 2512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

In some aspects, the network entity 2560 may correspond to the second entity described in connection with FIG. 21 and/or FIG. 32. The network entity 2560 may be configured to enable security, performed by a second entity, for wireless access by a UE to an SV in a store and forward mode. As discussed supra, the security component 2599 may be configured to receive a key identity (Kid) from a first entity;

means for determining a substitute primary key (K*) for the UE based on the Kid and a primary key (K) for the UE, the K configured in the second entity; and perform authentication and ciphering key determination based on the K* to enable secure data transfer between the UE and at least one remote endpoint via the SV, where the K* and the Kid are configured in the first entity, where the secure data transfer is between the UE that accesses the SV using a service link when the SV does not have a feeder link, and where UE registration with the SV is a part of access to the SV. In some aspects, the security component 2599, or another component of the network entity 2560, may be configured to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the service link supports the wireless access to the SV using 4G LTE, 5G NR or a future 6G standard, wherein the SV comprises a RAN and CN. When the service link supports the 5G NR, the UE registration with the SV may include a NAS registration of the UE with the SV, and when the service link supports the 4G LTE, the UE registration with the SV may include a NAS attach of the UE with the SV. In some aspects, the SV further includes an IMS, where the UE registration comprises an IMS registration of the UE with the SV. For example, the secure transfer of data that is enabled may be for a UE that sends MO data intended for the at least one remote endpoint to the SV for storage and forwarding to a ground based network via a server when the SV later has the feeder link to the ground based network, where the UE registers with the ground based network via the server. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the second entity is a UDM or an HSS in an HPLMN for the UE, and the first entity is a UE proxy function. In such aspects, the security component 2599, or another component of the network entity 2560, (e.g., as the UDM or the HSS) may be configured to perform the authentication and the ciphering key determination as part of registering the UE with the ground based network via the server. The Kid and the K* may originate from one of: an O&M server, as a configuration of the Kid and the K*; the SV; or the UDM or the HSS in the HPLMN for the UE, wherein the UDM or HSS sends the Kid and the K* to the UE proxy function via the ground based network as part of registering the UE with the ground based network by the server. The security component 2599 may be within the network processor(s) 2512. The security component 2599, and/or another component of the network entity 2560, may be further configured to perform any of the aspects performed by the UDM or HSS in any of FIGS. 1-14B and/or in the flowchart in FIG. 21 and/or FIG. 32. The security component 2599 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

The network entity 2560 may include a variety of components configured for various functions. some aspects, the network entity 2560 may correspond to the second entity described in connection with FIG. 21 and/or FIG. 33. The network entity 2560 may include means for enabling security, performed by a second entity, for wireless access by a UE to an SV in a store and forward mode. The network entity 2560 may include means for receiving a key identity (Kid) from a first entity; means for determining a substitute primary key (K*) for the UE based on the Kid and a primary key (K) for the UE, the K configured in the second entity; and means for performing authentication and ciphering key determination based on the K* to enable secure data transfer between the UE and at least one remote endpoint via the SV, wherein the K* and the Kid are configured in the first entity, wherein the secure data transfer is between the UE that accesses the SV using a service link when the SV does not have a feeder link, wherein UE registration with the SV is a part of access to the SV. In some aspects, the means for determining are configured to determine the K* based on the Kid and the K for the UE by ciphering the Kid using the K. In some aspects, the Kid includes one or more of: pseudo-random or random bits or octets; a date and/or a time; and either a duration or a second date and/or a time. In some aspects, the service link supports the wireless access to the SV using 4G LTE, 5G NR or a future 6G standard, wherein the SV comprises a RAN and CN. When the service link supports the 5G NR, the UE registration with the SV may include a NAS registration of the UE with the SV, and when the service link supports the 4G LTE, the UE registration with the SV may include a NAS attach of the UE with the SV. In some aspects, the SV further includes an IMS, where the UE registration comprises an IMS registration of the UE with the SV. For example, the secure transfer of data that is enabled may be for a UE that sends MO data intended for the at least one remote endpoint to the SV for storage and forwarding to a ground based network via a server when the SV later has the feeder link to the ground based network, wherein the UE registers with the ground based network via the server. The MO data may include at least one of: an MO SMS message; media data for an SIP, wherein the media data includes at least one of voice, text or video; MO data transported using non-IP, IP, UDP/IP or TCP/IP; an Internet query; an Email query; or some combination of these. In some aspects, the secure transfer of the data may include MT data from the at least one remote endpoint via a ground based network and the SV. The MT data may include at least one of: an MT SMS message, media data for an SIP, where the media data includes at least one of voice, text or video; MT data transported using non-IP, IP, UDP/IP TCP/IP; an Internet query response; an Email; or some combination of these. In some aspects, the second entity is a UDM or an HSS in an HPLMN for the UE, and the first entity is a UE proxy function. In such aspects, the UDM or the HSS may include means for performing the authentication and the ciphering key determination as part of registering the UE with the ground based network via the server. The Kid and the K* may originate from one of: an O&M server, as a configuration of the Kid and the K*; the SV; or the UDM or the HSS in the HPLMN for the UE, wherein the UDM or HSS sends the Kid and the K* to the UE proxy function via the ground based network as part of registering the UE with the ground based network by the server. The network entity 2560 may further include means for performing any of the aspects performed by the UDM or HSS in any of FIGS. 1-14B and/or in the flowchart in FIG. 21 and/or FIG. 33. The means may be the security component 2599 of the network entity 2560 configured to perform the functions recited by the means.

Figure 26:
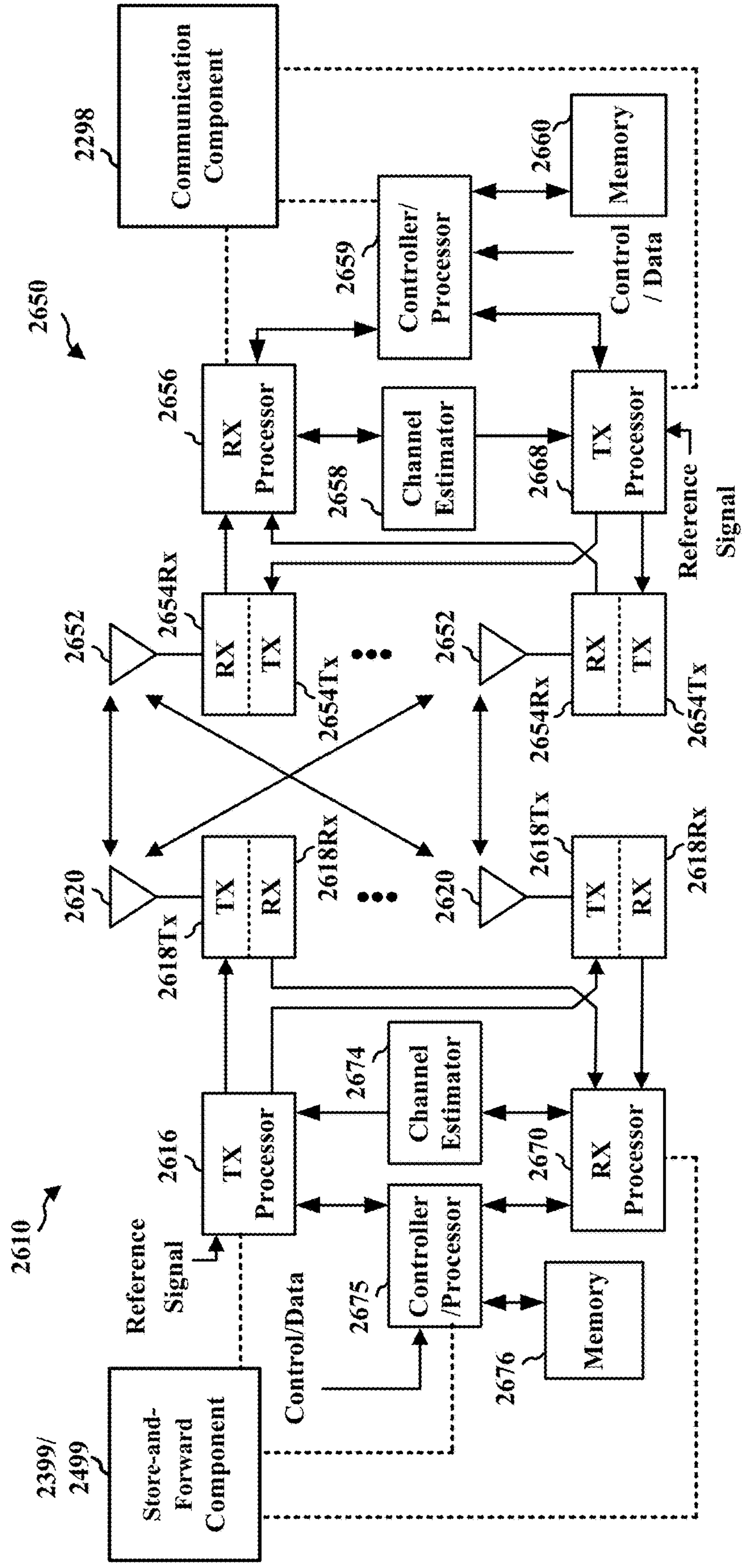
FIG. 26 is a block diagram of a network entity in communication with a UE in an access network.

FIG. 26 is a block diagram of a network entity 2610 in communication with a UE 2650 in an access network. In some aspects, the network entity 2610 may correspond to the SV 104. In some aspects, the network entity 2610 may correspond to a component of a ground based network, and the UE 2650 may communicate with the ground based network via an SV, e.g., as described in connection with FIGS. 1-14B or directly.

At the UE 2650, each receiver 2654Rx receives a signal through its respective antenna 2652. Each receiver 2654Rx recovers information modulated onto an RF carrier and provides the information to the receive (RX) processor 2656. The controller/processor 2659 can be associated with at least one memory 2660 that stores program codes and data. The at least one memory 2660 may be referred to as a computer-readable medium. In the UL, the controller/processor 2659 provides demultiplexing between transport and logical channels, packet reassembly, deciphering, header decompression, and control signal processing to recover IP packets. The controller/processor 2659 may also be responsible for error detection using an ACK and/or NACK protocol to support HARQ operations.

The UL transmission is processed at the network entity 2610 in a manner similar to that described in connection with the receiver function at the UE 2650. Each receiver 2618Rx receives a signal through its respective antenna 2620. Each receiver 2618Rx recovers information modulated onto an RF carrier and provides the information to a RX processor 2670.

The controller/processor 2675 can be associated with at least one memory 2676 that stores program codes and data. The at least one memory 2676 may be referred to as a computer-readable medium. In the UL, the controller/processor 2675 provides demultiplexing between transport and logical channels, packet reassembly, deciphering, header decompression, control signal processing to recover IP packets. The controller/processor 2675 is also responsible for error detection using an ACK and/or NACK protocol to support HARQ operations.

In some aspects, DL Internet protocol (IP) packets may be provided to a controller/processor 2675. The controller/processor 2675 may implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 2675 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 2616 and the receive (RX) processor 2670 may implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 2616 may handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 2674 may be used to determine the coding and modulation scheme, as well as for spatial processing. The channel estimate may be derived from a reference signal and/or channel condition feedback transmitted by the UE 2650. Each spatial stream may then be provided to a different antenna 2620 via a separate transmitter 2618Tx. Each transmitter 2618Tx may modulate a radio frequency (RF) carrier with a respective spatial stream for transmission.

The TX processor 2668 and the RX processor 2656 implement layer 1 functionality associated with various signal processing functions. The RX processor 2656 may perform spatial processing on the information to recover any spatial streams destined for the UE 2650. If multiple spatial streams are destined for the UE 2650, they may be combined by the RX processor 2656 into a single OFDM symbol stream. The RX processor 2656 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the network entity 2610. These soft decisions may be based on channel estimates computed by the channel estimator 2658. The soft decisions are then decoded and deinterleaved to recover the data and control signals that were originally transmitted by the network entity 2610 on the physical channel. The data and control signals are then provided to the controller/processor 2659, which implements layer 3 and layer 2 functionality.

Similar to the functionality described in connection with the DL transmission by the network entity 2610, the controller/processor 2659 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 2658 from a reference signal or feedback transmitted by the network entity 2610 may be used by the TX processor 2668 to select the appropriate coding and modulation schemes, and to facilitate spatial processing. The spatial streams generated by the TX processor 2668 may be provided to different antenna 2652 via separate transmitters 2654Tx. Each transmitter 2654Tx may modulate an RF carrier with a respective spatial stream for transmission.

Figure 27:
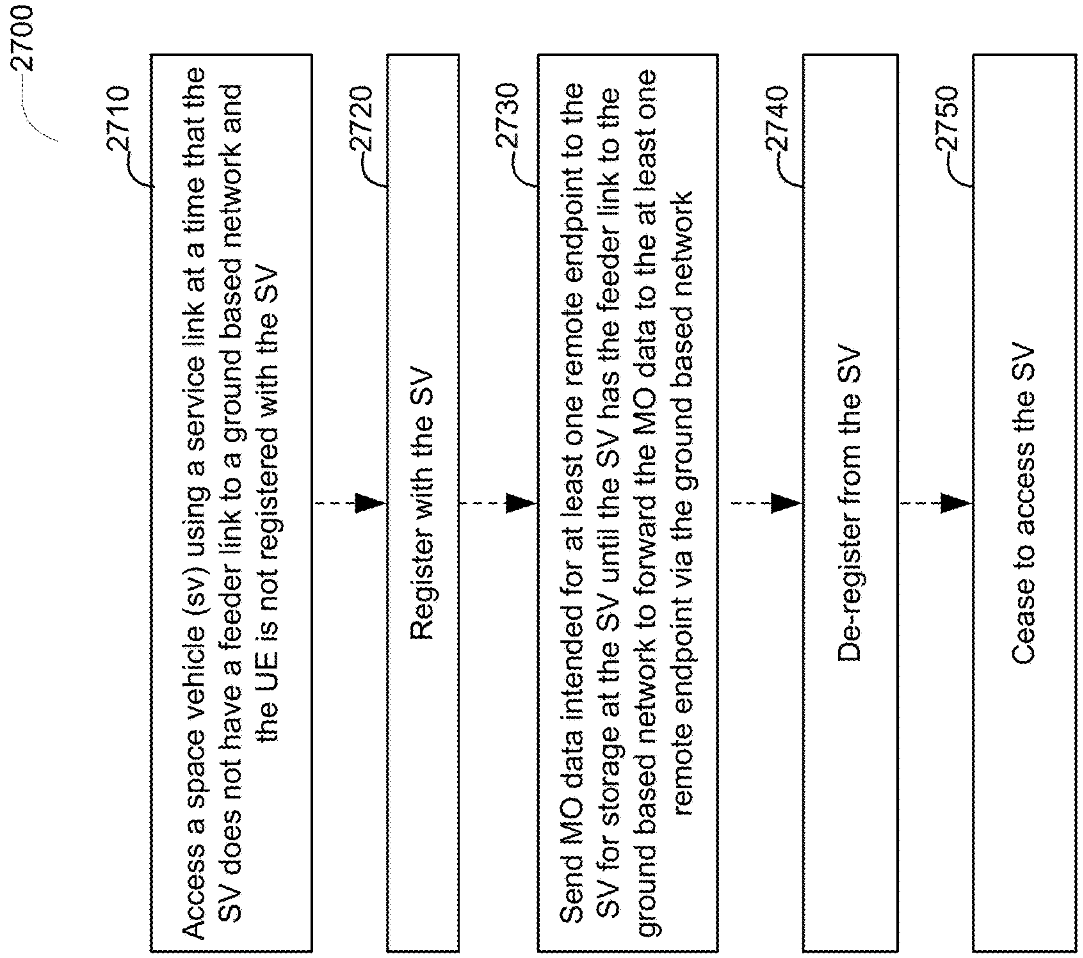
FIG. 27 is a flow diagram of a method of supporting wireless communication performed by a user equipment.

FIG. 27 is a flow diagram of an example method 2700 of supporting wireless communication performed by a user equipment (e.g. UE 102, apparatus 2204). Example components of a UE are provided with respect to FIG. 22. The method may improve coverage for the UE by enabling the UE to send and/or receive communication via an SV when the SV may have intermittent feeder link connection to a ground based network.

At block 2710, the UE accesses a space vehicle (e.g. an SV 104) using a service link, where the SV does not have a feeder link to a ground based network (e.g. PLMN 108) and where the UE is not registered with the SV. For example, the aspects described for stages 2 to 9 in FIG. 7 and stages 2 to 9 in FIG. 9 illustrate example aspects of a UE accessing an SV. As an example, the access may be performed, e.g., by the communication component 2298, the transceiver 2222 and/or the antennas 2280 of the apparatus 2204.

At block 2720, the UE registers with the SV. For example, stages 3 to 5 in FIG. 7 and stages 3 to 5 in FIG. 9 illustrate example aspects of a UE registering with an SV. As an example, the registration may be performed, e.g., by the communication component 2298, the transceiver 2222 and/or the antennas 2280 of the apparatus 2204.

At block 2730, the UE sends mobile originated (MO) data intended for at least one remote endpoint (e.g. a remote endpoint 116) to the SV for storage at the SV until the SV has the feeder link to the ground based network to forward the MO data to the at least one remote endpoint via the ground based network. FIG. 7 illustrates an example of a UE transmitting MO data to an SV at stages 11 to 23. As an example, the data may be sent or transmitted, e.g., by the communication component 2298, the transceiver 2222 and/or the antennas 2280 of the apparatus 2204.

At block 2740, the UE de-registers from the SV. FIG. 7 illustrates an example of de-registration at stage 25, and FIG. 9 illustrates an example of de-registration at stage 26. As an example, the de-registration may be performed, e.g., by the communication component 2298, the transceiver 2222 and/or the antennas 2280 of the apparatus 2204.

At block 2750, the UE ceases to access the SV. For example, after the UE ceases to access the SV, the SV later has the feeder link to the ground based network and forwards the MO data to the at least one remote endpoint via the network. FIG. 7 illustrates an example of cessation at stage 28, and FIGS. 8 and 9 illustrate an example of cessation at stage 29. For example, the cessation may be performed by the communication component 2298 of the apparatus 2204.

In some aspects, the service link supports wireless access to the SV using 4G LTE, 5G NR or a future 6G standard, where the SV comprises a RAN and a CN. e.g. as described for FIG. 2. The service link may support 5G NR, in which case registering with the SV may comprise performing a NAS registration with the SV and de-registering from the SV may comprise performing a NAS de-registration with the SV. The service link may alternatively, or additionally, support 4G LTE, in which case registering with the SV may comprise performing a NAS attach with the SV and de-registering from the SV may comprise performing a NAS detach with the SV. In some aspects, the registration/de-registration and/or attach/detach may be performed by the communication component 2298 of the apparatus 2204.

In some aspects, the UE may further receive a response from an endpoint proxy function, at the SV, for the at least one remote endpoint (e.g. endpoint proxy 240). For example, the response from the endpoint proxy function may mimic a behavior of the at least one remote endpoint from a perspective of the UE. The response may indicate that the endpoint proxy function will receive and store the MO data, e.g. as described for FIG. 7. In some aspects, receiving the response from the endpoint proxy function may be supported by the communication component 2298 of the apparatus 2204. As an example, the response mimicking the behavior of the at least one remote endpoint from the perspective of the UE may include at least one of: a pre-configured response to the UE at an application level; a response to the UE at a transport level (e.g., which may be referred to as a transport level response); or both of these, e.g. as described for FIG. 7.

In some aspects, the MO data comprises at least one of: an MO short message service (SMS) message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7.

In some aspects, the SV forwards the MO data to the at least one remote endpoint via the network by forwarding the MO data to a ground based server (e.g. SFC 202), where the server forwards the MO data to the at least one remote endpoint via the network, e.g. as described for FIG. 8. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 3 to 5 and FIG. 8. The server may include a UE proxy function for the UE (e.g. UE proxy function (e.g., 340)), where the UE proxy function mimics a behavior of the UE from a perspective of the at least one remote endpoint and a perspective of the network, where the UE proxy function receives the MO data from the SV, and where the UE proxy function forwards the MO data to the at least one remote endpoint, e.g. as described for FIG. 8. Mimicking the behavior of the UE from the perspective of the at least one remote endpoint may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network may comprise performing by the UE proxy function: a NAS registration of the UE with the network for option (a) or option (b) when the wireless access type is 5G NR; or a NAS attach of the UE with the network for option (a) or option (b) when the wireless access type is 4G LTE.

Mimicking the behavior of the UE from the perspective of the network may further comprise keeping by the UE proxy function the UE in a permanent Connected state from the perspective of the network.

In some aspects, the SV may be a first SV, the feeder link for the first SV may be a first feeder link, and the service link to the first SV may be a first service link. The UE may access a second SV at a later time (e.g. another SV 104) using a second service link, where the second SV does not have a second feeder link to the ground based network, and where the UE is not registered with the second SV, e.g. as described for FIG. 9. The UE may then: register with the second SV; receive mobile terminated (MT) data from the second SV, where the MT data comprises SV stored data that originated from the at least one remote endpoint; de-register from the second SV; and cease to access the second SV, e.g. as described for FIG. 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 9. The second SV may receive the MT data from a ground based server (e.g. SFC 202), where the server receives the MT data from the at least one remote endpoint via the network, e.g. as described for FIG. 9. The UE may send second MO data intended for at least one additional remote endpoint (e.g. a remote endpoint 116) to the second SV to be stored at the second SV and forwarded to the at least one remote endpoint when the second SV later has the second feeder link to the ground based network, e.g. as described for FIG. 9.

In some aspects, the UE may receive an indication in a broadcast received from the SV, where the indication indicates that the SV is operating in a store and forward mode. The UE may then access the SV using the service link at block 2710, based on the indication received from the SV, e.g., the indication indicating that the SV is operating in the store and forward mode. The UE may have a subscription to access the SV when the SV is operating in the store and forward mode, e.g. as described for FIG. 7.

The method may further include any of the aspects performed by a UE, as described in connection with any of FIGS. 1-14B.

Figure 28:
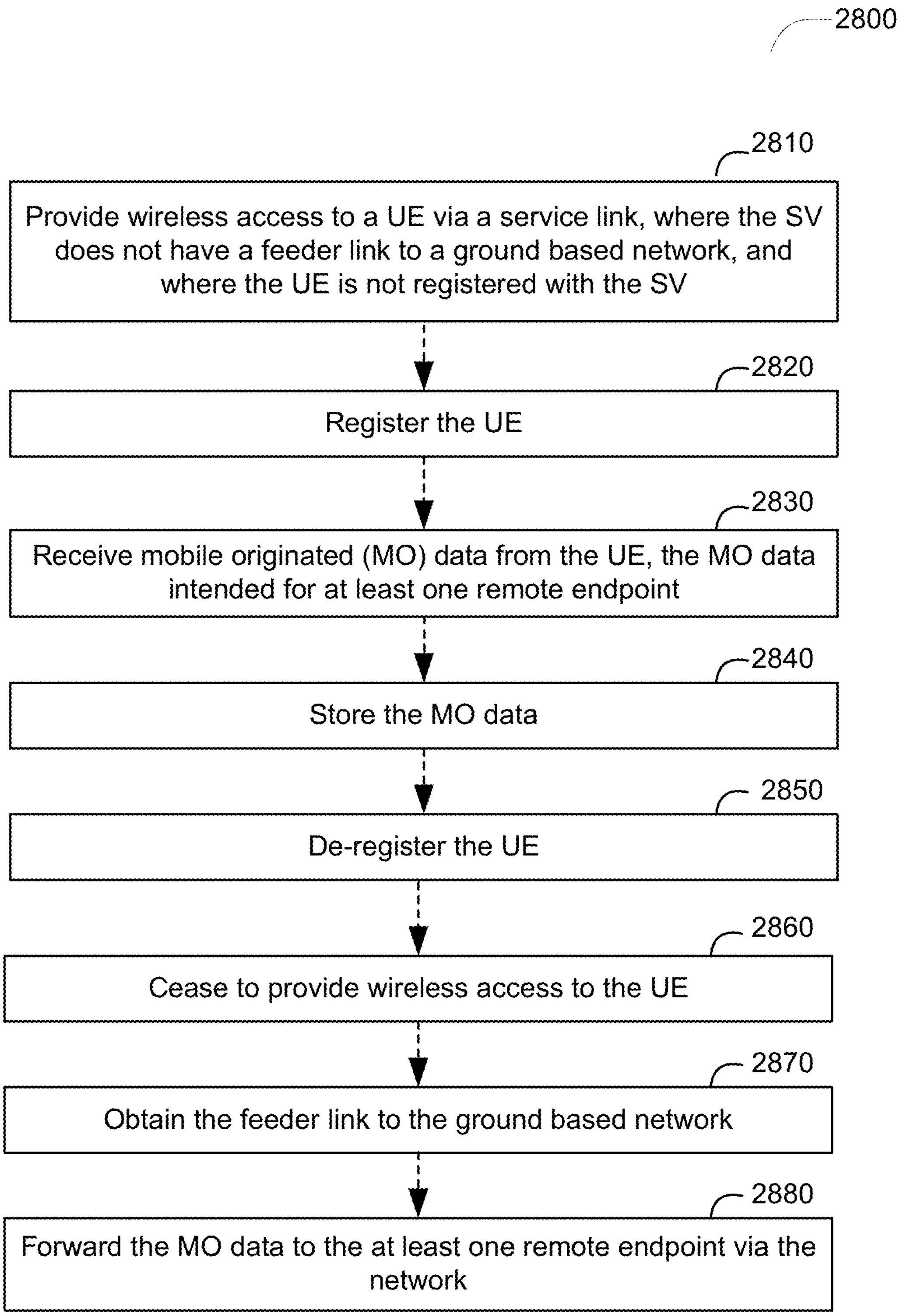
FIG. 28 is a flow diagram of a method of supporting wireless communication performed by a space vehicle.

FIG. 28 is a flow diagram of a method 2800 of supporting wireless communication performed by a space vehicle (e.g. an SV 104; network entity 2302). Example components of an SV are provided with respect to FIG. 23. The method may improve coverage provided to a UE by enabling the SV to receive and store communication when the SV does not have a feeder link connection to a ground based network in order to provide the communication to the ground based network at a later point at which the SV has a feeder link with the network.

At block 2810, the SV provides wireless access to a UE (e.g. a UE 102) via a service link, where the SV does not have a feeder link to a ground based network (e.g. a PLMN 108) and where the UE is not registered with the SV. FIGS. 7 and 9 illustrate examples of providing such access e.g. as described for stages 1 to 9 in FIG. 7 and stages 1 to 9 in FIG. 9. The provision of the access may be performed, e.g., by the store and forward component 2399, the communications interface 2348, the transceiver(s) 2346, and/or the antenna(s) 2380 of the network entity 2302 in FIG. 23.

At block 2820, the SV registers the UE. FIGS. 7 and 9 illustrate example aspects of registration, e.g. as described for stages 3 to 5 in FIG. 7 and stages 3 to 5 in FIG. 9. The registration may be performed, e.g., by the store and forward component 2399, the communications interface 2348, the transceiver(s) 2346, and/or the antenna(s) 2380 of the network entity 2302 in FIG. 23.

At block 2830, the SV receives mobile originated (MO) data from the UE, where the MO data is intended for at least one remote endpoint (e.g. a remote endpoint 116). FIG. 7 illustrates an example of reception of MO data from a UE, e.g. as described for stages 11 to 22 in FIG. 7. The reception may be performed, e.g., by the store and forward component 2399, the communications interface 2348, the transceiver(s) 2346, and/or the antenna(s) 2380 of the network entity 2302 in FIG. 23.

At block 2840, the SV stores the MO data. FIG. 7 illustrates an example of storage of MO data at the SV, e.g. as described for stages 13, 17 and 23 in FIG. 7. The storage may be performed, e.g., by the store and forward component 2399 of the network entity 2302 in FIG. 23.

At block 2850, the SV de-registers the UE. FIG. 7 and FIG. 9 illustrate example aspects of de-registration, e.g. as described for stage 25 in FIG. 7 and stage 26 in FIG. 9. The de-registration may be performed, e.g., by the store and forward component 2399, the communications interface 2348, the transceiver(s) 2346, and/or the antenna(s) 2380 of the network entity 2302 in FIG. 23.

At block 2860, the SV ceases to provide wireless access to the UE. FIG. 7 and FIG. 9 illustrate example aspects of an SV ceasing wireless access for a UE, e.g. as described for stage 28 in FIG. 7 and stage 29 in FIG. 9. The cessation of the access may be performed, e.g., by the store and forward component 2399 and/or the communications interface 2348 of the network entity 2302 in FIG. 23.

At block 2870, the SV obtains the feeder link to the ground based network. FIG. 8 illustrates example aspects of an SV obtaining a feeder link. The obtaining of the feeder link may be performed, e.g., by the store and forward component 2399, the communications interface 2348, the transceiver(s) 2346, and/or the antenna(s) 2380 of the network entity 2302 in FIG. 23.

At block 2880, the SV forwards the MO data to the at least one remote endpoint via the ground based network, e.g. as described in connection with the example in FIG. 8. The forwarding may be performed, e.g., by the store and forward component 2399, the communications interface 2348, the transceiver(s) 2346, and/or the antenna(s) 2380 of the network entity 2302 in FIG. 23.

In some aspects, the service link supports wireless access using 4G LTE, 5G NR or a future 6G standard, where the SV comprises a RAN and a CN, e.g. as described for FIGS. 2 and 7 to 9. When the service link supports 5G NR, registering the UE may comprise performing a NAS registration of the UE and de-registering the UE may comprise performing a NAS de-registration of the UE, e.g. as described for FIGS. 7 and 9. When the service link supports 4G LTE, registering the UE may comprise performing a NAS attach of the UE and de-registering the UE may comprise performing a NAS detach of the UE, e.g. as described above following the description of FIG. 14B.

In some aspects, the SV includes an endpoint proxy function (e.g. endpoint proxy 240) for the at least one remote endpoint, where the endpoint proxy function mimics a behavior of the at least one remote endpoint from a perspective of the UE, and where the endpoint proxy function receives and stores the MO data. Mimicking the behavior of the at least one remote endpoint from the perspective of the UE may include returning at least one of: a pre-configured response to the UE at an application level; a response to the UE at a transport level; or both of these, e.g. as described for FIG. 7.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7.

In some aspects, forwarding the MO data to the at least one remote endpoint via the ground based network may comprise forwarding the MO data to a ground based server (e.g. an SFC 202) for forwarding to the at least one remote endpoint via the ground based network, e.g. as described for FIG. 8. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6. The server may include a UE proxy function for the UE (e.g. UE proxy 340), where the UE proxy function mimics a behavior of the UE from a perspective of the at least one remote endpoint and from a perspective of the network, and the SV may send the MO data to the UE proxy function, where the UE proxy function may forward the MO data to the at least one remote endpoint, e.g. as described for FIG. 8. Mimicking the behavior of the UE from the perspective of the at least one remote endpoint may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network may comprise performing by the UE proxy function: a NAS Registration of the UE with the network for option (a) or option (b) when the wireless access type is 5G NR, e.g. as described for FIG. 8; or a NAS Attach of the UE with the network for option (a) or option (b) when the wireless access type is 4G LTE, e.g. as described above following the description of FIG. 14B. Mimicking the behavior of the UE from the perspective of the network may further comprise keeping by the UE proxy function the UE in a permanent Connected state from the perspective of the network, e.g. as described for FIG. 8.

In some aspects, the SV may: receive mobile terminated (MT) data via the network, where the MT data originates from the at least one remote endpoint; store the MT data; and send the MT data to the UE using the service link at a later time, e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these. The SV may receive the MT data from a ground based server (e.g. an SFC 202), where the MT data is originated from the at least one remote endpoint via the ground based network, e.g. as described for FIG. 8.

In some aspects, the SV broadcasts an indication to the UE that the SV is operating in a store and forward mode, where access is provided to the SV using the service link with the UE based on the indication broadcast by the SV that the SV is operating in the store and forward mode, e.g. as described for FIG. 7. The SV may have subscription information for the UE, where the subscription information for the UE permits the UE to access the SV when the SV is operating in the store and forward mode, e.g. as described for FIG. 7.

Figure 29:
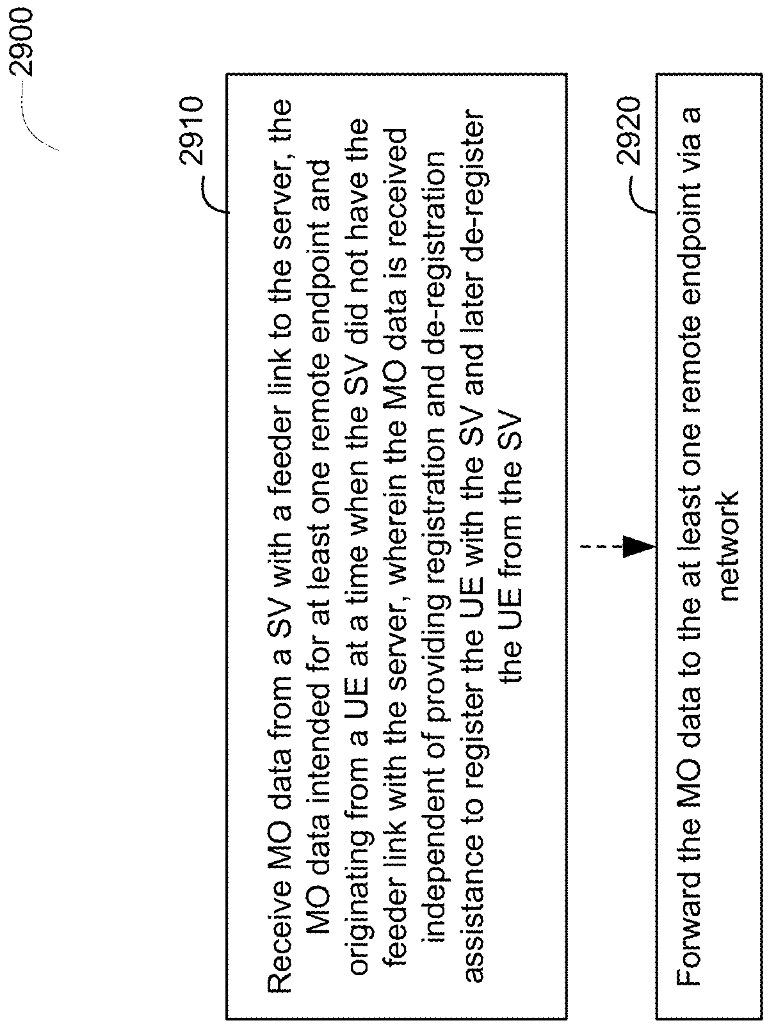
FIG. 29 is a flow diagram of a method of supporting wireless communication performed by a server.

FIG. 29 is a flow diagram of a method 2900 of supporting wireless communication performed by a server (e.g. an SFC 202; the network entity 2402). Example components of a server are provided with respect to FIG. 24. The method may improve communication with a UE via an SV that has an intermittent feeder link connection to a ground based network.

At block 2910, the server receives mobile originated (MO) data from a space vehicle (e.g. SV 104) with a feeder link to the server, where the MO data is intended for at least one remote endpoint (e.g. a remote endpoint 116) and originating from a user equipment (e.g. UE 102) at a time when the SV did not have the feeder link, and where the MO data is received independent of providing registration and de-registration assistance to register the UE registered with the SV and later de-register from the SV. FIGS. 7 and 8 illustrate example aspects of a server receiving MO data from an SV. The reception may be performed, e.g., by the store and forward component 2499, the communications interface 2448, the transceiver(s) 2446, and/or the antenna(s) 2480 of the network entity 2402 in FIG. 24.

At block 2920, the server forwards the MO data to the at least one remote endpoint via a network (e.g. a PLMN 108), e.g. as described for FIG. 8. The forwarding may be performed, e.g., by the store and forward component 2499, the communications interface 2448, the transceiver(s) 2446, and/or the antenna(s) 2480 of the network entity 2402 in FIG. 24.

In some aspects, the service link supports wireless access using 4G LTE, 5G NR or a future 6G standard, and the SV comprises a RAN and a CN, e.g. as described for FIGS. 2 and 7-9. When the service link supports 5G NR, registering with the SV by the UE may comprise performing a NAS Registration by the UE with the SV prior to sending the MO data to the SV and de-registering from the SV may comprise performing a NAS De-registration by the UE with the SV after sending the MO data to the SV, e.g. as described for FIG. 7. When the service link supports 4G LTE, registering with the SV by the UE may comprise performing a NAS Attach by the UE with the SV prior to sending the MO data to the SV and de-registering from the SV by the UE may comprise performing a NAS Detach by the UE with the SV, e.g. as described above following the description of FIG. 14B.

In some aspects, the SV includes an endpoint proxy function (e.g. endpoint proxy 240) for the at least one remote endpoint, where the endpoint proxy function mimics a behavior of the at least one remote endpoint from a perspective of the UE, and where the MO data is received by the server from the endpoint proxy function, e.g. as described for FIGS. 7 and 8. Mimicking the behavior of the at least one remote endpoint from the perspective of the UE may include returning by the endpoint proxy function at least one of: a pre-configured response to the UE at an application level; a response to the UE at a transport level; or both of these, e.g. as described for FIG. 7.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7.

In some aspects the server accesses the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6. The server may include a UE proxy function for the UE (e.g. a UE proxy 340), where the UE proxy function mimics a behavior of the UE from a first perspective of the at least one remote endpoint and a second perspective of the network, where the MO data is received from the SV by the UE proxy function, and where forwarding the MO data to the at least one remote endpoint comprises forwarding the MO data from the UE proxy function, e.g. as described for FIG. 8. Mimicking the behavior of the UE from the perspective of the at least one remote endpoint may include sending at least one of: a pre-configured message to the at least one remote endpoint at an application level; a response to the at least one remote endpoint at a transport level; or both of these, e.g. as described for FIG. 8. Mimicking the behavior of the UE from the perspective of the network may comprise performing: a NAS Registration of the UE with the network for option (a) or option (b) when the wireless access type is 5G NR, e.g. as described for FIG. 8; or a NAS Attach of the UE with the network for option (a) or option (b) when the wireless access type is 4G LTE, e.g. as described above following the description of FIG. 14B. Mimicking the behavior of the UE from the perspective of the network may further comprise keeping the UE in a permanent Connected state from the perspective of the network, e.g. as described for FIG. 8.

In some aspects, the server: receives mobile terminated (MT) data via the network, where the MT data originates from the at least one remote endpoint; stores the MT data; and sends the MT data to a second SV (e.g. another SV 104) using a second feeder link for forwarding the MT data to the UE using a second service link at a later time, e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 8.

In some aspects, the SV and the server have subscription information for the UE, where the subscription information for the UE permits the UE to send the MO data to the at least one remote endpoint via the SV and the server, e.g. as described for FIGS. 7 and 8.

Figure 30:
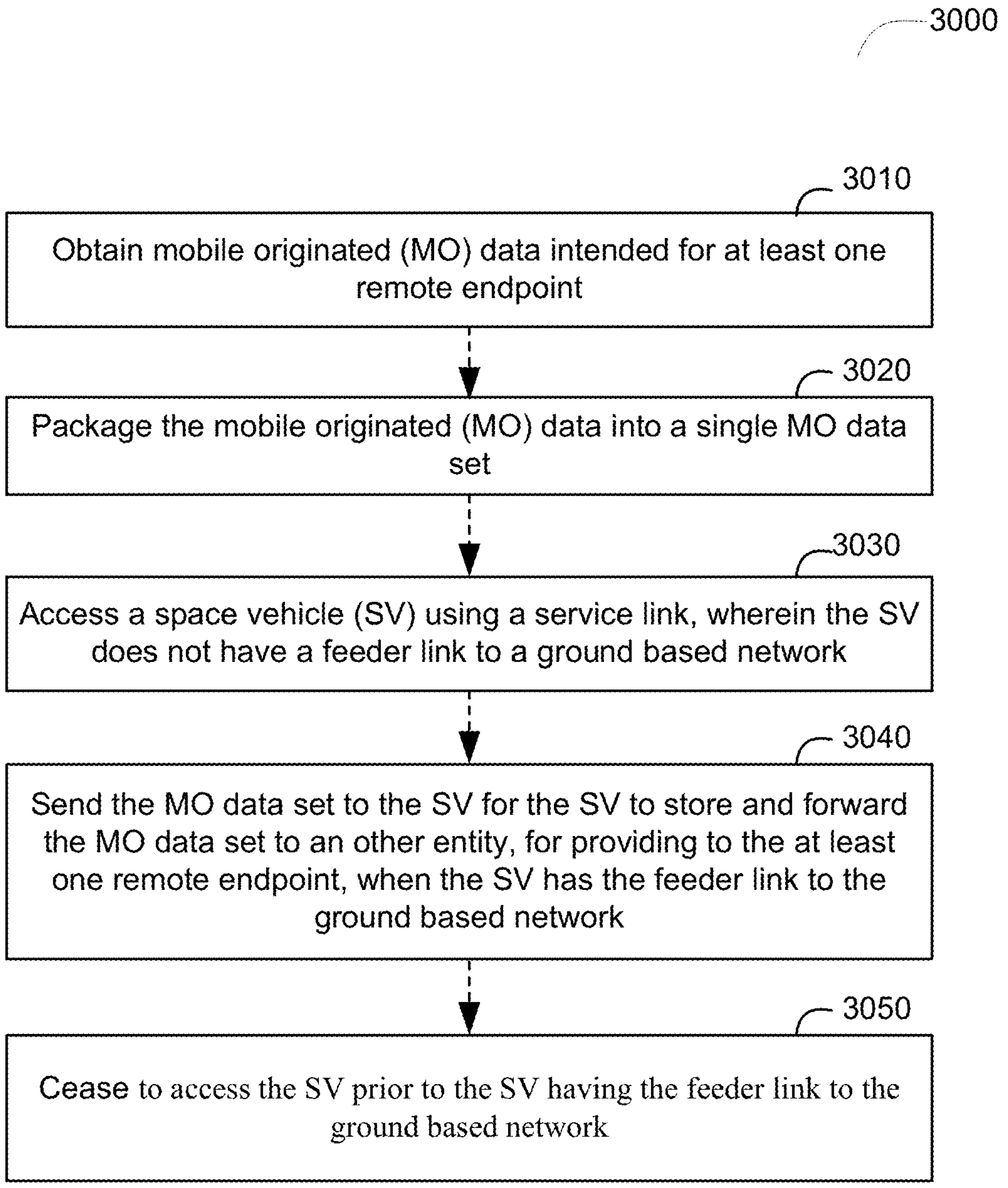
FIG. 30 is a flow diagram of a method of supporting wireless communication performed by a user equipment.

FIG. 30 is a flow diagram of a method 3000 of supporting wireless communication performed by a user equipment (e.g. a UE 102; the apparatus 2204). Example components of a UE are provided with respect to FIG. 22. The method may improve coverage for the UE by enabling the UE to send and/or receive communication via an SV when the SV may have intermittent feeder link connection to a ground based network.

At block 3010, the UE obtains mobile originated (MO) data intended for at least one remote endpoint (e.g. a remote endpoint 116). As an example, FIGS. 10 and 11 illustrate aspects of a UE obtaining MO data intended for a remote endpoint. As an example, the obtaining may be performed, e.g., by the communication component 2298, the transceiver 2222 and/or the antennas 2280 of the apparatus 2204.

At block 3020, the UE packages the mobile originated (MO) data into a single MO data set, e.g. as described for FIGS. 10 and 11. As an example, the packaging may be performed, e.g., by the communication component 2298 of the apparatus 2204.

At block 3030, the UE accesses a space vehicle (e.g. an SV 104) using a service link, where the SV does not have a feeder link to a ground based network (e.g. a PLMN 108), e.g. as described for FIGS. 10 and 11. As an example, the access may be performed, e.g., by the communication component 2298, the transceiver 2222 and/or the antennas 2280 of the apparatus 2204.

At block 3040, the UE sends the MO set to the SV for storage of the MO data set and forwarding to another entity, for providing to the at least one remote endpoint, when the SV has the feeder link to the ground based network. FIGS. 10 and 11 illustrate example aspects of a UE sending the MO set to the SV. As an example, the sending may be performed, e.g., by the communication component 2298, the transceiver 2222 and/or the antennas 2280 of the apparatus 2204.

At block 3050, the UE ceases to access the SV, e.g., prior to the SV having the feeder link to the ground based network. The SV may then forward the MO data set to another entity using the feeder link, where the other entity unpackages the MO data set into the MO data, and where the other entity provides the MO data to the at least one remote endpoint, e.g. as described for FIGS. 10 and 11. As an example, the cessation may be performed, e.g., by the communication component 2298 of the apparatus 2204.

In some aspects, the service link supports wireless access to the SV using 4G LTE, 5G NR or a future 6G standard, and the SV comprises a RAN and CN, e.g. as described for FIGS. 2, 10 and 11. When the service link supports 5G NR, accessing the SV may include performing a NAS Registration with the SV and ceasing to access the SV may include performing a NAS De-registration with the SV, e.g. as described for FIGS. 10 and 11. When the service link supports 4G LTE, accessing the SV may include performing a NAS Attach with the SV and ceasing to access the SV may include performing a NAS Detach with the SV, e.g. as described above following the description of FIG. 14B.

In an embodiment, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIGS. 10 and 11.

In some aspects, the single MO data set comprises a bit sequence or an octet sequence, e.g. as described for FIGS. 10 and 11.

In some aspects, packaging the MO data into the single MO data set comprises: combining different types of the MO data into the single MO data set; and including control information in the MO data set identifying the different types of the MO data, e.g. as described for FIGS. 10 and 11. Unpackaging the single MO data set into the MO data by the other entity may then comprise: identifying the different types of the MO data in the single MO data set by the other entity based on the control information; and separating the different types of the MO data by the other entity, e.g. as described for FIGS. 10 and 11.

In some aspects, the other entity is a ground based server (e.g. an SFC 202), where the ground based server provides the MO data to the at least one remote endpoint by sending the MO data to the at least one remote endpoint via the network, e.g. as described for FIG. 10. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6.

In some aspects, the single MO data set is transparent to the SV, and the other entity comprises the at least one remote endpoint. In some aspects, the at least one remote endpoint comprises a single remote endpoint, where the SV forwards the MO data set to a ground based server (e.g. an SFC 202) using the feeder link, and where the ground based server forwards the MO data set to the single endpoint via the network, e.g. as described for FIG. 11.

In some aspects, the SV may be a first SV, the feeder link may be a first feeder link, and the service link may be a first service link. In such aspects, the UE may access a second SV (e.g. another SV 104) at a later time using a second service link, where the second SV does not have a second feeder link to the ground based network. The UE may then receive a mobile terminated (MT) data set from the second SV, where the MT data set contains MT data originated from the at least one remote endpoint (e.g., where the MT data was stored by the second SV), e.g. as described for FIGS. 10 and 11. The UE may then obtain the MT data by unpackaging the MT data set. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIGS. 10 and 11. The second SV may receive the MT data set from a ground based server (e.g. an SFC 202), where the server receives the MT data from the at least one remote endpoint via the network, and where the server packages the MT data into the MT data set, e.g. as described for FIG. 10. Alternatively, the second SV may receive the MT data set from a ground based server (e.g. an SFC 202), where the server receives the MT data set from the at least one remote endpoint via the network, where the at least one remote endpoint comprises a single remote endpoint, and where the single remote endpoint packages the MT data into the MT data set, e.g. as described for FIG. 11. The UE may further: obtain second MO data intended for the at least one remote endpoint; package the second MO data into a second single MO data set; and send the second single MO data set to the second SV for storing and forwarding when the second SV later has the second feeder link to the ground based network. For example, the second SV may store the second single MO data set, and when the second SV later has the second feeder link to the ground based network, the SV may forward the second single MO data set to the other entity using the feeder link, where the other entity unpackages the second single MO data set into the second MO data, and where the other entity provides the second MO data to the at least one remote endpoint, e.g. as described for FIGS. 10 and 11.

In some aspects, packaging the MO data into the single MO data set at block 3020 and/or unpackaging the MT data set into the MT data may be performed by an application on the UE, e.g. as described for FIGS. 10 and 11. A user of the UE may provide the MO data to the application and may obtain the MT data from the App when the UE does not have access to an SV.

Figure 31:
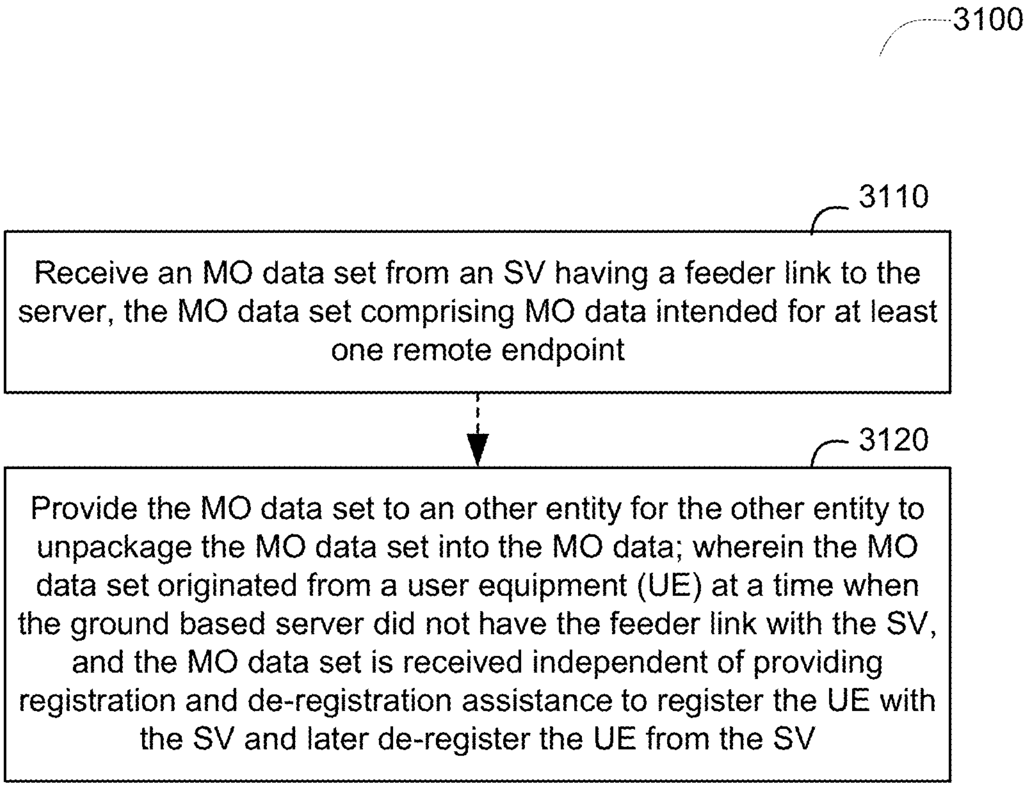
FIG. 31 is a flow diagram of a method of supporting wireless communication performed by a server.

FIG. 31 is a flow diagram of a method 3100 of supporting wireless communication performed by a server (e.g. an SFC 202; the network entity 2402). Example components of a server are provided with respect to FIG. 24. The method may improve communication with a UE via an SV to that has an intermittent feeder link connection to a ground based network.

At block 3110, the server receives an MO data set from a space vehicle (e.g. an SV 104), where the SV has a feeder link to the server, and where the MO data set comprises MO data intended for at least one remote endpoint (e.g. a remote endpoint 116). FIGS. 10 and 11 illustrate various example aspects of a server receiving an MO data set from an SV. The reception may be performed, e.g., by the store and forward component 2499, the communications interface 2448, the transceiver(s) 2446, and/or the antenna(s) 2480 of the network entity 2402 in FIG. 24.

At block 3120, the server provides the MO data set to an other entity for unpackaging of the MO data set into the MO data, wherein the MO data set originated from a UE at a time when the ground based server did not have the feeder link with the SV, and the MO data set is received independent of providing registration and de-registration assistance to register the UE with the SV and later de-register the UE from the SV. For example, the other entity may unpackage the MO data set into the MO data, where the other entity provides the MO data to the at least one remote endpoint, where a user equipment (e.g. a UE 102) sent the MO data set to the SV using a service link when the SV did not have the feeder link, and where the UE registered with the SV and later de-registered from the SV without assistance from the server, e.g. as described for FIGS. 10 and 11. The providing may be performed, e.g., by the store and forward component 2499, the communications interface 2448, the transceiver(s) 2446, and/or the antenna(s) 2480 of the network entity 2402 in FIG. 24.

In some aspects, the service link supports wireless access by the UE to the SV using 4G LTE, 5G NR or a future 6G standard, and the SV comprises a RAN and a CN, e.g. as described for FIGS. 2, 10 and 11. When the service link supports 5G NR, registering with the SV by the UE may comprise performing a NAS Registration by the UE with the SV prior to sending the MO data set to the SV and de-registering from the SV may comprise performing a NAS De-registration by the UE with the SV after sending the MO data set to the SV, e.g. as described for FIGS. 10 and 11. When the service link supports 4G LTE, registering with the SV by the UE may comprise performing a NAS Attach by the UE with the SV prior to sending the MO data set to the SV and de-registering from the SV by the UE may comprise performing a NAS Detach by the UE with the SV, e.g. as described above following the description of FIG. 14B.

In some aspects, the UE obtains the MO data and packages the MO data into the MO data set, e.g. as described for FIGS. 10 and 11. Packaging the MO data into the single MO data set by the UE may comprise: combining different types of the MO data into the MO data set; and including control information in the MO data set identifying the different types of the MO data, e.g. as described for FIGS. 10 and 11. Unpackaging the single MO data set into the MO data by the other entity may comprise: identifying the different types of the MO data in the single MO data set by the other entity based on the control information; and separating the different types of the MO data by the other entity, e.g. as described for FIGS. 10 and 11.

In some aspects, the MO data comprises at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIGS. 10 and 11.

In some aspects, the MO data set may comprise a bit sequence or an octet sequence, e.g. as described for FIGS. 10 and 11.

In some aspects, the other entity is the ground based server, and the server may then provide the MO data to the at least one remote endpoint by sending the MO data to the at least one remote endpoint via the network, e.g. as described for FIG. 10. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises or is part of the network, e.g. as described for FIGS. 4-6.

In some aspects, the other entity comprises the at least one remote endpoint, where the at least one remote endpoint comprises a single remote endpoint, e.g. as described for FIG. 11. In such aspects, the server may forward the MO data set to the single endpoint via the network, e.g. as described for FIG. 11.

In some aspects, the server obtains a mobile terminated (MT) data set, where the MT data set comprises MT data, and where the MT data originates from the at least one remote endpoint, e.g. as described for FIGS. 10 and 11. The server may then store the MT data set, and send the MT data set to a second SV (e.g. another SV 104) using a second feeder link for forwarding to the UE using a second service link at a later time. For example, the second SV may forward the MT data set to the UE using a second service link at a later time, and where the UE obtains the MT data by unpackaging the MT data set, e.g. as described for FIGS. 10 and 11. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIGS. 10 and 11. The server may receive the MT data from the at least one remote endpoint via the ground based network, and the server may then package the MT data into the MT data set, e.g. as described for FIG. 10. Alternatively, the server may receive the MT data set from the at least one remote endpoint via the network, where the at least one remote endpoint comprises a single remote endpoint, and where the single remote endpoint packages the MT data into the MT data set, e.g. as described for FIG. 11. The server may further receive a second MO data set from a second SV (e.g. another SV 104), where the second SV has a second feeder link to the server, and where the second MO data set comprises second MO data intended for the at least one remote endpoint, e.g. as described for FIGS. 10 and 11. The server may then provide the second MO data set to the other entity for unpackaging the second MO data set into the second MO data, e.g., for providing the second MO data to the at least one remote endpoint. For example, the other entity may unpackage the second MO data set into the second MO data, where the other entity provides the second MO data to the at least one remote endpoint, where the UE sent the second MO data set to the second SV using a second service link when the SV did not have the feeder link, and where the UE registered with the second SV and later de-registered from the second SV without assistance from the server, e.g. as described for FIGS. 10 and 11.

In some aspects, packaging the MO data into the MO data set and unpackaging the MT data set into the MT data may be performed by an application on the UE, e.g. as described for FIGS. 10 and 11. A user of the UE may then provide the MO data to the application and may obtain the MT data from the application when the UE does not have access to an SV.

Figure 32:
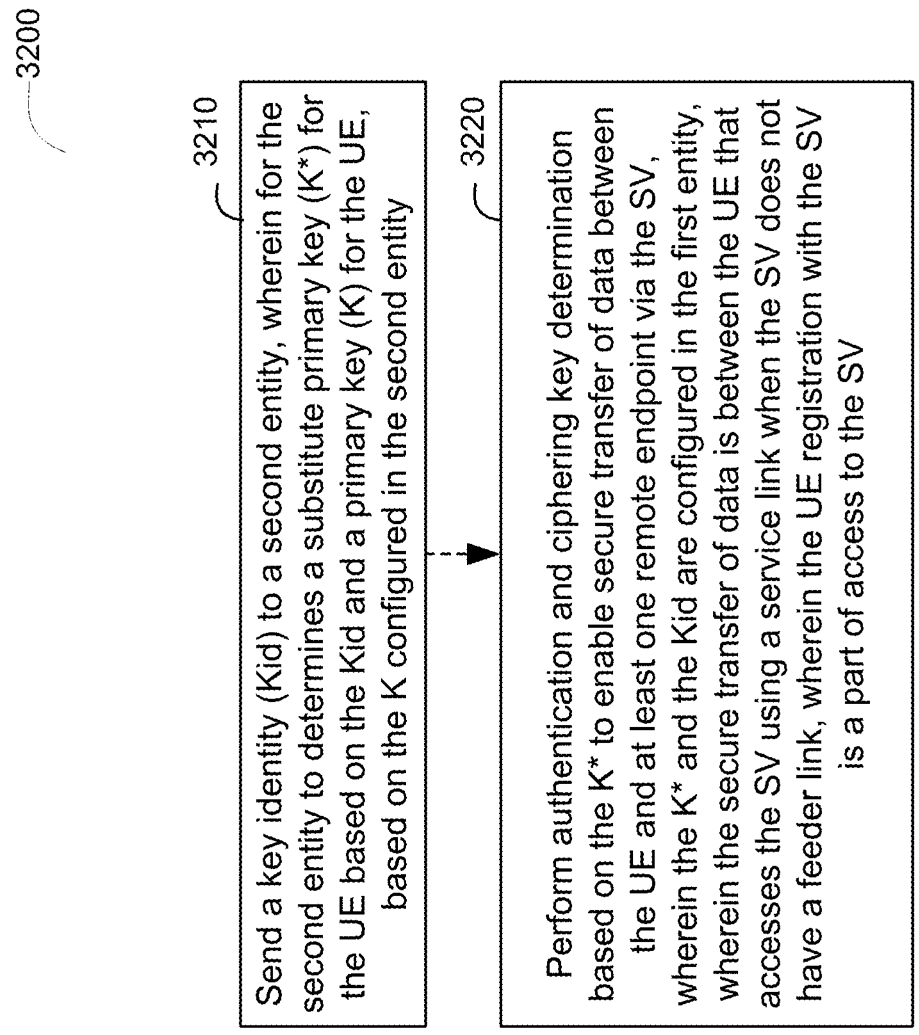
FIG. 32 is a flow diagram of a method of enabling security for wireless access by a UE to a space vehicle in a store and forward mode.

FIG. 32 is a flow diagram of a method 3200 of enabling security for wireless access by a UE (e.g. a UE 102) to a space vehicle (e.g. an SV 104) in a store and forward mode performed by a first entity. The first entity may be the SV, a UE proxy function in a server or a server. Example components of an SV are provided with respect to FIG. 23. Example components of a server are provided with respect to FIG. 24.

At block 3210, the first entity sends a key identity (Kid) to a second entity, where the second entity determines a substitute primary key (K*) for the UE based on the Kid and a primary key (K) for the UE, where the K is configured in the second entity, e.g. as described for FIGS. 12, 13, 14A and/or 14B.

At block 3220, the first entity performs authentication and ciphering key determination based on the K*, where the K* and the Kid are configured in the first entity, where the UE accesses the SV using a service link, where the SV does not have a feeder link when accessed by the UE, where the UE registers with the SV as part of accessing the SV, and where the authentication and the ciphering key determination help enable secure transfer of data between the UE and at least one remote endpoint (e.g. a remote endpoint 116) via the SV, e.g. as described for FIGS. 12, 13, 14A and/or 14B.

In an embodiment, the second entity determines the K* based on the Kid and the K for the UE by ciphering the Kid using the K (e.g. using equation 1), e.g. as described for FIGS. 12, 13, 14A and/or 14B. The Kid may include one or more of: pseudo-random or random bits or octets; a date; and a time.

In an embodiment, the service link supports wireless access to the SV using 4G LTE, 5G NR or a future 6G standard, where the SV comprises a RAN and a CN, e.g. as described for FIGS. 2, 12, 13, 14A and/or 14B. When the service link supports 5G NR, registering by the UE with the SV may comprise performing a NAS Registration by the UE with the SV, e.g. as described for FIGS. 12, 13, 14A and/or 14B. When the service link supports 4G LTE, registering by the UE with the SV may comprise performing a NAS Attach by the UE with the SV, e.g. as described above following the description of FIG. 14B. The SV may further comprise an IMS, where registering with the SV by the UE comprises performing an IMS Registration by the UE with the SV, e.g. as described for FIG. 13.

In an embodiment, the first entity is the SV and the second entity is the UE, and the SV (i.e. first entity) may then send the Kid to the UE and perform the authentication and the ciphering key determination as part of the UE registering with the SV, e.g. as described for FIGS. 12 and 13. The SV (i.e. first entity) may also obtain the Kid and K* from one of the following: an O&M server, where the O&M server configures the Kid and K* in the SV; or the UE, where the UE sends the Kid and K* to the SV as part of the registering by the UE with the SV, e.g. as described for FIGS. 12, 13, 14A and/or 14B.

In an embodiment, the UE sends mobile originated (MO) data intended for the at least one remote endpoint to the SV, where the SV stores the MO data, where the SV later has the feeder link to a ground based network (e.g. a PLMN 108), where the SV forwards the MO data to a server (e.g. an SFC 202) using the feeder link, where the server registers the UE with the network, and where the server forwards the MO data to the at least one remote endpoint via the network, e.g. as described for FIGS. 7 and 8. The MO data may comprise at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises, or is part of, the network, e.g. as described for FIGS. 4-6. The server may include a UE proxy function for the UE (e.g. a UE proxy 340), where the UE proxy function mimics a behavior of the UE from a perspective of the at least one remote endpoint and a perspective of the network, where the UE proxy function receives the MO data from the SV, and where the UE proxy function forwards the MO data to the at least one remote endpoint via the network, e.g. as described for FIGS. 7 and 8. Mimicking the behavior of the UE from the perspective of the at least one remote endpoint by the UE proxy function may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network by the UE proxy function may comprise the registering the UE with the network, where the registering the UE with the network comprises performing by the UE proxy function one of: a NAS Registration of the UE with the network when the wireless access type is 5G NR; a NAS Attach of the UE with the network when the wireless access type is 4G LTE; or an IMS Registration of the UE with the network, e.g. as described for FIG. 8. The first entity may be the UE proxy function and the second entity may be a UDM or HSS in an HPLMN for the UE, and the first entity (i.e. UE proxy function) may then perform the authentication and the ciphering key determination as part of the registering the UE with the network, e.g. as described for FIGS. 12, 13, 14A and/or 14B. The first entity (i.e. UE proxy function) may also obtain the Kid and K* from one of the following: an O&M server, where the O&M server configures the Kid and K* in the UE proxy function or in the server; the SV, wherein the SV transfers the Kid and K* to the UE proxy function when the SV has the feeder link to the ground based network; or the UDM or the HSS in the HPLMN for the UE, where the UDM or HSS sends the Kid and K* to the UE proxy function via the ground based network as part of the registering the UE with the ground based network, e.g. as described for FIGS. 12, 13, and 14B.

In an embodiment, the UE receives mobile terminated (MT) data from the SV, where the MT data was stored by the SV, where the SV received the MT data from a server (e.g. an SFC 202), where the server registers the UE with the network, and where the server received the MT data from the at least one remote endpoint via a ground based network (e.g. a PLMN 108), e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 8. The first entity may be the SV and the second entity may be the UE, and the SV (i.e. first entity) may then perform the authentication and the ciphering key determination as part of the UE registering with the SV, e.g. as described for FIGS. 12, 13 and 14A. The SV (i.e. first entity) may also obtain the Kid and K* from the server, where the server receives the Kid and K* from an HPLMN of the UE as part of the server registering the UE with the network, e.g. as described for FIG. 14A.

Figure 33:
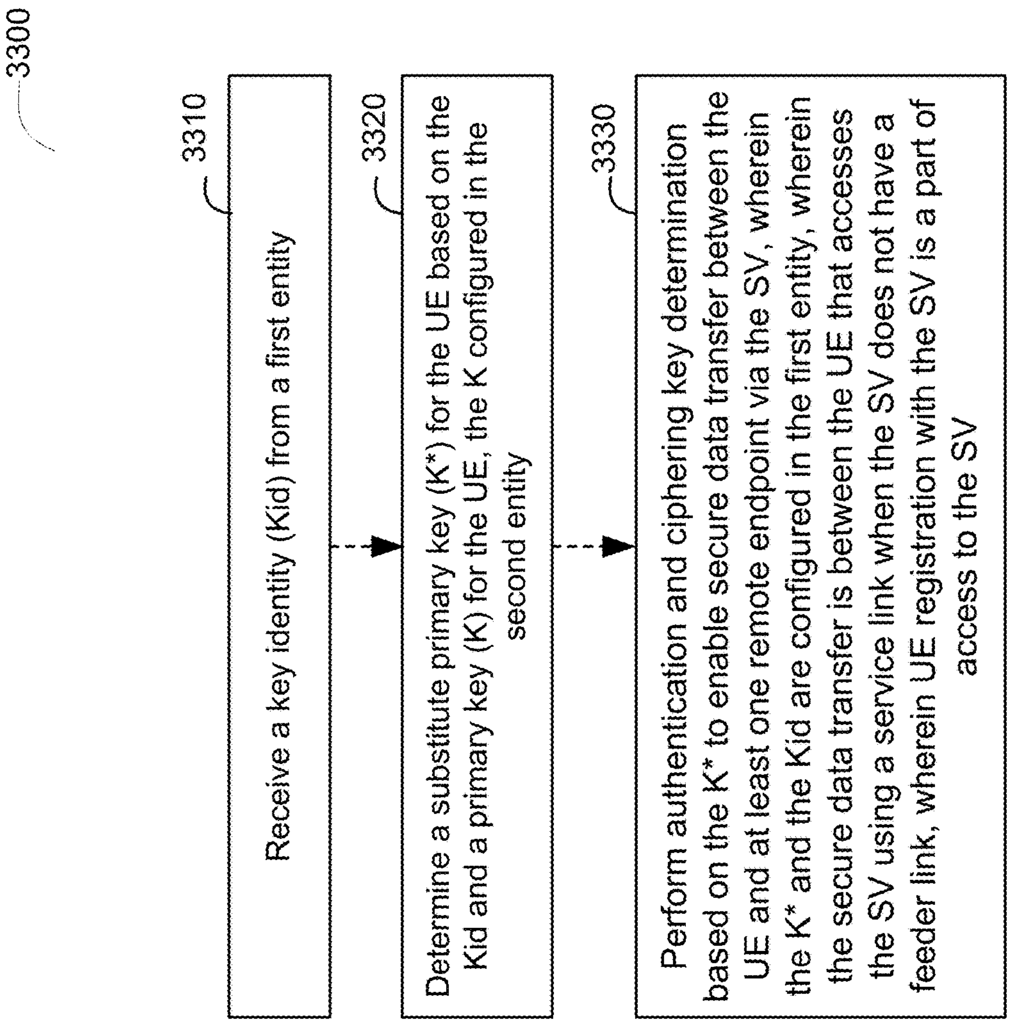
FIG. 33 is a flow diagram of a method of enabling security for wireless access by a UE to a space vehicle in a store and forward mode.

FIG. 33 is a flow diagram of a method 3300 of enabling security for wireless access by a UE (e.g. a UE 102) to a space vehicle (e.g. an SV 104) in a store and forward mode performed by a second entity. The second entity may be the UE or an entity (e.g. UDM or HSS) in an HPLMN for the UE. Example components of a UE are provided with respect to FIG. 22. Example components of a UDM and HSS are provided with respect to FIG. 25.

At block 3310, the second entity receives a key identity (Kid) from a first entity, e.g. as described for FIGS. 12, 13, 14A, and/or 14B.

At block 3320, the second entity determines a substitute primary key (K*) for the UE based on the Kid and a primary key (K) for the UE, where the K is configured in the second entity, e.g. as described for FIGS. 12, 13, 14A and/or 14B.

At block 3330, the second entity performs authentication and ciphering key determination based on the K*, where the K* and the Kid are configured in the first entity, where the UE accesses the SV using a service link, where the SV does not have a feeder link when accessed by the UE, where the UE registers with the SV as part of accessing the SV, and where the authentication and the ciphering key determination help enable secure transfer of data between the UE and at least one remote endpoint (e.g. a remote endpoint 116) via the SV, e.g. as described for FIGS. 12, 13, 14A and/or 14B.

In an embodiment, the second entity determines the K* based on the Kid and the K for the UE by ciphering the Kid using the K (e.g. using equation 1), e.g. as described for FIGS. 12, 13, 14A and/or 14B. The Kid may include one or more of: pseudo-random or random bits or octets; a date; and a time.

In an embodiment, the service link supports wireless access to the SV using 4G LTE, 5G NR or a future 6G standard, and the SV comprises a RAN and a CN, e.g. as described for FIGS. 2, 12, 13, 14A and/or 14B. When the service link supports 5G NR, registering by the UE with the SV may comprise performing a NAS Registration by the UE with the SV, e.g. as described for FIGS. 12, 13, and 14A. When the service link supports 4G LTE, registering by the UE with the SV may comprise performing a NAS Attach by the UE with the SV, e.g. as described above following the description of FIG. 14B. The SV may further comprise an IMS, where registering with the SV by the UE comprises performing an IMS Registration by the UE with the SV, e.g. as described for FIG. 13.

In an embodiment, the first entity is the SV and the second entity is the UE, and the UE (i.e. second entity) may then receive the Kid from the SV and perform the authentication and the ciphering key determination as part of the registering with the SV, e.g. as described for FIGS. 12 and 13. The SV (i.e. first entity) may also obtain the Kid and K* from one of the following: an O&M server, where the O&M server configures the Kid and K* in the SV; or the UE, wherein the UE sends the Kid and K* to the SV as part of the registering by the UE with the SV, e.g. as described for FIGS. 12, 13 and/or 14A.

In an embodiment, the UE sends mobile originated (MO) data intended for the at least one remote endpoint to the SV, where the SV stores the MO data, where the SV later has the feeder link to a ground based network (e.g. a PLMN 108), where the SV forwards the MO data to a server (e.g. an SFC 202) using the feeder link, where the server registers the UE with the network, and where the server forwards the MO data to the at least one remote endpoint via the network, e.g. as described for FIGS. 7 and 8. The MO data may comprise at least one of: an MO SMS message; media data for a Session Initiation Protocol (SIP), where the media data includes at least one of voice, text or video; MO data transported using non-IP, IP, UDP/IP or TCP/IP; an Internet query; an Email query; or some combination of these, e.g. as described for FIG. 7. The server may access the network using an option (a), option (b) or option (c), where: for option (a), the server attaches as an NTN gateway to the network and the network comprises a RAN and a CN for a wireless access type; for option (b), the server attaches as a base station to the network and the network comprises the CN for the wireless access type; and for option (c), the server comprises, or is part of, the network, e.g. as described for FIGS. 4-6. The server may include a UE proxy function for the UE (e.g. a UE proxy 340), where the UE proxy function mimics a behavior of the UE from a perspective of the at least one remote endpoint and a perspective of the network, where the UE proxy function receives the MO data from the SV, and where the UE proxy function forwards the MO data to the at least one remote endpoint via the network, e.g. as described for FIG. 8. Mimicking the behavior of the UE from the perspective of the at least one remote endpoint by the UE proxy function may include sending by the UE proxy function at least one of: a pre-configured message to the at least one remote endpoint at an application level; a response to the at least one remote endpoint at a transport level; or both of these, e.g. as described for FIG. 8. Mimicking the behavior of the UE from the perspective of the network by the UE proxy function may comprise the registering the UE with the network, where the registering the UE with the network comprises performing by the UE proxy function one of: a NAS Registration of the UE with the network when the wireless access type is 5G NR; a NAS Attach of the UE with the network when the wireless access type is 4G LTE; or an IMS Registration of the UE with the network, e.g. as described for FIG. 8. The first entity may the UE proxy function and the second entity may be a UDM or HSS in an HPLMN for the UE, and the second entity (i.e. the UDM or HSS) may then perform the authentication and the ciphering key determination as part of the registering the UE with the network by the server, e.g. as described for FIG. 14. The first entity (i.e. the UE proxy function) may obtain the Kid and K* from one of the following: an O&M server, where the O&M server configures the Kid and K* in the UE proxy function or in the server; the SV, where the SV transfers the Kid and K* to the UE proxy function when the SV has the feeder link to the ground based network; or the UDM or the HSS in the HPLMN for the UE, and where the UDM or HSS sends the Kid and K* to the UE proxy function via the ground based network as part of the registering the UE with the ground based network by the server, e.g. as described for FIGS. 12, 13 and/or 14B.

In an embodiment, the UE receives mobile terminated (MT) data from the SV, where the MT data was stored by the SV, where the SV received the MT data from a server (e.g. an SFC 202), where the server registers the UE with the network, and where the server received the MT data from the at least one remote endpoint via a ground based network, e.g. as described for FIGS. 8 and 9. The MT data may comprise at least one of: an MT SMS message; media data for a Session Initiation Protocol (SIP), where the media data includes at least one of voice, text or video; MT data transported using non-IP, IP, UDP/IP or TCP/IP; an Internet query response; an Email; or some combination of these, e.g. as described for FIG. 8. The first entity may be the SV and the second entity may be the UE, and the UE (i.e. second entity) may then perform the authentication and the ciphering key determination as part of the registering with the SV, e.g. as described for FIGS. 12, 13, 14A and/or 14B. The SV (i.e. first entity) may also obtain the Kid and K* from the server, where the server receives the Kid and K* from an HPLMN of the UE as part of the server registering the UE with the network, e.g. as described for FIG. 14A and/or 14B.

This disclosure provides a method for wireless communication at a UE. The method may include creating an endpoint proxy corresponding to a UE, the endpoint proxy simulating an* end device in a terrestrial network; receiving, as the endpoint proxy, communication from the UE to be delivered to the end device in the terrestrial network; storing the communication at the SV during a time period when a feeder link between the SV and the terrestrial network is unavailable; and forwarding the communication to the terrestrial network when the feeder link becomes available. The method revolutionizes wireless communication through the NTN by introducing the S&F mode that enables seamless connectivity between ground-based networks and UE via an SV. It increases service availability, reduces latency, and enhances data transfer speeds, particularly in areas with intermittent or unreliable network coverage.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication performed by a user equipment (UE) comprising: obtaining mobile originated (MO) data intended for at least one remote endpoint; packaging the mobile originated (MO) data into a single MO data set; accessing a space vehicle (SV) using a service link, wherein the SV does not have a feeder link to a ground based network; sending the single MO data set to the SV for storage of the single MO data set and forwarding to an other entity, for unpackaging the single MO data set into the MO data and providing the MO data to the at least one remote endpoint, when the SV has the feeder link to the ground based network; and ceasing to access the SV prior to the SV having the feeder link to the ground based network.

In aspect 2, the method of aspect 1 further includes that the service link supports wireless access to the SV using 4G LTE, 5G NR or a future 6G standard, wherein the SV comprises a radio access network (RAN) and a core network (CN).

In aspect 3, the method of aspect 2 further includes that accessing the SV includes performing a non-access stratum (NAS) registration with the SV and ceasing to access the SV includes performing a NAS de-registration with the SV when the service link supports the 5G NR, wherein accessing the SV includes performing a NAS attach with the SV and ceasing to access the SV includes performing a NAS detach with the SV when the service link supports the 4G LTE.

In aspect 4, the method of any of aspects 1-3 further includes that the MO data comprises at least one of: an MO short message service (SMS) message; media data for a Session Initiation Protocol (SIP), wherein the media data includes at least one of voice, text or video; MO data transported using non-internet protocol (non-IP), internet protocol (IP), user datagram protocol (UDP)/IP or transmission control protocol (TCP)/IP; an Internet query; an Email query; or some combination of these.

In aspect 5, the method of any of aspects 1-4 further includes that the single MO data set comprises a bit sequence or an octet sequence.

In aspect 6, the method of any of aspects 1-5 further includes that packaging the MO data into the single MO data set comprises: combining different types of the MO data into the single MO data set; and including control information in the single MO data set identifying the different types of the MO data.

In aspect 7, the method of any of aspects 1-6 further includes that the other entity is a ground based server.

In aspect 8, the method of any of aspects 1-6 further includes that the single MO data set is transparent to the SV, wherein the other entity comprises the at least one remote endpoint, wherein the at least one remote endpoint comprises a single remote endpoint.

In aspect 9, the method of any of aspects 1-8 further includes that the SV is a first SV, the feeder link for the first SV is a first feeder link, and the service link to the first SV is a first service link, the method further comprising: accessing a second SV at a later time using a second service link, wherein the second SV does not have a second feeder link to the ground based network; receiving a mobile terminated (MT) data set from the second SV, wherein the MT data set contains MT data originated from the at least one remote endpoint; and obtaining the MT data by unpackaging the MT data set.

In aspect 10, the method of aspect 9 further includes that the MT data comprises at least one of: an MT short message service (SMS) message; media data for a Session Initiation Protocol (SIP), wherein the media data includes at least one of voice, text or video; the MT data that is transported using non-internet protocol (non-IP), internet protocol (IP), user datagram protocol (UDP)/IP or transmission control protocol (TCP)/IP; an Internet query response; an Email; or some combination of these.

In aspect 11, the method of aspect 9 or 10 further includes obtaining second MO data intended for the at least one remote endpoint; packaging the second MO data into a second single MO data set; and sending the second single MO data set to the second SV for storing and forwarding when the second SV later has the second feeder link to the ground based network.

In aspect 12, the method of any of aspects 1-11 further includes that one or more of packaging the MO data into the single MO data set or unpackaging the MT data set into the MT data is performed by an application on the UE.

In aspect 13, the method of aspect 12 further includes that a user of the UE provides the MO data to the application and obtains the MT data from the application when the UE does not have access to the SV.

Aspect 14 is an apparatus for wireless communication at a UE, the apparatus comprising: at least one memory; and at least one processor coupled to the at least one memory, the at least one processor, individually or in any combination, is configured to cause the UE to perform the method of any of 1-13.

Aspect 15 is an apparatus for wireless communication at a UE, comprising means for performing each step in the method of any of aspects 1-13.

Aspect 16 is the apparatus of any of aspects 14 to 15, further comprising a transceiver configured to receive or to transmit in association with the method of any of aspects 1-13.

Aspect 17 is a computer-readable medium (e.g., non-transitory) storing computer executable code at a UE, the code when executed by at least one processor causes the UE to perform the method of any of aspects 1-13.

Aspect 18 is a method of wireless communication performed by a ground based server comprising: receiving a mobile originated (MO) data set from a space vehicle (SV) having a feeder link to the server, the MO data set comprising MO data intended for at least one remote endpoint; and providing the MO data set to an other entity for unpackaging of the MO data set into the MO data and providing the MO data to the at least one remote endpoint; wherein the MO data set is sent by a user equipment (UE) to the SV using a service link at a time when the SV did not have the feeder link, wherein the UE is registered with the SV and later de-registered from the SV without assistance from the server.

In aspect 19, the method of aspect 18 further includes that the service link supports wireless access by the UE to the SV using 4G LTE, 5G NR or a future 6G standard, wherein the SV comprises a radio access network (RAN) and a core network (CN).

In aspect 20, the method of aspect 18 or 19 further includes that the MO data set includes different types of the MO data and control information identifying the different types of the MO data, wherein unpackaging a single MO data set into the MO data by the other entity comprises: identifying the different types of the MO data in the single MO data set by the other entity based on the control information; and separating the different types of the MO data by the other entity.

In aspect 21, the method of any of aspects 18-20 further includes that the MO data comprises at least one of: an MO short message service (SMS) message; media data for a Session Initiation Protocol (SIP), wherein the media data includes at least one of voice, text or video; the MO data that is transported using non-internet protocol (non-IP), internet protocol (IP), user datagram protocol (UDP)/IP or transmission control protocol (TCP)/IP; an Internet query; an Email query; or some combination of these.

In aspect 22, the method of any of aspects 18-21 further includes that the MO data set comprises a bit sequence or an octet sequence.

In aspect 23, the method of any of aspects 18-22 further includes that the other entity is the ground based server, and further comprising providing the MO data to the at least one remote endpoint by sending the MO data to the at least one remote endpoint via a ground based network.

In aspect 24, the method of aspect 23 further includes that the ground based server accesses the ground based network using a first option, a second option, or a third option, wherein: for the first option, the ground based server attaches as an NTN gateway to the ground based network and the ground based network comprises a RAN and a CN for a wireless access type; for the second option, the ground based server attaches as a base station to the ground based network and the ground based network comprises the CN for the wireless access type; and for the third option, the ground based server comprises or is part of the ground based network.

In aspect 25, the method of any of aspects 16-24 further includes that the other entity comprises the at least one remote endpoint, wherein the at least one remote endpoint comprises a single remote endpoint, and further comprising forwarding the MO data set to the single remote endpoint via a network.

In aspect 26, the method of any of aspects 16-25 further includes obtaining a mobile terminated (MT) data set, the MT data set comprising MT data, the MT data originating from the at least one remote endpoint; storing the MT data set; and sending the MT data set to a second SV using a second feeder link for forwarding the MT data set to the UE using a second service link at a later time.

In aspect 27, the method of aspect 26 further includes that the MT data comprises at least one of: an MT short message service (SMS) message; media data for a Session Initiation Protocol (SIP), wherein the media data includes at least one of voice, text or video; the MT data that is transported using non-internet protocol (non-IP), internet protocol (IP), user datagram protocol (UDP)/IP or transmission control protocol (TCP)/IP; an Internet query response; an Email; or some combination of these.

In aspect 28, the method of aspect 26 or 27 further includes that the ground based server receives the MT data from the at least one remote endpoint via a ground based network, wherein the ground based server packages the MT data into the MT data set.

In aspect 29, the method of aspect 26 or 27 further includes that the ground based server receives the MT data set in a packaged form from the at least one remote endpoint via a ground based network, wherein the at least one remote endpoint comprises a single remote endpoint.

In aspect 30, the method of aspect 18-29 further includes that receiving a second MO data set from a second SV, the second SV having a second feeder link to the ground based server, the second MO data set comprising second MO data intended for the at least one remote endpoint; and providing the second MO data set to the other entity for unpackaging the second MO data set into the second MO data, for providing the second MO data to the at least one remote endpoint.

Aspect 31 is an apparatus for wireless communication at a ground based server, the apparatus comprising: at least one memory; and at least one processor coupled to the at least one memory, the at least one processor, individually or in any combination, is configured to cause the ground based server to perform the method of any of aspects 18-30.

Aspect 32 is an apparatus comprising means for performing each step in the method of any of aspects 18-30.

Aspect 33 is the apparatus of any of aspects 30 or 31, further comprising a transceiver configured to receive or to transmit in association with the method of any of aspects 18-30.

Aspect 34 is a computer-readable medium (e.g., non-transitory computer-readable medium) storing computer executable code at a ground based server, the code when executed by at least one processor causes the ground based server to perform the method of any of aspects 18-30.

What is claimed is:

1. An apparatus for wireless communication performed by a user equipment (UE) comprising:

at least one memory; and at least one processor coupled to the at least one memory and, based at least in part on information stored in the at least one memory, the at least one processor, individually or in any combination, is configured to cause the UE to:

obtain mobile originated (MO) data intended for at least one remote endpoint;

package the mobile originated (MO) data into a single MO data set, wherein to package the MO data into the single MO data set, the at least one processor is configured to cause the UE to:

combine different types of the MO data into the single MO data set; and include control information in the single MO data set identifying the different types of the MO data;

access a space vehicle (SV) using a service link, wherein the SV does not have a feeder link to a ground based network;

send the single MO data set to the SV for storage of the single MO data set and forwarding to an other entity, for unpackaging the single MO data set into the MO data and providing the MO data to the at least one remote endpoint, when the SV has the feeder link to the ground based network; and cease to access the SV prior to the SV having the feeder link to the ground based network.

2. The apparatus of claim 1, wherein the SV comprises a radio access network (RAN) and a core network (CN).

3. The apparatus of claim 2, wherein to access the SV, the at least one processor is configured to cause the UE to perform a non-access stratum (NAS) registration with the SV and, to cease to access the SV, the at least one processor is configured to cause the UE to perform a NAS de-registration with the SV when the service link supports the 5G NR, wherein to access the SV, the at least one processor is configured to cause the UE to perform a NAS attach with the SV and, to cease to access the SV, the at least one processor is configured to cause the UE to perform a NAS detach with the SV when the service link supports the 4G LTE.

4. The apparatus of claim 1, wherein the MO data comprises at least one of:

an MO short message service (SMS) message;

media data for a Session Initiation Protocol (SIP), wherein the media data includes at least one of voice, text or video;

MO data transported using non-internet protocol (non-IP), internet protocol (IP), user datagram protocol (UDP)/IP or transmission control protocol (TCP)/IP;

an Internet query;

an Email query; or some combination of these.

5. The apparatus of claim 1, wherein the single MO data set comprises a bit sequence or an octet sequence.

6. The apparatus of claim 1, wherein the other entity is a ground based server.

7. The apparatus of claim 1 wherein the single MO data set is transparent to the SV, wherein the other entity comprises the at least one remote endpoint, wherein the at least one remote endpoint comprises a single remote endpoint.

8. The apparatus of claim 1, wherein the SV is a first SV, the feeder link for the first SV is a first feeder link, and the service link to the first SV is a first service link, and wherein the at least one processor is further configured to cause the UE to:

access a second SV at a later time using a second service link, wherein the second SV does not have a second feeder link to the ground based network;

receive a mobile terminated (MT) data set from the second SV, wherein the MT data set contains MT data originated from the at least one remote endpoint; and obtain the MT data by unpackaging the MT data set.

9. The apparatus of claim 8, wherein the MT data comprises at least one of:

an MT short message service (SMS) message;

media data for a Session Initiation Protocol (SIP), wherein the media data includes at least one of voice, text or video;

the MT data that is transported using non-internet protocol (non-IP), internet protocol (IP), user datagram protocol (UDP)/IP or transmission control protocol (TCP)/IP;

an Internet query response;

an Email; or some combination of these.

10. The apparatus of claim 8, wherein the at least one processor is configured to cause the UE to:

obtain second MO data intended for the at least one remote endpoint;

package the second MO data into a second single MO data set; and send the second single MO data set to the second SV for storing and forwarding when the second SV later has the second feeder link to the ground based network.

11. The apparatus of claim 8, wherein an application on the UE is configured to one or more of package the MO data into the single MO data set or unpackage the MT data set into the MT data.

12. The apparatus of claim 11, wherein the MO data is provided to the application by a user of the UE and the MT data is obtained from the application when the UE does not have access to the SV.

13. The apparatus of claim 1, wherein an application on the UE is configured to package the MO data into the single MO data set.

14. An apparatus for wireless communication performed by a ground based server comprising:

at least one memory; and at least one processor coupled to the at least one memory and, based at least in part on information stored in the at least one memory, the at least one processor, individually or in any combination, is configured to cause the ground based server to:

receive a mobile originated (MO) data set from a space vehicle (SV) having a feeder link to the server, the MO data set comprising MO data intended for at least one remote endpoint; and provide the MO data set to an other entity for unpackaging of the MO data set into the MO data and providing the MO data to the at least one remote endpoint; wherein the MO data set is sent by a user equipment (UE) to the SV using a service link at a time when the SV did not have the feeder link, wherein the UE is registered with the SV and later de-registered from the SV without assistance from the server; and wherein the MO data set includes different types of the MO data and control information identifying the different types of the MO data, wherein to unpackage a single MO data set into the MO data by the other entity, the at least one processor is configured to cause the ground based server to:

identifying the different types of the MO data in the single MO data set by the other entity based on the control information; and separating the different types of the MO data by the other entity.

15. The apparatus of claim 14, wherein the service link supports wireless access by the UE to the SV using 4G LTE, 5G NR or a future 6G standard, wherein the SV comprises a radio access network (RAN) and a core network (CN).

16. The apparatus of claim 14, wherein the MO data comprises at least one of:

an MO short message service (SMS) message;

media data for a Session Initiation Protocol (SIP), wherein the media data includes at least one of voice, text or video;

the MO data that is transported using non-internet protocol (non-IP), internet protocol (IP), user datagram protocol (UDP)/IP or transmission control protocol (TCP)/IP;

an Internet query;

an Email query; or some combination of these.

17. The apparatus of claim 14, wherein the MO data set comprises a bit sequence or an octet sequence.

18. The apparatus of claim 14, wherein the other entity is the ground based server, and the at least one processor is configured to cause the ground based server to provide the MO data to the at least one remote endpoint by sending the MO data to the at least one remote endpoint via a ground based network.

19. The apparatus of claim 18, wherein the ground based server is configured to access the ground based network using a first option, a second option, or a third option, wherein:

for the first option, the ground based server is configured to attach as an NTN gateway to the ground based network and the ground based network comprises a RAN and a CN for a wireless access type;

for the second option, the ground based server is configured to attach as a base station to the ground based network and the ground based network comprises the CN for the wireless access type; and for the third option, the ground based server comprises or is part of the ground based network.

20. The apparatus of claim 14, wherein the other entity comprises the at least one remote endpoint, wherein the at least one remote endpoint comprises a single remote endpoint, and the at least one processor is further configured to cause the ground based server to forward the MO data set to the single remote endpoint via a network.

21. The apparatus of claim 14, wherein the at least one processor is further configured to cause the ground based server to:

obtain a mobile terminated (MT) data set, the MT data set comprising MT data, the MT data originating from the at least one remote endpoint;

store the MT data set; and send the MT data set to a second SV using a second feeder link for forwarding the MT data set to the UE using a second service link at a later time.

22. The apparatus of claim 21, wherein the MT data comprises at least one of:

an MT short message service (SMS) message;

media data for a Session Initiation Protocol (SIP), wherein the media data includes at least one of voice, text or video;

the MT data that is transported using non-internet protocol (non-IP), internet protocol (IP), user datagram protocol (UDP)/IP or transmission control protocol (TCP)/IP;

an Internet query response;

an Email; or some combination of these.

23. The apparatus of claim 21, wherein the at least one processor is configured to cause the ground based server to receive the MT data from the at least one remote endpoint via a ground based network and package the MT data into the MT data set.

24. The apparatus of claim 21, wherein the at least one processor is configured to cause the ground based server to receive the MT data set in a packaged form from the at least one remote endpoint via a ground based network, wherein the at least one remote endpoint comprises a single remote endpoint.

25. The apparatus of claim 20, wherein the at least one processor is further configured to cause the ground based server to:

receive a second MO data set from a second SV, the second SV having a second feeder link to the ground based server, the second MO data set comprising second MO data intended for the at least one remote endpoint; and provide the second MO data set to the other entity for unpackaging the second MO data set into the second MO data, for providing the second MO data to the at least one remote endpoint.

26. A method of wireless communication performed by a user equipment (UE) comprising:

obtaining mobile originated (MO) data intended for at least one remote endpoint;

packaging the mobile originated (MO) data into a single MO data set, wherein packaging the MO data into the single MO data set comprises:

combining different types of the MO data into the single MO data set; and including control information in the MO data set identifying the different types of the MO data;

accessing a space vehicle (SV) using a service link, wherein the SV does not have a feeder link to a ground based network;

sending the MO data set to the SV for storage of the MO data set and forwarding to an other entity, for unpackaging the MO data set into the MO data and providing the MO data to the at least one remote endpoint, when the SV has the feeder link to the ground based network; and ceasing to access the SV prior to the SV having the feeder link to the ground based network.

27. The method of claim 26, wherein the SV is a first SV, the feeder link for the first SV is a first feeder link, and the service link to the first SV is a first service link, the method further comprising:

accessing a second SV at a later time using a second service link, wherein the second SV does not have a second feeder link to the ground based network;

receiving a mobile terminated (MT) data set from the second SV, wherein the MT data set contains MT data originated from the at least one remote endpoint; and obtaining the MT data by unpackaging the MT data set.

* * * * *